(12) United States Patent
Hosoi et al.

(10) Patent No.: US 8,886,263 B2
(45) Date of Patent: Nov. 11, 2014

(54) INCOMING/OUTGOING-TALK UNIT AND INCOMING-TALK UNIT

(75) Inventors: Hiroshi Hosoi, Osaka (JP); Yoji Hosoi, Osaka (JP); Masashi Morimoto, Kyoto (JP); Masahide Tanaka, Osaka (JP)

(73) Assignees: Rohm Co., Ltd., Kyoto (JP); Hiroshi Hosoi, Osaka (JP)

(*) Notice: Subject to any disclaimer, the term of this patent is extended or adjusted under 35 U.S.C. 154(b) by 0 days.

(21) Appl. No.: 13/556,367

(22) Filed: Jul. 24, 2012

(65) Prior Publication Data
US 2012/0289162 A1    Nov. 15, 2012

Related U.S. Application Data

(63) Continuation of application No. PCT/JP2011/080099, filed on Dec. 26, 2011.

(30) Foreign Application Priority Data

| Date | | Number |
|---|---|---|
| Dec. 27, 2010 | (JP) | 2010-289894 |
| Jan. 20, 2011 | (JP) | 2011-009546 |
| Feb. 3, 2011 | (JP) | 2011-021312 |
| Feb. 14, 2011 | (JP) | 2011-028489 |
| Feb. 23, 2011 | (JP) | 2011-037543 |
| Feb. 24, 2011 | (JP) | 2011-038011 |
| Mar. 7, 2011 | (JP) | 2011-048787 |
| Mar. 23, 2011 | (JP) | 2011-064543 |
| Apr. 28, 2011 | (JP) | 2011-102006 |
| May 6, 2011 | (JP) | 2011-103604 |
| Jun. 3, 2011 | (JP) | 2011-125705 |
| Jun. 14, 2011 | (JP) | 2011-132634 |
| Jul. 4, 2011 | (JP) | 2011-147934 |
| Jul. 14, 2011 | (JP) | 2011-155966 |
| Jul. 29, 2011 | (JP) | 2011-166439 |
| Aug. 19, 2011 | (JP) | 2011-179815 |
| Sep. 2, 2011 | (JP) | 2011-191995 |
| Sep. 22, 2011 | (JP) | 2011-207627 |
| Oct. 3, 2011 | (JP) | 2011-219638 |
| Oct. 18, 2011 | (JP) | 2011-228890 |
| Nov. 7, 2011 | (JP) | 2011-243624 |
| Nov. 18, 2011 | (JP) | 2011-253267 |
| Dec. 16, 2011 | (JP) | 2011-276160 |

(51) Int. Cl.
*H04M 1/00* (2006.01)
*H04B 5/00* (2006.01)

(52) U.S. Cl.
CPC ............ *H04B 5/0006* (2013.01); *H04B 5/0081* (2013.01)
USPC ...................... 455/575.2; 381/151; 455/569.1

(58) Field of Classification Search
CPC .. H04R 25/00; H04R 25/606; H04R 2460/13; H04R 25/70; H04R 25/554; H04R 1/10; H04R 1/1016
USPC ........ 455/41.1, 41.2, 41.3, 566, 569.1, 575.1, 455/575.2, 90.3; 381/151, 374
See application file for complete search history.

(56) References Cited

U.S. PATENT DOCUMENTS

| | | | |
|---|---|---|---|
| 2004/0132509 A1* | 7/2004 | Glezerman | 455/575.2 |
| 2005/0046790 A1 | 3/2005 | Jannard et al. | |
| 2005/0176459 A1 | 8/2005 | Fukuda | |
| 2005/0275714 A1 | 12/2005 | Ishikawa et al. | |
| 2006/0079291 A1 | 4/2006 | Granovetter et al. | |
| 2006/0121960 A1 | 6/2006 | Wang | |
| 2006/0286998 A1 | 12/2006 | Fukuda | |
| 2007/0003098 A1* | 1/2007 | Martenson et al. | 381/388 |
| 2007/0098200 A1 | 5/2007 | Takei | |
| 2008/0139254 A1* | 6/2008 | Levy | 455/569.1 |
| 2008/0267433 A1* | 10/2008 | Katou et al. | 381/309 |
| 2009/0002626 A1 | 1/2009 | Wakabayashi | |
| 2009/0028356 A1* | 1/2009 | Ambrose et al. | 381/71.6 |
| 2009/0245557 A1* | 10/2009 | Parker | 381/326 |
| 2009/0288489 A1 | 11/2009 | Lee et al. | |
| 2009/0290730 A1* | 11/2009 | Fukuda et al. | 381/151 |
| 2010/0150368 A1* | 6/2010 | Chang et al. | 381/71.6 |
| 2010/0178957 A1 | 7/2010 | Chen | |
| 2010/0329485 A1* | 12/2010 | Fukuda | 381/151 |
| 2012/0237075 A1 | 9/2012 | East et al. | |
| 2012/0244917 A1 | 9/2012 | Hosoi et al. | |

FOREIGN PATENT DOCUMENTS

| | | |
|---|---|---|
| EP | 1705874 A1 | 9/2006 |
| EP | 1 783 919 | 5/2007 |
| EP | 1783919 | 5/2007 |
| JP | 58-182398 | 10/1983 |
| JP | 63-142981 | 9/1988 |
| JP | 3-29424 | 2/1991 |
| JP | 4-90298 | 3/1992 |
| JP | 7-039150 U | 7/1995 |
| JP | 8-102780 | 4/1996 |
| JP | 2000-324217 | 11/2000 |
| JP | 2003-145048 | 5/2003 |
| JP | 2003-188985 | 7/2003 |
| JP | 2003-348208 | 12/2003 |
| JP | 2004-187031 | 7/2004 |
| JP | 2004-205839 | 7/2004 |
| JP | 2005-534269 | 11/2005 |
| JP | 2005-341543 | 12/2005 |
| JP | 2005-352024 | 12/2005 |
| JP | 2006-02113 | 3/2006 |
| JP | 2006-067049 | 3/2006 |
| JP | 2006-086581 | 3/2006 |
| JP | 2006-148295 | 6/2006 |
| JP | 2006-166128 | 6/2006 |
| JP | 2006-226506 | 8/2006 |
| JP | 2007-104548 | 4/2007 |
| JP | 2007-165938 | 6/2007 |
| JP | 2007-189578 | 7/2007 |
| JP | 2007-214883 | 8/2007 |
| JP | 2008-511217 | 4/2008 |
| JP | 2008-141589 | 6/2008 |
| JP | 2008-177705 | 7/2008 |
| JP | 2008-227806 | 9/2008 |
| JP | 2008-263383 | 10/2008 |
| JP | 2009-159402 | 7/2009 |
| JP | 2009-260883 | 11/2009 |
| JP | 4541111 | 7/2010 |
| JP | 2010-528547 | 8/2010 |
| TW | 200536415 A | 11/2005 |
| TW | 200539664 A | 12/2005 |
| TW | 200922261 A | 5/2009 |
| WO | 03-055183 | 7/2003 |
| WO | 2005/067339 | 7/2005 |
| WO | 2005/069586 | 7/2005 |
| WO | 2005/096664 | 10/2005 |
| WO | 2007/034739 | 3/2007 |
| WO | 2007-099707 | 9/2007 |
| WO | 2008/007666 | 1/2008 |
| WO | 2010-005045 | 1/2010 |

OTHER PUBLICATIONS

International Search Report for International Patent Application PCT/JP2011/080099, dated Apr. 3, 2012.
U.S. Patent and Trademark Office, Office Action in U.S. Appl. No. 13/489,971 (Oct. 24, 2012).
Taiwanese Patent Office, search report in application 100148983 (2 pages) (Jan. 17, 2013).
H. Isaka et al., "Development of Bone Conduction Speaker by Using Piezoelectric Vibration," The Japan Society of Mechanical Engineers (No. 04-5) Dynamics and Design Conference 2004 CD-ROM Compilation (Sep. 27-30, 2004; Tokyo) (and English translation).
European Patent Office, official communication in Application No. EP 11 85 3718 (May 14, 2014).

* cited by examiner

*Primary Examiner* — Ping Hsieh
(74) *Attorney, Agent, or Firm* — Fish & Richardson P.C.

(57) ABSTRACT

The present specification discloses an incoming/outgoing-talk unit having an ear-hook unit, a cartilage conduction vibration unit that makes contact with ear cartilage in a state where the hook unit is hooked to the ear, an outgoing-talk unit, and a unit for performing short-range wireless communication with the mobile telephone. Further disclosed is an incoming-talk unit having an ear-hook unit, and a cartilage conduction vibration unit for transmitting cartilage conduction from outside of ear cartilage in a state where the hook unit is hooked to the ear. Also disclosed is an incoming-talk unit having a three-dimensional viewing adjustment unit, a temple having a unit for adjusting contact of eyesight-adjusting eyeglasses with the temple when the unit is superposedly mounted on the eyesight-adjusting eyeglasses; and an audio information output unit provided to the temple.

22 Claims, 91 Drawing Sheets

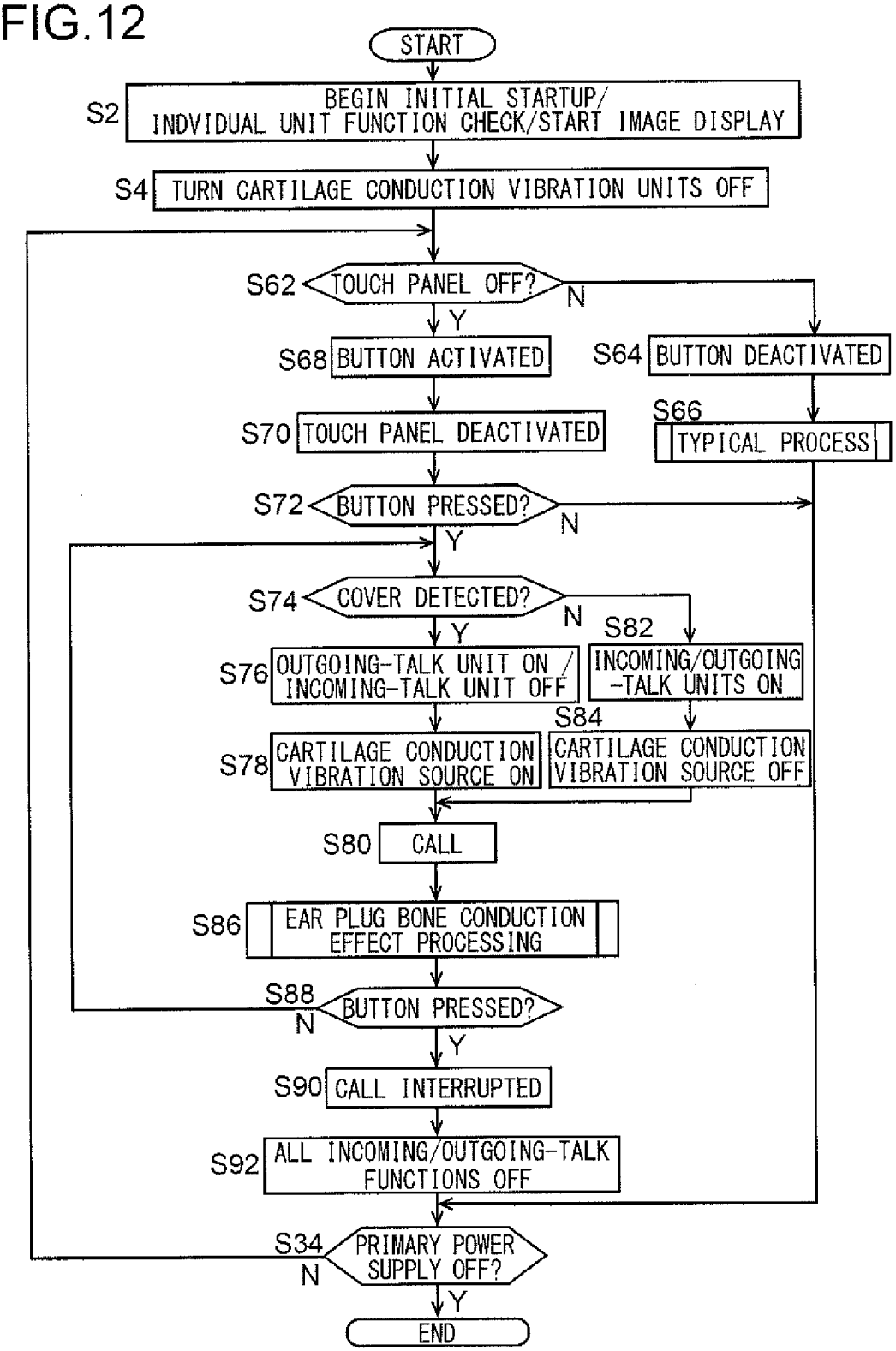

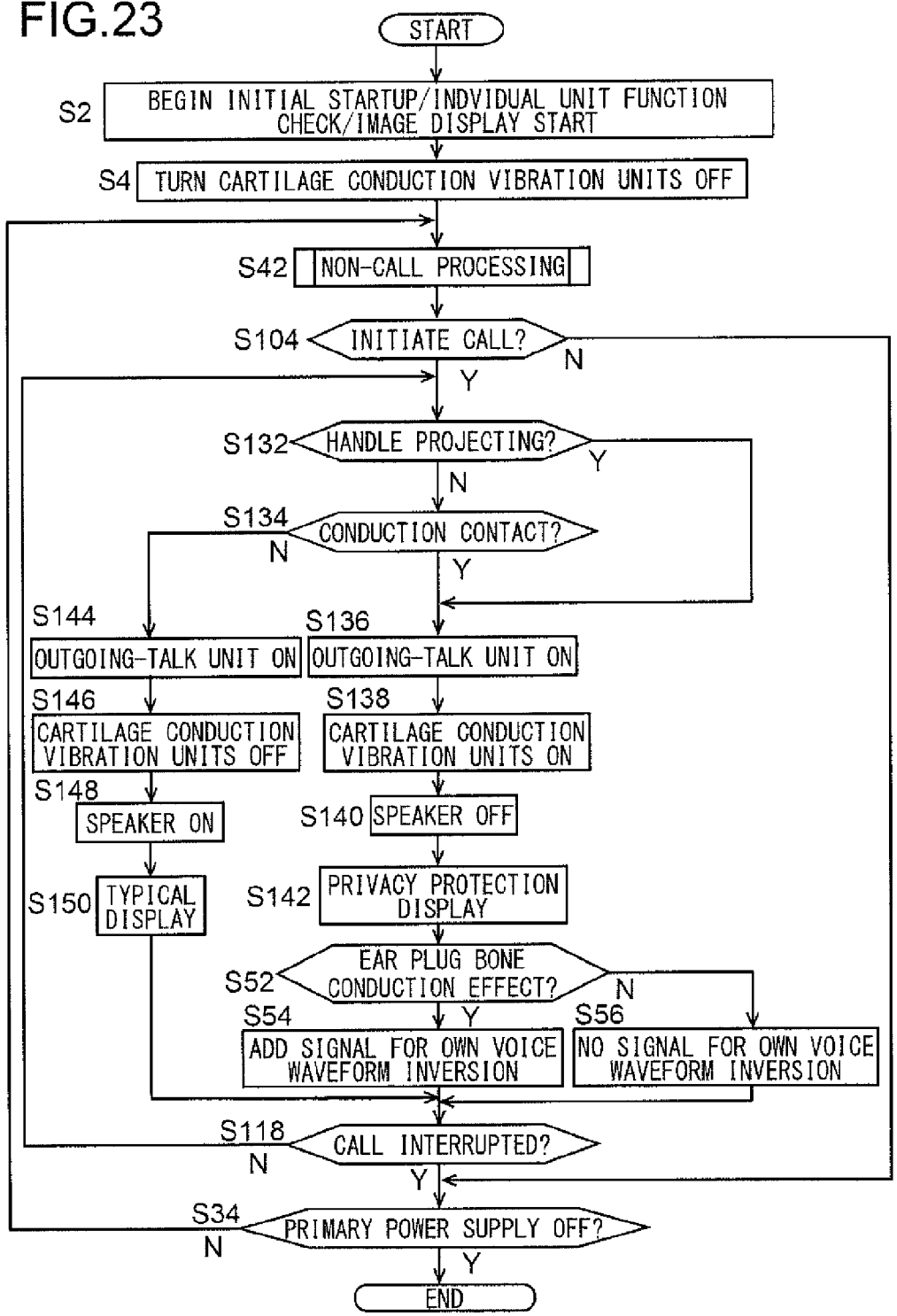

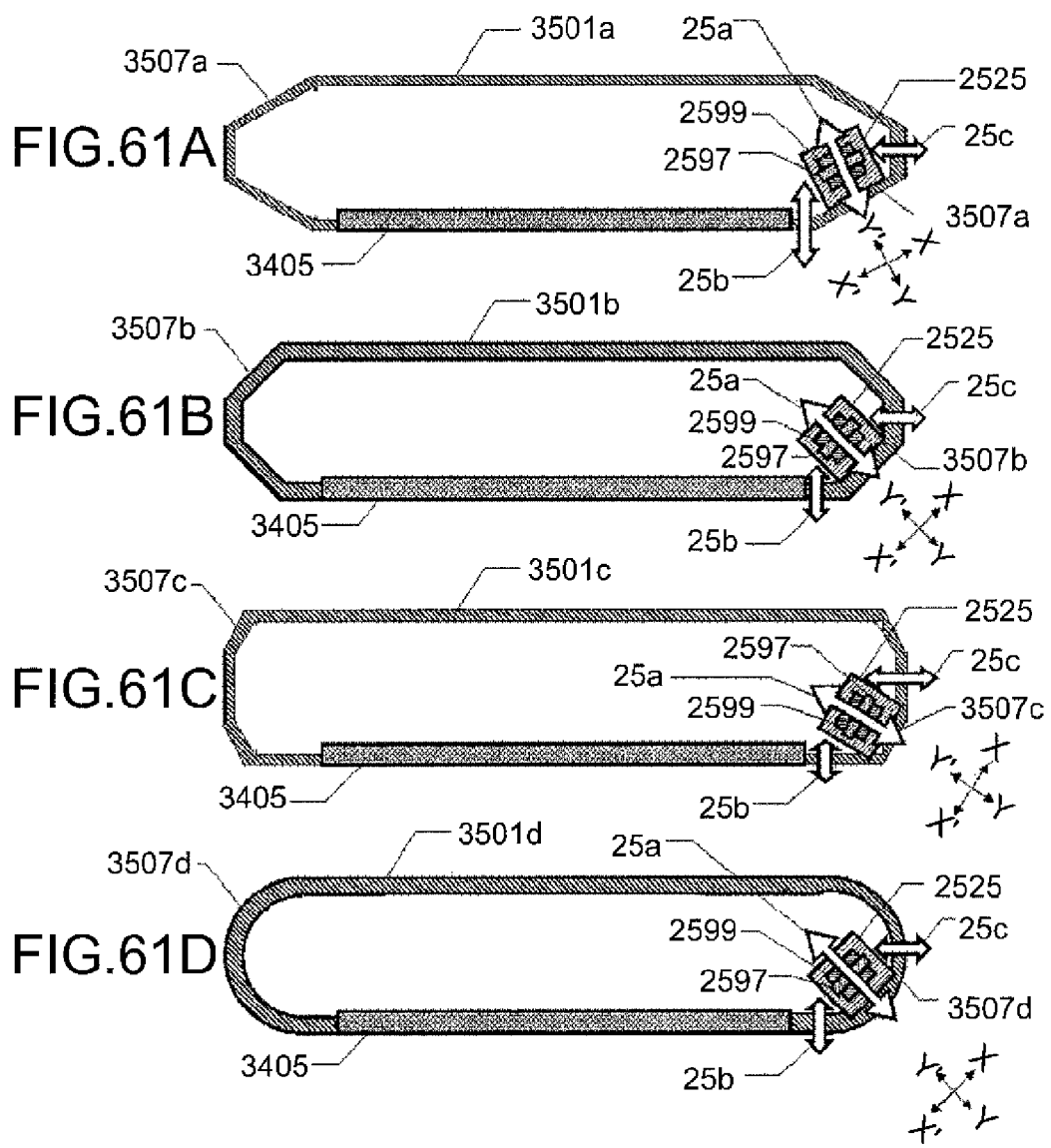

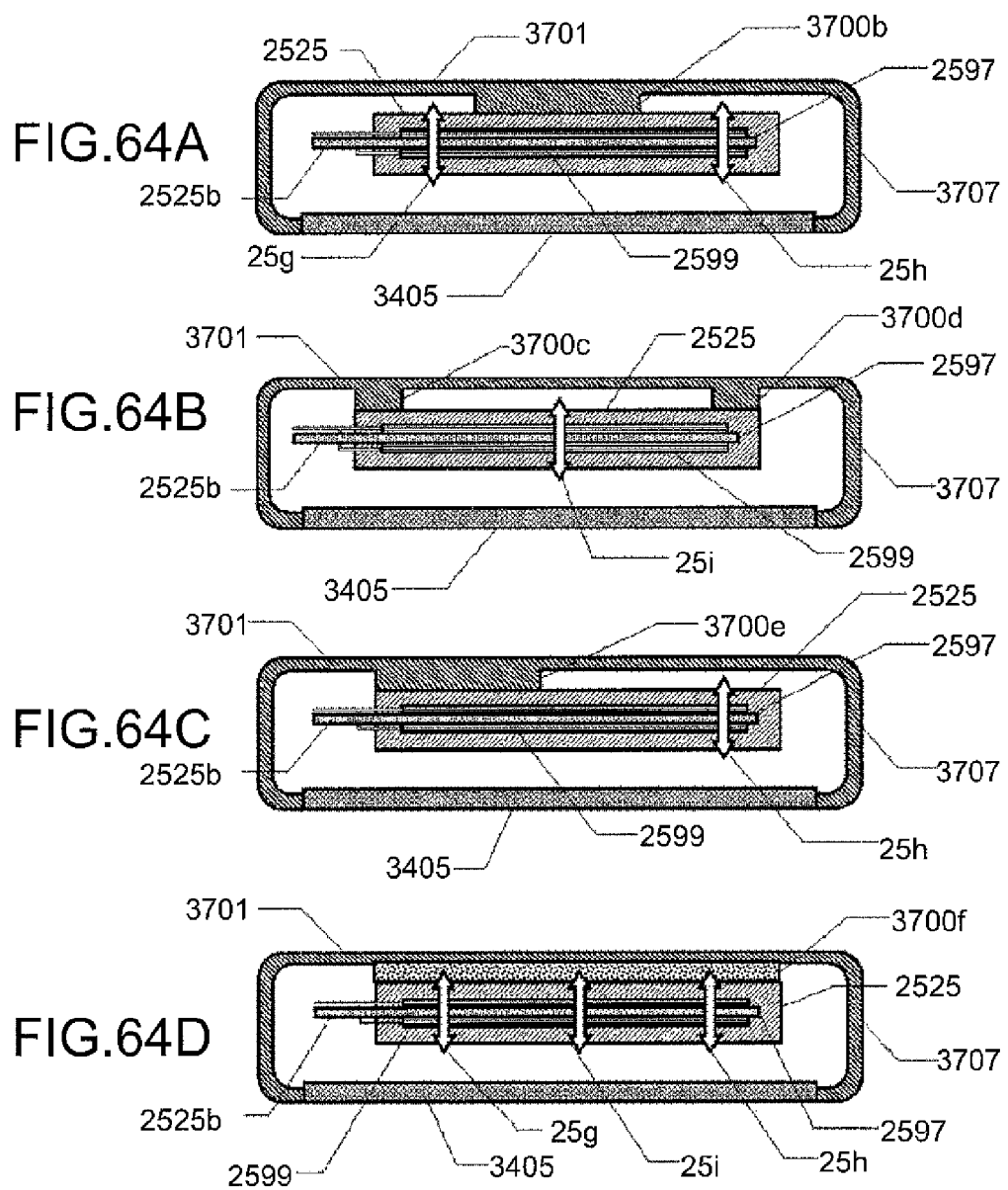

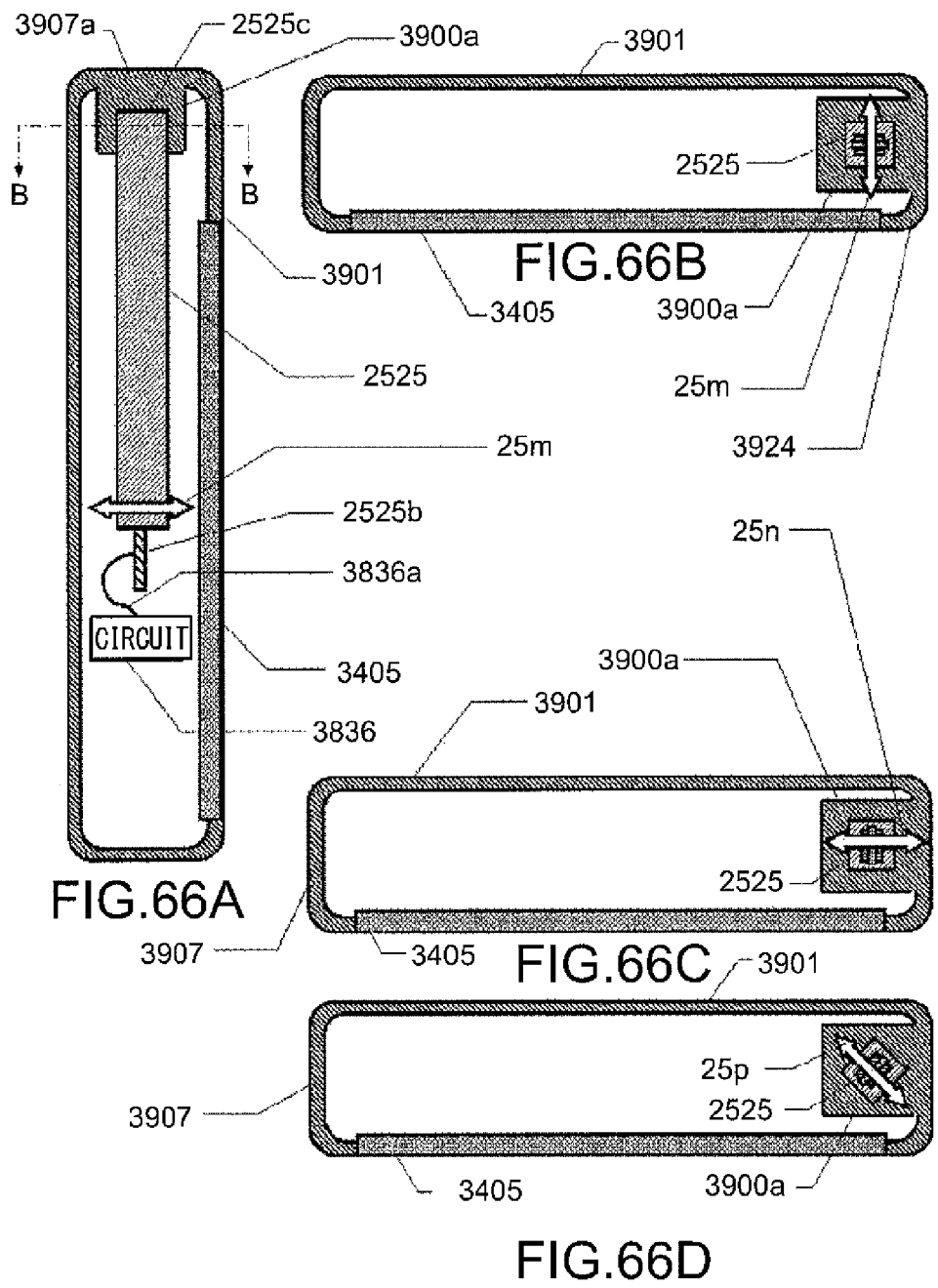

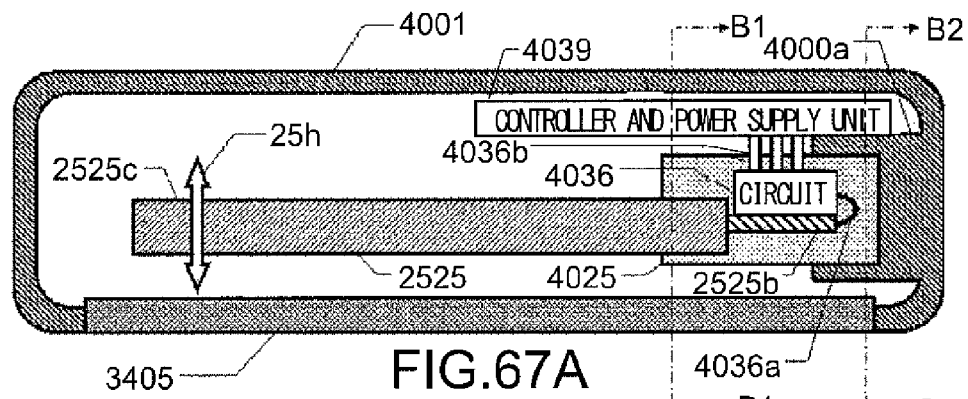
FIG. 67A
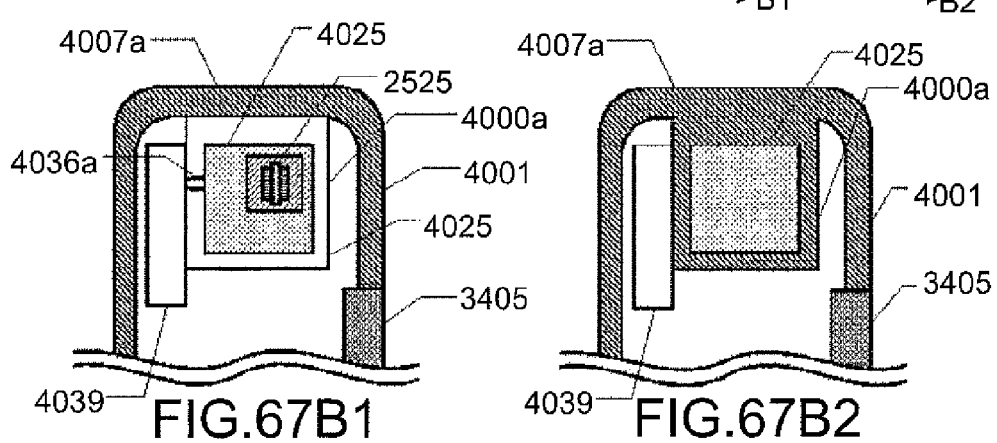
FIG. 67B1  FIG. 67B2
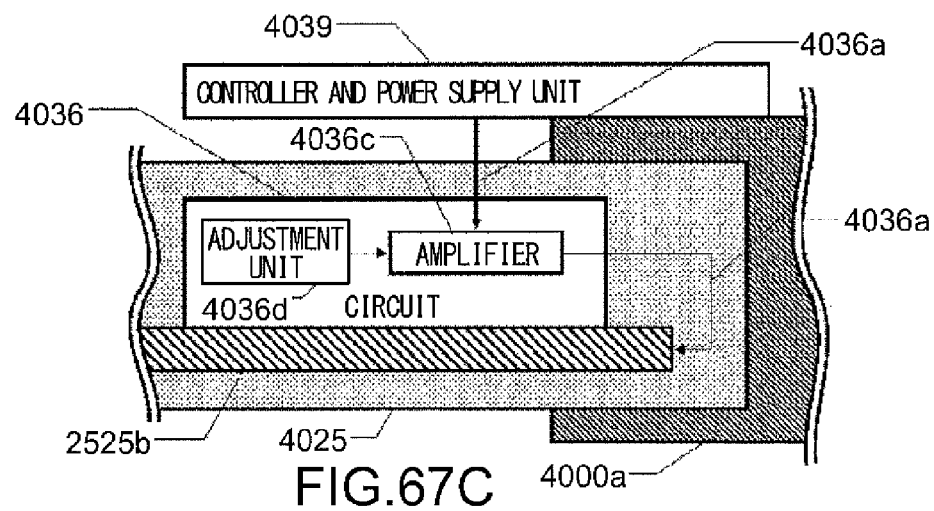
FIG. 67C

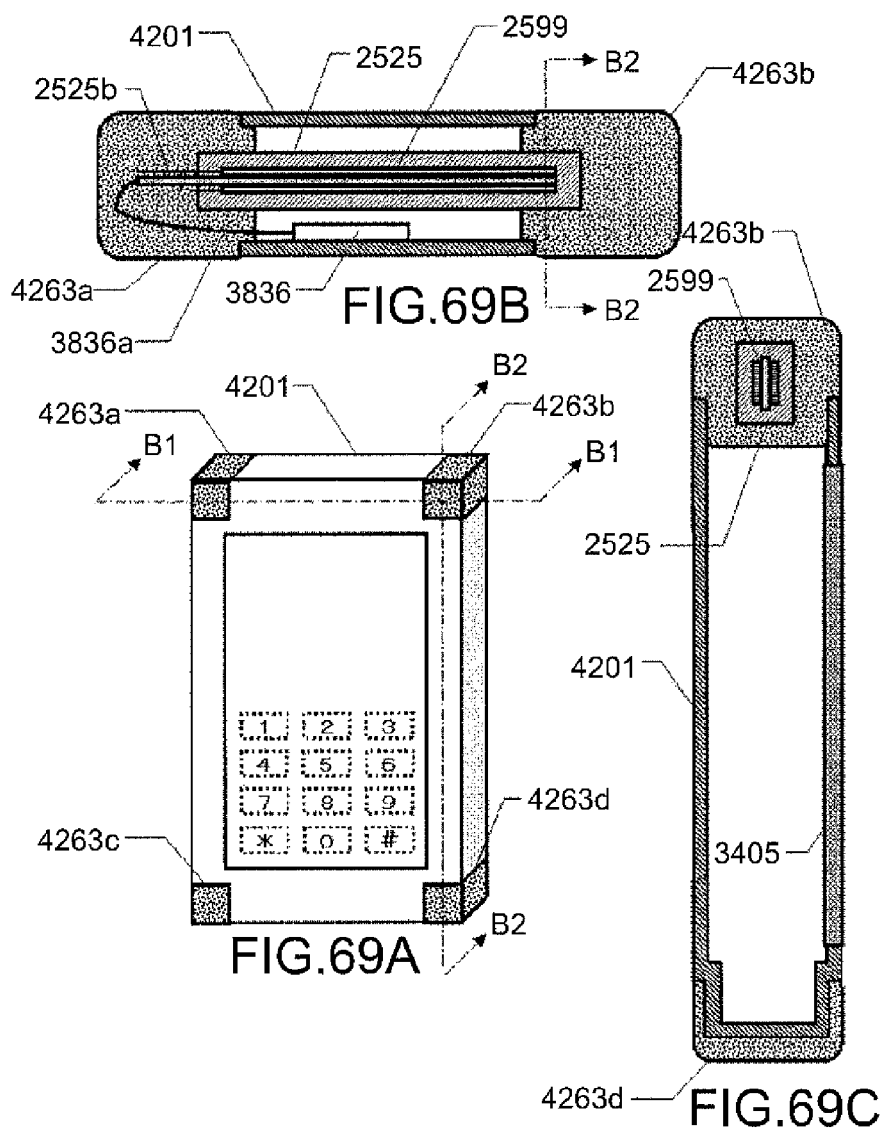

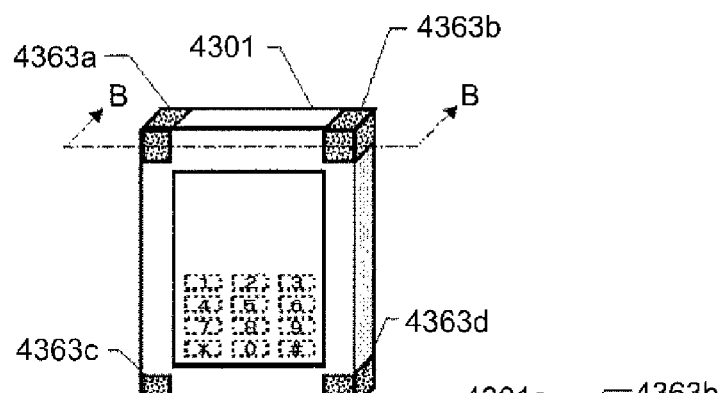
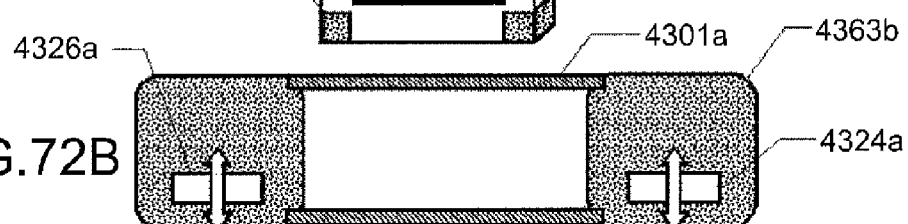
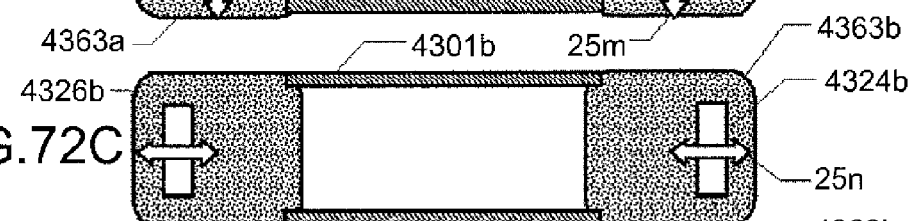
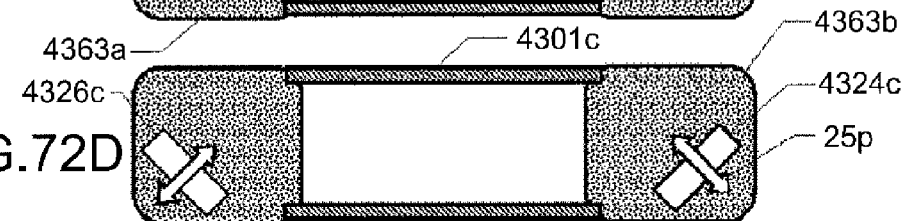
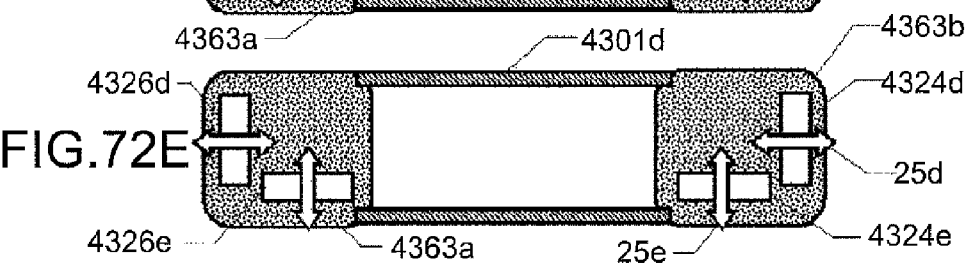

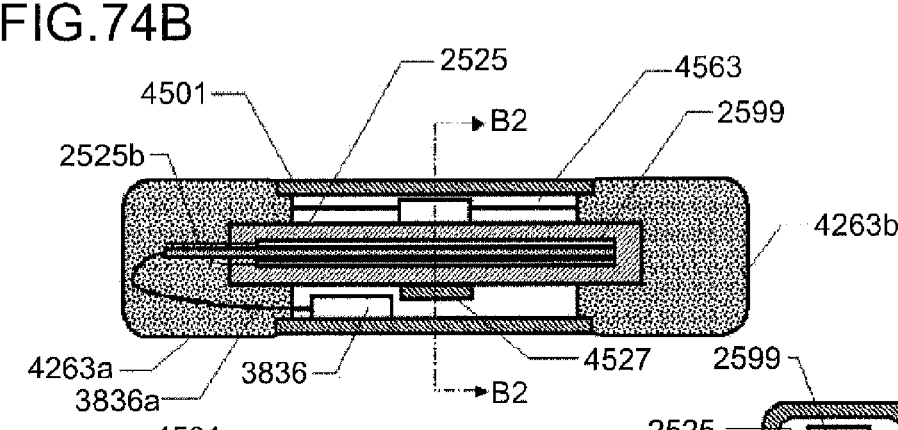
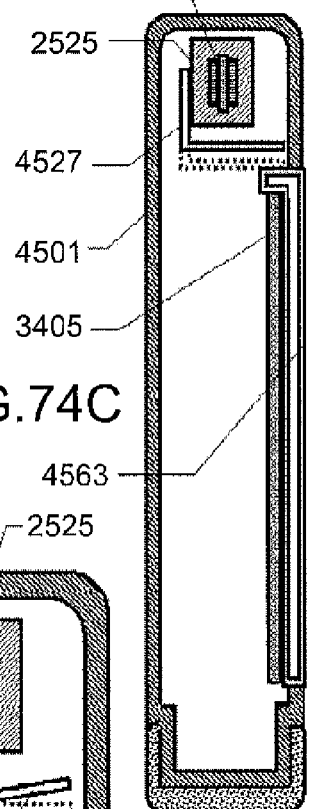
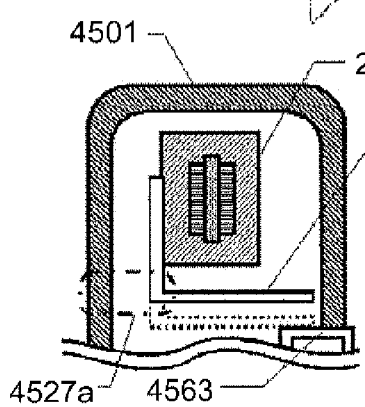
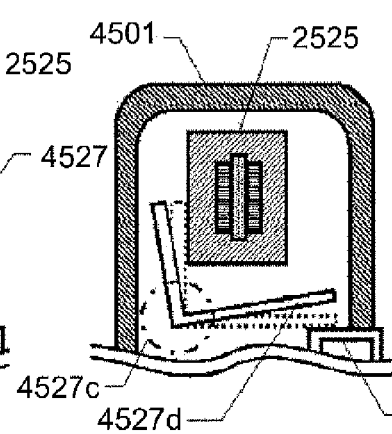

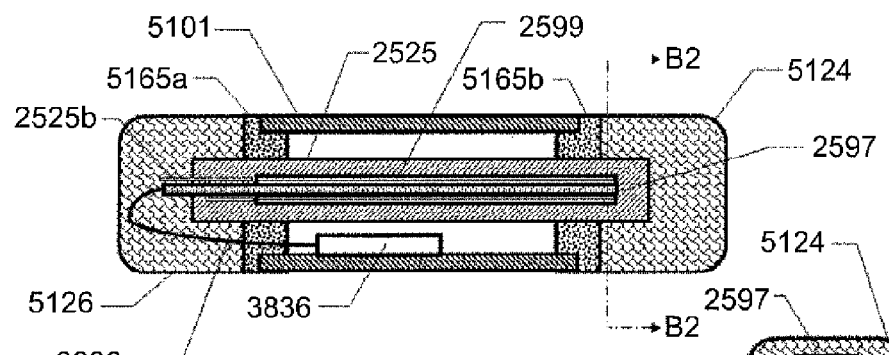
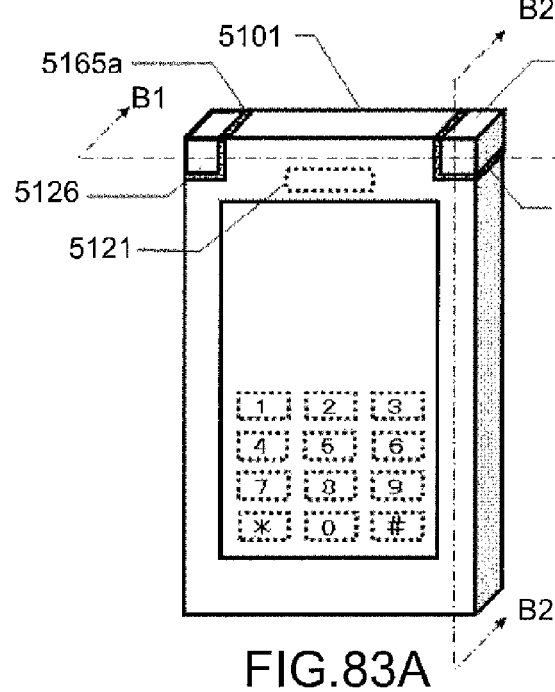
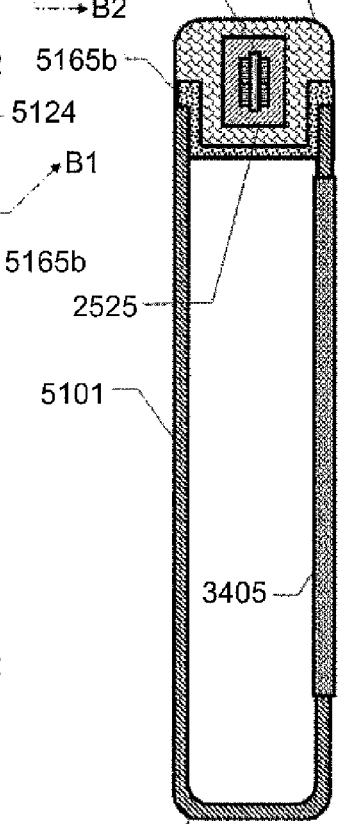

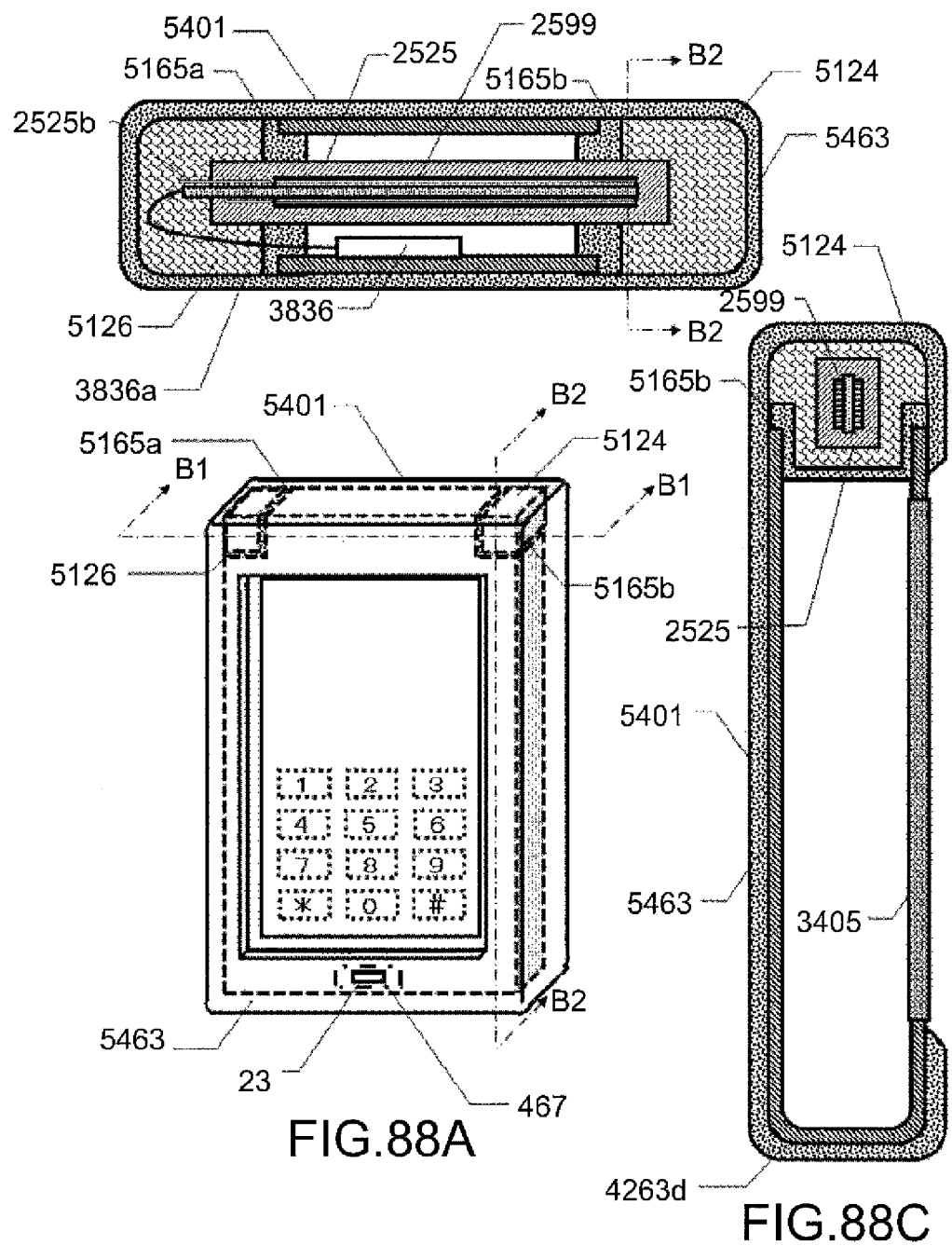

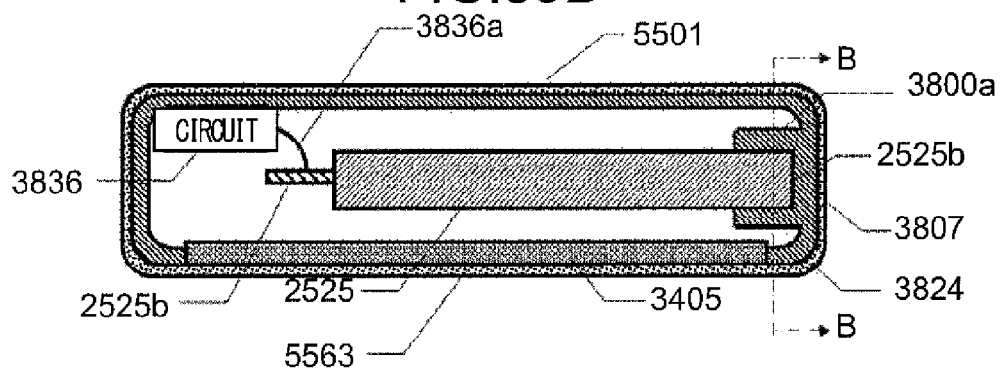
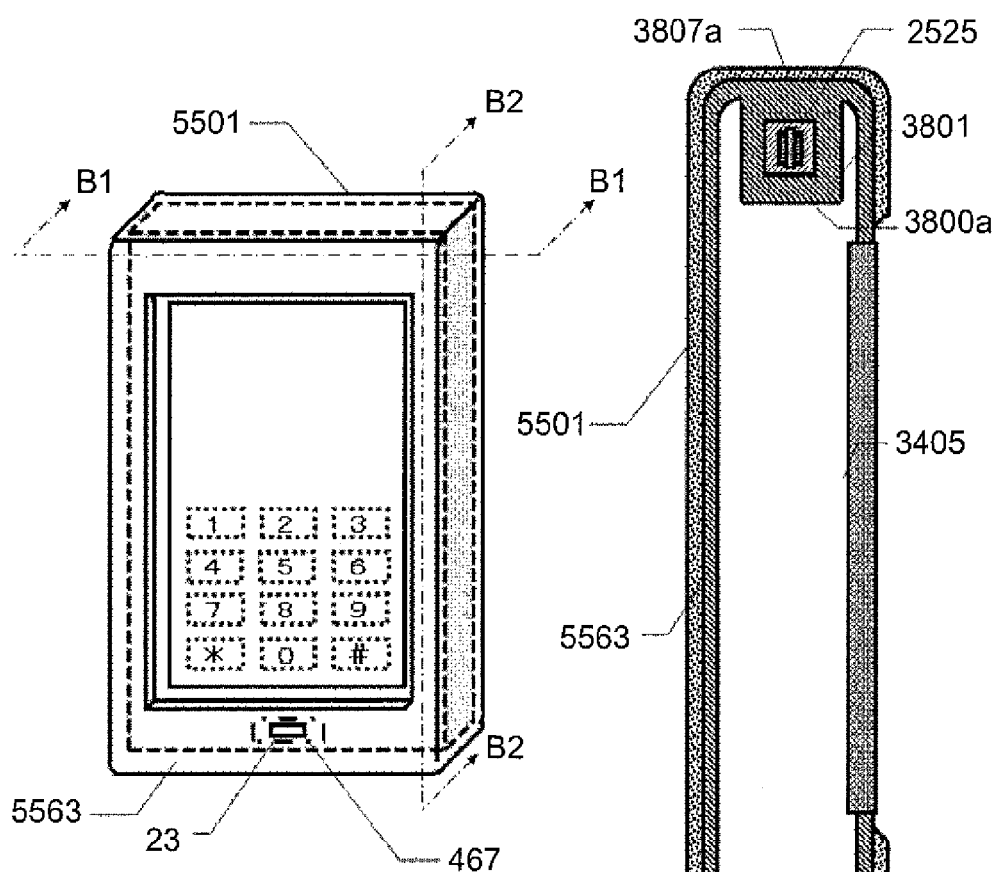

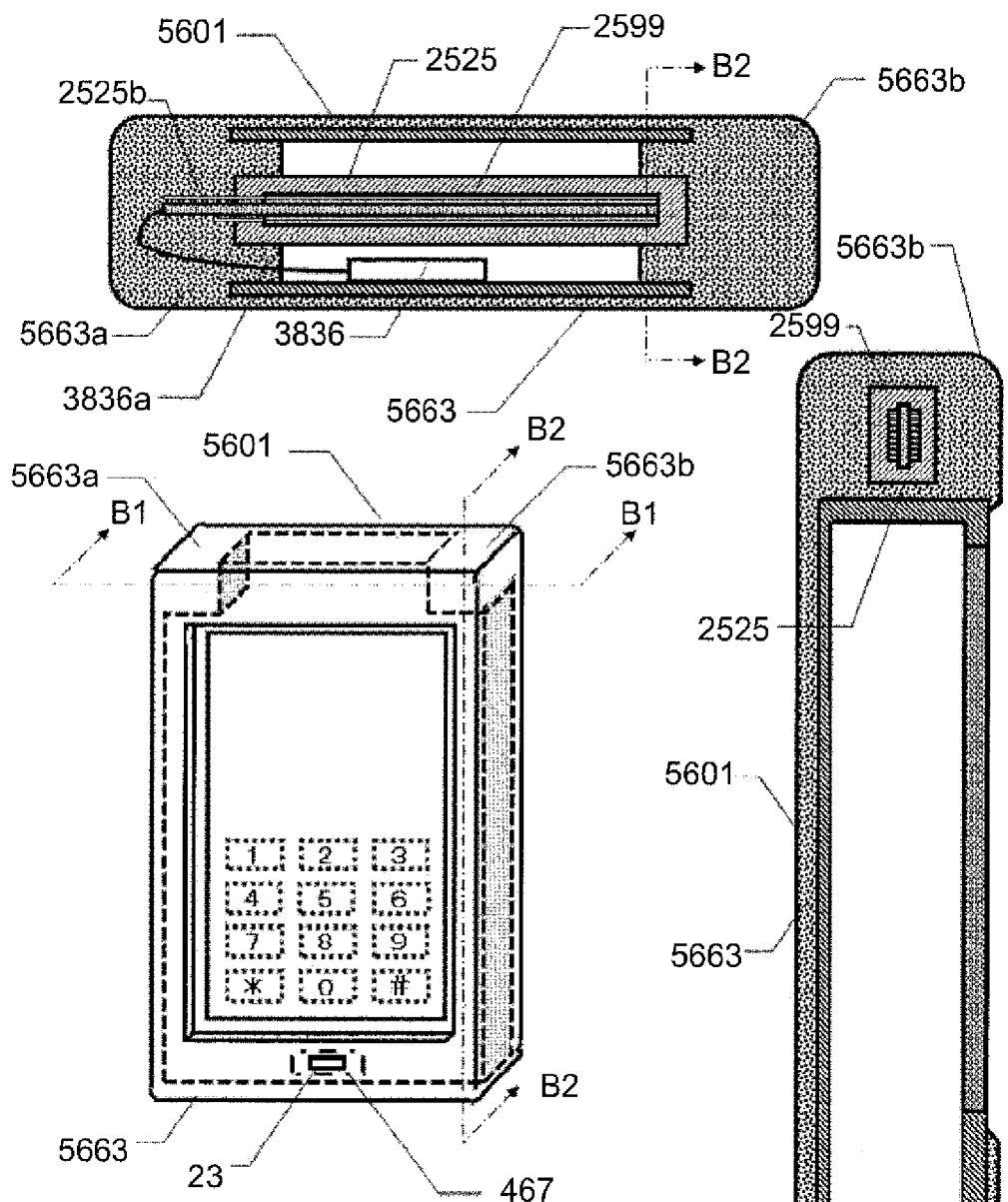

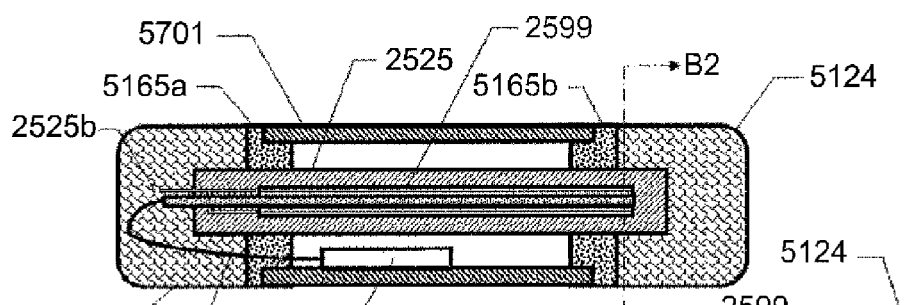
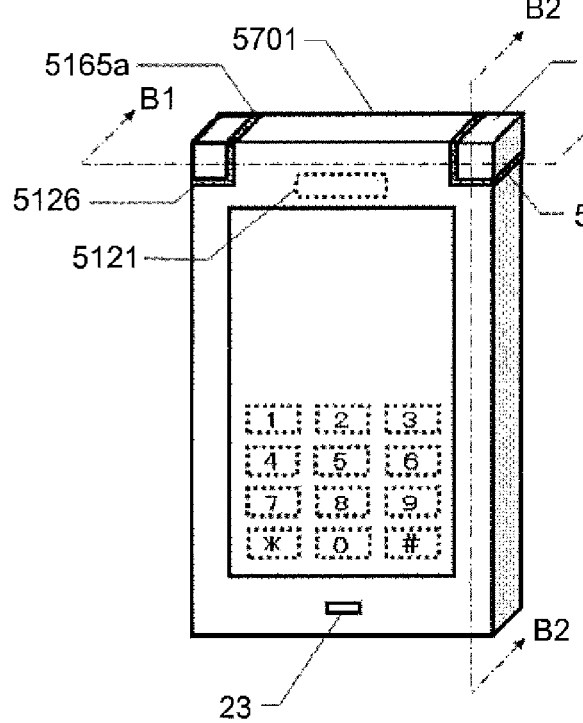
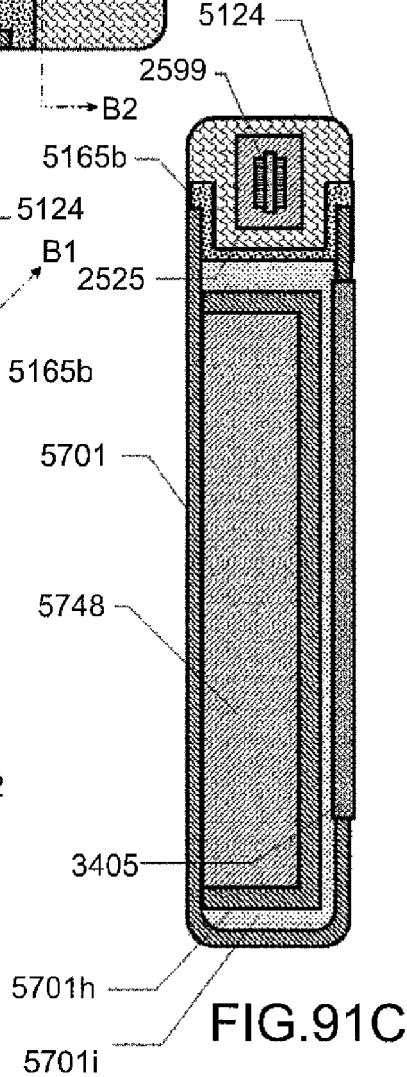

INCOMING/OUTGOING-TALK UNIT AND INCOMING-TALK UNIT

CROSS-REFERENCE TO RELATED APPLICATIONS

This application is a continuation application of and claims the benefit under 35 U.S.C. §120 to International Patent Application PCT/JP2011/080099, filed Dec. 26, 2011, which claims the benefit of foreign priority of the following Japanese Applications:

2010-289894, filed Dec. 27, 2010;
2011-009546, filed Jan. 20, 2011;
2011-021312, filed Feb. 3, 2011;
2011-028489, filed Feb. 14, 2011;
2011-037543, filed Feb. 23, 2011;
2011-038011, filed Feb. 24, 2011;
2011-048787, filed Mar. 7, 2011;
2011-064543, filed Mar. 23, 2011;
2011-102006, filed Apr. 28, 2011;
2011-103604, filed May 6, 2011;
2011-125705, filed Jun. 3, 2011;
2011-132634, filed Jun. 14, 2011;
2011-47934, filed Jul. 4, 2011;
2011-155966, filed Jul. 14, 2011;
2011-166439, filed Jul. 29, 2011;
2011-179815, filed Aug. 19, 2011;
2011-191995, filed Sep. 2, 2011;
2011-207627, filed Sep. 22, 2011;
2011-219638, filed Oct. 3, 2011;
2011-228890, filed Oct. 18, 2011;
2011-243624, filed Nov. 7, 2011;
2011-253267, filed Nov. 18, 2011; and
2011-276160, filed Dec. 16, 2011.

The disclosures of the prior applications are considered part of (and are hereby incorporated by reference in) the disclosure of this application.

TECHNICAL FIELD

The present invention relates to an incoming/outgoing-talk unit, and to an incoming-talk unit.

BACKGROUND ART

Conventionally, various different mobile telephones have been proposed for various different objectives. For example, to provide a mobile telephone permitting clear listening even in the presence of loud noise, there has been proposed a mobile telephone in which a bone conduction speaker is employed, the mobile telephone being provided with the bone conduction speaker as well as with external auditory meatus stoppage means (Patent Document 1). On the other hand, in another proposed method for using a bone conduction speaker, a manual operation is used to adjust the pressure of contact between the tragus and a vibrating surface to be brought into contact with the tragus, whereby the ratio at which audio information through cartilage conduction and audio information through air conduction are transmitted can be altered in accordance with the magnitude of outside noise (Patent Document 2). In yet another proposal, a piezoelectric element is used as a vibration source of bone conduction. A further proposal for a mobile telephone is a wireless communication function headset that is wirelessly communicatively connected to a communication apparatus capable of audio communication via a communication network, the wireless communication function headset permitting audio communication with a party on the line via the communication apparatus (Patent Document 3). In yet another proposal, an eyeglasses-type interface device is provided with an audio unit that includes a bone conduction earphone, a microphone, and a display unit for displaying, on a lens, movie information that has been sent to a wireless communication unit from a mobile telephone or the like (Patent Document 4).

LIST OF CITATIONS

Patent Literature

[Patent Document 1] JP-A 2003-348208
[Patent Document 2] JP-B 4541111
[Patent Document 3] JP-A 2006-86581
[Patent Document 4] JP-A 2005-352024

SUMMARY OF INVENTION

Technical Problem

However, there are many problems relating to mobile telephones that should be further studied.

In view of the foregoing, an objective of the present invention resides in providing a more easily used incoming/outgoing-talk unit and incoming-talk unit.

Solution to Problem

In order to achieve the objective above, an incoming/outgoing-talk unit disclosed in the present specification adopts a configuration having, for example, an ear-hook unit, a cartilage conduction vibration unit that makes contact with ear cartilage in a state where the hook unit is hooked to the ear, an outgoing-talk unit, and a unit for performing short-range wireless communication with the mobile telephone. An incoming-talk unit disclosed in the present specification adopts a configuration having, for example, an ear-hook unit, and a cartilage conduction vibration unit for transmitting cartilage conduction from outside of ear cartilage in a state where the hook unit is hooked to the ear. Further, the incoming-talk unit disclosed in the present specification adopts a configuration having, for example, a three-dimensional-view adjusting unit, a temple having a unit for adjusting contact of eyesight-adjusting eyeglasses with the temple when the unit is superposedly mounted on the eyesight-adjusting eyeglasses; and an audio information output unit provided to the temple. The following provides a more detailed description of the remaining elements of the configuration, as modes for carrying out the invention.

Advantageous Effects of the Invention

According to the present invention, there can be provided a more easily used incoming/outgoing-talk unit and incoming-talk unit.

BRIEF DESCRIPTION OF DRAWINGS

FIG. 12 is a flow chart of the operation of the controller in the fifth embodiment of FIG. 11;

FIG. 13 is a perspective view illustrating a sixth embodiment of a mobile telephone according to an aspect of the present invention, where

FIG. 15 is a perspective view illustrating a seventh embodiment of a mobile telephone according to an aspect of the present invention, where

FIG. 17 is a perspective view illustrating an eighth embodiment of a mobile telephone according to an aspect of the present invention, where

FIG. 18 is a perspective view illustrating a ninth embodiment of a mobile telephone according to an aspect of the present invention, where

FIG. 23 is a flow chart of the operation of the controller in the twelfth embodiment of FIG. 22;

FIG. 61 is a cross-sectional view of a thirty-ninth embodiment according to an aspect of the present invention, and various modification examples thereof (thirty-ninth embodiment);

FIG. 64 is a cross-sectional view of various modification examples of the forty-first embodiment;

FIG. 66 is a cross-sectional view relating to a forty-third embodiment according to an aspect of the present invention (forty-third embodiment)

FIG. 67 is a cross-sectional view relating to a forty-fourth embodiment according to an aspect of the present invention (forty-fourth embodiment);

FIG. 69 is a perspective view and a cross-sectional view relating to a forty-sixth embodiment according to an aspect of the present invention (forty-sixth embodiment);

FIG. 72 is a perspective view and a cross-sectional view relating to a forty-eighth embodiment according to an aspect of the present invention (forty-eighth embodiment);

FIG. 74 is a perspective view and a cross-sectional view relating to a forty-ninth embodiment according to an aspect of the present invention, and a modification example thereof (forty-ninth embodiment);

FIG. 83 is a perspective view and a cross-sectional view of a fifty-fifth embodiment according to an aspect of the present invention (fifty-fourth embodiment);

FIG. 88 is a perspective view and a cross-sectional view of a fifty-eight embodiment according to an aspect of the present invention (fifty-eight embodiment);

FIG. 89 is a perspective view and a cross-sectional view of a fifty-ninth embodiment according to an aspect of the present invention (fifty-ninth embodiment);

FIG. 90 is a perspective view and a cross-sectional view of a sixtieth embodiment according to an aspect of the present invention (sixtieth embodiment);

FIG. 91 is a perspective view and a cross-sectional view of a sixty-first embodiment according to an aspect of the present invention (sixty-first embodiment)

SOLUTION TO PROBLEM

First Embodiment

Figure 1:
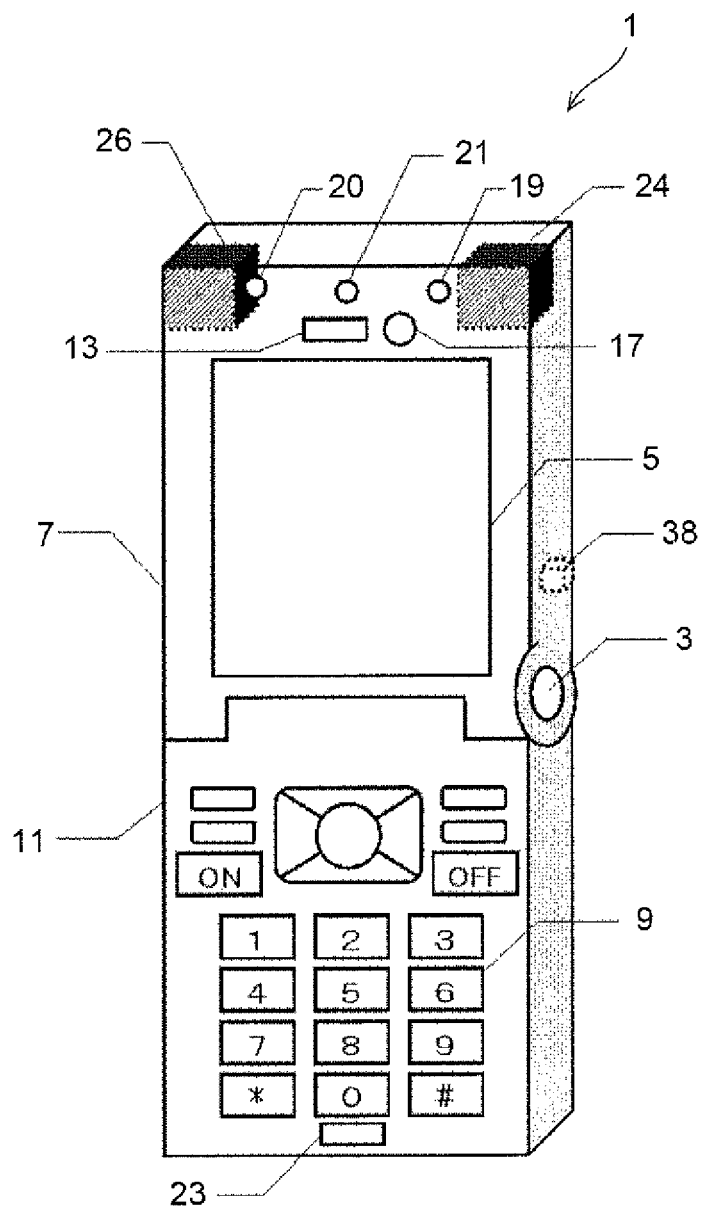
FIG. 1 is a perspective view illustrating a first embodiment of a mobile telephone according to an aspect of the present invention (first embodiment)

FIG. 1 is a perspective view illustrating a first embodiment of the mobile telephone according to an aspect of the present invention. In FIG. 1, a mobile telephone 1 comprises an upper part 7 having a display unit 5 or the like, and a lower part 11 having a keypad or other operation unit 9 and a microphone or other outgoing-talk unit 23 for picking up audio uttered from the mouth of an operator, and is configured such that the upper part 7 can be folded onto the lower part 11 by a hinge unit 3. An earphone or other incoming-talk unit 13 for transmitting audio to an ear of the operator is provided to the upper unit 7, and together with the outgoing-talk unit 23 of the lower part 11 constitutes a telephone function unit. A videoconferencing internal camera 17, which is able to photograph the face of an operator looking at the display unit 5 in a case in which the mobile telephone 1 is to be used as a video phone and which is also used when a self-portrait is taken, is also arranged on the upper part 7. The upper part 7 is further provided with a pair of infrared light emitting units 19, 20 constituting a proximity sensor for detecting that the mobile telephone 1 is abutting an ear for purposes of a call, and with a shared infrared light proximity sensor 21 for receiving infrared light reflected from the ear. Although not shown in FIG. 1, a backside camera is provided to the backside of the upper part 7, and the camera is able to capture an image of a subject that is on the backside of the mobile telephone 1 and is being monitored with the display unit 5.

The upper part 7 is further provided with a right-ear cartilage-conduction vibration unit 24 and a left-ear cartilage-conduction vibration unit 26, which comprise a piezoelectric bimorph element or the like for contacting the tragus, at the upper corner of the inside (the side that touches the ear). The right-ear cartilage-conduction vibration unit 24 and the left-ear cartilage-conduction vibration unit 26 are constituted so as not to protrude from the outer wall of the mobile telephone and hinder the design, but are provided to the corners of the outer wall of the mobile telephone whereby contact is effectively made with the tragus. It is thereby possible both to listen to the audio from the incoming-talk unit 13, and to listen by bone conduction from the cartilage of the tragus. Also, as has been disclosed in the above-mentioned Patent Document 2, the tragus is known to receive the greatest auditory sensation among the mastoid process of the ear, the cartilage surface of the rear of the opening of the outer ear, the tragus, the sideburn part, and all the other constituents of the ear cartilage; and is known to have a greater elevation in the bass register than other locations when pressure is increased by pushing. This knowledge is described in detail in Patent Document 2, for which reference can accordingly be made thereto.

The mobile telephone 1 rotates slightly clockwise when brought up against the right ear in FIG. 1, and takes on a downward-right state in FIG. 1. Providing the right-ear cartilage-conduction vibration unit 24 to the lower angle of incline of the upper end of the ear side of such a mobile telephone makes it possible to naturally bring the right-ear cartilage-conduction vibration unit 24 in contact with the tragus of the right ear without causing the vibration unit to protrude from the outer wall of the mobile telephone. This state is a posture approximating the normal state of a telephone call, and is awkward for neither the person making the telephone call nor any onlookers. Because the incoming-talk unit 13 is in the vicinity of the right-ear cartilage-conduction vibration unit 24, audio information through the tragus cartilage and audio information through the external auditory meatus will both be transmitted to the ear. At this time, because the same audio information will be transmitted by different sound-generating pairs and pathways, the phasing between the two is adjusted so as to prevent the same from canceling each other out.

On the other hand, the mobile telephone 1 rotates slightly counter-clockwise when brought up against the left ear in FIG. 1, and takes on a downward-left state in FIG. 1. The state becoming such that the left-ear cartilage-conduction vibration unit 26 is provided to the lower angle of incline of the upper end of the ear side of the mobile telephone, it is possible to naturally bring the left-ear cartilage-conduction vibration unit 26 into contact with the tragus of the left ear, as is the case with the right ear. Because this state is a posture approximating the normal state of a telephone call, and because the incoming-talk unit 13 is in the vicinity of the left-ear cartilage-conduction vibration unit 26 and both audio information through the tragus cartilage and audio information through the external auditory meatus are transmitted to the ear, the fact that the phasing between the two is adjusted is similar to the case of the right ear.

Because the pair of infrared light emitting units 19, 20 in the above-described proximity sensor emit light alternating in time division, the shared infrared light proximity sensor 21 is able to identify from which light-emitting unit the reflective light coming from the infrared light has been received, and is thereby able to judge which of the right-ear cartilage-conduction vibration unit 24 and the left-ear cartilage-conduction vibration unit 26 has been brought up against the tragus. It is thereby possible to determine at which ear the mobile telephone 1 is being used, and to cause the vibration unit of the side against which the tragus abuts to vibrate and to turn off the other one. However, because of the individual variations regarding up to which ear the mobile telephone 1 is brought and regarding the shape of the ear, the first embodiment is configured such that, as will be described later, an acceleration sensor is further housed, the direction in which the mobile telephone 1 is inclined being detected by the gravitational acceleration detected by the acceleration sensor, and the vibration unit on the side at the lower angle of incline is made to vibrate while the other is turned off. The aforementioned right ear use and left ear use will again be described, using the drawings adapted to the respective modes of use.

The upper part 7 is further provided with an environment-noise microphone 38, which is arranged on the outside (the back surface not brought up against the ear) so as to pick up environment noise, and which is implemented as means for preventing conduction of the vibration of the right-ear cartilage-conduction vibration unit 24 and the left-ear cartilage-conduction vibration unit 26. The environment-noise microphone 38 further picks up audio uttered from the mouth of the operator. The environment noise picked up by the environment-noise microphone 38 and the operator's own voice, upon undergoing wavelength inversion, are mixed into the right-ear cartilage-conduction vibration unit 24 and the left-ear cartilage-conduction vibration unit 26; the environment noise and the operator's own voice, which are contained in the audio information through the incoming-talk unit 13, are canceled to facilitate listening comprehension of the party on the line. A more detailed description of this function will be provided later.

Figure 2A:
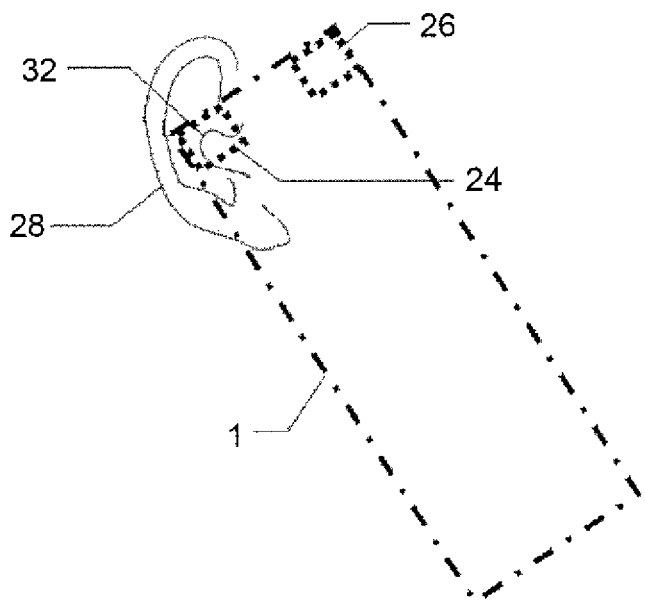
FIG. 2 is a side view of the first embodiment illustrating the functions of the state of right ear use and the state of left ear use.

FIG. 2 is a side view of the mobile telephone 1 illustrating the functions of the right-ear cartilage-conduction vibration unit 24 and left-ear cartilage-conduction vibration unit 26; FIG. 2A illustrates a state in which the mobile telephone 1 is held in the right hand and brought up against the right ear 28.

Figure 2B:
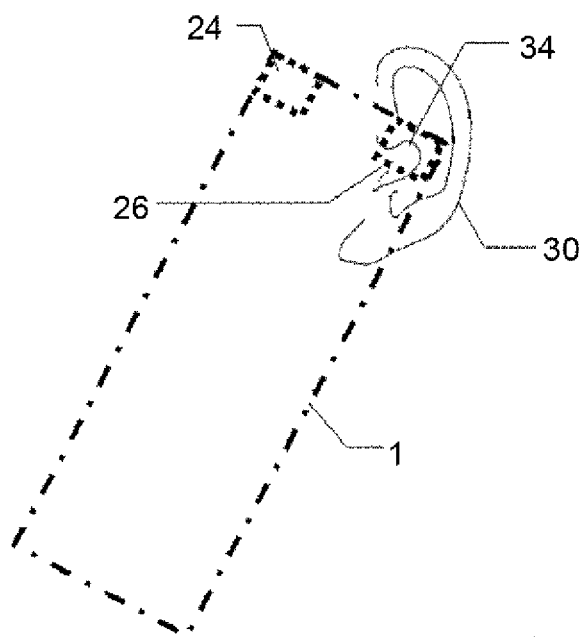

On the other hand, FIG. 2B illustrates a state in which the mobile telephone 1 is held in the left hand and brought up against the left ear 30. FIG. 2A is a drawing viewed from the right side of the face, and FIG. 2B is a drawing viewed from the left side of the face; therefore, each show the back surface of the mobile telephone 1 (the reverse side of FIG. 1). The mobile telephone 1 is indicated by dashed lines, in order to depict the relationship between the mobile telephone 1 and the right ear 28 and left ear 30.

As illustrated in FIG. 2A, the mobile telephone 1 is inclined slightly counterclockwise (the relationship of the reverse surface with FIG. 1) in FIG. 2 when the same is brought up against the right ear 28, and takes on a diagonally downward-left state in FIG. 2. Because the right-ear cartilage-conduction vibration unit 24 is provided to the lower angle of incline of the upper end of the ear side of such a mobile telephone, the same can naturally be brought into contact with the tragus 32 of the right ear 28. As has already been described, this state is a posture approximating the normal state of a telephone call, and is awkward neither to the person making the telephone call nor to onlookers. On the other hand, as illustrated in FIG. 2B, the mobile telephone 1 is inclined slightly clockwise (the relationship of the reverse side with FIG. 1) in FIG. 2 when the same is brought up against the left ear 30, and takes on a diagonally downward-right state in FIG. 2. Because the left-ear cartilage-conduction vibration unit 26 is provided to the lower angle of incline of the upper end of the ear side of such a mobile telephone, the same can naturally be brought into contact with the tragus 34 of the left ear 30. This state as well, as is the case with the right ear 28, is a posture approximating the normal state of a telephone call, and is awkward neither to the person making the telephone call nor to onlookers.

Figure 3:
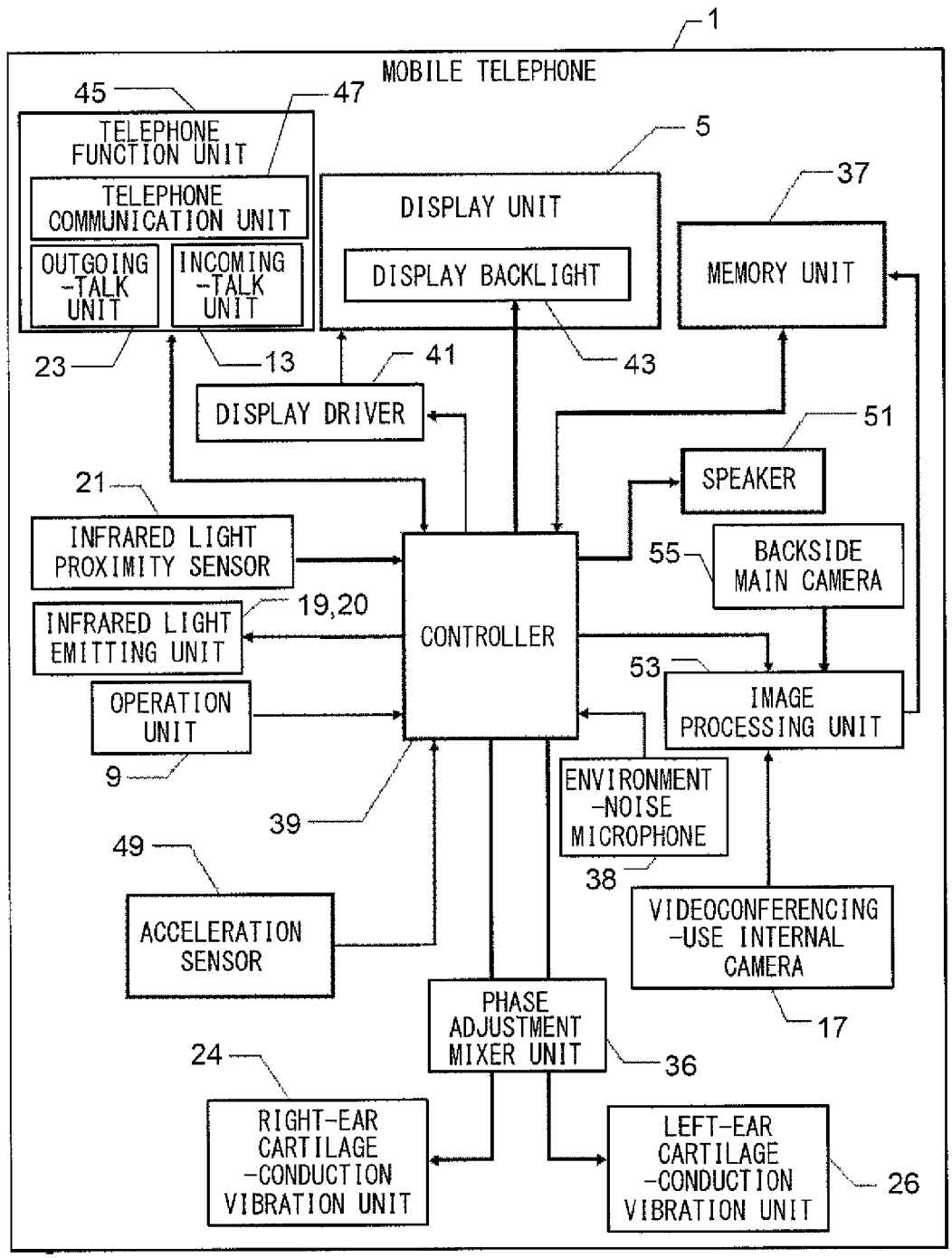
FIG. 3 is a block diagram of the first embodiment.

FIG. 3 is a block diagram of the first embodiment, the same portions being given the same reference numerals as in FIG. 1, and a description having been omitted unless necessary. The mobile telephone 1 is controlled by a controller 39, which operates in accordance with a program stored in a memory unit 37. The memory unit 37 is further able to temporarily store data needed for the control of the controller 39 and also to store various measurement data and/or images. The display unit 5 displays on the basis of the control of the controller 39 and on the basis of display data held by a display driver 41. The display unit 5 has a display backlight 43, the controller 39 adjusting the brightness thereof on the basis of the brightness of the surroundings.

A telephone function unit 45, which includes the incoming-talk unit 13 and the outgoing-talk unit 23, is capable of connecting with a wireless telephone line using a telephone communication unit 47, which is under the control of the controller 39. A speaker 51 provides ring alerts and various types of guidance by the control of the controller 39, and also outputs the other party's voice during a videoconferencing function. The audio output of the speaker 51 is not to be outputted from the right-ear cartilage-conduction vibration unit 24 and the left-ear cartilage-conduction vibration unit 26, because it is not possible to bring a cartilage conduction vibration unit up against the ear during a videoconferencing function. An image processing unit 53 is controlled with the controller 39 and processes an image photographed by a videoconferencing function internal camera 17 and a backside main camera 55, and inputs the image resulting from the processing into the memory unit 37.

As described above, the pair of infrared light emitting units 19, 20 in the proximity sensor emit light alternating in time division on the basis of the control of the controller 39. Accordingly, the reflected infrared light inputted into the controller 39 by the shared infrared light proximity sensor 21 allows for identification of reflected light by the infrared light from either light-emitting unit. When reflected light is detected from both the infrared light emitting units 19, 20, the controller 39 runs a cross comparison to determine which of the right-ear cartilage-conduction vibration unit 24 and left-ear cartilage-conduction vibration unit 26 has been brought up against the tragus. Further, the acceleration sensor 49 detects the orientation of the detected gravitational acceleration. The controller 39 determines, on the basis of the detection signal, whether the mobile telephone 1 is inclined in the state of FIG. 2A or FIG. 2B; as has been described with FIG. 2, the vibration unit on the side at the lower angle of incline is made to vibrate and the other is turned off.

The mobile telephone 1 further possesses a phase adjustment mixer unit 36 for running phase adjustment for the audio information from the controller 39 and for transmitting to the right-ear cartilage-conduction vibration unit 24 and left-ear cartilage-conduction vibration unit 26. More specifically, the phase adjustment mixer unit 36 uses the audio information transmitted to the incoming-talk unit 13 from the controller 39 as a benchmark to run phase adjustment for the audio information from the controller 39 and transmits to the right-ear cartilage-conduction vibration unit 24 and left-ear cartilage-conduction vibration unit 26, in order to prevent the mutual canceling out of the audio information generated from the incoming-talk unit 13 and transmitted via the tympanic membrane from the external auditory meatus and of the same audio information generated from either the right-ear cartilage-conduction vibration unit 24 or left-ear cartilage-conduction vibration unit 26 and transmitted via the cartilage of the tragus. The phase adjustment is a relative adjustment between the incoming-talk unit 13 and the right-ear cartilage-conduction vibration unit 24 and left-ear cartilage-conduction vibration unit 26, and therefore the configuration may be such that the audio information transmitted from the controller 39 to the right-ear cartilage-conduction vibration unit 24 and left-ear cartilage-conduction vibration unit 26 is used as a benchmark for adjusting the phase of the audio information transmitted from the controller 39 to the incoming-talk unit 13. In this case, the audio information to the speaker 51 is also adjusted in the same phase as the audio information to the incoming-talk unit 13.

In addition to having the first function described above of preventing the mutual canceling out of the audio information from the incoming-talk unit 13 and the identical audio information from the right-ear cartilage-conduction vibration unit 24 or the left-ear cartilage-conduction vibration unit 26, the phase adjustment mixer unit 36 also has a second function through collaboration with the environment-noise microphone 38. In this second function, the environment noise picked up by the environment-noise microphone 38 and the operator's own voice, upon undergoing wavelength inversion by the phase adjustment mixer unit 36, are mixed into the audio information of the right-ear cartilage-conduction vibration unit 24 or the left-ear cartilage-conduction vibration unit 26; the environment noise and the operator's own voice, which are contained in the audio information through the incoming-talk unit 13, are thereby canceled to facilitate listening comprehension of the audio information of the party on the line. At this time, the mixing is done also taking into consideration the phase adjustment that is based on the first function, so as to effectively cancel out the environment noise and the operator's own voice regardless of the different transmission routes of the audio information from the incoming-talk unit 13 and the audio information from either the right-ear cartilage-conduction vibration unit 24 or the left-ear cartilage-conduction vibration unit 26.

Figure 4:
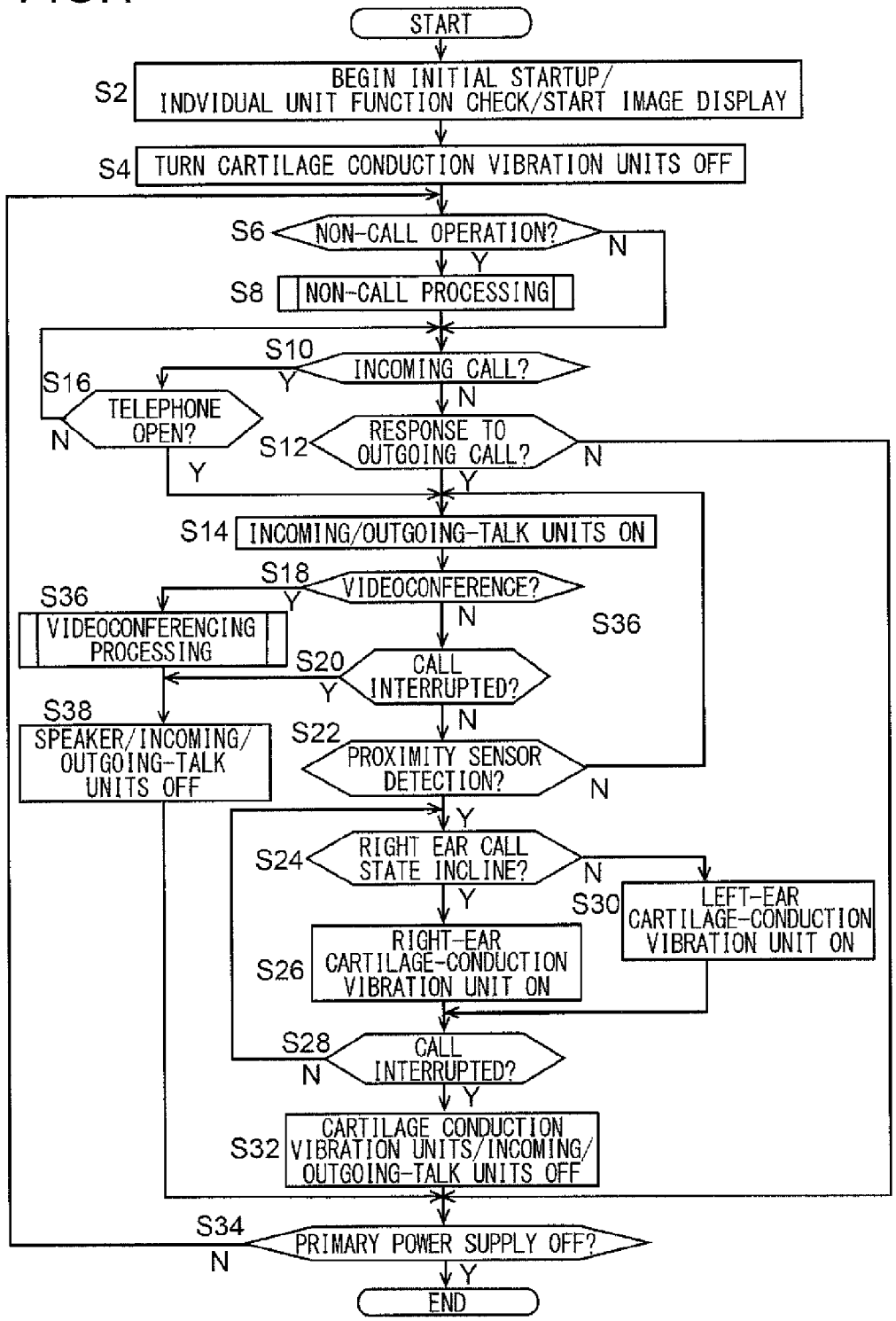
FIG. 4 is a flowchart of the operation of a controller in the first embodiment of FIG. 2.

FIG. 4 is a flowchart of the operation of the controller 39 in the first embodiment of FIG. 2. To provide a description primarily of the function of the right-ear cartilage-conduction vibration unit 24 and the left-ear cartilage-conduction vibration unit 26, the flow of FIG. 4 illustrates an abstraction of the operation, focusing on related functions; the controller 39 also contains typical mobile telephone functions and other operations not represented in the flow of FIG. 4. The flow of FIG. 4 begins when a main power source is turned on by the operation unit 9 of the mobile telephone 1; and in step S2 an initial startup and a check of each unit function are performed and a screen display on the display unit 5 is started. Next, in step S4, the functions of the right-ear cartilage-conduction vibration unit 24 and left-ear cartilage-conduction vibration unit 26 are turned on to proceed on to step S6. Step S6 is a check of the presence or absence of an e-mail operation and/or Internet operation, as well as other operations in which radio operations are not used, such as various settings and also downloaded games (which hereinafter are collectively referred as "non-call operations"). In the case of these operations, execution proceeds on to step S8 for non-call processing, and then arrives at step S10. However, the function in non-call operations is not assumed to be a function of the incoming-talk unit 13 and/or the right-ear cartilage-conduction vibration unit 24 and left-ear cartilage-conduction vibration unit 26 in the upper part 7 of the mobile telephone 1 that is performed brought up against the ear. On the other hand, step S6 proceeds directly on to step S10 when no non-call operations are detected.

In step S10, there is performed a check for whether or not there is an incoming call by mobile radio waves. A case of no incoming call proceeds on to step S12; there is performed a check for whether or not there has been a response from the other party to a call request from the mobile telephone 1. A case in which a response is detected proceeds on to step S14. On the other hand, a case in which it is detected by mobile radio waves in step S10 that there is an incoming call moves on to step S16, in which there is performed a check for whether the mobile telephone 1 is open; i.e., a check for whether the upper part 7 has gone from a state of being folded over the lower part 11 to an opened state as in FIG. 1. A case in which it is not possible to detect that the mobile telephone 1 is open returns to step S10; thereafter, step S10 and step S16 are repeated and the flow pauses for the mobile telephone 1 to be open. However, when, during this repetition, the incoming call is terminated while the mobile telephone 1 remains unopened, the flow moves from step S10 to step S12. On the other hand, a case in which it has been detected in step S16 that the mobile telephone 1 is open proceeds to step S14. In step S14, the outgoing-talk unit 23 and the incoming-talk unit 13 are turned on to move on to step S18. In step S18, there is a check whether or not the call is a videoconferencing function, the flow moving on to step S20 when the call is not a videoconferencing function; at this point in time, there is a confirmation of whether or not the call is cut off, the flow moving on to step S22 when the call is not cut off.

In step S22, there is performed a check for whether or not the infrared light proximity sensor 21 detects contact with an ear, and the flow proceeds to step S24 when no contact is detected. On the other hand, in step S22 the flow returns to step S14 when the infrared light proximity sensor 21 does not detect contact with an ear; as follows, step S14 and from step S18 to S22 are repeated and detection by the proximity sensor in step S22 is awaited. In step S24, there is performed a check for whether an incline of the right ear call state has occurred as illustrated in FIG. 2A, on the basis of the detection signal of the acceleration sensor 49. In a case in which this is true, the flow proceeds to step S26; the right-ear cartilage-conduction vibration unit 24 is turned on, and the flow moves on to step S28. On the other hand, in a case in which it cannot be detected in step S24 that the incline of the right ear call state has occurred, the flow proceeds on to step S30 after the detection signal of the acceleration sensor 49 signifies that the left ear call state as illustrated in FIG. 2B has been detected; the left-ear cartilage-conduction vibration unit 26 is turned on, and the flow moves on to step S28.

In the above description of FIG. 4, the flow is described as proceeding on to step S24 regardless of whether the infrared reflected light detected by the infrared light proximity sensor 21 comes from the infrared light emitting unit 19 or 20, and in step S24 the signal of the acceleration sensor 49 is used to detect whether or not the incline is in the right ear call state. However, because the infrared light proximity sensor 21 can also be used to detect whether or not the incline is in the right ear call state, the configuration may be such that, instead of the signal of the acceleration sensor 49 in step S24, the incline is judged to be in the right ear call state when the output of the infrared light proximity sensor 21 in the light-emitting timing of the infrared light emitting unit 19 is greater than that in the light-emitting timing of the infrared light emitting unit 20. Also, the configuration in step S24 may be such that the judgment of whether or not the incline is in the right ear call state is made together with the signal of the acceleration sensor 49 and the results of a comparison of the outputs of the infrared light proximity sensor 21 in the light-emitting timings of the infrared light emitting units 19, 20.

In step S28, there is performed a check for whether or not the call state has been cut off, the flow returning to step S24 when the call has not been cut off; as follows, step S24 to step S30 are repeated until a call interruption is detected in step S28. Support is thereby provided for switching the hand holding the mobile telephone 1 during a call, between the right ear call state and the left ear call state. On the other hand, in a case in which a call interruption is detected in step S28, the flow moves on to step S32, in which either the right-ear cartilage-conduction vibration unit 24 or the left-ear cartilage-conduction vibration unit 26 that is in an on state, as well as the incoming-talk unit 13 and the outgoing-talk unit 23, are turned on, and the flow then moves on to step S34. On the other hand, in a case in which a call request response has been detected in step S12, the flow moves directly on to step S34. In a case in which there is detected to be a videoconferencing function in step S18, the flow moves on to the videoconferencing function processing of step S36. The videoconferencing function processing involves imaging one's face using the videoconferencing function internal camera 17, outputting the voice of the other party using the speaker 51, switching the sensitivity of the outgoing-talk unit 23, displaying the face of the other party on the display unit 5, or the like. Once such videoconferencing function processing has concluded, the flow proceeds to step S38, which turns off the speaker 51, the incoming-talk unit 13, and the outgoing-talk unit 23, whereupon the flow moves on to step S34. In a case in which a call interruption is detected in step S20, the flow also moves on to step S38, but since the speaker 51 is not originally turned on at that time, the incoming-talk unit 13 and the outgoing-talk unit 23 are turned off and the flow moves on to step S34.

In step S34, there is a check for the presence or absence of an operation to turn off the primary power source; the flow is terminated when there is a turning-off operation. On the other hand, when there is no detection of an operation to turn off the primary power source in step S34, the flow returns to step S6, whereupon steps S6 to step S38 are repeated. As described above, the right-ear cartilage-conduction vibration unit 24 or the left-ear cartilage-conduction vibration unit 26 will not be turned on when the mobile telephone 1 is not open, when the mobile telephone 1 is not in the call state, when the call state is enabled but is a videoconferencing function, or when an ordinary call state is enabled but the mobile telephone 1 is not brought up against the ear. Once the right-ear cartilage-conduction vibration unit 24 or the left-ear cartilage-conduction vibration unit 26 is in the on state, then as long as a call interruption is not detected, it will not be turned off except when on/off switching of the right-ear cartilage-conduction vibration unit 24 or the left-ear cartilage-conduction vibration unit 26 is performed.

Second Embodiment

Figure 5:
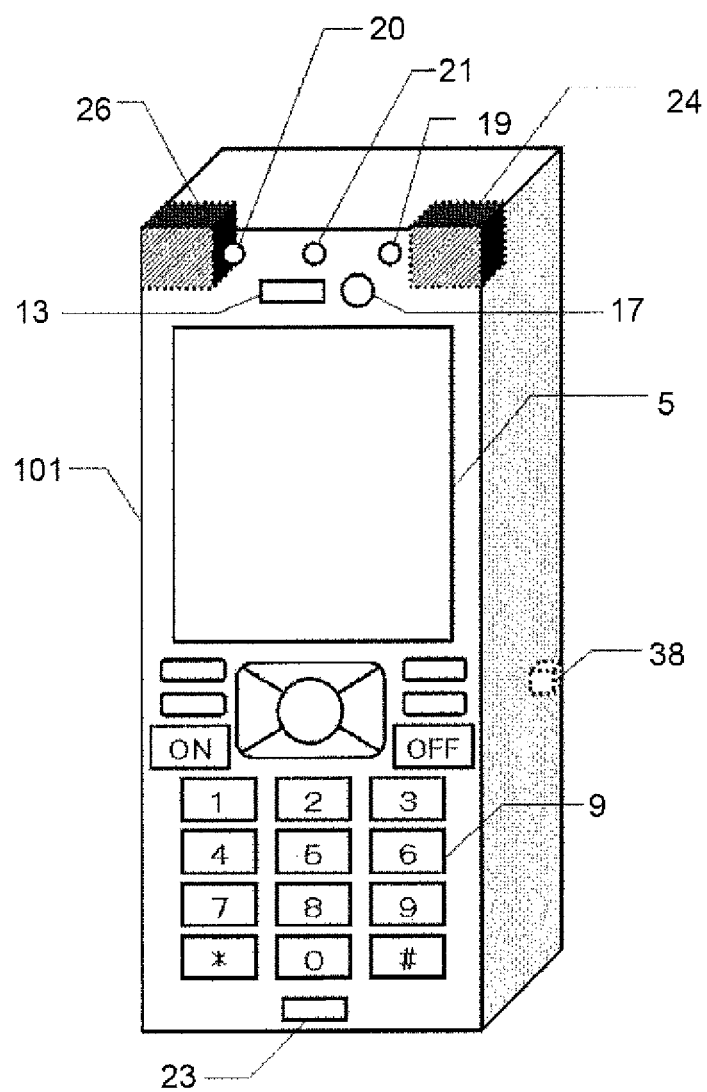
FIG. 5 is a perspective view illustrating a second embodiment of a mobile telephone according to an aspect of the present invention (second embodiment)

FIG. 5 is a perspective view depicting a second embodiment of the mobile telephone according to an aspect of the present invention. Structurally there is much in common in the second embodiment, and so corresponding portions have been given like reference numerals as in the first embodiment, and a description has been omitted. The mobile telephone 101 of the second embodiment has an integrated type with no movable parts, rather than a folding one separated into an upper part and a bottom part. Accordingly, the "upper part" in such a case does not signify a separated upper part but rather signifies the portion at the top of the integrated structure.

In the second embodiment, the right-ear cartilage-conduction vibration unit 24 and the left-ear cartilage-conduction vibration unit 26 assume a form of being constantly exposed on the outer wall of the mobile telephone 101, whereas in the first embodiment, the right-ear cartilage-conduction vibration unit 24 and the left-ear cartilage-conduction vibration unit 26 assume a form of being housed while sandwiched between the upper part 7 and the lower part 11 when the mobile telephone 1 is folded shut. The essential points of the internal structure of FIG. 3 and the flowchart of FIG. 4 can be applied to the second embodiment as well. Regarding the above-described structural differences, step S16 of the flowchart of FIG. 4 is left out; in a case in which an incoming telephone call is confirmed in step S10, the flow moves directly on to step S14.

Third Embodiment

Figure 6:
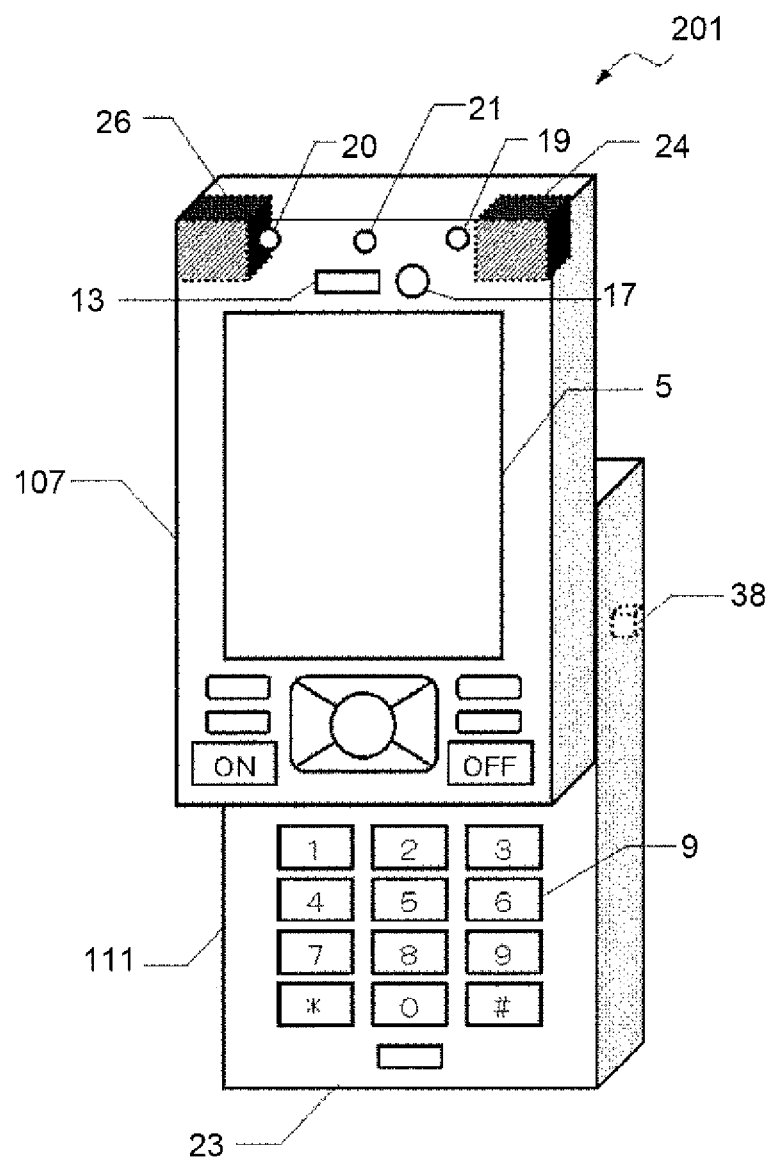
FIG. 6 is a perspective view illustrating a third embodiment of a mobile telephone according to an aspect of the present invention (third embodiment)

FIG. 6 is a perspective view illustrating a third embodiment of the mobile telephone according to an aspect of the present invention. Structurally there is much in common in the third embodiment, and so corresponding portions have been given like reference numerals as in the first embodiment, and a description has been omitted. The mobile telephone 201 of the third embodiment has a structure in which the upper part 107 is able to slide relative to the lower part 111. In the structure of the third embodiment, the up-down relationship is lost in the state in which the upper part 107 is placed on top of the lower part 111, but the "upper part" in the third embodiment signifies the portion that comes up when the mobile telephone 201 is extended.

In the third embodiment, full functionality is available in the state in which, as illustrated in FIG. 6, the upper part 107 is extended to expose the operation unit 9, and also basic functionality, such as responding to incoming calls and/or participating in a call, is also available in a case in which the upper part 107 is placed on top of the lower part 111 and the operation unit 9 is concealed. In the third embodiment as well, the right-ear cartilage-conduction vibration unit 24 and the left-ear cartilage-conduction vibration unit 26 assume a form of being constantly exposed on the outer wall of the mobile telephone 201 in both the state in which, as illustrated in FIG. 6, the mobile telephone 201 is extended, and the state in which the upper part 107 is placed on top of the lower part 111. The essential points of the internal structure of FIG. 3 and the flowchart of FIG. 4 can be applied to the third embodiment as well. However, as described above, the third embodiment allows calls to take place even when the upper part 107 is placed on top of the lower part 111, and therefore, similarly with respect to the second embodiment, step S16 of the flowchart in FIG. 4 is left out; in a case in which an incoming call is confirmed in step S10 the flow moves directly on to step S14.

The implementation of the variety of features of the present invention as described above is not to be limited to the above embodiments; they can be implemented in other aspects as well. For example, because the above embodiments support both right ear usage and left ear usage from changing hands and/or changing users, although the right-ear cartilage-conduction vibration unit 24 and the left-ear cartilage-conduction vibration unit 26 have been provided, the cartilage conduction vibration unit may be singular in a case that assumes usage of only the right ear or of only the left ear for cartilage conduction.

Also, although the right-ear cartilage-conduction vibration unit 24 and the left-ear cartilage-conduction vibration unit 26 have originally been provided with the assumption that each would abut the tragus of the right ear and the tragus of the left ear, respectively, cartilage conduction is also possible in an ear cartilage constituent other than the tragus, such as the mastoid process or the cartilage surface of the rear of the opening of the outer ear, as has been disclosed in Patent Document 2; therefore, both the right-ear cartilage-conduction vibration unit 24 and the left-ear cartilage-conduction vibration unit 26 may be used when, for example, the right ear is used, by simultaneously pushing against appropriate points on the right ear cartilage. In this sense, the two cartilage conduction vibration units 24, 26 need not be limited to right ear usage and left ear usage. Both are turned on at the same time in such a case, instead of only turning on either one of the two cartilage conduction vibration units 24, 26, as in the embodiments.

Further, although the incoming-talk unit 13 and the right-ear cartilage-conduction vibration unit 24 and left-ear cartilage-conduction vibration unit 26 are to be turned on at the same time in the embodiments above, the configuration may be such that the incoming-talk unit 13 is to be turned off when either the right-ear cartilage-conduction vibration unit 24 or the left ear cartilage conduction unit 26 is turned on. In such a case, there is no longer a need for phase adjustment of the audio information.

Fourth Embodiment

Figure 7:
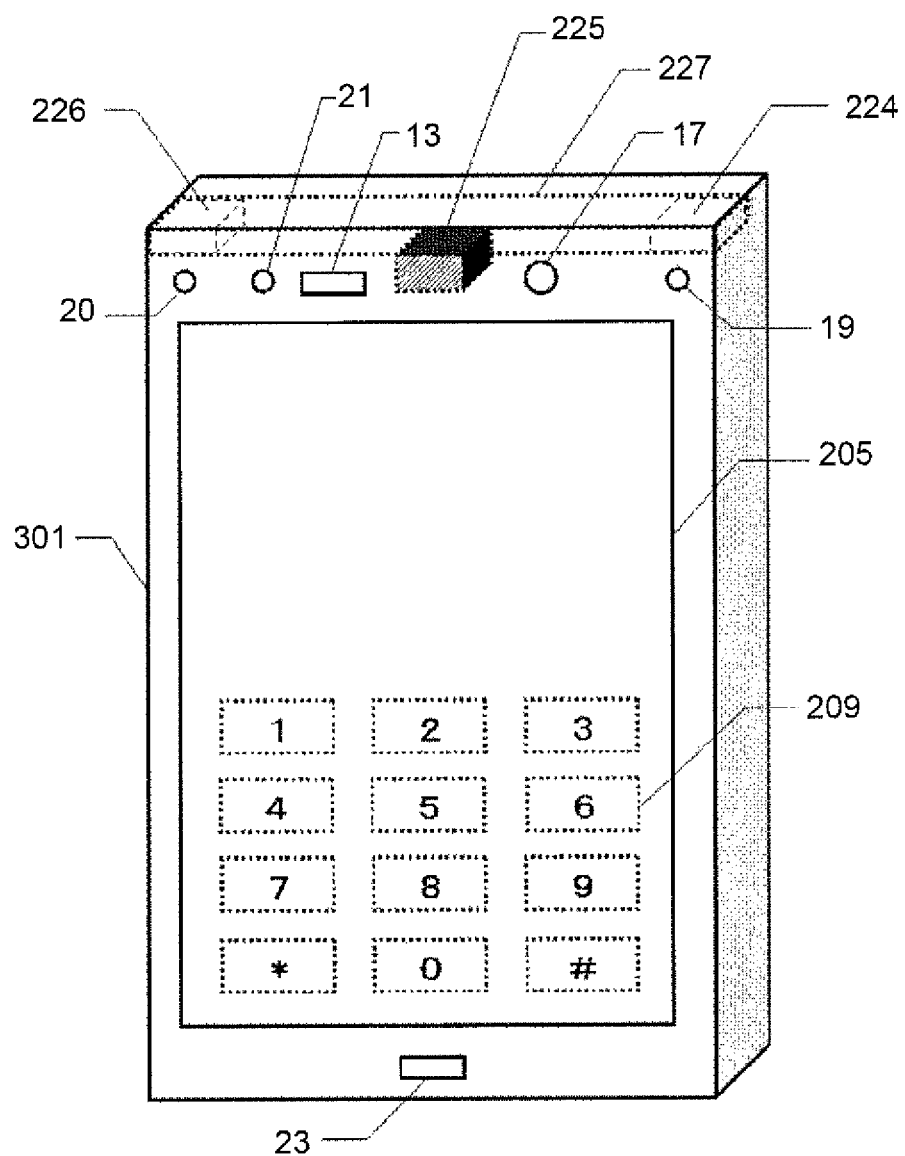
FIG. 7 is a perspective view illustrating a fourth embodiment of a mobile telephone according to an aspect of the present invention (fourth embodiment)

FIG. 7 is a perspective view illustrating a fourth embodiment of the mobile telephone according to an aspect of the present invention. Structurally there is much in common in the fourth embodiment; therefore, corresponding portions have been given like reference numerals as in the first embodiment, and a description has been omitted. A mobile telephone 301 of the fourth embodiment has an integrated type with no movable parts, rather than a folding one separated into an upper part and a bottom part, similarly with respect to the second embodiment. Also, this embodiment is configured as a "smartphone," which has a large-screen display unit 205 provided with graphical user interface (GUI) functionality. In the fourth embodiment as well, "upper part" does not signify a separated upper part but rather signifies the portion at the top of the integrated structure. However, in the fourth embodiment, a keypad or other operation unit 209 is displayed on the large-screen display unit 205, and the GUI is operated in accordance with how a finger is touched and/or swiped relative to the large-screen display unit 205.

The cartilage conduction vibration functionality in the fourth embodiment is assigned to a cartilage conduction vibration unit, which has a vibration conductor 227 and a cartilage conduction vibration source 225, comprising a piezoelectric bimorph or the like. The cartilage conduction vibration source 225 is arranged to be in contact with the lower part of the vibration conductor 227, the vibration thereof being conducted to the vibration conductor 227. The cartilage conduction vibration source 225 is constituted so as not to protrude from the outer wall of the mobile telephone (front view shown in FIG. 7) and hinder the design, similarly with respect to the first to third embodiments, but the vibration of the cartilage conduction vibration source 225 is transmitted laterally by the vibration conductor 227, causing the two ends 224 and 226 thereof to vibrate. The two ends 224 and 226 of the vibration conductor 227 are located on the inner angle of the top part 7 of the mobile telephone 301, which is in contact with the tragus, and therefore, similarly with respect to the first to third embodiments, effectively come into contact with the tragus without protruding from the outer wall of the mobile telephone. In this manner, the right end part 224 and left end part 226 of the vibration conductor 227 respectively constitute the right-ear cartilage-conduction vibration unit 24 and left-ear cartilage-conduction vibration unit 26 mentioned in the first embodiment.

However, because the vibration conductor 227 does not vibrate only at the right end 224 and left end 226 thereof but vibrates as a whole, it is possible in the fourth embodiment to transmit audio information regardless of where on the top inner edge of the mobile telephone 301 contact with the ear cartilage is made. Because the vibration of the cartilage conduction vibration source 225 is guided to a desired location by the vibration conductor 227, and no requirement is made that the cartilage conduction vibration source 225 itself be arranged on the outer wall of the mobile telephone 301, the configuration of such a cartilage conduction vibration unit is advantageous in that a greater amount of freedom is provided for the layout and in that the cartilage conduction vibration unit can be installed on a mobile telephone lacking any available extra space.

The fourth embodiment adds two further functionalities. However, these functionalities are not specific to the fourth embodiment, and can be applied to the first to third embodiments as well. One of the additional functionalities serves to prevent accidental operation of the cartilage conduction vibration unit. All of the first to fourth embodiments detect when the mobile telephone is brought up against an ear using the infrared light emitting units 19, 20 and the infrared light proximity sensor 21; however, in the first embodiment, for example, there is a concern that the proximity sensor will detect a case in which the inside of the mobile telephone 1 is lowered and placed on a desk or the like, and will accordingly falsely confirm that the mobile telephone 1 has been brought up against an ear, proceeding from step S22 of the flow of FIG. 4 to step S24. Because the same is not also true for the incline of the right ear call state detected in step S24, there is a possibility that the flow will proceed to step S30 and the left-ear cartilage-conduction vibration unit 26 will erroneously be turned on. The vibration of the cartilage conduction vibration unit results in a comparatively large amount of energy, so vibration noise may be created with the desk when such mistaken operation occurs. To prevent this, the fourth embodiment is configured such that a horizontal stationary state is detected using the acceleration sensor 49, and, when applicable, the cartilage conduction vibration source 225 is prohibited from vibrating. This point will be described in greater detail later.

Next, a description will be provided for the second additional functionality in the fourth embodiment. In each of the embodiments of the present invention, audio information is transmitted by having either the right-ear cartilage-conduction vibration unit 24 or the left-ear cartilage-conduction vibration unit 26 (in the fourth embodiment, the right end part 224 or left end part 226 of the vibration conductor 227) brought into contact with the tragus of the right ear or left ear; however, the contact pressure can be increased to obstruct the hole of the ear with the tragus, thereby creating an earplug bone conduction effect and conducting the audio information at an even higher volume. Further, because environment noise is blocked by the obstruction of the ear hole with the tragus, use in such a state achieves a listening status with dual effects, in which unnecessary environment noise is reduced and necessary audio information is increased; and is appropriate, for example, for calls to take place noisy environments or other situation. When the earplug bone conduction effect occurs, one's own voice becomes louder due to bone conduction from the vocal cords, and there is also a discomfort from the resulting imbalance in left and right auditory sensation. To ease the discomfort of one's own voice during the occurrence of such an earplug bone conduction effect, the fourth embodiment is configured such that the information of one's own voice picked up from the outgoing-talk unit 23 is subjected to phase inversion and transmitted to the cartilage conduction vibration source 225, canceling out the sound of one's own voice. This point will be described in greater detail later.

Figure 8:
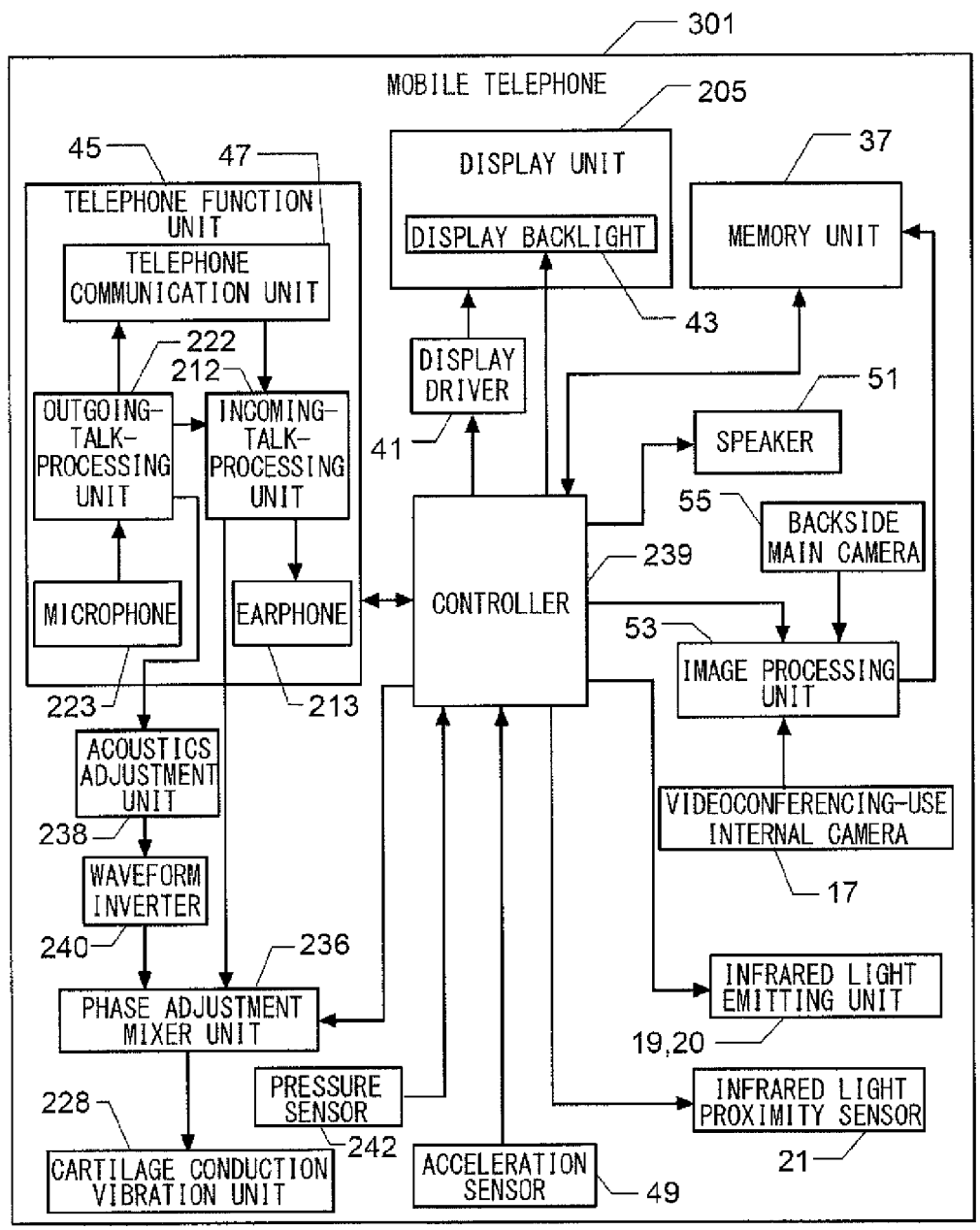
FIG. 8 is a block diagram of the fourth embodiment.

FIG. 8 is a block diagram of the fourth embodiment, in which the same reference numerals are assigned to the same parts from FIG. 7. Also, because there are many portions in common with the first to third embodiments, corresponding portions are each assigned these same reference numerals. A description has been omitted for these identical or shared portions, unless there is a particular need. Although the telephone function unit 45 is illustrated in somewhat greater detail in the fourth embodiment, the configuration is shared among the first to third embodiments. More specifically, the incoming-talk-processing unit 212 and the earphone 213 of FIG. 8 correspond to the incoming-talk unit 13 in FIG. 3, and the outgoing-talk-processing unit 222 and the microphone 223 in FIG. 8 correspond to the outgoing-talk unit 23 in FIG. 3. On the other hand, the cartilage conduction vibration source 225 and the vibration conductor 227 in FIG. 7 are depicted together in FIG. 8 as the cartilage conduction vibration unit 228. The outgoing-talk-processing unit 222 transmits a part of the audio from the operator picked up by the microphone 223 to the incoming-talk-processing unit 212 as a sidetone, and the incoming-talk-processing unit 212 superimposes the operator's own sidetone onto the voice of the calling party from the telephone communication unit 47 and outputs same to the earphone 213, whereby the balance between the bone conduction and air conduction of one's own voice in the state in which the mobile telephone 301 is brought up against an ear is made to approximate a natural state.

The outgoing-talk-processing unit 222 further outputs a part of the audio from the operator picked up by the microphone 223 to an acoustics adjustment unit 238. The acoustics adjustment unit 238 adjusts the acoustics of one's own voice, which are to be outputted from the cartilage conduction vibration unit 228 and transmitted to the cochlea, to acoustics approximating the operator's own voice transmitted to the cochlea by internal body conduction from the vocal cords during the occurrence of the earplug bone conduction effect; and effectively cancels out both. Also, a waveform inverter 240 subjects one's own voice, the acoustics of which have been adjusted in this manner, to waveform inversion, and outputs same to the phase adjustment mixer unit 236. When the pressure detected by a pressure sensor 242 is at or above a predetermined range and the state corresponds to one in which the ear hole is obstructed at the tragus by the mobile telephone 301, the phase adjustment mixer unit 236 mixes the output from the waveform inverter 240 according to an instruction from the controller 239 and drives the cartilage conduction vibration unit 228. The excessive amount of one's own voice that occurs during the earplug bone conduction effect is thereby cancelled out, thus easing the discomfort. At this time, the degree of cancellation is regulated such that an amount of one's own voice equivalent to the sidetone remains without being cancelled out. On the other hand, a case in which the pressure detected by the pressure sensor 242 is lower than the predetermined level corresponds to a state in which the ear hole is not obstructed at the tragus and the earplug bone conduction effect does not occur; therefore, the phase adjustment mixer unit 236 will not mix the wavelength inversion output of one's own voice from the waveform inverter 240, on the basis of the instruction of the controller 239. However, the configuration may reverse the positions of the acoustics adjustment unit 238 and the waveform inverter 240 in FIG. 8. Moreover, the acoustics adjustment unit 238 and the waveform inverter 240 may be integrated as a function within the phase adjustment mixer unit 236.

FIG. 9 is a conceptual block diagram illustrating the elements of the state in which the mobile telephone 301 is brought up against the tragus of the right ear in the fourth embodiment, and provides a description of how one's own voice is cancelled out during the occurrence of the earplug bone conduction effect. FIG. 9 also depicts a particular embodiment of the pressure sensor 242; the configuration assumes that the cartilage conduction vibration unit 225 is a piezoelectric bimorph element. Equivalent parts have been given like reference numerals as in FIGS. 7 and 8, and a description has been omitted unless there is a particular need.

Figure 9A:
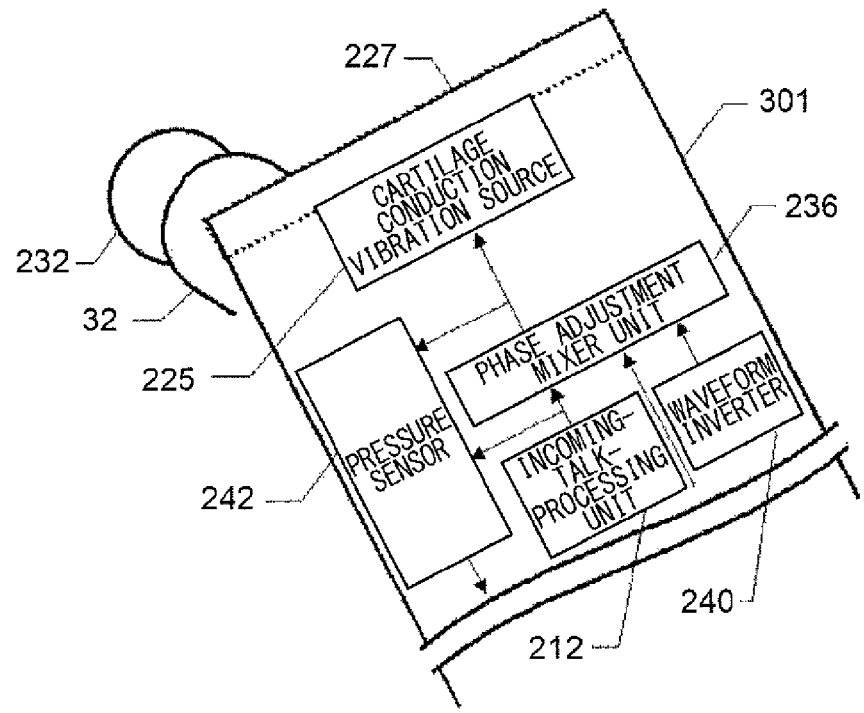
FIG. 9 is a conceptual block diagram illustrating the elements of the configuration pertaining to an earplug bone conduction effect of the fourth embodiment.

FIG. 9A illustrates the state in which the mobile telephone 301 is brought up against the tragus 32 to such an extent that the tragus 32 does not obstruct the ear hole 232. In such a state, the phase adjustment mixer unit 236 drives the cartilage conduction vibration unit 225 on the basis of the audio information of the calling party from the incoming-talk-processing unit 212. The pressure sensor 242 is configured so as to monitor a signal appearing on a signal line linking the cartilage conduction vibration unit 225 to the phase adjustment mixer unit 236, and detects signal variations that are based on strain to the cartilage conduction vibration unit (a piezoelectric bimorph element) 225 that is applied depending on the pressure on the vibration conductor 227. Thus, when the cartilage conduction vibration unit 225 for transmitting audio information by being brought into contact with the tragus 32 comprises a piezoelectric bimorph element, the piezoelectric bimorph element can be made to also serve as a pressure sensor for detecting the pressure on the tragus 32. The pressure sensor 242 further monitors a signal appearing on a signal line linking the incoming-talk-processing unit 212 to the phase adjustment mixer unit 236. The signal appearing therein is not affected by the pressure on the tragus 32 and can therefore be utilized as a reference signal for determining the pressure.

Figure 9B:
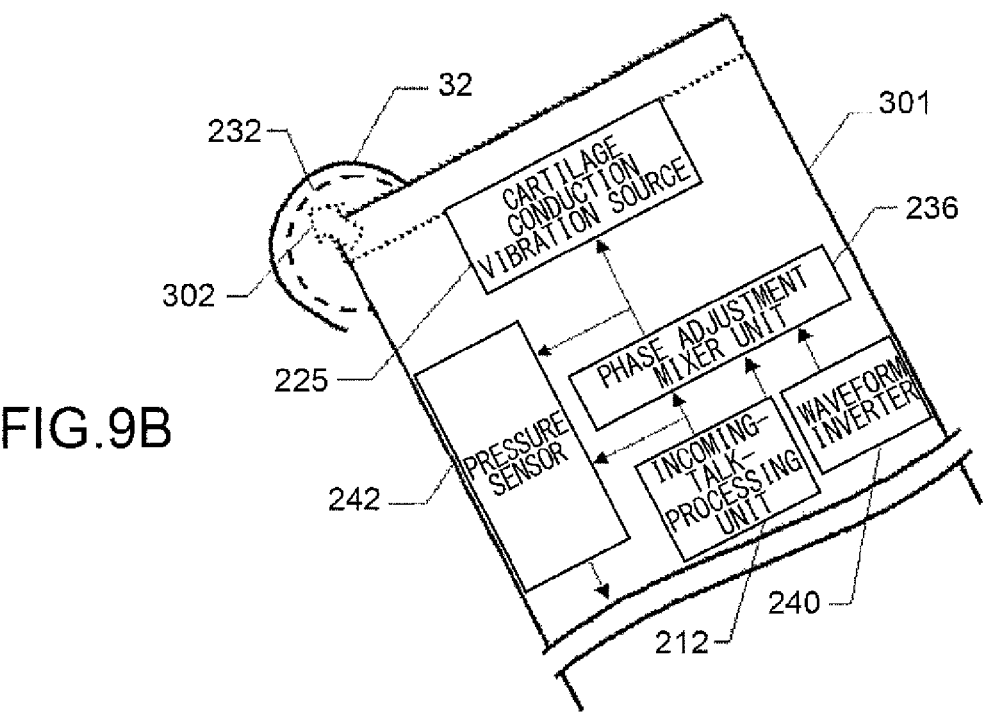

In FIG. 9A, as described above, the tragus 32 is in a state that does not obstruct the ear hole 232, and the pressure sensor 242 determines that the pressure is small; therefore, on the basis of this determination, the controller 239 instructs the phase adjustment mixer unit 236 not to mix one's own waveform-inverted voice from the waveform inverter 240 into the cartilage conduction vibration unit 225. On the other hand, FIG. 9B illustrates the state in which the mobile telephone 301 presses more strongly on the tragus 32 in the direction of arrow 302 and the tragus 32 obstructs the ear hole 232. This state generates the earplug bone conduction effect. The pressure sensor 242 determines that the ear hole 232 has been obstructed on the basis of a detection of an increase to or above a predetermined pressure, and, on the basis of this determination, the controller 239 instructs the phase adjustment mixer unit 236 to mix one's own waveform-inverted voice from the waveform inverter 240 into the cartilage conduction vibration unit 225. The discomfort of one's own voice during the occurrence of the earplug bone conduction effect is eased as described above. Conversely, when a reduction at or above a predetermined pressure from the state in FIG. 9B is detected by the pressure sensor 242, the state is determined to be one in which, as in FIG. 9A, the ear hole 232 is not obstructed, and the mixing of one's own waveform-inverted voice is discontinued. However, the pressure sensor 242 determines that there has been a transition between the states of FIGS. 9A and 9B on the basis of the absolute amount of pressure and the directionality of the pressure change. However, in a state of silence in which neither party speaks, the pressure sensor 242 detects the pressure by directly applying a pressure monitor signal, which is inaudible by ear, to the direct bone conduction vibration unit 225.

Figure 10:
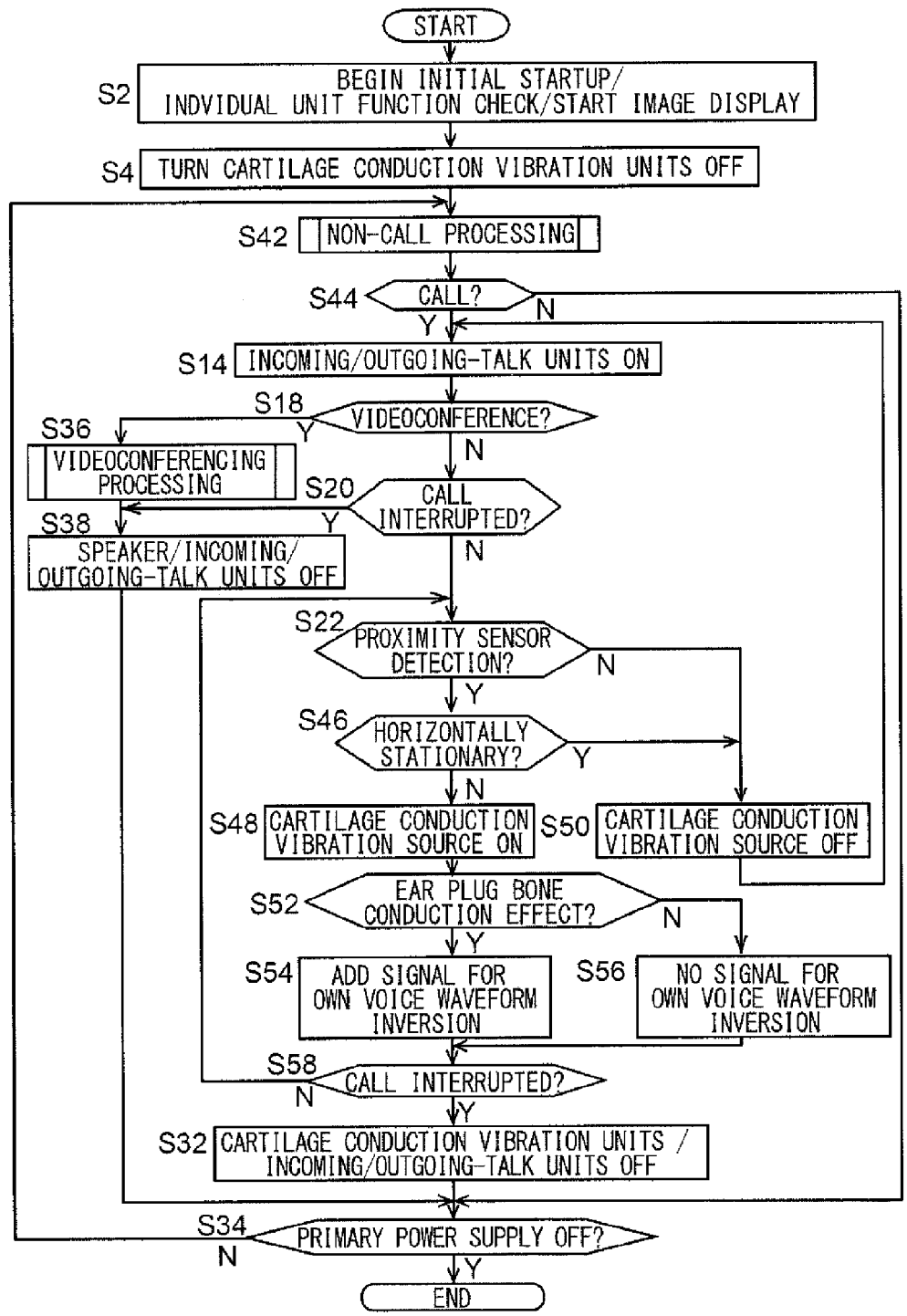
FIG. 10 is a flow chart of the operation of the controller in the fourth embodiment of FIG. 8.

FIG. 10 is a flow chart of the operation of the controller 239 in the fourth embodiment of FIG. 8. However, because the flow of FIG. 10 has many points in common with the flow of the first embodiment in FIG. 4, corresponding parts have been given like step numerals, and a description has been omitted unless needed. FIG. 10 also illustrates an abstraction of the operation that focuses on related functions, in order to primarily provide a description of the function of the cartilage conduction vibration unit 228. Accordingly, similarly with respect to the case in FIG. 4, the controller 239 also contains typical mobile telephone functions and other operations not represented by the flow of FIG. 10. FIG. 10 uses boldface print to illustrate points of difference with FIG. 4, and thus the following description focuses on these portions.

Step S42 integrates step S6 and step S8 of FIG. 4, and is therefore illustrated such that the non-call processing of step S42 includes the case of directly proceeding to the next step without any non-call operation, but the content thereof is identical to step S6 and step S8 in FIG. 4. Step S44 integrates step S10 and step S12 of FIG. 4, and is therefore illustrated as a step for checking the presence or absence of a call state between two parties regardless of whether the call is incoming from the other party or is outgoing from oneself, but the content thereof is identical to step S6 and step S8 in FIG. 4. However, the fourth embodiment does not contain a step that would correspond to step S16 in FIG. 4, because the configuration is not such that the mobile telephone 301 is opened or closed.

Step S46 relates to the first addition function in the fourth embodiment and therefore checks for whether the mobile telephone 301 has left the hand-held state and remained stationary in a horizontal state for a predetermined period of time (for example, 0.5 seconds). When the proximity sensor has made a detection in step S22, step S48 is first reached in a case in which it is confirmed in step S46 that there is no such horizontal stationary state; the cartilage conduction vibration source 225 is then turned on. On the other hand, in a case in which a horizontal stationary state is detected in step S46, the flow proceeds on to step S50, which turns off the cartilage conduction vibration source 225, and the flow returns to step S14. However, step S50 corresponds to when, in a flow repetition to be described later, the cartilage conduction vibration source 225 reaches step S46 in an on state and a horizontal stationary state has been detected; therefore, when the cartilage conduction vibration source 225 reaches step S50 in an off state, the flow returns to step S14 without any action being performed.

Step S52 relates to the second added function in the fourth embodiment, and checks for the occurrence of the earplug bone conduction effect, which is caused by the mobile telephone 301 pressing strongly on the tragus 32 and obstructing the ear hole 232. In particular, as illustrated in FIG. 9, this is checked by the presence or absence of a change at or above a predetermined pressure and the directionality thereof by the pressure sensor 242. In a case in which there is a detection of the state in which the earplug bone conduction effect is created, the flow proceeds to step S54, which adds the waveform-inversion signal of one's own voice to the cartilage conduction vibration source 225, and the flow then moves on to step S58. On the other hand, in a case in which there is a detection in step S52 of a state in which the earplug bone conduction effect is not created, the flow moves on to step S56, and then on to step S58 without adding the waveform-inversion signal of one's own voice to the cartilage conduction vibration source 225. In step S58, there is performed a check for whether or not a call state has been cut off; when the call is not cut off, the flow returns to step S22, following which step S22 and step S46 to S58 are repeated until a call interruption is detected in step S58. Support is thereby provided for the generation and elimination of the earplug bone conduction effect during a call.

The various features of each of the embodiments described above are not to be restricted to individual respective embodiments, but rather can be substituted or combined with other appropriate embodiments. For example, the flow chart of the fourth embodiment in FIG. 10 does not have the configuration in the flow chart of the first embodiment in FIG. 4 for switching the right-ear cartilage-conduction vibration unit 24 and the left-ear cartilage-conduction vibration unit 26, but the configuration may be such that the right-ear cartilage-conduction vibration unit 24 and the left-ear cartilage-conduction vibration unit such as in the first embodiment are utilized as the configuration of the cartilage conduction vibration unit 228 in the tenth embodiment; thus, in addition to support for the generation and elimination of the earplug bone conduction effect in repeating the loop of step S22 and steps S46 to S58, support is additionally provided for switching the mobile telephone to the other hand between the right ear call state and the left ear call state by the function according to steps S24 to S26 from FIG. 4. It is also possible to add to the first to third embodiments the functionality of checking for the horizontal stationary state and turning off the cartilage conduction vibration unit 228 in the fourth embodiment of FIG. 10. It is moreover possible in the first through third embodiments to utilize the cartilage conduction vibration unit 228 as in the fourth embodiment.

Fifth Embodiment

Figure 11:
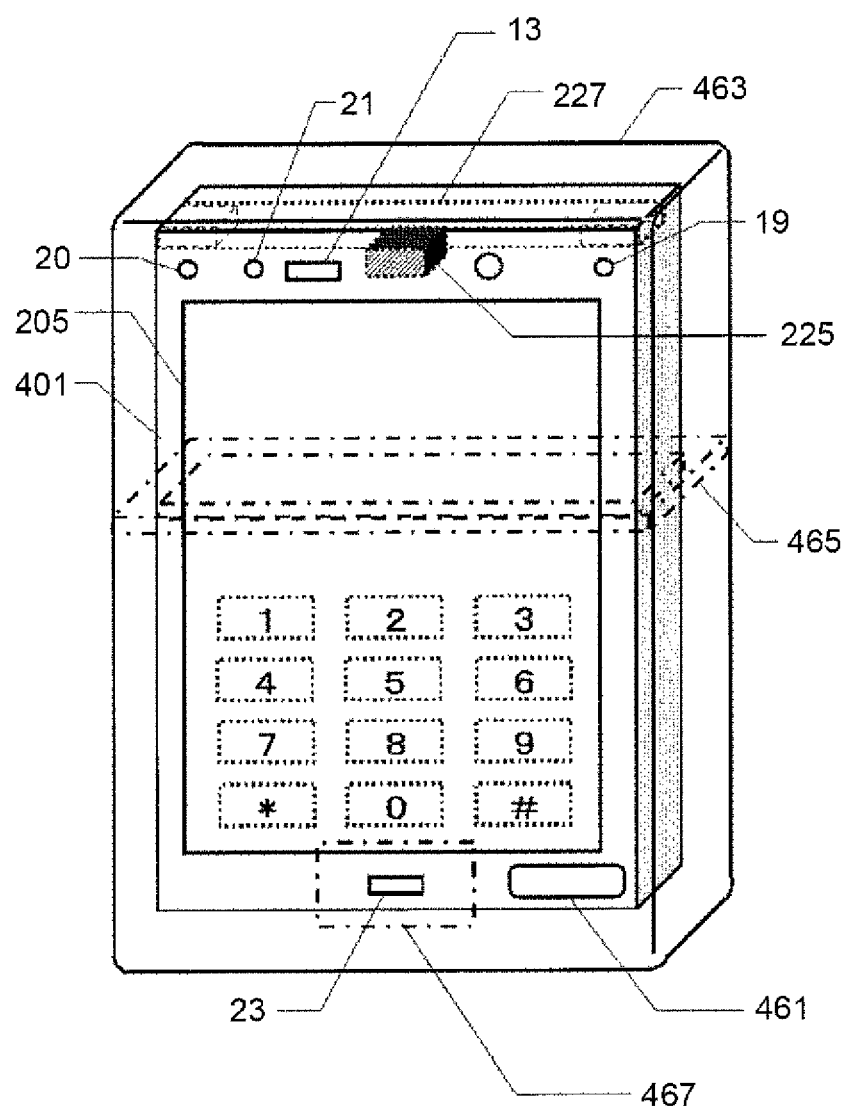
FIG. 11 is a perspective view illustrating a fifth embodiment of a mobile telephone according to an aspect of the present invention (fifth embodiment)

FIG. 11 is a perspective view illustrating a fifth embodiment of the mobile telephone according to an aspect of the present invention. The fifth embodiment is founded on the fourth embodiment of FIG. 7, and shares the majority of the structure thereof; thus, corresponding parts have been given like reference numerals, and a description thereof has been omitted. Also, to avoid complicating the illustration, the assignment of the reference numerals themselves has also been omitted for those portions for which the description has been omitted, but the functions and names of the common parts in the drawings are common with FIG. 7. However, a more detailed description of the configuration calls on the essential points of the block diagram of the fourth embodiment in FIGS. 8 and 9. A first point of difference in the fifth embodiment from the fourth embodiment lies in that a mobile telephone 401 is provided with a double-push button 461, which makes it possible to set a so-called touch panel function (a function in which the large-screen display unit 205, on which the key pad or other operation unit 209 is displayed, is touched with a finger and the GUI is operated by the detection of this touch position and/or the detection of this swipe) to off, and also which is only usable when this touch panel function has been set to off. The touch panel function can be set to off by operating the touch panel itself, and the touch panel can also be set to return to on by pressing the double-push button 461 for a predetermined period of time or longer. The double-push button 461, when usable, also has a function for initiating a call with a first push and for interrupting a call when there is a second push during the call (an alternate switching function performed by pushing whether [the device] is on or off). The above-described first push of the double-push button 461 is performed either to call a specific party or to respond to an incoming call, a call being initiated thereby in either case.

A second point of difference in the fifth embodiment from the fourth embodiment lies in that the fifth embodiment is configured so as to function by the combination of the mobile telephone 401 with a softcover 463 for housing same. Although FIG. 11, for the sake of describing the configuration, depicts the softcover 463 as if it were transparent, the softcover 463 is actually opaque, and the mobile telephone 401 cannot be seen from the outside in the state in which the mobile telephone 401 is housed in the softcover 463 as in FIG. 11.

The above-described double-push button 461 is also able to function when the double-push button 461 is pushed from on the softcover 463 in the state in which the mobile telephone 401 has been housed in the softcover 463. Furthermore, the softcover 463 is configured so as to interlock with the cartilage conduction vibration unit 228 comprising the cartilage conduction vibration source 225 and vibration conductor 227 of the mobile telephone 401, allowing for a call to take place in the state in which the mobile telephone 401 is housed in the softcover 463. The following provides a description thereof.

The softcover 463 is made using an elastic material that has acoustic impedance approximating that of ear cartilage (a silicone rubber; a mixture of a silicone rubber and a butadiene rubber; a natural rubber; a structure formed using these varieties of rubber in which air bubbles are sealed; a structure, such as can be seen in transparent packaging sheet materials or the like, in which a layer of groups of air bubbles is sealed separated by a thin film of synthetic resin; or the like). The vibration conductor 227 for transmitting vibration from the cartilage conduction vibration source 225 is in contact with the inside of the softcover when the mobile telephone 401 is housed therein. The outside of the softcover 463 is brought up against the ear with the mobile telephone 401 housed therein, whereby the vibration of the vibration conductor 227 is transmitted to the ear cartilage over a broad area of contact by the interposition of the softcover 463. Sound from the exterior of the softcover 463, which resonates in accordance with the vibration of the vibration conductor 227, is further transmitted to the tympanic membrane from the external auditory meatus. Sound source information from the cartilage conduction vibration source 225 can thereby be heard as a loud sound. Environment noise can also be blocked, because the softcover 463, which is brought up against the ear, has a form such that the external auditory meatus is obstructed. Increasing the force with which the softcover 463 is pressed against the ear furthermore gives the result of substantially completely obstructing the external auditory meatus, and sound source information from the cartilage conduction vibration source 225 can be heard as an even louder sound due to the earplug bone conduction effect. Detection is done via the softcover 463, but, similarly with respect to the fourth embodiment, in the state in which the earplug bone conduction effect is created, the waveform inversion signal from the outgoing-talk unit 23 (the microphone 223) is added to the signal of one's own voice, on the basis of the detection of pressure by the cartilage conduction vibration source 225.

In a call state in which the mobile telephone 401 remains housed in the softcover 463, the vibration of the vibration conductor 227, which is transmitted to the softcover 463, is also transmitted to the outgoing-talk unit 23, which has the potential to generate a Larsen effect. To block acoustic conduction between the vibration conductor 227 and the outgoing-talk unit 23 as a countermeasure therefor, the softcover 463 is provided in between the two with an insulation ring unit 465 having an acoustic impedance different from that of the body of the softcover. The insulation ring unit 465 can be formed by either integrating or joining a material different from the material of the body of the softcover. The insulation ring unit 465 may also be formed by joining a layer having a different acoustic impedance to either the outside or the inside of the softcover 463, which are molded with the same material. Moreover, a plurality of insulation ring units 465 may be interposed between the vibration conductor 227 and the outgoing-talk unit 23 so that the insulating effect may be increased.

In order for the softcover 463 to permit a call to take place in the state in which the mobile telephone 401 remains housed therein, the vicinity of the outgoing-talk unit 23 (the microphone 223) is configured as a microphone cover unit 467, which does not interfere with the air conduction of sound. Such a microphone cover unit 467 takes a sponge-like structure such as that of, for example, an earphone cover or the like.

FIG. 12 is a flow chart of the operation of the controller 239 (borrowing from FIG. 8) in the fifth embodiment of FIG. 11. However, parts that the flow of FIG. 12 shares with the flow of FIG. 10 have been given like step reference numerals, and a description thereof has been omitted. FIG. 12 also primarily serves to describe the functions of the cartilage conduction vibration unit 228 and therefore depicts an abstraction of the operation that focuses on the related functions. Accordingly, similarly with respect to FIG. 10 or the like, the controller 239 in the fifth embodiment also contains typical mobile telephone functions and other operations that are not represented in the flow in FIG. 12.

When the flow of FIG. 12 reaches step S62, a check is performed for whether or not the touch panel has been set to off by the operation described above. When same has not been set to off, the flow moves on to step S64, and the function of the double-push button 461 is deactivated, whereupon the flow moves on to step S66 before arriving at step S34. The portion illustrated as typical processing in step S66 collectively integrates step S14, steps S18 to S22, step S32, step S36, step S38, and steps S42 to S58 in FIG. 10 (i.e., the portions between steps S4 and S34). In other words, in a case in which step S62 transitions to step S64, the flow in FIG. 12 implements similar functions to those of FIG. 10.

On the other hand, when it is detected in step S62 that the touch panel has been set to off, the flow moves on to step S68, in which the function of the double-push button 461 is activated. The flow then proceeds to step S70. In step S70, the function of the touch panel is deactivated, and in step S72, the presence or absence of a first push on the double-push button 461 is detected. In a case in which herein no push is detected, the flow moves on directly to step S34. On the other hand, in a case in which a first push on the double-push button 461 is detected in step S72, the flow proceeds to step S74, which detects whether or not the mobile telephone 401 has been housed in the softcover 463. This detection is made possible, for example, by the function of the infrared light-emitting units 19, 20 and the infrared light proximity sensor 21, which constitute the proximity sensor.

When housing in the softcover 463 is detected in step S74, the flow proceeds to step S76, which turns the outgoing-talk unit 23 on, and turns the incoming-talk unit 13 off. Further, step S78 turns the cartilage conduction vibration source 225 on and the flow proceeds to step S80, which places the mobile telephone 401 in a call state. When a call state is already in effect, the same is continued. On the other hand, in a case in which housing in the softcover 463 is not detected in step S74, the flow moves on to step S82, which turns both the outgoing-talk unit 23 and the incoming-talk unit 13 on; further, step S84 turns the cartilage conduction vibration source 225 off and the flow proceeds to step S80. Step S86, which follows step S80, runs processing for the earplug bone conduction effect, and then the flow moves on to step S88. The processing for the earplug bone conduction effect in step S86 is collectively illustrated by steps S52 to S56 in FIG. 10.

In step S88, the presence or absence of a second push on the double-push button 461 is detected. When there is no detection, the flow returns to step S74, following which steps S74 to S88 are repeated until there is a detection of a second push on the double-push button 461. There is a constant check for whether the mobile telephone 401 is housed in the softcover 463 during this repetition during a call; therefore, when, for example, environment noise is loud and listening comprehension at the incoming-talk unit 13 is impaired, support is provided for the user to house the mobile telephone 401 in the softcover 463 and thereby block environment noise and further ease listening comprehension by the earplug bone conduction effect.

On the other hand, when a second push on the double-push button 461 is detected in step S88, the flow moves on to step S90, which interrupts the call; step S92 also turns all sending and receiving functions off and the flow arrives at step S34. In step S34, there is performed a check for whether the primary power source is off; therefore, when there is no detection of the primary power source being off, the flow returns to step S62, following which steps S62 to S92 and step S34 are repeated. Further, during this repetition, step S64 provides support for setting the touch panel to off by the previously described operation of the touch panel or for releasing the off setting by a long press on the double-push button 461, and therefore switch is possible with appropriate, ordinary processing.

Sixth Embodiment

Figure 13A:
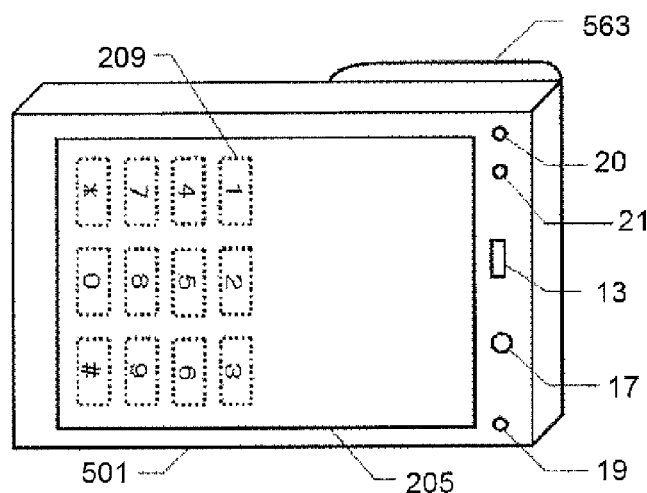
FIG. 13A is a front perspective view.
Figure 13B:
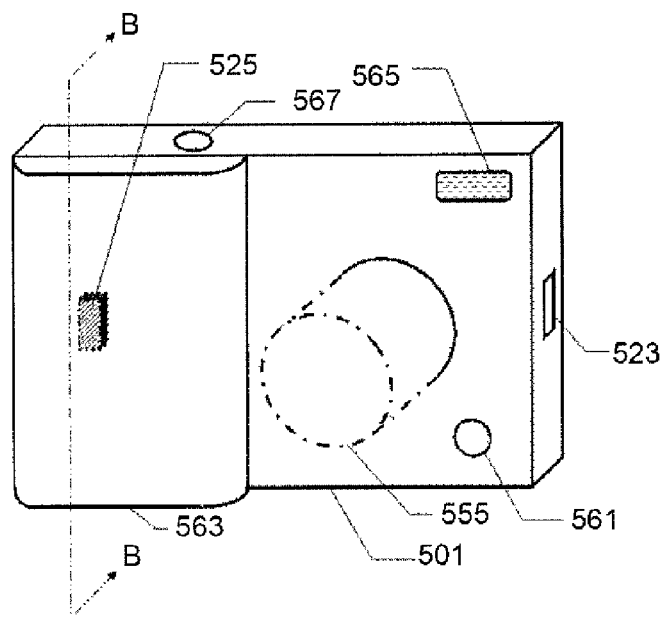
FIG. 13B is a rear perspective view.
Figure 13C:
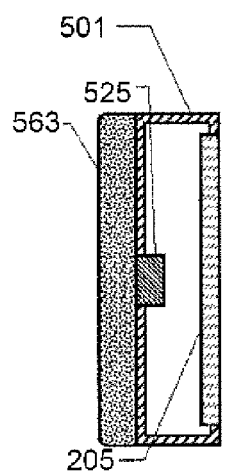
FIG. 13C is a cross-sectional view along the B-B cross-section of the rear perspective view of FIG. 13B (sixth embodiment)

FIG. 13 is a perspective view illustrating a sixth embodiment of the mobile telephone according to an aspect of the present invention. FIG. 13A is a front perspective view similar to FIG. 7, but, as will be described later, because the sixth embodiment is constituted as a digital camera provided with mobile telephone functions, FIG. 13A is rotated 90 degrees relative to FIG. 7 and depicted at the angle of the state of use as a digital camera. FIG. 13B is a rear perspective view thereof (a front perspective view in a case viewed as a digital camera), and FIG. 13C is a cross-sectional view in the B-B sectional plane in FIG. 13B.

The sixth embodiment is founded on the fourth embodiment of FIG. 7, and has the majority of the structure thereof in common; thus, corresponding parts have been given like reference numerals, and a description thereof has been omitted. Also, to avoid complicating the illustration, the assignment of the reference numerals themselves has also been omitted for those portions for which the description has been omitted, but the functions and names of the common parts in the drawings are in common with those of FIG. 7. However, a more detailed description of the configuration calls on the essential points of the block diagram of the fourth embodiment in FIGS. 8 and 9. A first point of difference in the sixth embodiment from the fourth embodiment lies in that a mobile telephone 501 is constituted as a digital camera provided with mobile telephone functions. That is, as illustrated in FIG. 13B, the first point of difference is that a zoom lens 555 provided with high optical performance is utilized as the imaging lens of the backside main camera. The zoom lens 555 projects out during use in the state illustrated by the single dotted line in FIG. 13B, but, during non-use, takes a so-called collapsible lens configuration, which retracts to a position forming a plane identical to that of the outer surface of the mobile telephone 501. A strobe 565 and a shutter release button 567 for projecting auxiliary light when the subject is dark are also provided. The mobile telephone 501 also has a grip unit 563 suited for when the camera is held in the right hand.

A second point of difference in the sixth embodiment from the fourth embodiment lies in that the grip unit 563, similarly with respect to the softcover 463 in the fifth embodiment, is made using a material that has acoustic impedance approximating that of ear cartilage (a silicone rubber; a mixture of a silicone rubber and a butadiene rubber; a natural rubber; or a structure formed from these varieties of rubber in which air bubbles are sealed), and is provided with an elasticity suited for providing a satisfactory grip sensation. Also, unlike the arrangement in the fourth embodiment, a cartilage conduction vibration source 525 is arranged on the reverse side of the grip unit 563. As is clear from the cross-section in FIG. 13C, the cartilage conduction vibration source 525 is in contact with the rear side of the grip unit 563.

Accordingly, bringing the grip unit 563 up against the ear transmits the vibration of the cartilage conduction vibration source 525 to the ear cartilage over a broad area of contact by the interposition of the grip unit 563. Moreover, sound from the exterior of the grip unit 563, which resonates according to the vibration of the cartilage conduction vibration source 525, is transmitted to the tympanic membrane from the external auditory meatus. Sound source information from the cartilage conduction vibration source 525 can thereby be heard as a loud sound. Also, similarly with respect to the fifth embodiment, the grip unit 563, which is brought up against the ear, takes on a form such that the external auditory meatus is obstructed, and can therefore block environment noise. Further similarly with respect to the fifth embodiment, increasing the force for pressing the grip unit 563 gives the result of substantially completely obstructing the external auditory meatus, and sound source information from the cartilage conduction vibration source 525 can be heard as an even louder sound due to the earplug bone conduction effect. Detection is made via the grip unit 563, but, similarly with respect to the fifth embodiment, in the state in which the earplug bone conduction effect is created, the waveform inversion signal from a microphone or other outgoing-talk unit 523 is added to the signal of one's own voice, on the basis of the detection of pressure by the cartilage conduction vibration source 525.

Unlike the fourth embodiment, the outgoing-talk unit 523 is provided not to the front surface of the mobile telephone 501 but rather to the end surface thereof, as is clear from FIG. 13B. Accordingly, the outgoing-talk unit 523 can consistently pick up the user's voice both when the incoming-talk unit 13 is brought up against the ear for a call and when the grip unit 563 on the reverse side is brought up against the ear for a call. The settings can be switched using a switch button 561 for either activating the incoming-talk unit 13 or for activating the cartilage conduction vibration source 525. In the state in which the zoom lens 555 projects in the state illustrated by the single dotted line in FIG. 13B, it is inappropriate to bring the grip unit 563 up against the ear for a call; therefore, when the switch button is operated in such a state and the setting is changed to activate the cartilage conduction vibration source 525, the zoom lens 555 retracts automatically, the execution of this switch being reserved until the retraction is complete.

Figure 14:
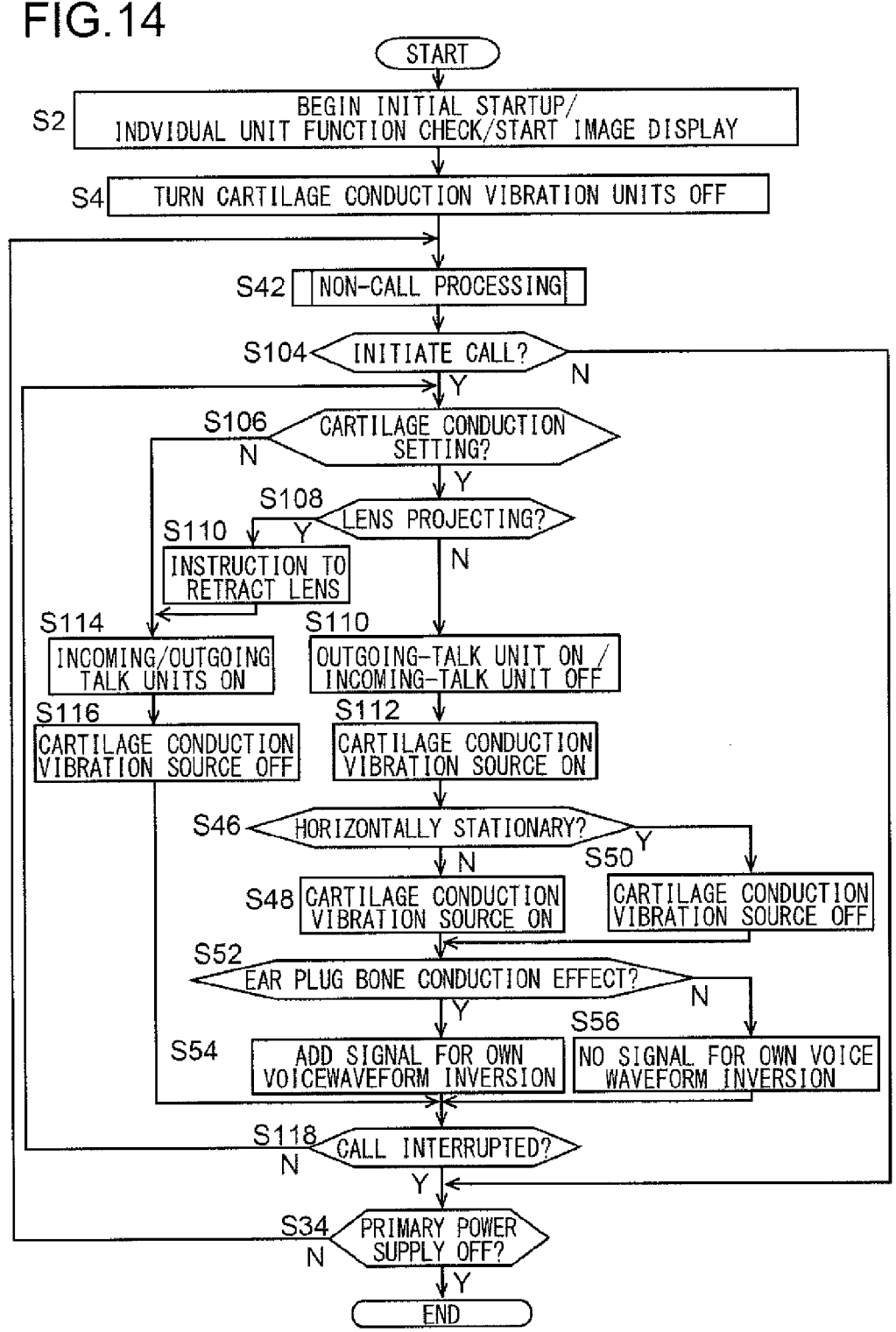
FIG. 14 is a flow chart of the operation of the controller in the sixth embodiment of FIG. 13.

FIG. 14 is a flow chart of the operation of the controller 239 (borrowing from FIG. 8) in the sixth embodiment of FIG. 13. However, parts that the flow of FIG. 14 shares with the flow of FIG. 10 have been given like step reference numerals, and a description thereof has been omitted. FIG. 14 also illustrates an abstraction of the operation that focuses on related functions, in order to primarily provide a description of the function of the cartilage conduction vibration unit 228. Accordingly, similarly with respect to FIG. 10 and the like, in the sixth embodiment as well, the controller 239 also contains typical mobile telephone functions and other operations not represented by the flow in FIG. 14.

In the flow of FIG. 14, there is performed a check for whether there has been an operation to initiate a call once step S104 is reached. In a case in which there has not been an operation, the flow moves directly on to step S34. On the other hand, in a case in which an operation to initiate a call is detected, the flow proceeds to step S106, in which there is performed a check for whether the cartilage conduction has been set using the switch button 561. When the cartilage conduction has been set, there is a check in step S108 for whether the zoom lens 555 is projecting out. A result in which the zoom lens 555 is not projecting out moves on to step S110, in which the outgoing-talk unit 523 is turned on and the incoming-talk unit 13 is turned off; step S112 turns the cartilage conduction vibration source 525 on and then the flow moves on to step S46.

On the other hand, in a case in which no cartilage conduction setting is detected in step S106 the flow moves on to step S114, in which the outgoing-talk unit 523 and the incoming-talk unit 13 are turned on; step S116 turns the cartilage conduction vibration source 525 off and the flow moves on to step S118. Furthermore, in a case in which it is detected in step S108 that the zoom lens 555 is projecting out when it is also detected in step S106 that the cartilage conduction has been set, the flow moves on to step S110, which instructs that the zoom lens 555 be retracted, and the flow moves on to step S114. However, in a case in which collapsing has already been initiated, the instruction is that same be continued. As will be described later, steps S106 to S116 are repeated until the call state is cut off. Thus, there is an instruction to retract in step S110 in accordance with a cartilage conduction setting detection in step S106, and after the collapsing has been initiated, the state of steps S114 and S116 is maintained without the flow moving on to step S110 until the collapsing is completed and the projection of the zoom lens 555 is no longer detected in step S108.

Steps S46 to S56, which follow step S112, are consistent with FIG. 10 and therefore a description thereof has been omitted. Upon the move to step S54 or steps S56 to S118, a check is done for whether the call state has been cut off, and in a case in which a call interruption is not detected, the flow returns to step S106, following which steps S106 to S118 and steps S46 to S56 are repeated. When, for example, environment noise is loud and when listening comprehension is impaired at the incoming-talk unit 13, support can thereby be provided for the user to operate the switch button 561 during a call to switch to the cartilage conduction setting and thereby block environment noise or further ease listening comprehension by the earplug bone conduction effect, and the like. Also, at this time the zoom lens 555 is automatically retracted when in the projecting state.

Seventh Embodiment

Figure 15A:
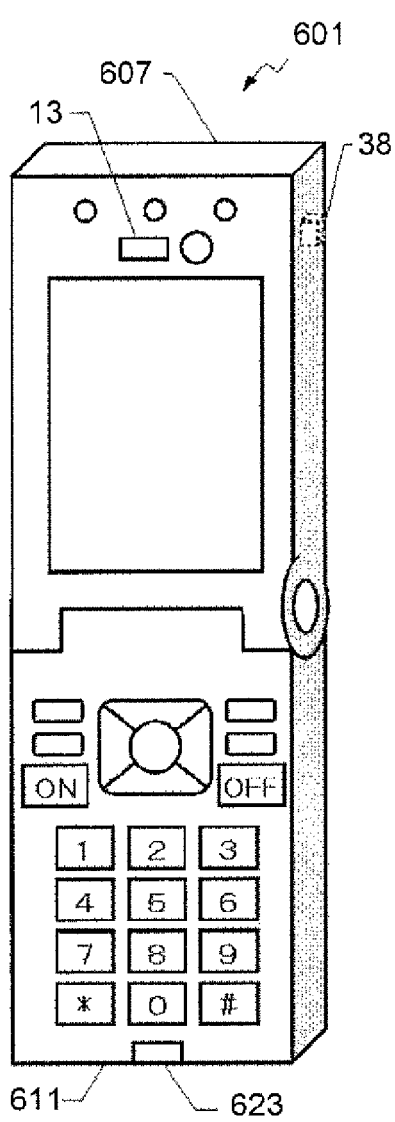
FIG. 15A is a front view.
Figure 15B:
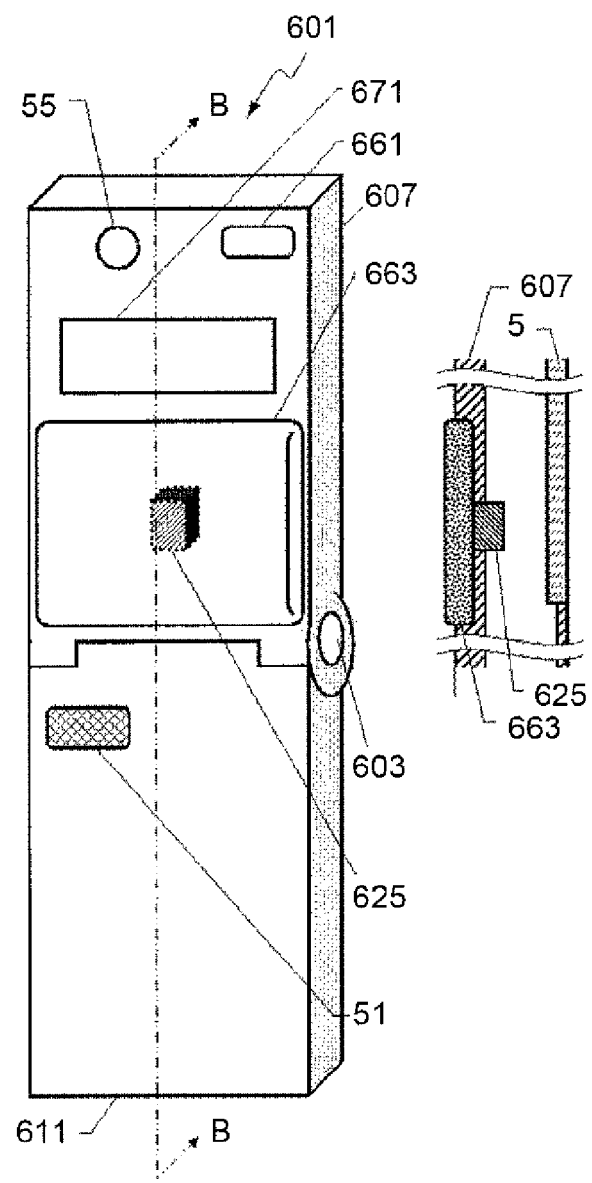
FIG. 15B is a rear view.
Figure 15C:
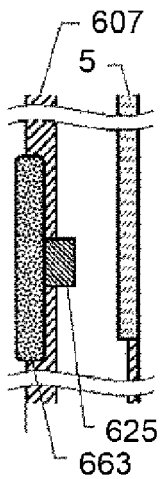
FIG. 15C is an elemental cross-sectional view along the B-B cross-section of the rear perspective view of FIG. 15B (seventh embodiment)

FIG. 15 is a perspective view illustrating a seventh embodiment of a mobile telephone according to an aspect of the present invention. A mobile telephone 601 of the seventh embodiment, similarly with respect to the first embodiment, is configured such that an upper part 607 can be folded onto a lower part 611 by a hinge unit 603. FIG. 15A is a front perspective view similar to FIG. 1, and FIG. 15B is a rear perspective view thereof. FIG. 15C is a cross-sectional view of the elements in the B-B sectional plane in FIG. 15B. The majority of the structure of the seventh embodiment is shared with that of the first embodiment, and therefore corresponding parts have been assigned the same reference numerals, and a description has been omitted. Also, to avoid complicating the illustration, the assignment of the reference numerals themselves has also been omitted for those portions for which the description has been omitted, but the functions and names of the common parts in the drawings are common with FIG. 1. Furthermore, although the overview is shared with the first embodiment, a more detailed description of the internal configuration calls on the essential points of the block diagram of the fourth embodiment in FIGS. 8 and 9.

A first point of difference in the seventh embodiment from the first embodiment lies in that, as depicted in FIG. 15B, a cartilage conduction output unit 663 having a broad surface area is provided in the vicinity of the hinge of the upper part 607. The cartilage conduction output unit 663 is similar to the softcover 463 in the fifth embodiment and/or to the grip unit 563 in the sixth embodiment, and is made using a material that has acoustic impedance approximating that of ear cartilage (a silicone rubber; a mixture of a silicone rubber and a butadiene rubber; a natural rubber; or a structure formed using these varieties of rubber in which air bubbles are sealed), and is provided with an elasticity suited for protecting against collision of a foreign object against the outer wall of the mobile telephone 601. Unlike the arrangement in the first embodiment, a cartilage conduction vibration source 625 is arranged behind the cartilage conduction output unit 663. As is clear from the cross-section of FIG. 15C, the cartilage conduction vibration source 625 is in contact with the rear surface of the cartilage conduction output unit 663.

Accordingly, folding the mobile telephone 601 and bringing the cartilage conduction output unit 663 up against the ear transmits the vibration of the cartilage conduction vibration source 625 to the ear cartilage over a broad area of contact by the interposition of the cartilage conduction output unit 663. Sound from the exterior of the cartilage conduction output unit 663, which resonates in accordance with the vibration of the cartilage conduction vibration source 625, is further transmitted to the tympanic membrane from the external auditory meatus. Sound source information from the cartilage conduction vibration source 625 can thereby be heard as a loud sound. Also, similarly with respect to the fifth embodiment and the sixth embodiment, the cartilage conduction output unit 663, which is brought up against the ear, takes on a form such that the external auditory meatus is obstructed, and can therefore block environment noise. Further similarly with respect to the fifth embodiment and the sixth embodiment, increasing the force with which the cartilage conduction output unit 663 is pressed to the ear gives the result of substantially completely obstructing the external auditory meatus, and sound source information from the cartilage conduction vibration source 625 can be heard as an even louder sound due to the earplug bone conduction effect. Detection is done via the cartilage conduction output unit 663, but, similarly with respect to the fifth embodiment and the sixth embodiment, in the state in which the earplug bone conduction effect is created, the waveform inversion signal from a microphone or other outgoing-talk unit 623 is added to the signal of one's own voice, on the basis of the detection of pressure by the cartilage conduction vibration source 625.

A second point of difference in the seventh embodiment from the first embodiment lies in that, as depicted in FIG. 15A, the outgoing-talk unit 623 is provided to the lower end surface of the lower part 611, rather than to the front surface of the lower part 611 of the mobile telephone 601. Accordingly, the outgoing-talk unit 623 can consistently pick up the user's voice both when the mobile telephone 601 is opened and the incoming-talk unit 13 is brought up against the ear for a call and when the mobile telephone 601 is closed and the cartilage conduction output unit 663 is brought up against the ear for a call. In a case in which the mobile telephone 601 is set to support switching cartilage conduction, switching occurs automatically such that the incoming-talk unit 13 is activated when the mobile telephone 601 is opened and a cartilage conduction vibration source 625 is activated when the mobile telephone 601 is closed. On the other hand, in a case in which there is no setting to support switching the cartilage conduction, the cartilage conduction vibration source 525 will not automatically be activated; rather, ordinary speaking and listening function regardless of whether the mobile telephone 601 is open or closed.

As is clear from the rear perspective view in FIG. 15B, the back surface of the mobile telephone 601 is provided with a backside main camera 55, a speaker 51, and a back surface display unit 671. The back surface of the mobile telephone 601 is further provided with a pushbutton 661, which becomes active when the cartilage conduction switching support is set and the mobile telephone 601 is closed. Similarly with respect to the fifth embodiment, the pushbutton 661 has the functions of initiating a call with a first push, and of interrupting a call when pushed a second time during a call. The first push of the pushbutton 661 is performed either to place an outgoing call to a specific party or to respond to an incoming call, a call being initiated thereby in either case.

Figure 16:
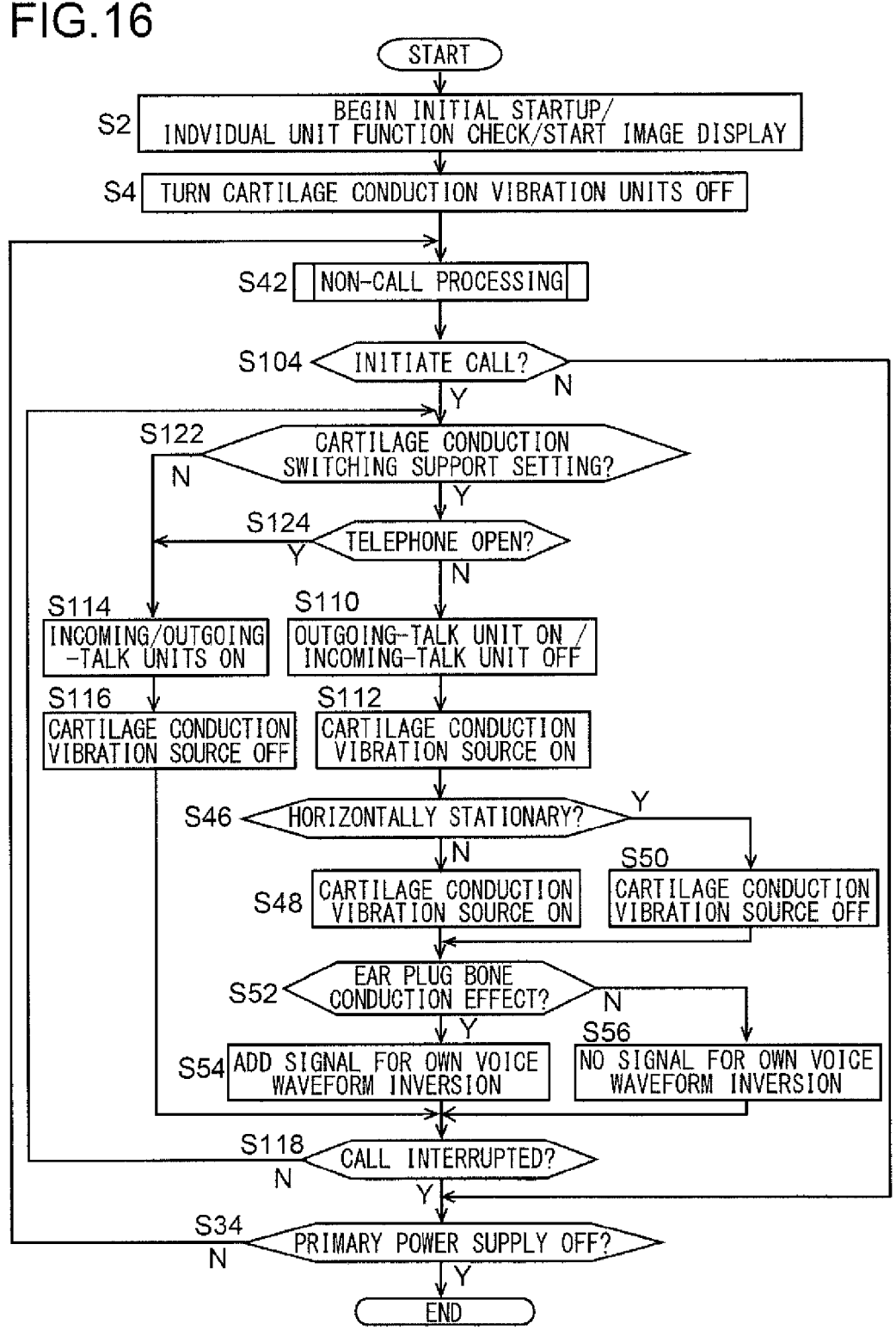
FIG. 16 is a flow chart of the operation of the controller in the seventh embodiment of FIG. 15.

FIG. 16 is a flow chart of the operation of the controller 239 (borrowing from FIG. 8) in the seventh embodiment of FIG. 15. However, parts that the flow of FIG. 16 shares with the flow of FIG. 14 have been given like step reference numerals, and a description thereof has been omitted. FIG. 16 also illustrates an abstraction of the operation that focuses on related functions, in order to primarily provide a description of the function of the cartilage conduction vibration unit 228. Accordingly, in the seventh embodiment, the controller 239 also contains typical mobile telephone functions and other operations not represented by the flow of FIG. 16, similarly with respect to FIG. 14 and the like.

In the flow of FIG. 16, a call is initiated and when step S122 is reached, there is performed a check for whether cartilage conduction switching support has been set. In a case in which cartilage conduction switching support is confirmed to have been set in step S122, the flow proceeds to step S124, which checks for whether or not the mobile telephone 601 has been opened; i.e., has gone from the state in which the upper part 607 is folded on top of the lower part 611 to the state of being opened as in FIG. 15. In a case in which it is confirmed that the mobile telephone 601 has not been opened and the upper part 607 is folded on top of the lower part 611, the flow moves on to step S110, which turns the outgoing-talk unit 623 on and turns the incoming-talk unit 13 off; step S112 turns the cartilage conduction vibration source 625 on and then the flow moves on to step S46. In this manner, it becomes possible to listen using the cartilage conduction output unit 663 in the state in which the mobile telephone 601 is folded up.

On the other hand, in a case in which it is not detected in step S122 that the cartilage conduction switching support has been set, no question is posed as to whether or not the mobile telephone 601 is folded up, but rather the flow moves on to step S114, which turns the outgoing-talk unit 623 and the incoming-talk unit 13 on together; step S116 then turns the cartilage conduction vibration source 625 off and moves on to step S118. In a case in which it is detected in step S106 that the cartilage conduction switching support has been set, the flow moves on to step S114 even when it is confirmed in step S124 that the mobile telephone 601 is open.

The flow in FIG. 16 also has a check for whether or not the call state has been cut off in step S118; the flow returns to step S122 in a case in which a call interruption is not detected, following which step S122, step S124, steps S114 to S118 and steps S46 to S56 are repeated. In this manner, in a case in which the cartilage conduction switching support has been pre-set, when, for example, environment noise is loud and when listening comprehension is impaired at the incoming-talk unit 13, support can be provided for the user to fold up the mobile telephone 601 during the course of a call and switch to listening by the cartilage conduction output unit 663, and thereby block environment noise or further ease listening comprehension by the earplug bone conduction effect, and the like.

To summarize the features of the aforementioned fifth to sixth embodiments, the mobile telephone comprises a cartilage conduction vibration source and a conductor for guiding the vibration of the cartilage conduction vibration source to the ear cartilage; the conductor either is configured as an elastic body, or is large enough to be in contact with the ear cartilage at a plurality of points or is large enough to be in contact with the ear cartilage and obstruct the external auditory meatus, or has a surface area at least approximating that of an earlobe, or has an auditory impedance approximating the auditory impedance of ear cartilage. Any of these features or a combination thereof makes it possible to listen effectively to sound information by the cartilage conduction vibration source. The use of these features is also not to be limited to the above-described embodiments. For example, it is also possible to constitute the present invention without having the conductor be an elastic body, by the use of the advantages of the materials, sizes, surface areas, arrangements, and structures disclosed in the above-described embodiments.

Eighth Embodiment

Figure 17A:
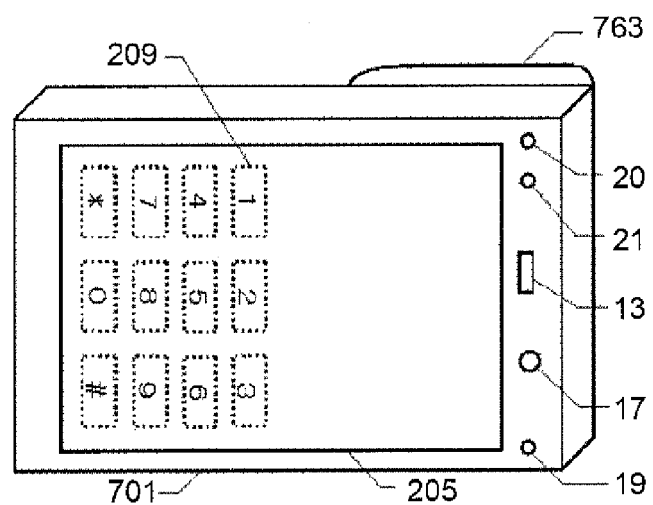
FIG. 17A is a front view.
Figure 17B:
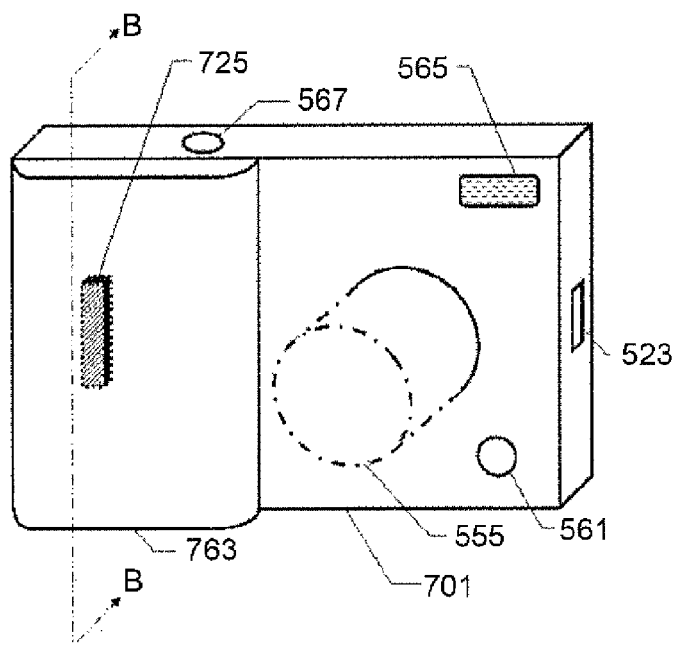
FIG. 17B is a rear view.
Figure 17C:
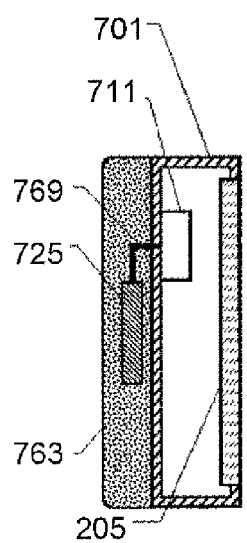
FIG. 17C is an elemental cross-sectional view along the B-B cross-section of the rear perspective view of FIG. 17B (eighth embodiment)

FIG. 17 is a perspective view illustrating an eighth embodiment of the mobile telephone according to an aspect of the present invention. The eight embodiment is similar to the sixth embodiment of FIG. 13, and is configured as a digital camera provided with a mobile telephone function; similarly with respect to FIG. 13, FIG. 17A is a front perspective view, FIG. 17B is a rear perspective view, and FIG. 17C is a cross-sectional view in the B-B sectional plane in FIG. 17B. The eighth embodiment shares the majority of the structure with the sixth embodiment of FIG. 13; thus, corresponding parts have been given like reference numerals, and a description thereof has been omitted.

The point of difference in the eighth embodiment from the sixth embodiment lies in that, as is clear from the cross-section of FIG. 17C, a cartilage conduction vibration source 725 is embedded inside a grip unit 763. The grip unit 763, similarly with respect to the sixth embodiment in FIG. 13, is made using a material that has acoustic impedance approximating that of ear cartilage (a silicone rubber; a mixture of a silicone rubber and a butadiene rubber; a natural rubber; or a structure formed using these varieties of rubber in which air bubbles are sealed), and is provided with an elasticity suited for providing a satisfactory grip sensation. A more detailed description of the internal configuration, similarly with respect to the sixth embodiment, calls on the essential points of the block diagram of the fourth embodiment in FIGS. 8 and 9.

A flexible connection wire 769 in FIG. 17C connects the cartilage conduction vibration source 725, which is embedded inside the grip unit 763, with the phase adjustment mixer unit 236 of FIG. 8 or other circuit portion 771. The structure as illustrated by the cross-sectional view in FIG. 17C, for embedding the cartilage conduction vibration source 725 inside the grip unit 763, can be achieved by an integrated mold in which the cartilage conduction vibration source 725 and the flexible connection wire 769 are inserted into the grip unit 763. The same can also be achieved by dividing the grip unit 763 into two bodies, where the flexible connection wire 769 and the cartilage conduction vibration source 725 serve as a boundary, and by bonding the two grip units 763 across the flexible connection wire 769 and the cartilage conduction vibration source 725.

The eighth embodiment is similar to the sixth embodiment in that bringing the grip unit 763 up against the ear transmits the vibration of the cartilage conduction vibration source 725 to the ear cartilage over a broad area of contact by the interposition of the grip unit 763; in that sound from the exterior of the grip unit 763, which resonates in accordance with the vibration of the cartilage conduction vibration source 725, is further transmitted to the tympanic membrane from the external auditory meatus; in that environment noise can also be blocked, because the grip unit 763, which is brought up against the ear, has a form such that the external auditory meatus is obstructed; and in that increasing the force pressing the grip unit 763 to the ear furthermore gives the result of substantially completely obstructing the external auditory meatus, and sound source information from the cartilage conduction vibration source 725 can be heard as an even louder sound due to the earplug bone conduction effect. In the state in which the earplug bone conduction effect is created, the adding of the waveform inversion signal from the microphone or other outgoing-talk unit 523 to the signal of one's own voice, on the basis of the detection of pressure by the cartilage conduction vibration source 625, is the same as in the sixth embodiment. However, because the cartilage conduction vibration source 725 is embedded in the grip unit 763 in the eighth embodiment, the state in which the earplug bone conduction effect is created is detected by the strain to the cartilage conduction vibration source 725, which is caused by the strain to the grip unit 763 due to an increase in the pushing force.

The significance of embedding the cartilage conduction vibration source 725 inside an elastic body such as the grip unit 763 in the eighth embodiment lies not only in obtaining a favorable conduction of sound, as described above, but also in counteracting impact on the cartilage conduction vibration source 725. A piezoelectric bimorph element, which is used as the cartilage conduction vibration source 725 in the eighth embodiment, has properties for resisting impact. Herein, configuring the cartilage conduction vibration source 725 so as to be enveloped circumferentially, as in the eighth embodiment, can provide cushioning against impact resulting from the rigid structure of the mobile telephone 701, and can facilitate implementation in the mobile telephone 701, which is constantly exposed to such risks as being dropped. The elastic body enveloping the cartilage conduction vibration source 725 not only functions simply as a cushioning material, but also functions as a configuration for more effectively transmitting the vibration of the cartilage conduction vibration source 725 to the ear as described above.

Ninth Embodiment

Figure 18A:
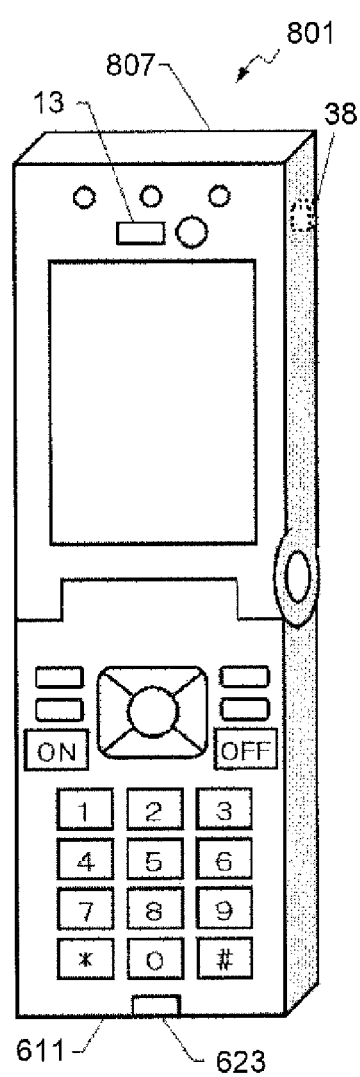
FIG. 18A is a front view.
Figure 18B:
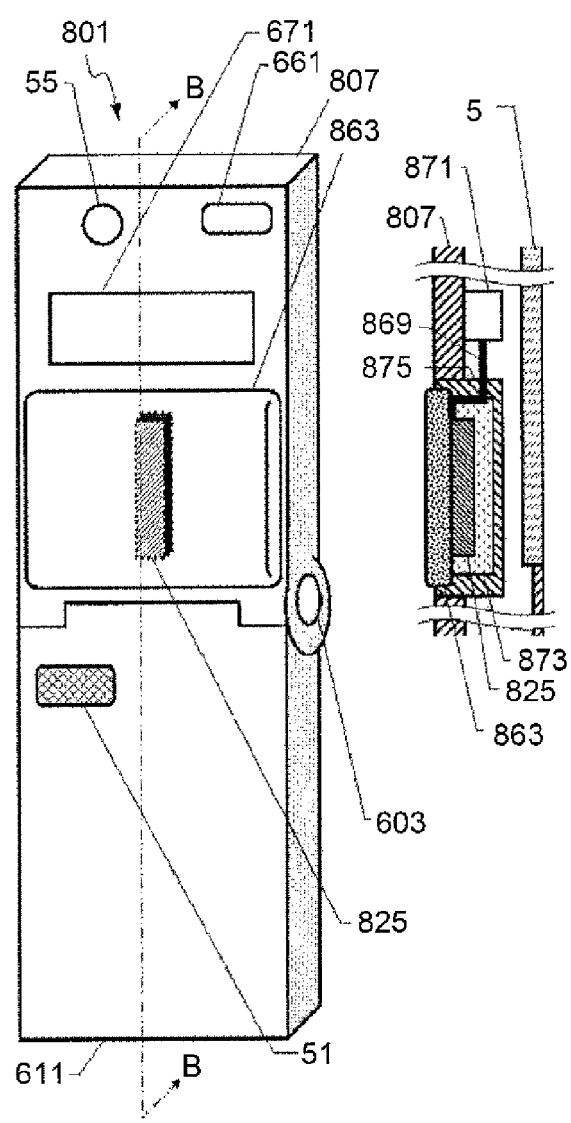
FIG. 18B is a rear view.
Figure 18C:
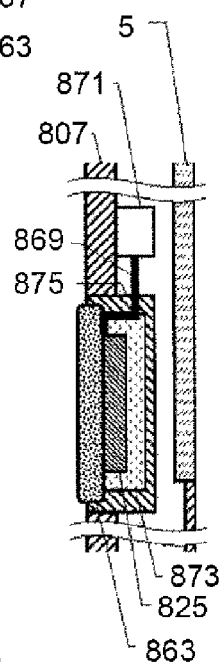
FIG. 18C is an elemental cross-sectional view along the B-B cross-section of the rear perspective view of FIG. 18B (ninth embodiment)

FIG. 18 is a perspective view illustrating a ninth embodiment of a mobile telephone according to an aspect of the present invention. A mobile telephone 801 of the ninth embodiment, similarly with respect to the seventh embodiment, is configured such that an upper part 807 can be folded onto the lower part 611 by a hinge unit 603. In FIG. 18, which is similar to FIG. 15, FIG. 18A is a front perspective view, FIG. 18B is a rear perspective view, and FIG. 18C is a cross-sectional view in the B-B sectional plane in FIG. 18B. The eighth embodiment in FIG. 18 shares the majority of the structure with the seventh embodiment of FIG. 15; thus, corresponding parts have been given like reference numerals, and a description thereof has been omitted.

A point of difference in the ninth embodiment from the seventh embodiment lies in that, as is clear from the cross-section of FIG. 18C, a cartilage conduction vibration source 825 is sandwiched between a cartilage conduction output unit 863 and an internal cushioning material 873. The cartilage conduction output unit 863, similarly with respect to the cartilage conduction output unit 663 in the seventh embodiment, is made using a material that has acoustic impedance approximating that of ear cartilage (a silicone rubber; a mixture of a silicone rubber and a butadiene rubber; a natural rubber; or a structure formed using these varieties of rubber in which air bubbles are sealed), and is provided with an elasticity suited for protecting against the collision of a foreign object against the outer wall of the mobile telephone 801. The internal cushioning material 873 can be constituted of any material provided that the material is an elastic body having the purpose of providing cushioning, but can also be made of the same material as the cartilage conduction output unit 863. A more detailed description of the internal configuration, which is similar to the seventh embodiment, calls on the essential points of the block diagram of the fourth embodiment in FIGS. 8 and 9.

As illustrated by the cross-section in FIG. 18C, the cartilage conduction vibration source 825 and a flexible connection wiring 869 are sandwiched in between the cartilage conduction output unit 863 and the internal cushioning material 873. The flexible connection wire 869, similarly with respect to the eighth embodiment, connects the cartilage conduction vibration source 825 with the phase adjustment mixer unit 236 of FIG. 8 or other circuit portion 871. These structures, in which the cartilage conduction vibration source 825 and the flexible connection wire 869 are sandwiched in between the cartilage conduction output unit 863 and the internal cushioning material 873, are integrated within a cartilage conduction output unit 875; such a cartilage conduction output unit 875 is fitted into the upper part 807 of the mobile telephone 801.

The ninth embodiment is also similar to the seventh embodiment in that bringing the cartilage conduction output unit 863 up against the ear transmits the vibration of the cartilage conduction vibration source 825 to the ear cartilage over a broad area of contact by the interposition of the cartilage conduction output unit 863; in that sound from the cartilage conduction output unit 863, which resonates in accordance with the vibration of the cartilage conduction vibration source 825, is transmitted to the tympanic membrane from the external auditory meatus; in that environment noise can be blocked, because the cartilage conduction output unit 863, which is brought up against the ear, has a form such that the external auditory meatus is obstructed; and in that increasing the force pressing the cartilage conduction output unit 863 to the ear gives the result of substantially completely obstructing the external auditory meatus, and sound source information from the cartilage conduction vibration source 825 can be heard as an even louder sound due to the earplug bone conduction effect. In the state in which the earplug bone conduction effect is created, the adding of the waveform inversion signal from the microphone or other outgoing-talk unit 623 to the signal of one's own voice, on the basis of the detection of pressure by the cartilage conduction vibration source 825, is the same as in the seventh embodiment. However, in the ninth embodiment, the cartilage conduction vibration source 825 is sandwiched in between the cartilage conduction output unit 863 and the internal cushioning material 873, which both are elastic bodies, and therefore, similarly with respect to the eighth embodiment, the state in which the earplug bone conduction effect is created is detected by the strain to the cartilage conduction vibration source 825, which accompanies the strain to the cartilage conduction output unit 863 due to an increase in the pushing force.

The significance of the structure in the ninth embodiment, in which the cartilage conduction vibration source 825 is sandwiched between the cartilage conduction output unit 863 and the internal cushioning material 873, which are both elastic bodies, lies not only in obtaining a favorable conduction of sound, as described above, but also in counteracting impact on the cartilage conduction vibration source 825, which is made of a piezoelectric bimorph element. In other words, similarly with respect to the eighth embodiment, configuring the cartilage conduction vibration source 825 so as to be enveloped circumferentially can provide cushioning against impact resulting from the rigid structure of the mobile telephone 801, and can facilitate implementation in the mobile telephone 801, which is constantly exposed to being dropped and other risks. The elastic body sandwiching the cartilage conduction vibration source 825 not only functions merely as a cushioning material, but also functions as a configuration for more effectively transmitting the vibration of the cartilage conduction vibration source 825 to the ear as described above, due to the fact that at least the outer elastic body is molded of a material having an acoustic impedance approximating that of ear cartilage.

Tenth Embodiment

Figure 19:
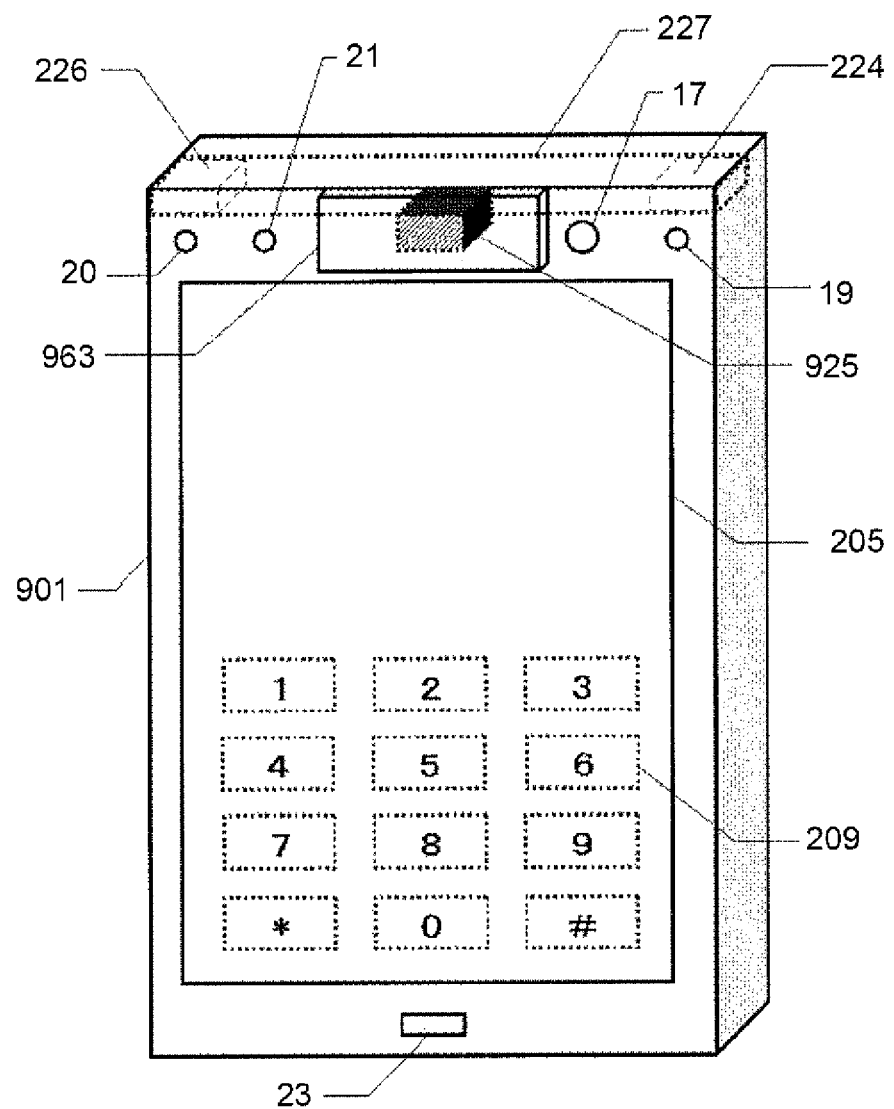
FIG. 19 is a perspective view illustrating a tenth embodiment of the mobile telephone according to an aspect of the present invention (tenth embodiment)

FIG. 19 is a perspective view illustrating a tenth embodiment of the mobile telephone according to an aspect of the present invention. A mobile telephone 901 of the tenth embodiment, similarly with respect to that of the fourth embodiment, is an integrated type with no moving parts, and is configured as a "smartphone," which has a large-screen display unit 205 provided with GUI functions. There is much in common with the structure thereof, and accordingly corresponding portions have been given like reference numerals as in the fourth embodiment, and a description has been omitted. However, similarly with respect to the fourth embodiment, the "upper part" in the tenth embodiment does not signify a separate upper part, but rather signifies the portion at the top of the integrated structure.

A point of difference in the tenth embodiment from the fourth embodiment lies in that a cartilage conduction vibration source 925, which is made up of a piezoelectric bimorph element or the like, serves as the cartilage conduction vibration source, and also takes on the role of a drive source of the incoming-talk unit for generating sound waves that are transmitted to the tympanic membrane by air conduction. To provide a more specific description, the vibration conductor 227, similarly with respect to the fourth embodiment, is in contact with the upper part of the cartilage conduction vibration source 925 and is arranged at the upper side of the mobile telephone. Furthermore, a cartilage conduction output unit 963, which, similarly with respect to the seventh embodiment, is made using a material that has acoustic impedance approximating that of ear cartilage (a silicone rubber; a mixture of a silicone rubber and a butadiene rubber; a natural rubber; or; a structure formed using these varieties of rubber in which air bubbles are sealed), is arranged at the front of the cartilage conduction vibration source 925. Because the cartilage conduction output unit 963, as will be described later, serves as an incoming-talk unit for generating sound waves that are transmitted to the tympanic membrane by air conduction, the tenth embodiment has no special setting for the incoming-talk unit 13 as in the fourth embodiment.

Due to the configuration described above, first, the vibration of the cartilage conduction vibration source 925 is transmitted laterally by the vibration conductor 227, causing the two ends 224 and 226 thereof to vibrate, and thus causing either one thereof to come into contact with the tragus allows sound to be heard by cartilage conduction. Also, similarly with respect to the fourth embodiment, the vibration conductor 227 vibrates not only at the right end 224 and left end 226 thereof but rather vibrates as a whole. Accordingly, it is possible in the tenth embodiment as well to transmit audio information regardless of where on the top inner edge of the mobile telephone 901 is contact made with the ear cartilage. Then, the vibration conductor 227 is in contact with the ear cartilage over a broad range and also the cartilage conduction output unit 963 is in contact with the tragus and other ear cartilage, when the mobile telephone 901 is brought up against the ear in such a form that a part of the cartilage conduction output unit 963 comes into the front of the entrance of the external auditory meatus, similarly with respect to an ordinary mobile telephone. Through such contact, sound can be heard by cartilage conduction. Similarly with respect to the fifth embodiment to the ninth embodiment, sound from the exterior of the cartilage conduction output unit 963, which resonates in accordance with the vibration of the cartilage conduction vibration source 925, is further transmitted to the tympanic membrane from the external auditory meatus as sound waves. In this manner, the cartilage conduction output unit 963 can function as an incoming-talk unit by air conduction in the ordinary state of use of a mobile telephone.

Cartilage conduction conducts differently depending on the magnitude of force pushing on the cartilage; a more effective conduction state can be obtained when the pushing force is increased. This signifies that natural behavior, such as increasing the force pushing the mobile telephone against the ear when it is difficult to hear the incoming-talk unit sound, can be utilized to adjust the volume. Even when such a function is not explained to the user in, for example, the instruction manual, the user can still intuitively understand the function through natural behavior. Configuring the vibration of the cartilage conduction vibration source 925 in the tenth embodiment such that the vibration conductor 227, which is a rigid body, and the cartilage conduction output unit 963, which is an elastic body, can both simultaneously be in contact with the ear cartilage is intended to permit more effective volume adjustment primarily through adjusting the force pushing on the vibration conductor 227, which is a rigid body.

The employment of the present invention is not to be limited to the above-described embodiments; other aspects can also benefit from the various above-described advantages of the present invention. For example, a resonator that is appropriate as a speaker other than the material having an acoustic impedance approaching that of ear cartilage can be arranged at the position where the cartilage conduction output unit 963 is arranged, in a case in which the tenth embodiment is configured such that the combination of the cartilage conduction vibration source 925 and the cartilage conduction output unit 963 function as a dedicated incoming-talk unit by air conduction. Such a case is also able to benefit from the features and advantages of the tenth embodiment, in which the cartilage conduction vibration source 925, which is made up of a piezoelectric bimorph element or the like, serves as the cartilage conduction vibration source, and also serves as a drive source of the incoming-talk unit for generating sound waves that are transmitted to the tympanic membrane by air conduction.

Eleventh Embodiment

Figure 20:
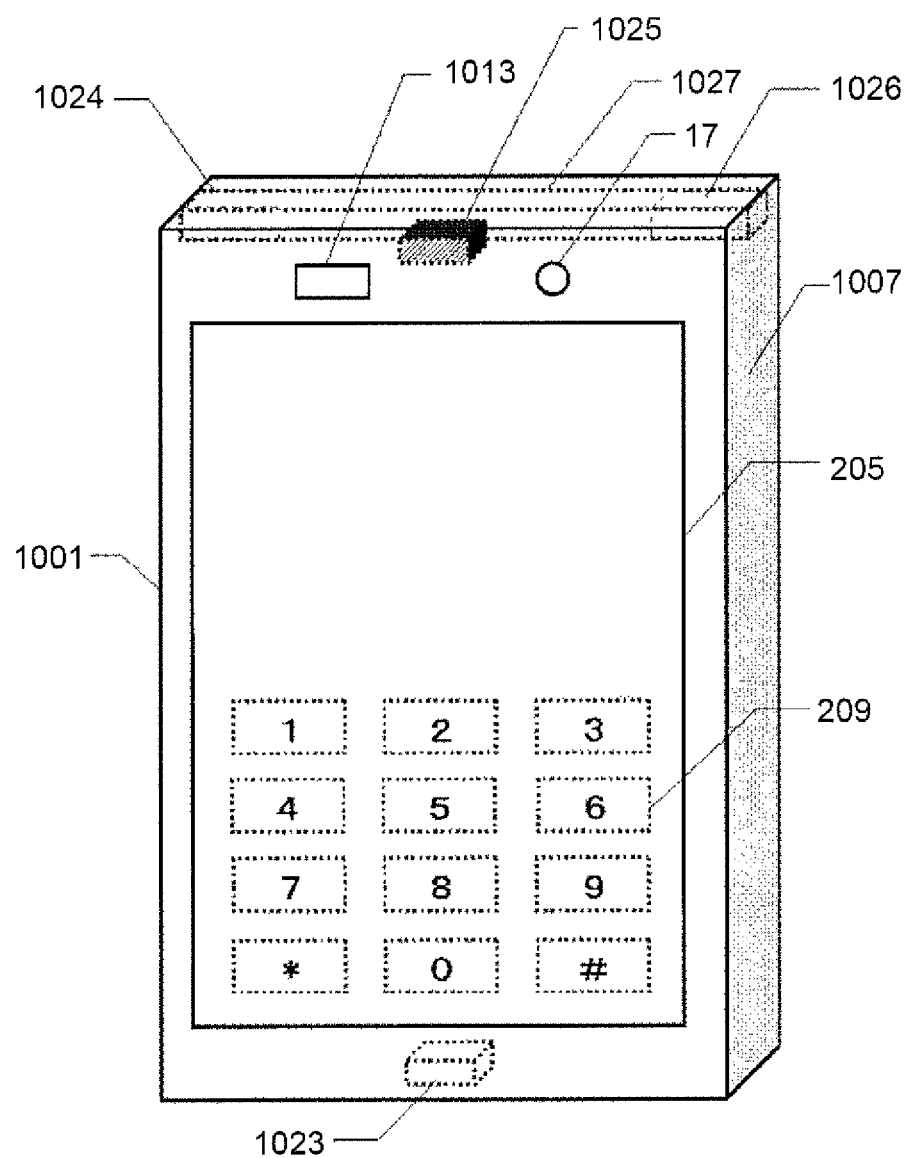
FIG. 20 is a perspective view illustrating an eleventh embodiment of a mobile telephone according to an aspect of the present invention (eleventh embodiment)

FIG. 20 is a perspective view illustrating an eleventh embodiment of the mobile telephone according to an aspect of the present invention. The mobile telephone 1001 of the eleventh embodiment, similarly with respect to that of the fourth embodiment, is an integrated type with no moving parts, and is configured as a "smartphone," which has a large-screen display unit 205 provided with GUI functions. There is much in common with the structure thereof, and so corresponding portions have been given like reference numerals as in the fourth embodiment, and a description has been omitted. However, similarly with respect to the fourth embodiment, the "upper part" in the eleventh embodiment does not signify a separate upper part, but rather signifies the portion at the top of the integrated structure.

A point of difference in the eleventh embodiment from the fourth embodiment lies in that a right ear vibration unit 1024 and a left ear vibration unit 1026 are provided not to the front of the mobile telephone 1001 but rather to a side surface 1007 and to the side surface of the opposite side, shown without a reference number with relation to the diagrams, respectively (it shall be noted that the right ear vibration unit 1024 and the left ear vibration unit 1026 are arranged in a left-right reversal relative to the fourth embodiment of FIG. 7). In a manner functionally similar to that of the fourth embodiment, the right ear vibration unit 1024 and the left ear vibration unit 1026 in the eleventh embodiment are also configured as the two end parts of the vibration conductor 1027; the cartilage conduction vibration source 1025, which is made up of a piezoelectric bimorph element or the like, is arranged in contact with the lower part of the vibration conductor 1027, the vibration thereof being transmitted to the vibration conductor 1027. The vibration of the cartilage conduction vibration source 1025 is thereby transmitted laterally by the vibration conductor 1027, causing the two ends 1024 and 1026 thereof to vibrate. The two ends 1024 and 1026 of the vibration conductor 1027 are provided so as to be in contact with the tragus when the upper end portion of a side surface (for example, 1007) of the mobile telephone 1001 is brought up against the ear.

A microphone or other outgoing-talk unit 1023 is provided to the lower surface of a mobile telephone 1001 such that audio uttered by the user can be picked up even in the state in which either of the right ear vibration unit 1024 or the left ear vibration unit 1026 is brought up against the tragus. In addition, the mobile telephone 1001 of the eleventh embodiment is provided with a speaker 1013 for videoconferencing functions occurring while the large-screen display unit 205 is being observed; the sensitivity of the microphone or other outgoing-talk unit 1023 is switched at the time of the videoconferencing function, and audio uttered by the user during the observation of the display monitor 205 can be picked up.

FIG. 21 is a side view of the mobile telephone 1001 illustrating the function of the right ear vibration unit 1024 and the left ear vibration unit 1026; the method illustrated is in accordance with FIG. 2. However, as depicted in FIG. 20, the right ear vibration unit 1024 and the left ear vibration unit 1026 in the eleventh embodiment are each provided to a side surface of the mobile telephone 1001. Accordingly, in the eleventh embodiment, the side surface of the mobile telephone 1001 is brought up against the tragus, as depicted in FIG. 21, when the mobile telephone 1001 is brought up against the ear. In other words, it is not that the surface of the display unit 5 of the mobile telephone 1 is brought up against the tragus, as in FIG. 2; therefore, the large-screen display unit 205 is not brought up against the ear and/or cheek and will not be fouled by sebum or the like.

Figure 21A:
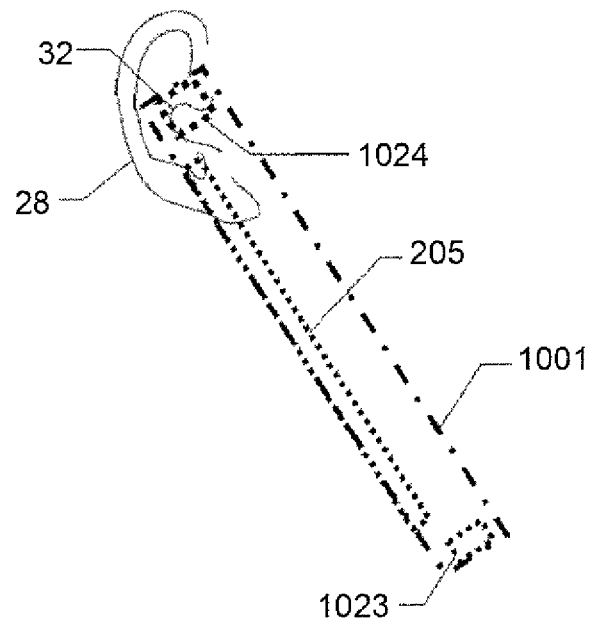
FIG. 21 is a side view of the eleventh embodiment illustrating the functions of the state of right ear use and the state of left ear use.
Figure 21B:
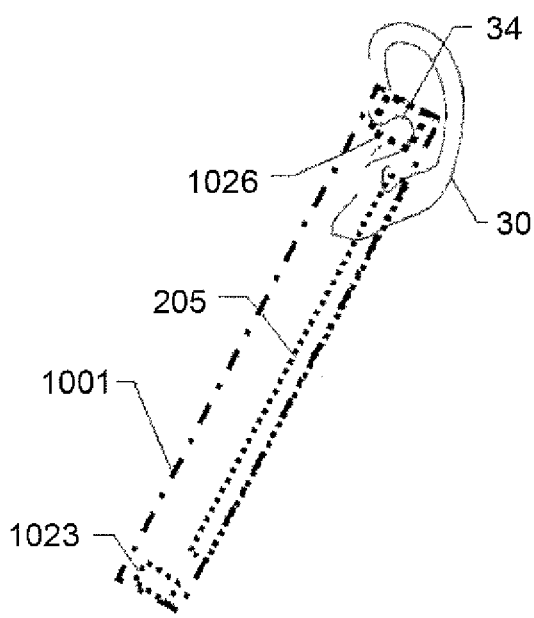

More specifically, FIG. 21A illustrates the state in which the mobile telephone 1001 is held in the right hand and is brought up against the tragus 32 of the right ear 28; the side surface in view is the side opposite to the one in the mobile telephone 1001 being brought up against the right ear 28, and the surface of the large-screen display unit 205 depicted by the cross-section is approximately perpendicular to the cheek and faces the lower rear of the face. The result is that, as described above, the large-screen display unit 205 is not brought up against the ear and/or cheek and does not get fouled with sebum or the like. Similarly, FIG. 21B illustrates the state in which the mobile telephone 1001 is held in the left hand and is brought up against the tragus 34 of the left ear 30; such a case is also similar to that of FIG. 21A in that, the large-screen display unit 205 being approximately perpendicular to the cheek and facing the lower rear of the face, the large-screen display unit 205 is not brought up against the ear and/or cheek and does not get fouled with sebum or the like.

However, such a state of use as in FIG. 21 is implemented from the state in which the mobile telephone 1001 is held with the right hand and the large-screen display unit 205 is observed, for example, in the case of FIG. 21A, by moving the mobile telephone 1001 without shaking the hand, and bringing the right ear vibration unit 1024 up against the tragus 32. Accordingly, transitioning between the state of observing the large-screen display unit 205 and the state in which the right ear vibration unit 1024 is brought up against the tragus 32 is possible by a natural movement of the right hand, such as by slightly altering the angle between the elbow and the wrist, without needing to switch the hand holding the mobile telephone 1001 nor to shake the hand. To simplify the above description, the state in FIG. 21 has the large-screen display unit 205 substantially perpendicular to the cheek, but the user can unrestrictedly select the angle of the hand or the posture for bringing the mobile telephone 1001 up against the ear; the angle of the large-screen display unit 205 with the cheek therefore need not be perpendicular, but rather may be moderately inclined. However, because each of the right ear vibration unit 1024 and the left ear vibration unit 1026 is provided to a side surface of the mobile telephone 1001 according to the configuration of the eleventh embodiment, the large-screen display unit 205 is not brought up against the ear and/or cheek and will not be fouled by sebum or the like, regardless of the posture in which the vibration units are brought up against the tragus 32 or 34.

As a result of the fact that the large-screen display unit 205 is not hidden by facing the direction of the cheek in the eleventh embodiment, it is possible that the call destination or other display content may be seen by other people in front or rear. Accordingly, to protect privacy in the eleventh embodiment, a switch is automatically made from an ordinary display to a privacy-protection display (where, for example, nothing is displayed) in the state in which the right ear vibration unit 1024 or the left ear vibration unit 1026 is brought up against the ear. This point will be described in greater detail later.

Twelfth Embodiment

Figure 22A:
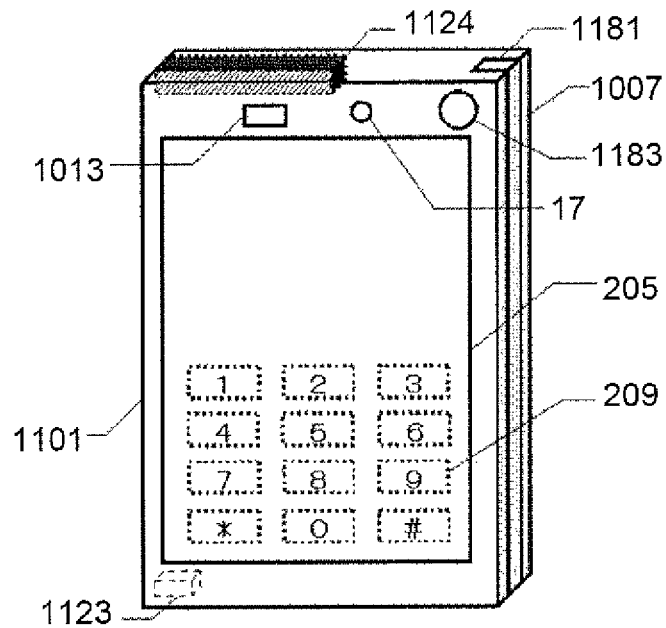
FIG. 22 is a perspective view illustrating a twelfth embodiment of a mobile telephone according to an aspect of the present invention (twelfth embodiment)
Figure 22B:
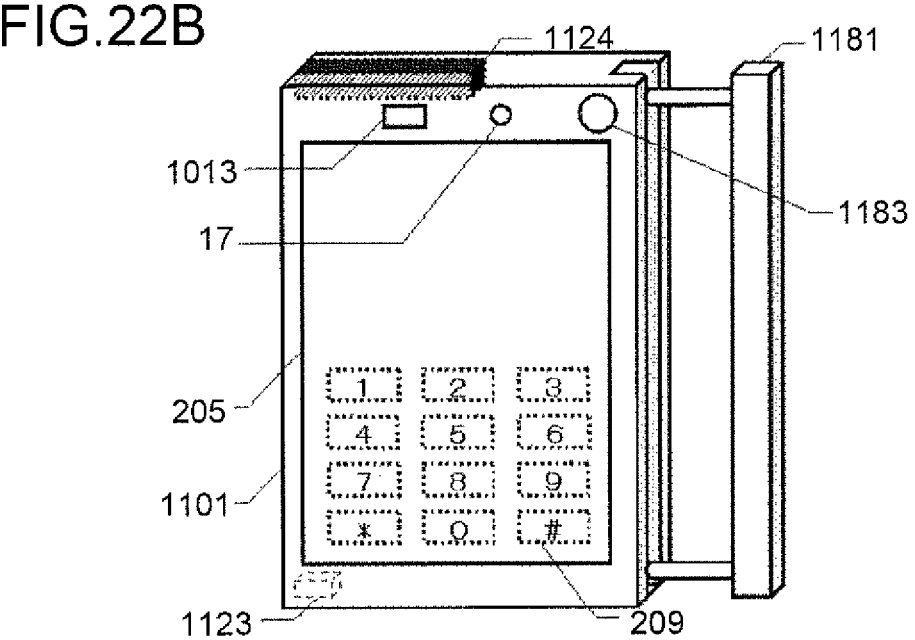

FIG. 22 is a perspective view illustrating a twelfth embodiment of the mobile telephone according to an aspect of the present invention. FIG. 22A illustrates the state in which a handle 1181 (to be described later) does not project out, and FIG. 22B illustrates the state in which the handle 1181 does project out. Similarly with respect to the eleventh embodiment, s cartilage conduction vibration unit 1124 of a mobile telephone 1101 of the twelfth embodiment is provided to a side surface of the mobile telephone 1101 (the side surface of the left side seen in FIG. 22, there being no reference numeral assigned thereto because the surface is hidden for convenience of illustration). The twelfth embodiment, being a mobile telephone, is based on an integrated type with no movable parts that is similar to the eleventh embodiment, and is configured as a "smartphone" having a large-screen display unit 205 provided with GUI functions. There is much in common with the structure thereof, and so corresponding portions have been given like reference numerals as in the eleventh embodiment, and a description has been omitted. However, similarly with respect to the eleventh embodiment, the "upper part" in the twelfth embodiment does not signify a separate upper part, but rather signifies the portion at the top of the integrated structure.

A point of difference in the twelfth embodiment from the eleventh embodiment lies in that, in addition to the configuration of the handle 1181 (to be described later), the cartilage conduction vibration unit 1124 is provided to one side surface on the left seen from FIG. 22 in the mobile telephone 1101. The element that is to be brought up against the ear is limited to being on the side surface of the left side, and therefore a microphone or other outgoing-talk unit 1123 is also provided to the lower surface close to the left side surface of the mobile telephone 1101, as illustrated in FIG. 22. However, in the twelfth embodiment as well, the outgoing-talk unit 1123 is switched at the time of a videoconferencing function occurring while the large-screen display unit 205 is being observed, and audio uttered by the user as they observe the large-screen display unit 205 can be picked up.

In the twelfth embodiment, similarly with respect to the eleventh embodiment, the cartilage conduction vibration unit 1124 can be brought up against the tragus of the right ear from the state in which the large-screen display unit 205 is being viewed, as in FIG. 22. On the other hand, to bring the cartilage conduction vibration unit 1124 up against the tragus of the left ear, the holding hand can be switched such that the mobile telephone 1101 faces backwards, the cartilage conduction vibration unit 1124 thereby being made to face the left ear. Use in such a manner is also possible in the state in which the handle 1181 does not project out, as in FIG. 22A.

The following is a description of the function of the handle. One natural way of holding when the cartilage conduction vibration unit 1124 is brought up against the ear at such an angle that the large-screen display unit 205 is approximately perpendicular to the cheek, as in FIG. 21, is embodied in a form such that the front surface of the mobile telephone 1101 on which the large-screen display unit 205 is provided and the back surface thereof are sandwiched by the thumb and the other four fingers, but the fingers at this time are in a state of touching the large-screen display unit 205; therefore, a concern is presented in that a mistaken operation is possible and the comparatively long-term and powerful contact during a call will result in fingerprint fouling.

In view whereof, to prevent the fingers from touching the large-screen display unit 205 while also facilitating holding the mobile telephone 1101, the twelfth embodiment is configured such that the handle 1181 projects out from the state in FIG. 22A to the state in FIG. 22B according to need, it being possible to use the handle 1181 to hold the mobile telephone. It thereby becomes possible in the state represented in FIG. 22B to sandwich the handle 1181 and the end parts of the body of the mobile telephone 1101 with the thumb and the other four fingers, and the mobile telephone 1101 can be readily held without the large-screen display unit 205 being touched. The handle 1181 can also be grasped to hold the mobile telephone 1101 in a case in which the degree of projection is configured so as to be comparatively larger. However, similarly with respect to the case of the state in FIG. 22A, the mobile telephone 1101 can also be held so as to face backwards, the cartilage conduction vibration unit 1124 thereby being brought up against the tragus of the left ear.

To cause the handle 1181 to project out from the state in FIG. 22A, a projection operation button 1183 is pushed and the handle is thereby unlocked and projects slightly outward; the state in FIG. 22B can therefore be achieved by pulling the handle out. Because the lock is engaged in the state in FIG. 22B, no problems are presented even when the handle 1181 is held and the cartilage conduction vibration unit 1124 is pushed up against the tragus. To house the handle 1181, the lock is undone when the projection operation button 1183 is pushed in the state in FIG. 22B; therefore, the lock is engaged when the handle 1181 is pushed in so as to assume the state in FIG. 22A.

FIG. 23 is a flow chart of the operation of the controller 239 (borrowing from FIG. 8) in the twelfth embodiment of FIG. 22. However, parts that the flow of FIG. 23 shares with the flow of FIG. 14 have been given like step reference numerals, and a description thereof has been omitted. FIG. 23 also illustrates an abstraction of the operation that focuses on related functions, in order to primarily provide a description of the function of the cartilage conduction vibration unit 228. Accordingly, similarly with respect to FIG. 14 and the like, the controller 239 in the twelfth embodiment also contains typical mobile telephone functions and other operations not represented by the flow of FIG. 23. FIG. 23 uses boldface print to illustrate points of difference with FIG. 14, and thus the following description focuses on these portions.

In the flow of FIG. 23, there is performed a check for whether there has been an operation to initiate a call once step S104 is reached. A case in which there has not been an operation moves directly on to step S34. On the other hand, in a case in which an operation to initiate a call is detected, the flow proceeds to step S132, in which there is performed a check for whether the handle 1181 is in state of projecting. Then, in a case of the handle not being in a state of projecting out, the flow proceeds to step S134, in which there is performed a check for whether the cartilage conduction vibration unit 1124 is in a state of being in contact with the ear cartilage. Then, in a case in which a state of contact is detected, the flow proceeds to step S136. However, in a case in which it is detected in step S132 that the handle 1181 is in a state of projecting out, the flow moves directly on to step S136.

In step S136, the outgoing-talk unit 1123 is turned on, and in step S138, the cartilage conduction vibration unit 1124 is turned on. On the other hand, the speaker 1013 is turned off in step S140. Subsequently, proceeding on to step S142, the display of the large-screen display unit 205 is set to a privacy-protection display. The privacy-protection display is a state in which either there is a predetermined display that does not contain private information, or nothing is displayed at all. At this point in time, only the display content is altered, without the large-screen display unit 205 itself being turned off. After the display has been controlled in such a manner, the flow moves on to step S52. A case in which the desired state already exists in step S136 to S142 leads to step S52 without anything being done in these steps as a result.

On the other hand, in a case in which there is no detection in step S134 that the cartilage conduction vibration unit 1124 is in a state of being in contact with the ear cartilage, the flow moves on to step S144, which turns the outgoing-talk unit 1123 on; in step S146, the cartilage conduction vibration unit 1124 is turned off. Meanwhile, the speaker 1013 is turned on in step S148. Subsequently, the flow proceeds to step S150, and the display of the large-screen display unit 205 is set to an ordinary display. After the display has been controlled in such a manner, the flow moves on to step S118. A case in which the desired state already exists in step S144 to S150 also leads to step S118, without anything being done in these steps as a result.

Steps S52 to S56, step S118, and step S34, which follow step S142; as well as step S118 and step S34, which follow step S150, are shared with FIG. 14, and a description thereof has thereof been omitted. Upon moving on to step S118, there is performed a check for whether the call state has been cut off; in a case in which no call state interruption is detected, the flow returns to step S132, following which steps S132 to S150 and steps S52 to S56 are repeated. Switching between the cartilage conduction vibration unit 1124 and the speaker 1013 and also switching the display are thereby performed automatically, either by moving the handle 1181 in or out or by the contact or non-contact of the cartilage conduction vibration unit 1124. In the state in which the cartilage conduction vibration unit 1124 has been turned on, switching occurs automatically between whether or not the waveform inversion signal of one's own voice is added, which is based on the presence or absence of the earplug bone conduction effect.

In the repetition of the aforementioned steps, there may be an insertion in between steps S142 and S52 of a step for determining whether a predetermined period of time has passed after the display of the large-screen display unit 205 is initially changed to the privacy-protection display in step S142, and also of a step for turning the large-screen display unit 205 itself off with the purpose of saving electricity when the predetermined period of time has passed. At this time, in accordance therewith, there is an insertion in between steps S148 and S150 of a step for turning the large-screen display unit 205 on when same has been turned off. The flow in FIG. 23 can also be used for the eleventh embodiment in FIG. 20 by the omission of step S132.

Thirteenth Embodiment

Figure 24A:
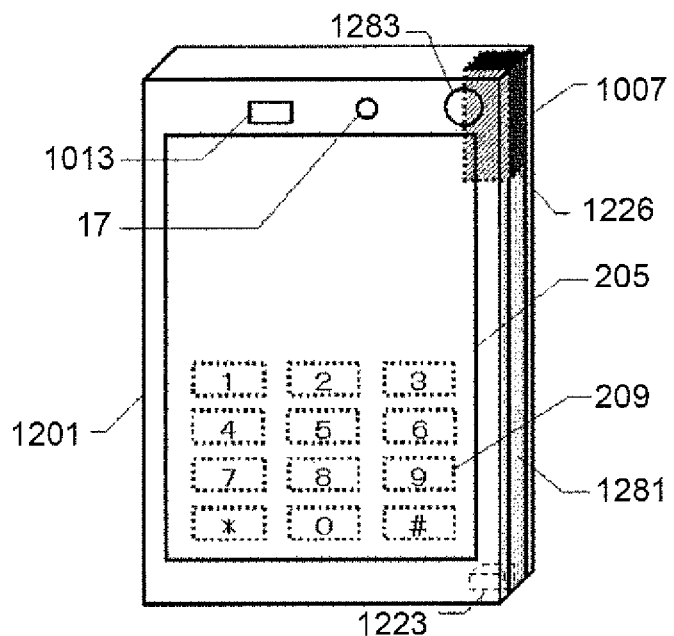
FIG. 24 is a perspective view illustrating a thirteenth embodiment of a mobile telephone according to an aspect of the present invention (thirteenth embodiment)
Figure 24B:
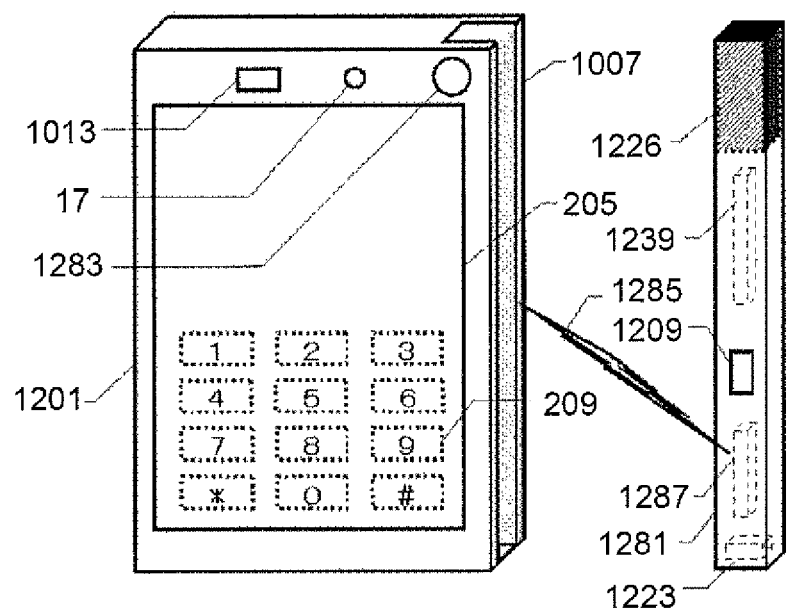

FIG. 24 is a perspective view illustrating a thirteenth embodiment of the mobile telephone according to an aspect of the present invention. FIG. 24A illustrates a state in which an incoming/outgoing-talk unit 1281 (to be described later) is integrated with a mobile telephone 1201, and FIG. 24B illustrates a state in which the incoming/outgoing-talk unit 1281 is separated. The mobile telephone 1201 of the thirteenth embodiment assumes a state in which a cartilage conduction vibration unit 1226 is arranged on the side surface 1007 of the mobile telephone 1201 in the state in FIG. 24A. This is a point of similarity with the eleventh and twelfth embodiments. The thirteenth embodiment, being a mobile telephone, is based on an integrated type with no movable parts that is similar to the eleventh embodiment and the twelfth embodiment, and is configured as a "smartphone" having a large-screen display unit 205 provided with GUI functions. There is much in common with the structure thereof, and so corresponding portions have been given like reference numerals as in the twelfth embodiment, and a description has been omitted. However, similarly with respect to the eleventh embodiment and the twelfth embodiment, the "upper part" in the thirteenth embodiment does not signify a separate upper part, but rather signifies the portion at the top of the integrated structure.

The thirteenth embodiment has a similar configuration to that of FIG. 22A of the twelfth embodiment, except in that, in the state in FIG. 24A, the cartilage conduction vibration unit 1226 and an outgoing-talk unit 1223 are arranged on the right when seen from FIG. 24. However, the cartilage conduction vibration unit 1226 is brought up against the tragus of the left ear from the state in which the large-screen display unit 205 is being viewed, as in FIG. 24. Then, to bring the cartilage conduction vibration unit 1226 up against the tragus of the right ear, the holding hand is switched such that the mobile telephone 1201 faces backwards, whereby the cartilage conduction vibration unit 1226 is made to face the left ear.

A point of difference in the thirteenth embodiment from the twelfth embodiment lies in that the incoming/outgoing-talk unit 1281, which comprises the cartilage conduction vibration unit 1226 and the outgoing-talk unit 1223, can be separated from the mobile telephone 1201, as in FIG. 24B. The incoming/outgoing-talk unit 1281 can be inserted into and released from the mobile telephone 1201 by the operation of an insertion/release locking button 1283. The incoming/outgoing-talk unit 1281 further possesses an incoming/outgoing-talk operation unit 1209, and also a controller 1239 for the cartilage conduction vibration unit 1226 and the outgoing-talk unit 1223, the controller comprising a power supply unit. The incoming/outgoing-talk unit 1281 also possesses a Bluetooth™ or other short-range communication unit 1287, which is capable of wireless communication with the mobile telephone 1201 using radio waves 1285; the user's voice, which is picked up from the outgoing-talk unit 1223, and also information on the state of the contact of the cartilage conduction vibration unit 1226 with the ear are sent to the mobile telephone 1201, and the cartilage conduction vibration unit 1226 vibrates on the basis of the audio information received from the mobile telephone 1201.

The incoming/outgoing-talk unit 1281 separated out in the manner described above functions as a pencil incoming/outgoing-talk unit; the cartilage conduction vibration unit 1226 is held unrestrictedly and brought into contact with the tragus of either the right ear or the left ear, whereby a call can take place. Increasing the contact pressure on the tragus can yield the ear plug bone conduction effect. The incoming/outgoing-talk unit 1281 being in the separated state, sound can be heard by air conduction even when either the surface around the long axis of the cartilage conduction vibration unit 1226 or the tip thereof is brought up against the ear. In addition to the method for using the incoming/outgoing-talk unit 1281, in which the incoming/outgoing-talk unit ordinarily is housed in the mobile telephone 1201 as in FIG. 24A and is then separated out as appropriate like in FIG. 24B, there is also a possible method for using the incoming/outgoing-talk unit such that, in the separated state as in FIG. 24B, for example, the mobile telephone 1201 being housed in an inner pocket or bag and the incoming/outgoing-talk unit 1281 being inserted into an outer breast pocket like a pencil, only the incoming/outgoing-talk unit 1281 is used for operation and for calls to take place when outgoing and incoming calls are made. The cartilage conduction vibration unit 1226 can also function as a vibrator for incoming calls.

A pencil incoming/outgoing-talk unit 1281 such as in the thirteenth embodiment is not to be limited to the case of comprising a combination with a specialized mobile telephone 1201 having a housing unit. For example, a configuration as an accessory of a typical mobile telephone having a short-range communication function using Bluetooth™ or the like is also possible.

Fourteenth Embodiment

Figure 25A:
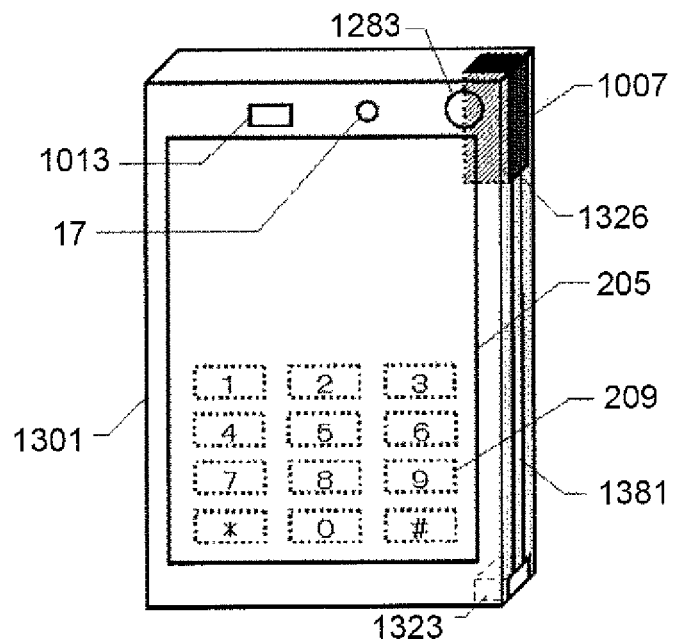
FIG. 25 is a perspective view illustrating a fourteenth embodiment of a mobile telephone according to an aspect of the present invention (fourteenth embodiment)
Figure 25B:
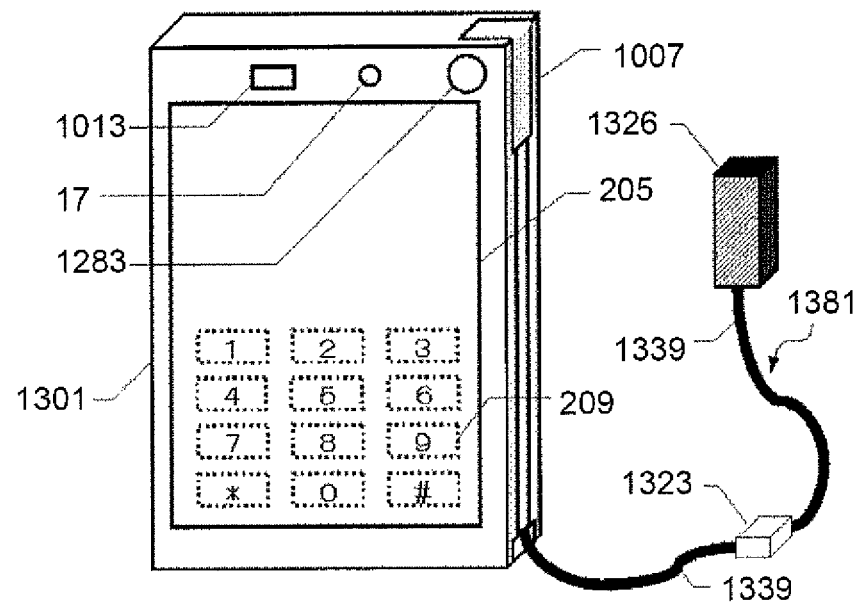

FIG. 25 is a perspective view illustrating a fourteenth embodiment of the mobile telephone according to an aspect of the present invention. FIG. 25A illustrates the state in which an incoming/outgoing-talk unit 1381 (to be described later) is housed in a mobile telephone 1301, and FIG. 25B illustrates the state in which the incoming/outgoing-talk unit 1381 is pulled out. The mobile telephone 1301 of the fourteenth embodiment assumes a state in which a cartilage conduction vibration unit 1326 is arranged on the side surface 1007 of the mobile telephone 1301 in the state in FIG. 25A. This is a point of similarity with the eleventh to thirteenth embodiments. The fourteenth embodiment, being a mobile telephone, is based on an integrated type with no movable parts that is similar to the eleventh to thirteenth embodiments, and is configured as a "smartphone" having a large-screen display unit 205 provided with GUI functions. There is much in common with the structure thereof, and so corresponding portions have been given like reference numerals as in the thirteenth embodiment, and a description has been omitted. However, similarly with respect to the eleventh to thirteenth embodiments, the "upper part" in the fourteenth embodiment does not signify a separate upper part, but rather signifies the portion at the top of the integrated structure.

The fourteenth embodiment, in the state in FIG. 25A, also has a similar configuration to that of FIG. 24A of the thirteenth embodiment. A point of difference in the fourteenth embodiment from the thirteenth embodiment lies in that, as illustrated in FIG. 25B, the incoming/outgoing-talk unit 1381 has a wired connection with the mobile telephone 1301 rather than a wireless one. Similarly with respect to the thirteenth embodiment, the incoming/outgoing-talk unit 1381 can be inserted into and released from the mobile telephone 1301 by the operation of the insertion/release locking button 1283. The incoming/outgoing-talk unit 1381 has a cable 1339 for respectively connecting the cartilage conduction vibration unit 1326 with the outgoing-talk unit 1323, and also the outgoing-talk unit 1323 with the mobile telephone 1301. In the housed state in FIG. 25A, the portion of the cable 1339 that is between the cartilage conduction vibration unit 1326 and the outgoing-talk unit 1323 is housed in a groove of the side surface 1007, and the portion thereof that is between the outgoing-talk unit 1323 and the mobile telephone 1301 is automatically wound up within the mobile telephone 1301 by a spring when the outgoing-talk unit 1323 is housed. The outgoing-talk unit 1323 is also provided with a remote control operation unit for operating at the time of outgoing and incoming calls. In the manner described above, in the fourteenth embodiment, the user's voice, which is picked up from the outgoing-talk unit 1323, and also information on the state of the contact of the cartilage conduction vibration unit 1326 with the ear are transmitted to the mobile telephone 1301 by wire, and the cartilage conduction vibration unit 1326 vibrates on the basis of the audio information received by wire from the mobile telephone 1301.

The incoming/outgoing-talk unit 1381 pulled out as in FIG. 25B is used by being hooked onto the cartilage of the lower part of the entrance to the external auditory meatus such that the portion of the cartilage conduction vibration unit 1326 is in contact with the tragus. Then, the outgoing-talk unit 1323 in this state is located close to the mouth, and can therefore pick up the user's voice. Holding the portion of the cartilage conduction vibration unit 1326 and increasing the contact pressure on the tragus can yield the ear plug bone conduction effect. In addition to the method for using the incoming/outgoing-talk unit 1381 in which the incoming/outgoing-talk unit ordinarily is housed in the mobile telephone 1301 as in FIG. 25A and is then pulled out as appropriate like in FIG. 25B, there is also a possible method for using the incoming/outgoing-talk unit such that, in the state in which the incoming/outgoing-talk unit 1381 is pulled out as in FIG. 25B, for example, the mobile telephone 1301 remains housed in an inner pocket or the like and the cartilage conduction vibration unit 1326 of the incoming/outgoing-talk unit 1381 remains hooked on the ear. The cartilage conduction vibration unit 1326 can also function as a vibrator for incoming calls, similarly with respect to the thirteenth embodiment.

A wired earphone-type incoming/outgoing-talk unit 1381 such as in the fourteenth embodiment is not to be limited to the case of comprising a combination with a specialized mobile telephone 1301 having a housing unit. For example, a configuration as an accessory of a typical mobile telephone having an external earphone-microphone connection terminal is also possible.

The various features indicated in each of the embodiments described above are not necessarily specific in each case to an individual embodiment; the features of each of the embodiments can be combined or rearranged with the features of other embodiments as appropriate, wherever it is possible to make use of the advantages thereof.

The implementation of the variety of features indicated in each of the embodiments described above is not to be limited to the above embodiments; the features can be implemented in other embodiments as well, wherever it is possible to benefit from the advantages thereof. For example, arranging the cartilage conduction vibration unit on the side surface relative to the display surface in the eleventh to fourteenth embodiments, being a configuration in which audio information is transmitted from the tragus by cartilage conduction, can thereby facilitate contact with the tragus and use the tragus as a conduction point for sound information. It is accordingly possible to achieve a listening posture free of discomfort, and approximating that of a conventional telephone in which one listens using the ear. The transmission of audio by cartilage conduction also does not require the formation of a closed space at the front of the entrance to the external auditory meatus, as is the case with air conduction, and is therefore appropriate for arrangement on the side surface. Furthermore, because audio information is conducted by cartilage conduction, there is a low percentage of air conduction caused by the vibration of the vibrator, and sound can be transmitted to the user's external auditory meatus without substantial sound leakage to the exterior, even though the cartilage conduction vibration unit is arranged on the side surface of the mobile telephone, which is narrow. This is due to the fact that, in cartilage conduction, sound does not enter the external auditory meatus as air conduction sound but rather is transmitted due to the contact of the sound energy with the cartilage, the sound being generated thereafter inside the external auditory meatus by the vibration of the tissue in the ear. Accordingly, the utilization of the cartilage conduction vibration unit in the eleventh to fourteenth embodiments is also very effective when a sound information output unit is arranged on the side surface relative to the display surface, there being no concern that the incoming-talk unit sound will be heard by neighboring people due to sound leakage, which would be annoying, nor that any sensitive information will be leaked.

However, from the standpoint of benefiting from the advantage of being able to prevent the display surface from being fouled by contact with the ear and/or cheek when audio information is being listened to, the arrangement on the side surface relative to the display surface is not to be limited to a case in which the audio information output unit that is to be arranged is the cartilage conduction vibration unit. For example, the configuration may be such that the audio information output unit is an earphone that works by air conduction, the earphone being provided to the side surface relative to the display surface. The configuration may also be such that the audio information output unit is a bone conduction vibration unit hitting against a bone at the front of the ear (the zygomatic arch), a bone at the rear of the ear (the mastoid part), or the forehead, the unit being arranged on the side surface relative to the display surface. Due to the arrangement on the side surface relative to the display surface, the display surface will not be in contact with the ear and/or cheek when audio information is being listened to; therefore, even in cases where these audio information output units are used, advantages can also accrue in regard to being able to prevent fouling of the display surface. In cases in which such units are used, moreover, a microphone can be arranged on the side surface relative to the display surface in a case in which the arrangement of the earphone and/or bone conduction vibration unit is limited to one side surface, as in the twelfth to fourteenth embodiments. Similarly with respect to the eleventh to fourteenth embodiments, when the earphone is brought up against the ear for a call in a posture such as is represented in FIG. 21, or, alternatively, when the bone conduction vibration unit is held to a bone at the front or rear of the ear for a call, setting the display surface to a privacy-protection display makes it possible to prevent a display containing private information from being viewed by other people, either in the front or rear or to the left or right.

Fifteenth Embodiment

Figure 26:
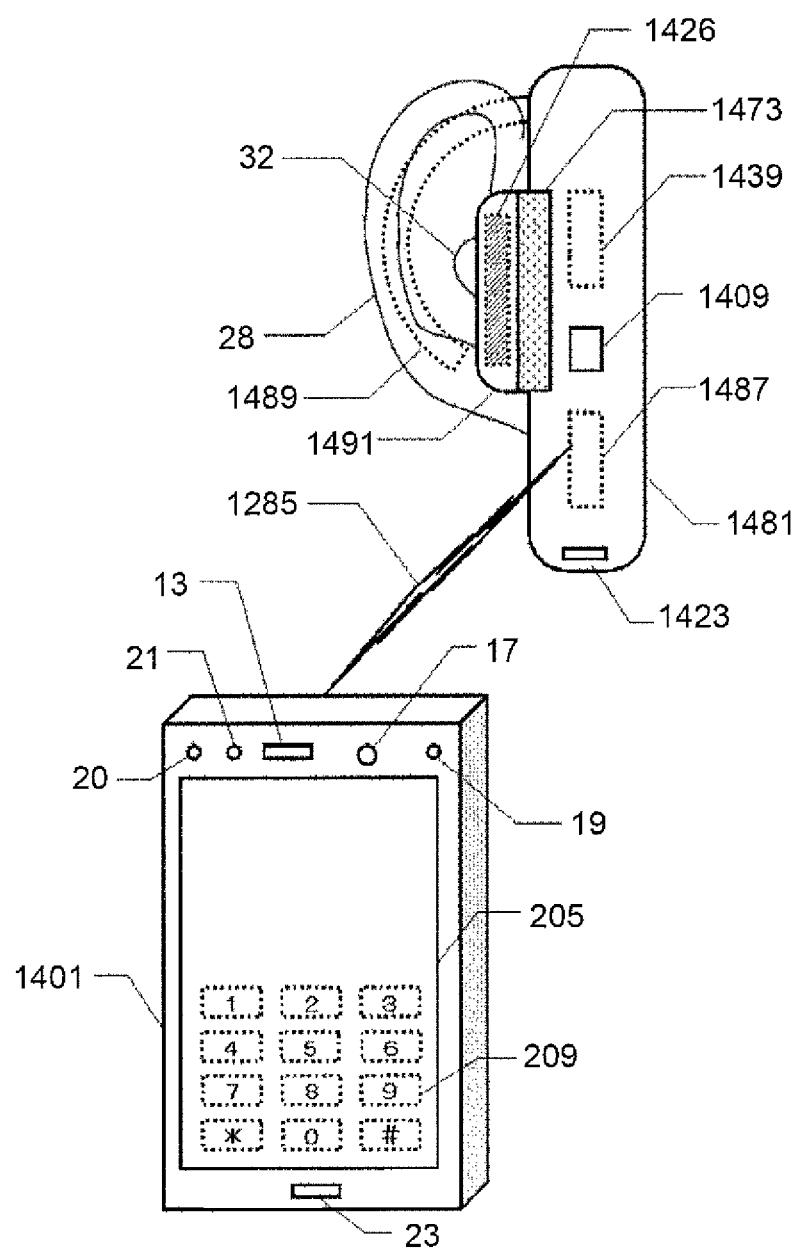
FIG. 26 is a diagram of the system of a fifteenth embodiment according to an aspect of the present invention (fifteenth embodiment)

FIG. 26 is a diagram of the system of a fifteenth embodiment according to an aspect of the present invention. The fifteenth embodiment is configured as an incoming/outgoing-talk unit for a mobile telephone, and forms a mobile telephone system together with a mobile telephone 1401. The fifteenth embodiment takes the configuration of a system in common with the configuration of the system in the state in which the incoming/outgoing-talk unit 1281 is separated from the mobile telephone 1201, as in FIG. 24B in the thirteenth embodiment; therefore, portions that are in common have been given like reference numerals, a description thereof being omitted unless there is a particular need. The mobile telephone 1401, similarly with respect to the mobile telephone 1201 of the thirteenth embodiment, is not to be limited to the case of being specially configured to be used in combination with an incoming/outgoing-talk unit; rather, the case may also be one of a configuration as a typical mobile telephone having, for example, a short-range communication function using Bluetooth™ or the like. The incoming/outgoing-talk unit in such a case then assumes a configuration as an accessory of such a typical mobile telephone 1401, similarly with respect to the thirteenth embodiment. A more detailed description of these two cases will be provided later.

A point of difference in the fifteenth embodiment from the thirteenth embodiment lies in that the incoming/outgoing-talk unit is configured as a headset 1481, rather than in a pencil-type format such as in the thirteenth embodiment. The incoming/outgoing-talk unit 1481 conforms with the thirteenth embodiment in being provided with an outgoing-talk unit 1423 and a cartilage conduction vibration unit 1426 comprising a piezoelectric bimorph element; in being provided with a controller 1439, which comprises a power supply unit for the cartilage conduction vibration unit 1426 and the outgoing-talk unit 1423; and in being provided with the incoming/outgoing-talk operation unit 1409. The incoming/outgoing-talk unit 1481 further conforms with the thirteenth embodiment in being provided a short-range communication unit 1487 compliant with Bluetooth™ or another scheme and capable of wireless communication with the mobile telephone 1401 using radio waves 1285; in sending to the mobile telephone 1401 the user's voice, which is picked up from the outgoing-talk unit 1423, and also information on the state of the contact made by the cartilage conduction vibration unit 1426 with the ear; and in causing the cartilage conduction vibration unit 1426 to vibrate on the basis of the audio information received from the mobile telephone 1401.

There shall next be provided a description of the configuration specific to the fifteenth embodiment. The headset 1481 is attached to the right ear 28 by an ear-hooking unit 1489. The headset 1481 is provided with a movable unit 1491 that is held by an elastic body 1473, and the cartilage conduction vibration unit 1426 is held by the movable unit 1491. The configuration is such that the cartilage conduction vibration unit 1426 is in contact with the tragus 32 in the state in which the headset 1481 is attached to the right ear 28 by the ear-hooking unit 1489. The elastic body 1473 makes it possible to bend the movable unit 1491 in the direction of the tragus 32, and also functions as a cushioning material for the cartilage conduction vibration unit 1426, protecting the cartilage conduction vibration unit 1426 against mechanical impact due to the headset 1481.

Sound information can be listened to via ordinary cartilage conduction in the state in FIG. 26. However, when listening comprehension of sound information is impaired due to environment noise, the movable unit 1491 is pushed from the exterior and thereby bent, and the pressure contact of the cartilage conduction vibration unit 1426 on the tragus 32 is increased, whereby the tragus 32 is made to block the hole of the ear. The ear plug conduction effect, which has also been described in the other embodiments, can thereby be generated, and even louder audio information can be transmitted. Obstructing the hole of the ear with the tragus 32 further allows environment noise to be blocked. Information on one's own voice, which is picked up from the outgoing-talk unit 1423, is also subjected to phase inversion on the basis of the mechanical detection of the bent state of the movable unit 1491, and is then transmitted to the cartilage conduction vibration unit 1426, to cancel out one's own voice. A more detailed description of the merits or other advantageous attributes thereof has been described in the other embodiments, and thus has been omitted.

Sixteenth Embodiment

Figure 27:
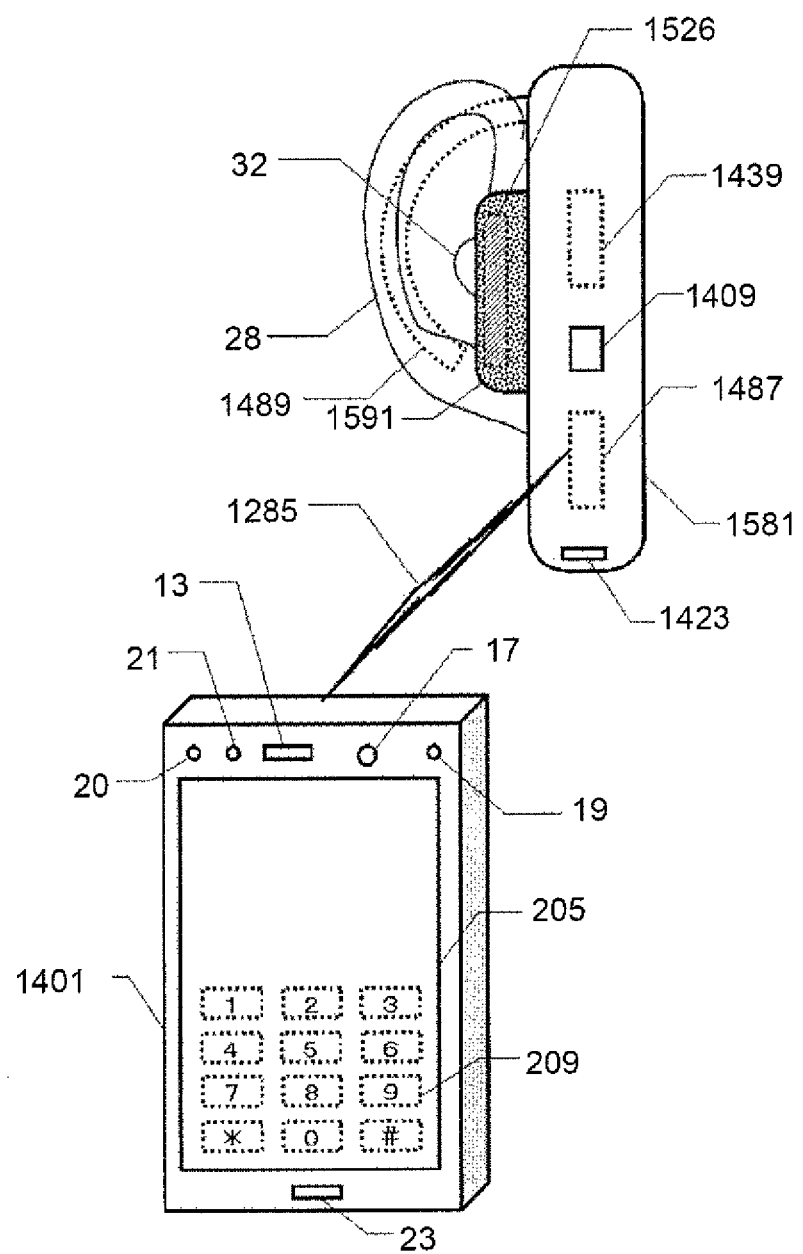
FIG. 27 is a diagram of the system of a sixteenth embodiment according to an aspect of the present invention (sixteenth embodiment)

FIG. 27 is a diagram of the system of a sixteenth embodiment according to an aspect of the present invention. The sixteenth embodiment is also configured as a headset 1581 for creating an incoming/outgoing-talk unit for the mobile telephone 1401, similarly with respect to the fifteenth embodiment, and forms a mobile telephone system together with the mobile telephone 1401. The sixteenth embodiment has much in common with the fifteenth embodiment, and therefore parts that are in common have been given like reference numerals, and a description thereof has been omitted unless there is a particular need. The mobile telephone 1401, as has been described in the fifteenth embodiment, may in some cases have a special configuration, and may in other cases be configured as a typical mobile telephone. A description of these two cases will be provided later.

A point of difference in the sixteenth embodiment from the fifteenth embodiment lies in that the entirety of a movable unit 1591 is made using an elastic material that has acoustic impedance approximating that of ear cartilage (a silicone rubber; a mixture of a silicone rubber and a butadiene rubber; a natural rubber; or a structure formed using these varieties of rubber in which air bubbles are sealed). A cartilage conduction vibration unit 1526, which comprises a piezoelectric bimorph element or the like, is embedded inside the movable unit 1591, similarly with respect to the eighth embodiment. Such a configuration allows the movable unit 1591, including the cartilage conduction vibration unit 1526, to be bent toward the tragus 32 under its own elasticity. Although omitted from the diagrams for simplicity, the circuit portions of the cartilage conduction vibration unit 1526, the controller 1439, and the like are connected by a connection wire similar to the flexible connection wire 769 in FIG. 17C.

In the sixteenth embodiment, the movable unit 1591 is in contact with the tragus 32 in the state represented in FIG. 27; sound information from the cartilage conduction vibration unit 1526 is conducted to the tragus 32 by cartilage conduction via the elastic material of the moveable unit 1591. The benefits from such a configuration are similar to those described in the fifth to tenth embodiments. Furthermore, when listening comprehension of sound information is impaired due to environment noise, the movable unit 1591 is pushed from the exterior and thereby bent, and the pressure contact of the cartilage conduction vibration unit 1526 on the tragus 32 is increased, whereby the tragus 32 is made to block the hole of the ear. The ear plug conduction effect can thereby be generated, and even louder sound information can thereby be transmitted, similarly with respect to the fifteenth embodiment. The fact that environment noise can be blocked by the obstruction of the hole of the ear by the tragus 32 is also similar to the fifteenth embodiment. Another similarity with the fifteenth embodiment is the fact that information on one's own voice, which is picked up from the outgoing-talk unit 1423, can also be subjected to phase inversion on the basis of the mechanical detection of the bent state of the movable unit 1591 and then transmitted to the cartilage conduction vibration unit 1526 to cancel out one's own voice.

Furthermore, in the sixteenth embodiment, because the cartilage conduction vibration unit 1526 is embedded inside the movable unit 1591, the elastic material constituting the movable unit 1591 functions as a cushioning material for protecting the cartilage conduction vibration unit 1526 against mechanical impact to the headset 1581 and also for further protecting the cartilage conduction vibration unit 1526 against mechanical impact to the movable unit 1591 itself.

Figure 28:
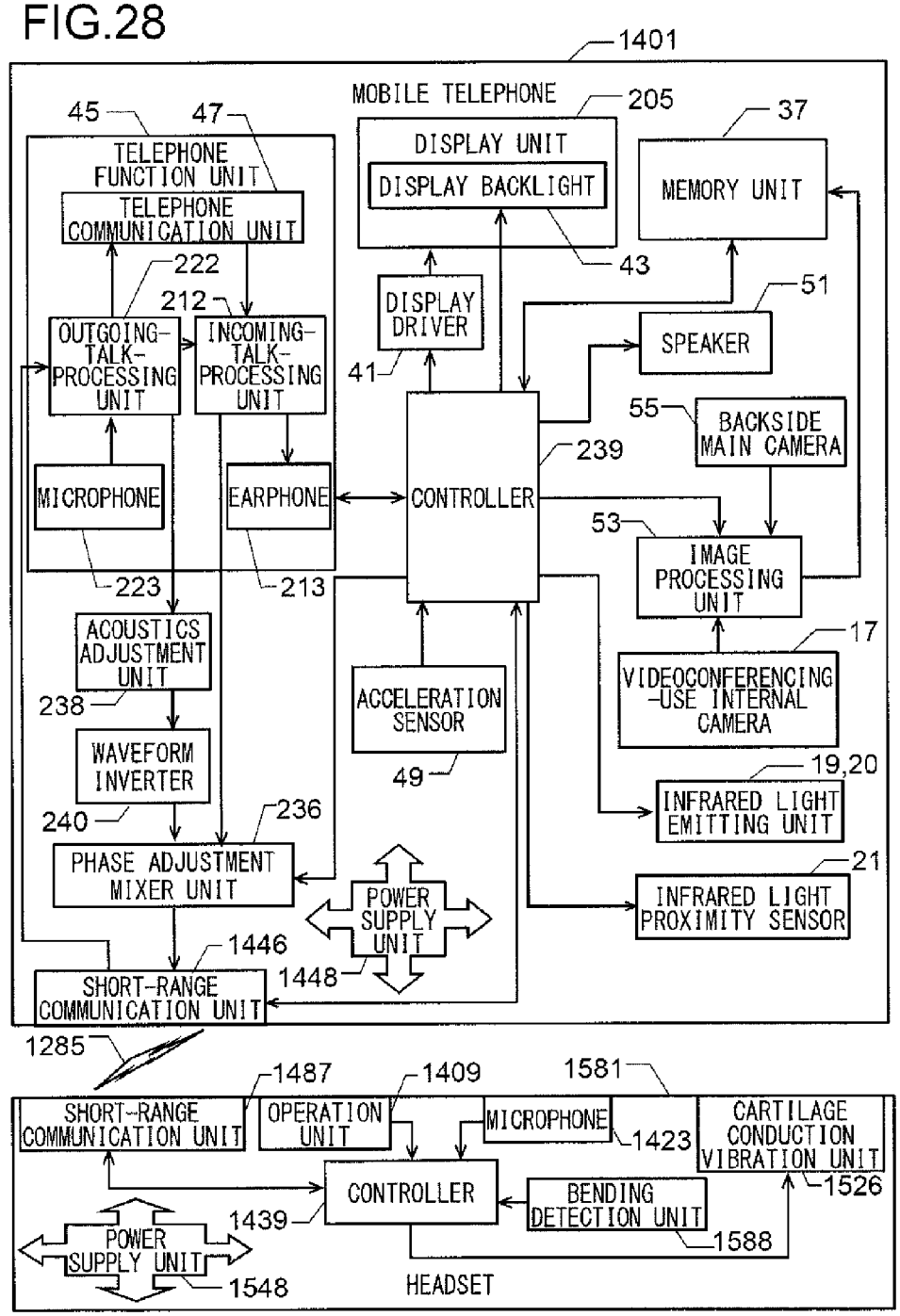
FIG. 28 is a block diagram of the sixteenth embodiment.

FIG. 28 is a block diagram of the sixteenth embodiment, identical portions being given identical reference numerals to those in FIG. 27. Also, because the configuration of the block diagram has many portions in common with the fourth embodiment, corresponding portions are each assigned the same reference numerals as each respective part. Also, a description has been omitted for these identical or shared portions, unless there is a particular need. In the sixteenth embodiment, the incoming-talk-processing unit 212 and the earphone 213 in FIG. 28 correspond to the incoming-talk unit 13 in FIG. 27, and the outgoing-talk-processing unit 222 and the microphone 223 in FIG. 28 correspond to the outgoing-talk unit 23 in FIG. 27. Similarly with respect to the fourth embodiment, the outgoing-talk-processing unit 222 transmits a part of the audio from the operator picked up by the microphone 223 to the incoming-talk-processing unit 212 as sidetone, and the incoming-talk-processing unit 212 superimposes the operator's own sidetone onto the voice of the calling party from the telephone communication unit 47 and outputs same to the earphone 213, whereby the balance between the bone conduction and air conduction of one's own voice in the state in which the mobile telephone 1401 is brought up against an ear is made to approximate a natural state.

A point of difference in the block diagram of the sixteenth embodiment in FIG. 28 from the block diagram of the fourth embodiment in FIG. 8 lies in that the mobile telephone 301 of the fourth embodiment in FIG. 8 is divided in the sixteenth embodiment of FIG. 28 into the mobile telephone 1401 and the headset 1581 for creating the incoming/outgoing-talk unit. Specifically, FIG. 28 corresponds to a block diagram of the case in the sixteenth embodiment in which the mobile telephone 1401 is specially configured to be used in combination with the headset 1581.

More specifically, in FIG. 28, the output of the phase adjustment mixer unit 236 is wirelessly sent externally by a short-range communication unit 1446 using Bluetooth™ or the like. The short-range communication unit 1446 also inputs audio signals received wirelessly from an external microphone into the outgoing-talk-processing unit 222. Furthermore, although a depiction and description has been omitted in the other embodiments, FIG. 28 depicts a power supply unit 1448, which has a storage battery for supplying power to the entire mobile telephone 1401.

On the other hand, the configuration of the headset 1581 has a short-range communication unit 1487 for intercommunication with the short-range communication unit 1446 of the mobile telephone 1401 using radio waves 1285, and also has a power supply unit 1548 for supplying power to the entire headset 1581. The power supply unit 1548 supplies power by a replaceable battery or by a built-in storage battery. The controller 1439 of the headset 1581 wirelessly sends audio picked up from the outgoing-talk unit (microphone) 1423 to the mobile telephone 1401 from the short-range communication unit 1487, and also controls the drive of the cartilage conduction vibration unit 1526 on the basis of audio information that has been received by the short-range communication unit 1487. Furthermore, the controller 1439 transmits an operation to receive an incoming call or to send an outgoing call, which is performed by the operation unit 1409, to the mobile telephone 1401 from the short-range communication unit 1487. A bending detection unit 1588 mechanically detects the bent state of the movable unit 1591, and the controller 1439 transmits the bending detection information from the short-range communication unit 1487 to the mobile telephone 1401. The bending detection unit 1588 can comprise, for example, a switch that is turned on mechanically when the bending reaches or exceeds a predetermined angle. The controller 239 of the mobile telephone 1401 controls the phase adjustment mixer unit 236 on the basis of the bending detection information received by the short-range communication unit 1446, and determines whether or not to add, to the audio information from the incoming-talk-processing unit 212, the signal of the waveform inverter 240 that is based on one's own voice transmitted from the outgoing-talk unit (microphone) 1423 to the outgoing-talk-processing unit 222.

Seventeenth Embodiment

Figure 29:
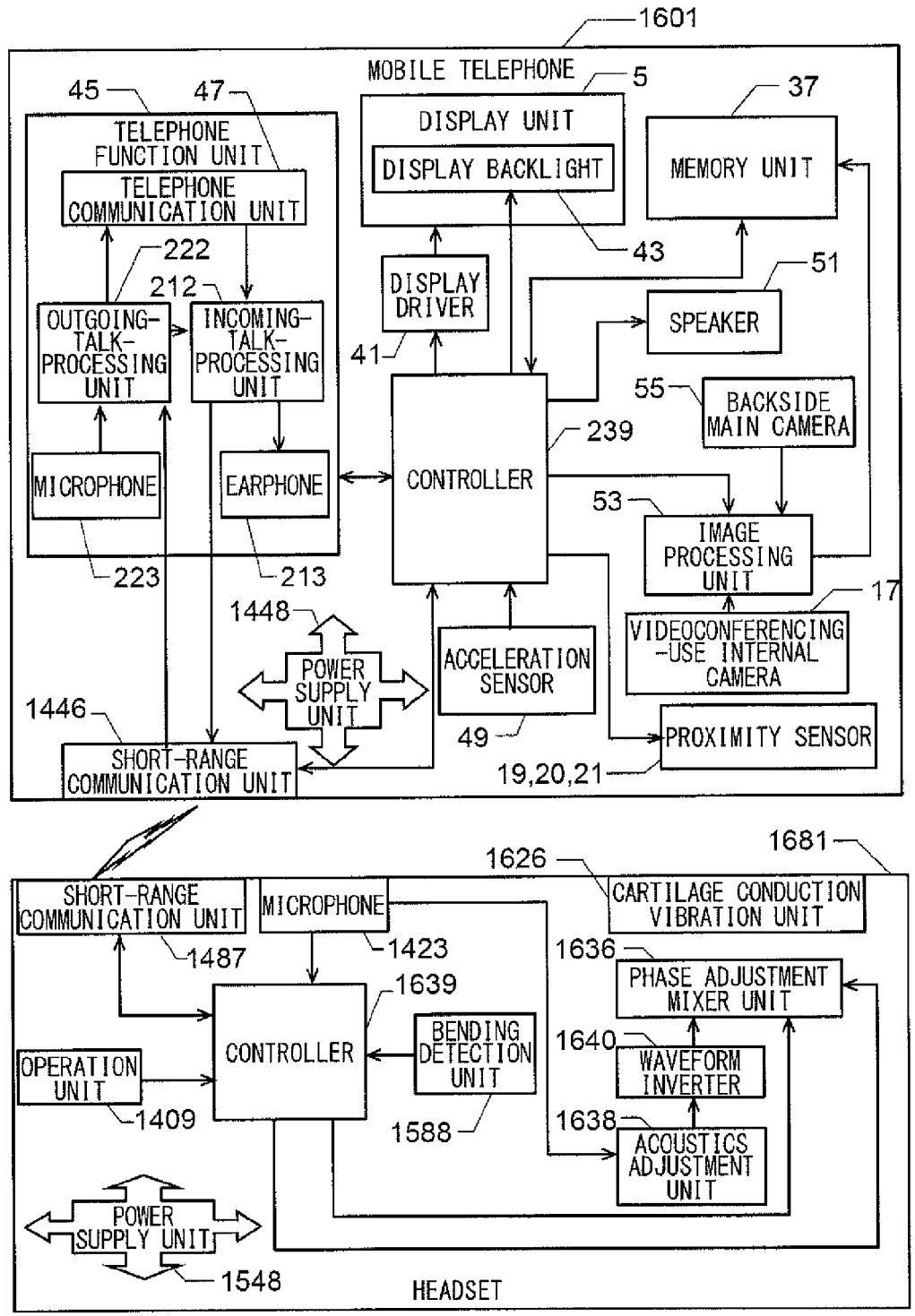
FIG. 29 is a block diagram of a seventeenth embodiment (seventeenth embodiment)

FIG. 29 is a block diagram of the case in which, in the sixteenth embodiment of FIG. 27, the mobile telephone 1401 is configured as a typical mobile telephone, and the headset 1581 is configured as an accessory thereof; the diagram serves to provide a description as the seventeenth embodiment in order to avoid confusion with FIG. 28. The configuration of FIG. 29 has much in common with FIG. 28, and therefore identical parts have been given reference numerals identical to those in FIG. 28, a description thereof having been omitted unless there is a particular need.

As described above, the mobile telephone 1601 in the seventeenth embodiment in FIG. 29 is configured as a typical mobile telephone comprising a short-range communication function using Bluetooth™ or the like. Specifically, the short-range communication unit 1446 inputs to the outgoing-talk-processing unit 222 audio information from an external microphone that is similar to what is inputted from the microphone 223, and also externally outputs audio information that is similar to what is outputted to the earphone 213. The controller 239 is used to switch the audio information that is inputted from and outputted to external elements through the short-range communication unit 1446 relative to the internal microphone 223 and earphone 213. As described above, in the seventeenth embodiment of FIG. 29, the functions of the acoustics adjustment unit 238, the waveform inverter 240, and the phase adjustment mixer unit 236 in the sixteenth embodiment in FIG. 28 are transferred to the headset 1681.

In accordance therewith, the configuration of the headset 1681 in the seventeenth embodiment of FIG. 29 differs from that of the sixteenth embodiment in FIG. 28 on the following points. The configuration is such that, although listening audio information received using the short-range communication unit 1487 by the control of a controller 1639 of the headset 1681 is inputted to the phase adjustment mixer unit 1636, audio information from the waveform inverter 1640 can also additionally be inputted thereto. Also, according to need, the phase adjustment mixer unit 1636 mixes the audio information from the waveform inverter 1640 into the received listening audio information and drives a cartilage conduction vibration unit 1626. More specifically, a part of the audio from the operator that has been picked up by the outgoing-talk unit (microphone) 1423 is inputted to the acoustics adjustment unit 1638, and the acoustics of one's own voice to be transmitted to the cochlea from a cartilage conduction vibration unit 1628, which comprises the cartilage conduction vibration unit 1626, are adjusted to acoustics approximating the operator's own voice transmitted to the cochlea by conduction in the body from the vocal cords when the ear plug bone conduction effect is generated, and the two are effectively canceled out. The waveform inverter 1640 subjects one's own voice, which has undergone acoustic adjustment in this manner, to waveform inversion, and outputs the same according to need to the phase adjustment mixer unit 1636.

The mixing control shall now be described in detail. When the bending of the movable unit 1591 detected by the bending detection unit 1588 reaches or exceeds a predetermined angle and a state is in effect in which the hole of the ear is obstructed by the tragus, which is pushed thereby, the phase adjustment mixer unit 1636 mixes the output from the waveform inverter 1640 and drives the cartilage conduction vibration unit 1628, depending on an instruction from the controller 1639. The excessive amount of one's own voice that occurs during the earplug bone conduction effect is thereby cancelled out, thus easing the discomfort. At this time, the degree of cancellation is regulated such that an amount of one's own voice equivalent to the sidetone remains without being cancelled out. On the other hand, when the bending detection unit 1588 does not detect a predetermined or greater amount of bending, the state in effect is one in which the hole of the ear is not obstructed by the tragus and the earplug bone conduction effect is not created; therefore, the phase adjustment mixer unit 1636 does not mix the waveform inversion output of one's own voice from the waveform inverter 1640, on the basis of an instruction from the controller 1639. Similarly with respect to the fourth embodiment, the configuration of the seventeenth embodiment of FIG. 29 may invert the positions of the acoustics adjustment unit 1638 and the waveform inverter 1640. Furthermore, the acoustics adjustment unit 1638 and the waveform inverter 1640 may be integrated as a function within the phase adjustment mixer unit 1636. It is a point of similarity with the sixteenth embodiment that the controller 1639 transmits an operation to receive an incoming call or to send an outgoing call, which is performed by the operation unit 1409, to the mobile telephone 1601 from the short-range communication unit 1487.

The block diagrams in FIGS. 28 and 29 can be applied not only to the configuration of the system diagram in FIG. 27, but also the system diagram of the fifteenth embodiment in FIG. 26. They can also be applied to the thirteenth embodiment of FIG. 24 and the fourteenth embodiment of FIG. 25 when the bending detection unit 1588 is read as the pressure sensor 242 as in FIG. 8. However, in the case of a reading as the thirteenth embodiment, in the case in which the incoming/outgoing-talk unit 1281 is incorporated into the mobile telephone 1201 as in FIG. 24A, a contact unit for directly connecting the two is provided to the mobile telephone 1201 and the incoming/outgoing-talk unit 1281. In the state in FIG. 24A, the wireless communication exchange between the mobile telephone 1201 and the incoming/outgoing-talk unit 1281 by a short-range communication unit is automatically switched to communication via such a contact unit. In the case of a reading as the fourteenth embodiment, a connector contact for establishing a wired connection between the two is provided to the mobile telephone 1301 and the incoming/outgoing-talk unit 1381 instead of the short-range communication unit.

Figure 30:
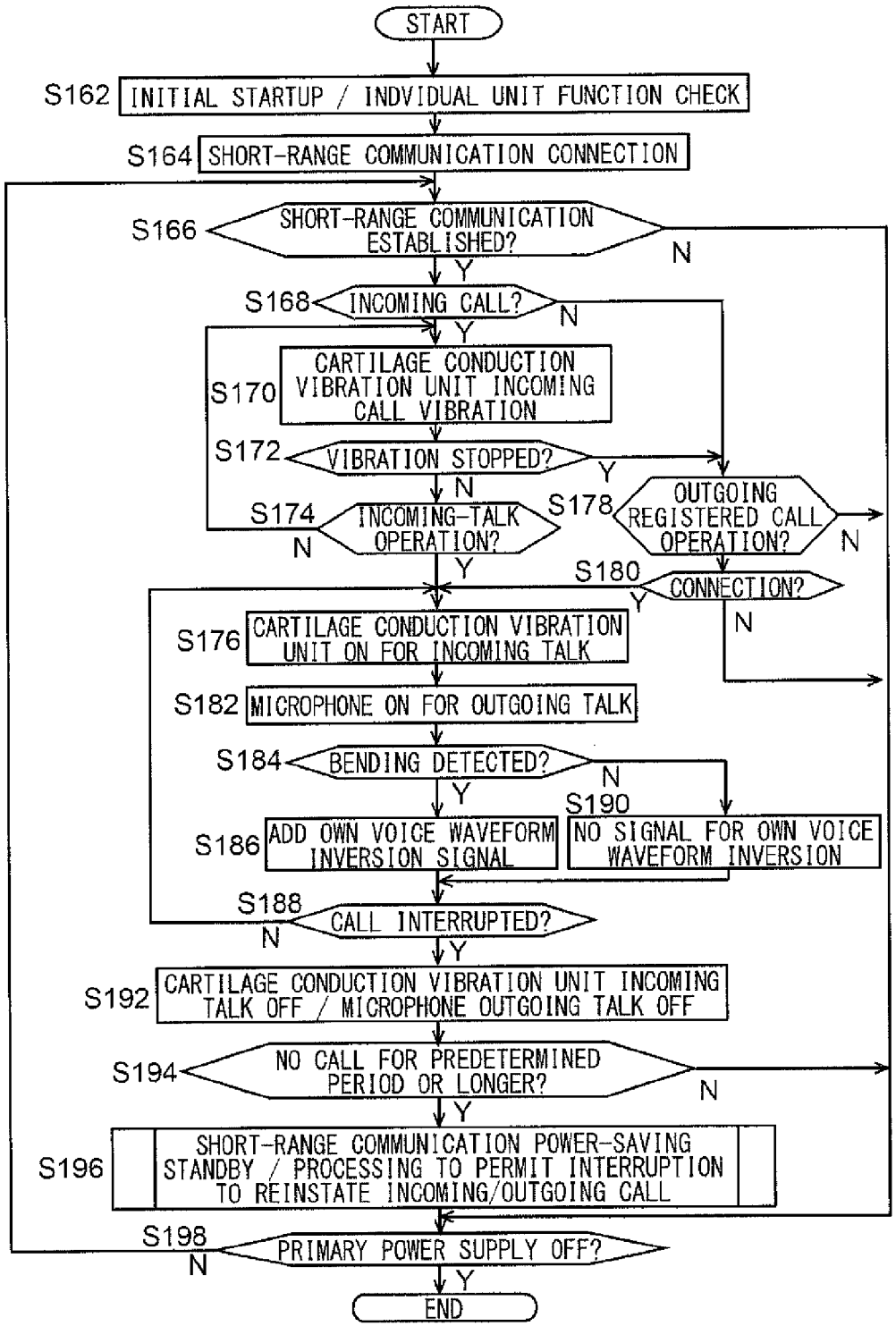
FIG. 30 is a flow chart of the operation of the controller of an incoming/outgoing-talk unit in the seventeenth embodiment of FIG. 29.

FIG. 30 is a flow chart of the operation of the controller 1639 of the headset 1681 in the seventeenth embodiment of FIG. 29. The flow in FIG. 30 starts when the primary power supply is turned on by the operation unit 1409; in step S162, there is performed a check for initial startup and for the functions of each unit. Next, in step S164, there is an instruction for a short-range communication connection with the mobile telephone 1601, and the flow moves on to step S166. When a short-range communication is established on the basis of the instruction in step S164, the headset 1681 enters a state of constant connection with the mobile telephone 1601 unless the primary power supply is subsequently turned off. In step S166, there is performed a check for whether short-range communication with the mobile telephone 1601 has been established; the flow moves on to step S168 when establishment is confirmed.

In step S168, there is performed a check for whether or not an incoming signal from the mobile telephone 1601 has been transmitted through a short-range communication. Then, when there is an incoming signal, the flow proceeds to step S170, in which a drive is performed such that the cartilage conduction vibration unit 1626 has an incoming signal vibration. This incoming signal vibration may have an audible frequency, or may vibrate in a low frequency region with a large enough amplitude that the vibration can be felt with the tragus 32. Next, in step S172, there is performed a check for whether an incoming signal has been stopped by an outgoing call stop operation or the like from the party making the call; when there is no stop, the flow proceeds to step S174, in which there is performed a check for whether there has been a receiving operation by the operation unit 1409. Then, when there is a receiving operation, the flow moves on to step S176. On the other hand, when there is no receiving operation in step S174, the flow returns to step S170, following which a loop of steps S170 to S174 is repeated unless either the incoming signal vibration of the cartilage conduction vibration unit 1626 is stopped or a receiving operation is performed.

On the other hand, in a case in which no incoming signal is detected in step S168, the flow moves on to step S178, in which there is performed a check for whether there has been a one-touch outgoing call operation to a registered call destination by the operation unit 1409. The flow proceeds to step S180 when an outgoing call operation is detected; the outgoing call operation is transmitted to the mobile telephone 1601 to make an outgoing call, and there is performed a check for whether or not a signal to the effect that a call connection has been established by a response from the other party thereto has been transmitted from the mobile telephone 1601. When it is confirmed that a call connection has been established in step S180, the flow moves on to step S176.

In step S176, the cartilage conduction vibration unit 1626 is turned on in order for audio information to be listened to, and in step S182 the outgoing-talk unit (microphone) 1423 is turned on in order for speaking to be performed; the flow then moves on to step S184. In step S184, there is performed a check for whether it has been detected that the movable unit 1591 is bent at or above a predetermined angle. When bending has been detected, the flow then proceeds to step S186, in which the waveform inversion signal of one's own voice is added to the cartilage conduction vibration unit 1626; the flow then moves on to step S188. On the other hand, when there is no detection in step S184 that the bending is at or above the predetermined angle, the flow moves on to step S190, and then on to step S188 without the waveform inversion signal of one's own voice being added to the cartilage conduction vibration unit 1626. In step S188, there is performed a check for whether or not a signal to the effect that the call state has been cut off has been received from the mobile telephone 1601; when the call has not been cut off, the flow returns to step S176, following which steps S176 to S188 are repeated until a call interruption is detected in step S188. Support is thereby provided for the generation and elimination of the earplug bone conduction effect that is based on the bending of the movable unit 1591 during a call.

On the other hand, when it is detected in step S188 that a call interruption signal has been received from the mobile telephone 1601, the flow proceeds to step S192, in which listening using the cartilage conduction vibration unit 1626 is turned off and speaking using the outgoing-talk unit (microphone) 1423 is turned off; the flow then moves on to step S194. In step S194, there is performed a check for whether a no-call state has continued for a predetermined period of time or longer; when this is true, the flow moves on to step S196. In step S196, there is a shift to a power-saving standby state, such as one in which the clock frequency is lowered to the minimum level required to maintain the standby state of the short-range communication unit 1487; processing is also done to permit an interruption for reinstating the short-range communication unit 1487 to an ordinary call state, in response to the receipt of an incoming call signal from the mobile telephone 1601 or an outgoing call operation of the operation unit 1409. Then, after such processing, the flow moves on to step S198. On the other hand, when there is no detection in step S194 of a no-call state lasting a predetermined period of time or longer, the flow moves directly on to step S198. However, the flow also moves directly on to step S198 when it is not possible in step S166 to confirm that short-range communication has been established, or when there is no detection in step S178 of an outgoing call operation, or when it is not possible in step S180 to confirm that a telephone connection has been established.

In step S198, there is performed a check for whether the primary power supply has been turned off by the operation unit 1409, the flow being terminated in a case in which it is detected that the primary power supply has been turned off. On the other hand, in a case in which it is not detected that the primary power supply has been turned off, the flow returns to step S166, following which steps S166 to S198 are repeated until primary power supply is turned off, to support various changes to the state of the headset 1681.

The flow in FIG. 30 can be applied not only to the configuration of the system diagram in FIG. 27, but also to the system diagram of the fifteenth embodiment in FIG. 26. The same can also be applied to the thirteenth embodiment in FIG. 24 or to the fourteenth embodiment in FIG. 25 when the "bending detection" in step S184 is read as a detection of the presence or absence of the state in which the "earplug bone conduction effect" is generated, as in step S52 of FIG. 10.

Eighteenth Embodiment

Figure 31:
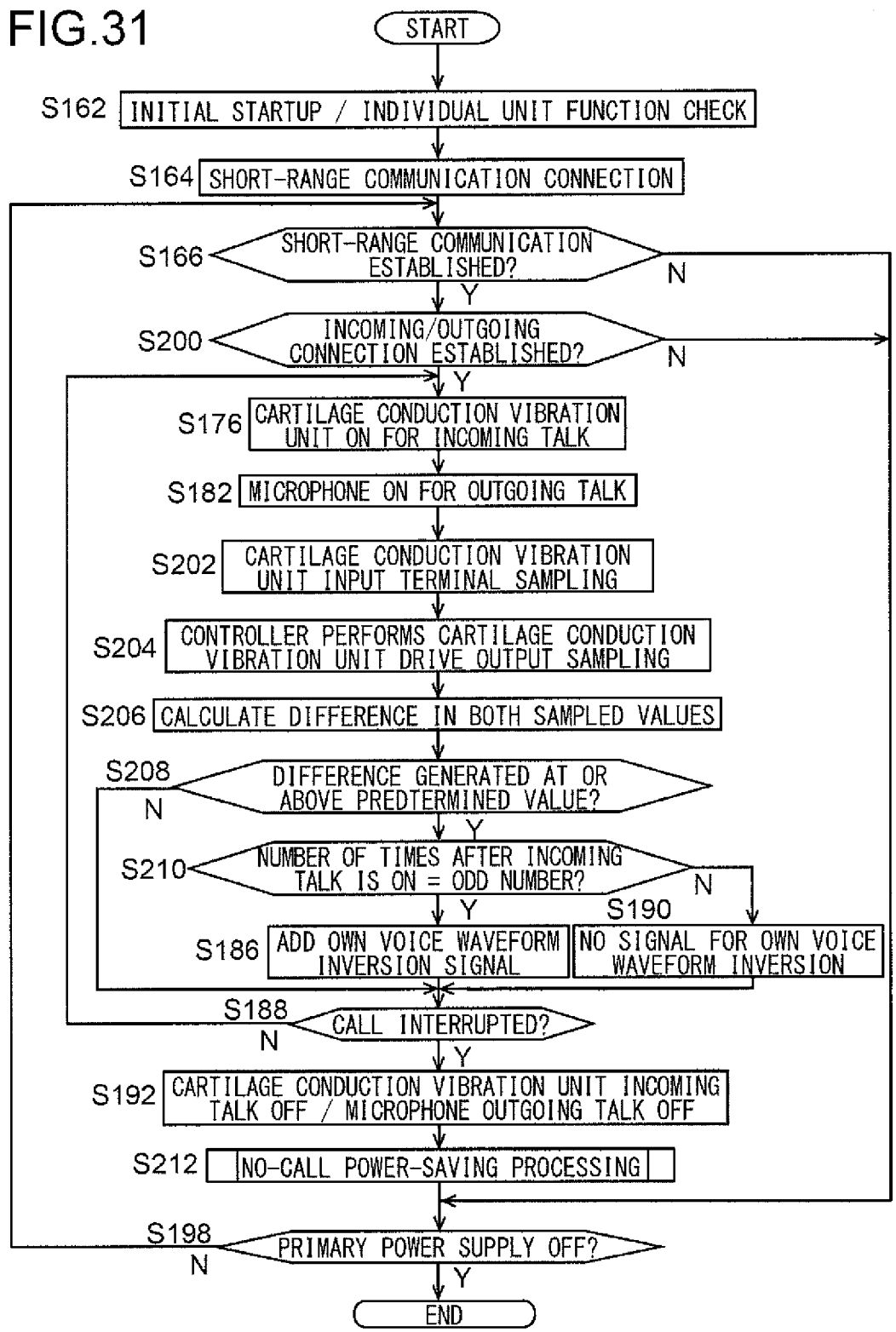
FIG. 31 is a flow chart of the operation of the controller of the incoming/outgoing talk unit in an eighteenth embodiment (eighteenth embodiment)

FIG. 31 is a flow chart of the controller of a headset in which, instead of having the bending be detected by a mechanical switch in the seventeenth embodiment of FIG. 30, the configuration is such that same is achieved using software; the description is provided as an eighteenth embodiment, in order to avoid confusion with FIG. 30. Steps that FIG. 31 has in common with FIG. 30 have been given like step reference numerals, a description thereof having been omitted unless there is a particular need. FIG. 31 uses boldface print and bold frames to illustrate points of difference, and thus the following description focuses on these portions. More specifically, the eighteenth embodiment is configured such that, with the assumption that the cartilage conduction vibration unit 1626 is a piezoelectric bimorph element and conforming to the fourth embodiment in FIG. 9, a signal appearing on a signal wire for connecting the phase adjustment mixer unit 1636 and the cartilage conduction vibration unit 1626 is monitored, and changes in the signal appearing for the cartilage conduction vibration unit (which is a piezoelectric bimorph element) 1626 are monitored by the strain that is based on the operational impact from the bending of the movable unit 1591 or at the moment of recovery from the bending thereof. The signal change is then processed by software, whereby the bending state is detected.

On the basis of the assumption above, there shall now be provided a description of how FIG. 31 is different from FIG. 30. First, step S200 is depicted by the consolidation of steps S170 to S174, step S178, and step S180 in FIG. 30, the content thereof being identical. Then, when a telephone connection is established on the basis of an operation to receive an incoming call or of the response of the other party to an outgoing call, the flow moves on to step S176; when there is no telephone connection, the flow moves on to step S198.

Steps S202 to S210 are steps that relate to detecting bending; once steps S182 to S202 are reached, first, a signal appearing on the input terminal of the cartilage conduction vibration unit 1626 (the signal wire connecting the phase adjustment mixer unit 1636 and the cartilage conduction vibration unit 1626) is sampled. In step S204, drive output of the cartilage conduction unit going from the controller 1639 to the phase adjustment mixer unit 1636 at the same timing is sampled at the same timing. Subsequently, in step S206, the difference between these sampling values is calculated, and in step S208, there is a detection for whether the calculated difference is at or above a predetermined value. This function corresponds to the function of the pressure sensor 242 in FIG. 9, but whereas the pressure state is continuously detected by the pressure sensor 242 of FIG. 9, the system in FIG. 27 uses operational impact from bending or at the moment of recovery from bending to perceive changes to the bending state.

When it is detected in step S208 that the two sampling values have generated a difference at or above the predetermined value, the flow moves on to step S210. It is not known at the stage in step S208 whether the difference in the two sampling values at or above the predetermined value has been generated due to bending or has been generated due to recovery from bending. However, after the cartilage conduction vibration unit 1626 has been turned on in step S176, there is a check in step S210 for whether the number of times a difference has been generated is an odd number, on the basis of the difference generation history. When the number of times is an odd number, the flow moves on to step S186, and when the number of times is an even number, the flow moves on step S190. Because the movable unit 1591 necessarily alternates between bending and recovering from bending, there can be an alternation between whether or not the phase-inverted signal of one's own voice is added each time there is an operational impact in the manner described above. However, the difference generation history can be reset using the operation unit 1409 in the event that the difference count is ever inverted by a mistaken operation.

Step S212 is depicted by the consolidation of step S194 and step S196 in FIG. 30, the content thereof being identical. As described above, similarly with respect to the fourth embodiment and the like, the sensor function of the cartilage conduction vibration unit 1626 itself is utilized in the eighteenth embodiment to detect the bending of the movable unit 1591, whereby the state in which the earplug bone conduction effect occurs is determined to be in effect. The flow of FIG. 31 can be applied not only to the configuration of the system diagram in FIG. 27, but also to the system diagram of the fifteenth embodiment in FIG. 26. Also, in a case such as in the fifth to tenth embodiments, in which the cartilage conduction vibration unit is held by an elastic body, the scheme in FIG. 31 for detecting the occurrence of the earplug bone conduction effect can also be utilized in a case in which there is no continuous strain on the cartilage conduction vibration unit in the state in which the earplug bone conduction effect occurs.

Nineteenth Embodiment

Figure 32:
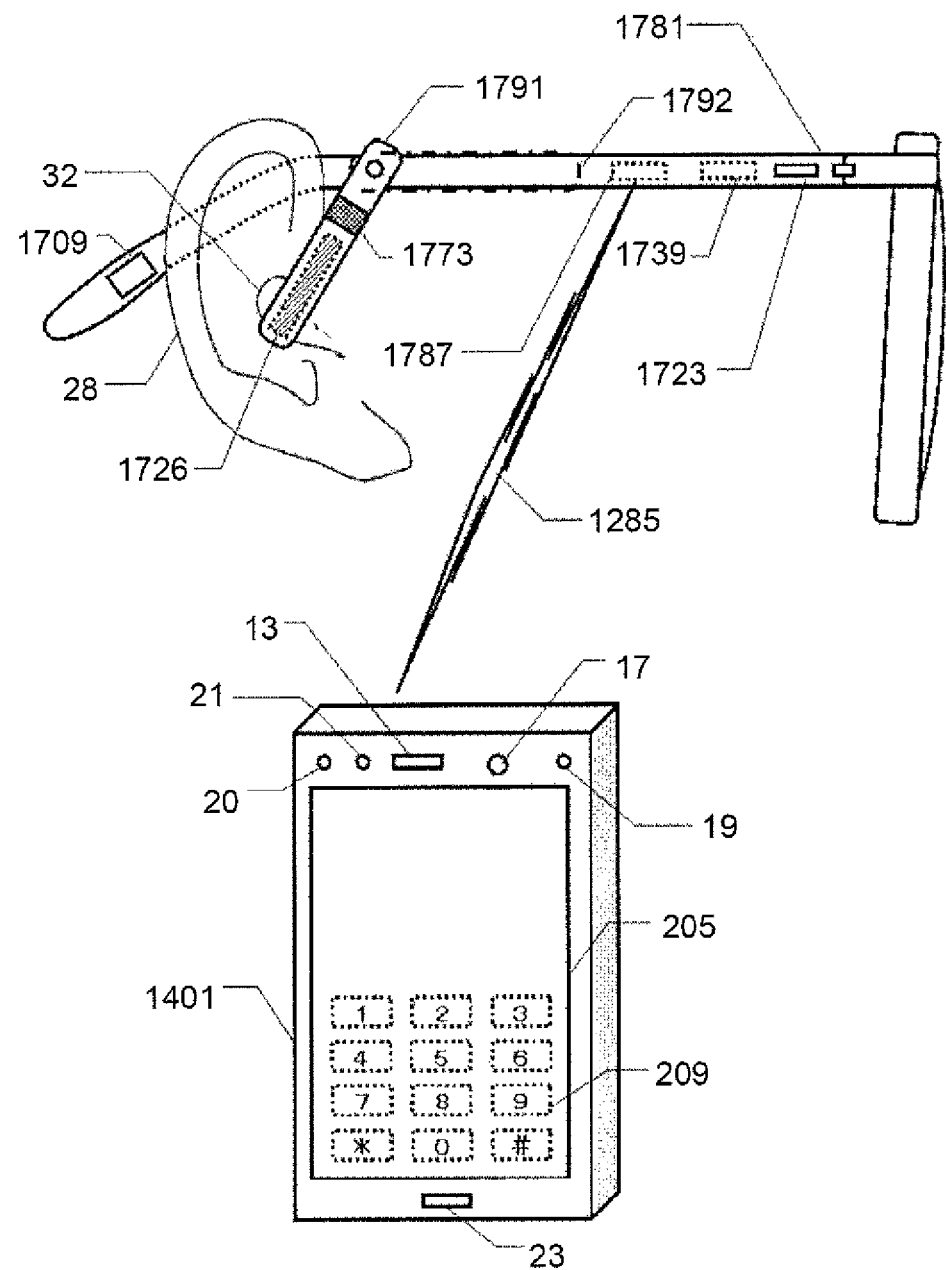
FIG. 32 is a diagram of the system of a nineteenth embodiment according to an aspect of the present invention (nineteenth embodiment)

FIG. 32 is a structural diagram illustrating the system of the nineteenth embodiment according to an aspect of the present invention. The nineteenth embodiment is also configured as an incoming/outgoing-talk unit for a mobile telephone, and together with the mobile telephone 1401 creates a mobile telephone system. In the nineteenth embodiment, as illustrated in FIG. 32, the incoming/outgoing-talk unit is configured as eyeglasses 1781. Because the nineteenth embodiment assumes a system configuration in common with that of the fifteenth embodiment, common parts have been given like reference numerals; in a case in which there is no particular description, that configuration is shared with that of the fifteenth embodiment. Also, in the nineteenth embodiment as well, the mobile telephone 1401 may in some cases have a special configuration to be used in combination with the eyeglasses 1781 creating an incoming/outgoing-talk unit, and may in other cases be configured as a typical mobile telephone having a short-range communication function. In the latter case, the eyeglasses 1781 take on a configuration as an accessory of the mobile telephone 1401, similarly with respect to the fifteenth embodiment.

In the nineteenth embodiment, as illustrated in FIG. 32, a movable unit 1791 is rotatably attached to the temple piece of the eyeglasses 1781; in the state depicted, a cartilage conduction vibration unit 1726 is in contact with the tragus 32 of the right ear 28. The movable unit 1791 can be rotationally withdrawn to a position along the temple of the eyeglasses 1781 as indicated by the single-dotted line 1792 in a case in which same is not to be used. The cartilage conduction vibration unit 1726 can be made to vibrate at low frequency in this withdrawn state as well; it can thereby be known that there is an incoming call when the vibration of the temple of the eyeglasses 1781 is felt on the face. The outgoing-talk unit (microphone) 1723 is arranged at the front portion of the temple of the eyeglasses 1781. The controller 1739, which comprises a power supply unit, is arranged at the portion of the temple on the eyeglasses 1781, and controls the cartilage conduction vibration unit 1726 and the outgoing-talk unit (microphone) 1723. A Bluetooth™ or other type of short-range communication unit 1787, which is capable of wireless communication with the mobile telephone 1401 by radio waves 1285, is further arranged at the portion of the temple on the eyeglasses 1781, sending audio from the user, which is picked up by the outgoing-talk unit (microphone) 1723, to the mobile telephone 1401, and also making it possible to cause the cartilage conduction vibration unit 1726 to vibrate on the basis of the audio information that is received from the mobile telephone 1401. The rear end part of the temple of the eyeglasses 1781 is provided with an incoming/outgoing-talk operation unit 1709. Since the temple of the eyeglasses 1781 is a portion that comes against a bone at the rear of the ear 28 (the mastoid part), it is supported in a backed state, and incoming/outgoing-talk operations, such as pressing on the temple from the front side, can be easily performed without causing the eyeglasses 1781 to deform. The arrangement of each of the aforementioned elements is not to be limited to the description above; all or a part of the elements may be integrated in the movable unit 1791 as appropriate.

The movable unit 1791, having an elastic body 1773 interposed partway therealong, is pushed from the outside and caused to bend when listening comprehension of audio information is impaired by environment noise; the cartilage conduction vibration unit 1726 is then pushed on the tragus 32 with greater pressure, whereby the tragus 32 more readily obstructs the hole of the ear. The ear plug conduction effect, which has also been described in the other embodiments, can thereby be generated, and even louder audio information can thereby be transmitted. Information on one's own voice, which is picked up from the outgoing-talk unit (microphone) 1723, is also subjected to phase inversion on the basis of the mechanical detection of the bent state of the movable unit 1791. The information is then transmitted to the cartilage conduction vibration unit 1726, and one's own voice is canceled out. These are points in common with the fifteenth embodiment.

The block diagrams of FIGS. 28 and 29 can be applied to the nineteenth embodiment by reading "headset" as "eyeglasses." The flow charts of FIGS. 30 and 31 can also be applied to the nineteenth embodiment.

Twentieth Embodiment

Figure 33:
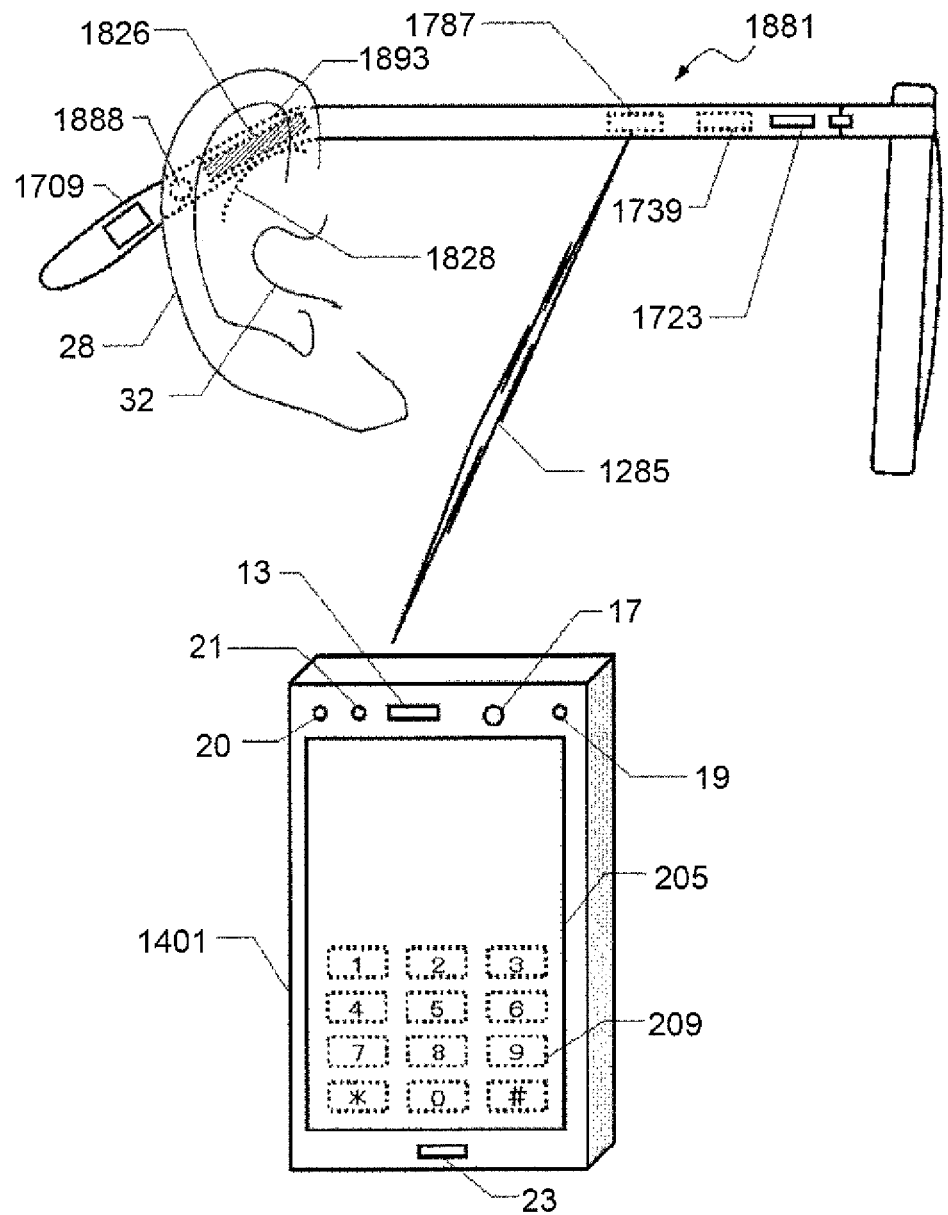
FIG. 33 is a diagram of the system of a twentieth embodiment according to an aspect of the present invention (twentieth embodiment)

FIG. 33 is a diagram of the system of the twentieth embodiment according to an aspect of the present invention. The twentieth embodiment is also configured as an incoming/outgoing-talk unit for a mobile telephone, and together with the mobile telephone 1401 creates a mobile telephone system. The twentieth embodiment takes the configuration of a system in common with that of the nineteenth embodiment in FIG. 32; therefore, portions that are in common have been given like reference numerals, a description thereof being omitted unless there is a particular need. Also similarly with respect to the nineteenth embodiment, the mobile telephone 1401 in the twentieth embodiment as well may in some cases have a special configuration to be used in combination with a pair of eyeglasses 1881 creating an incoming/outgoing-talk unit, and may in other cases be configured as a typical mobile telephone having a short-range communication function. In the latter case, the eyeglasses 1881 take on a configuration as an accessory of the mobile telephone 1401, similarly with respect to the nineteenth embodiment.

A point of difference in the twentieth embodiment from the nineteenth embodiment lies in that the cartilage conduction vibration unit 1826 is provided within an ear-hook unit 1893, by which the temple of the eyeglasses 1881 comes up against the base of the ear 28. As a result thereof, the vibration of the cartilage conduction vibration unit 1826 is transmitted to the outer side 1828 of the cartilage of the base of the ear 28; air conduction sound is generated from the inner wall of the external auditory meatus for transmission to the tympanic membrane via the cartilage around the entrance to the external auditory meatus, and a part is also transmitted directly to the inner ear through the cartilage. The outer side 1828 of the cartilage of the base of the ear 28, against which the temple of the eyeglasses 1881 comes, being close to the inner entrance of the external auditory meatus, is suitable for generating air conduction to the interior of the external auditory meatus from the cartilage around the entrance to the external auditory meatus and for direct conduction to the inner ear through the cartilage.

The ear-hook unit 1893 is further provided with an ear pushing detection unit 1888 at the portion coming up against the rear side of the ear lobe. The ear pushing detection unit 188 mechanically detects the state in which the ear lobe is pushed due to the palm of the hand coming against the ear 28 when there is loud external noise, in order to block same; the controller 1739 transmits this ear pushing detection information to the mobile telephone 1401 from the short-range communication unit 1787. The ear pushing detection unit 1888 can be made of, for example, a switch that is mechanically turned on when pushed by the rear side of the ear lobe. The controller 239 of the mobile telephone 1401 (in the case in which the configuration calls on that of FIG. 28) controls the phase adjustment mixer unit 236 on the basis of the bending detection information received by the short-range communication unit 1446, and determines whether or not to add, to the audio information from the incoming-talk-processing unit 212, the signal of the waveform inverter 240 that is based on one's own voice transmitted from the microphone 1723 to the outgoing-talk-processing unit 222 via the short-range communication unit 1446. A configuration relating to a countermeasure for when the earplug bone conduction effect is generated, similarly with respect to the nineteenth embodiment, can also be configured by calling on FIG. 29.

Twenty-First Embodiment

Figure 34:
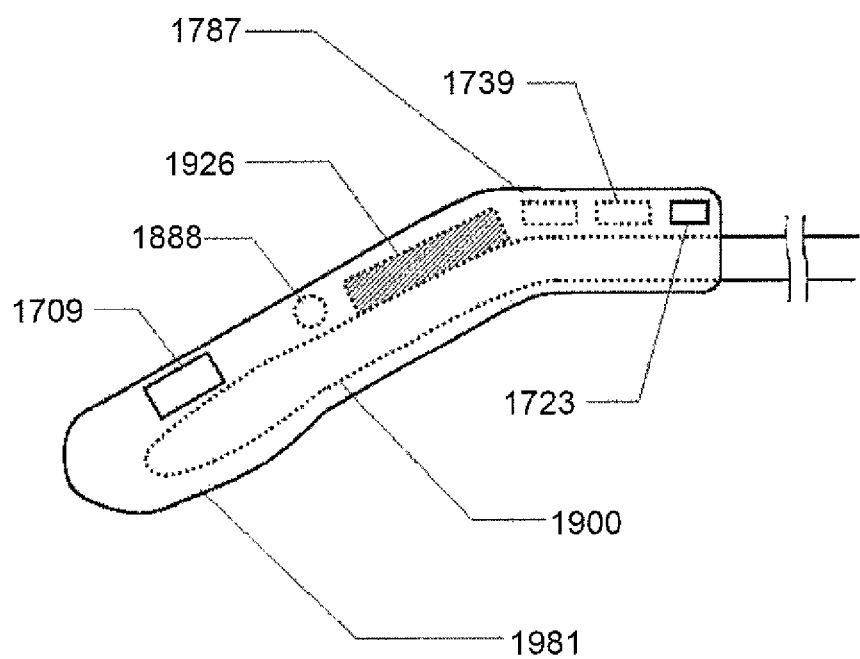
FIG. 34 is a side view of the elements of a twenty-first embodiment according to an aspect of the present invention (twenty-first embodiment)

FIG. 34 is a side view of the elements of the twenty-first embodiment according to an aspect of the present invention. The twenty-first embodiment is also configured as an incoming/outgoing-talk unit for a mobile telephone, and together with the mobile telephone 1401 (not shown) creates a mobile telephone system, similarly with respect to the twentieth embodiment. The twenty-first embodiment takes the configuration of a system analogous to that of the twentieth embodiment in FIG. 33; therefore, portions that are in common have been given like reference numerals, a description thereof being omitted unless there is a particular need. More specifically, a point of difference is that, whereas the incoming/outgoing-talk unit of the twentieth embodiment is configured as specialized eyeglasses, the incoming/outgoing-talk unit of FIG. 34 is configured as an eyeglasses attachment 1981 that can be attached to an ear-hook unit 1900 of the temple of ordinary eyeglasses. The configuration is otherwise consistent with that of the twentieth embodiment in FIG. 33. Also similarly with respect to the twentieth embodiment, the mobile telephone 1401 (not shown) in the twenty-first embodiment may in some cases have a special configuration to be used in combination with the eyeglasses attachment 1981 creating an incoming/outgoing-talk unit, and may in other cases be configured as a typical mobile telephone having a short-range communication function. In the latter case, the eyeglasses attachment 1981 takes on a configuration as an accessory of the mobile telephone 1401, similarly with respect to the twentieth embodiment.

The eyeglasses attachment 1981 is molded as a one-size-fits-all elastic body cover capable of covering the variously sized and/or shaped ear-hook unit 1900; when the ear-hook unit 1900 is inserted from the opening of one end thereof, the cartilage conduction vibration unit 1926 comes into contact with the top side of the ear-hook unit 1900. This contact may be achieved directly or via the coating of the elastic body of the eyeglasses attachment 1981. For this purpose, the elastic body is preferably selected to be of a material having an acoustic impedance that approximates that of ear cartilage. The aforementioned direct or indirect contact transmits the vibration of the cartilage conduction vibration unit 1926 to the ear-hook unit 1900, the vibration thereof then being transmitted to the outer side of the base of the ear 28; therefore, similarly with respect to the twentieth embodiment, air conduction sound is generated from the inner wall of the external auditory meatus for transmission to the tympanic membrane via the cartilage around the entrance to the external auditory meatus, and a part is also transmitted directly to the inner ear through the cartilage.

Each of the outgoing-talk unit (microphone) 1723, the controller 1739, the short-range communication unit 1787, the incoming/outgoing-talk operation unit 1709, and the ear pushing detection unit 1888 provided to the eyeglasses 1881 in the twentieth embodiment is arranged within the eyeglasses attachment 1981 in the twenty-first embodiment in FIG. 34; however, the functions thereof are shared and therefore a description has been omitted. Although not depicted, in a case in which, for example, the ear-hook unit 1900 on the right is covered with the eyeglasses attachment 1981, a dummy cover molded from an elastic body having the same outer shape, material, and weight is provided as an ear-hook unit on the left. Covering the eyeglasses attachment 1981 makes it possible to keep the left-right balance when the eyeglasses are worn. Since the eyeglasses attachment 1981 and the dummy cover are molded using the same elastic body, they can accordingly be configured such that each can be worn as desired as either the left or right ear-hook unit by being slightly deformed. For example, as the inverse of the description above, the left ear-hook unit can be covered with the eyeglasses attachment 1981 and the right ear-hook unit can be covered with the dummy cover. There is accordingly no need to market an assortment of eyeglasses attachments 1981 for either right ear use or left ear use.

Twenty-Second Embodiment

Figure 35:
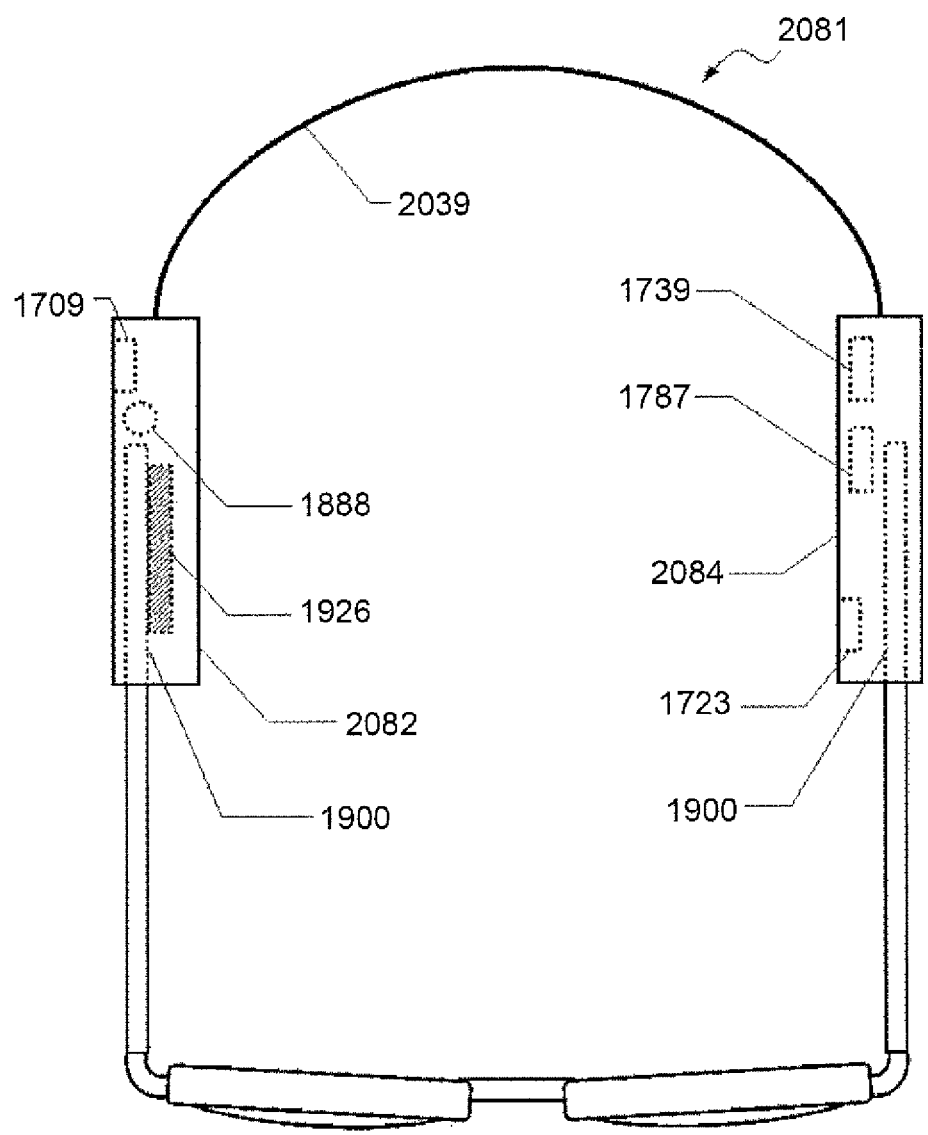
FIG. 35 is a top view of a twenty-second embodiment according to an aspect of the present invention (twenty-second embodiment)

FIG. 35 is a top view of the twenty-second embodiment according to an aspect of the present invention. The twenty-second embodiment is also configured as an incoming/outgoing-talk unit for a mobile telephone, and together with the mobile telephone 1401 (not shown) creates a mobile telephone system, similarly with respect to the twenty-first embodiment. The twenty-second embodiment takes the configuration of a system analogous to that of the twenty-first embodiment in FIG. 34; therefore, portions that are in common have been given like reference numerals, a description thereof being omitted unless there is a particular need. The incoming/outgoing-talk unit of the twenty-second embodiment, similarly with respect to the twenty-first embodiment, is also configured as an eyeglasses attachment 2081 that is molded as a one-size-fits-all elastic body cover capable of covering the variously sized and/or shaped ear-hook unit 1900 in ordinary eyeglasses.

A point of difference in the twenty-second embodiment in FIG. 35 from the twenty-first embodiment in FIG. 34 lies in that each of the constituent elements of the incoming/outgoing-talk unit, which in the twenty-first embodiment are arranged concentratedly in the eyeglasses attachment 1981, one side of which is covered with the ear-hook unit 1900, are distributed in the left and right ear-hook unit 1900. More specifically, the eyeglasses attachment 2081 of the twenty-second embodiment is made of a right-side elastic body cover 2082, a left-side elastic body cover 2084, and a dual-purpose glass-cord cable 2039 for connecting same to be able to communicate via a wire; each of the constituent elements of the incoming/outgoing-talk unit being arranged in a distributed fashion therein. For convenience of description, the elastic body cover 2082 is intended for use on the right ear and the elastic body cover 2084 is intended for use on the left ear, but each of the ear-hook units 1900 can be covered with this pair of elastic body covers in a left-right inversion.

In the aforementioned basic configuration, the cartilage conduction vibration unit 1926, the incoming/outgoing-talk operation unit 1709, and the ear pushing detection unit 1888 are arranged on the right-side elastic body cover 2082. Similarly with respect to the twenty-first embodiment, the vibration of the cartilage conduction vibration unit 1926 is thereby transmitted to the cartilage around the opening of the external auditory meatus via the ear-hook unit 1900. Air conduction sound is generated from the wall inside the external auditory meatus and transmitted to the tympanic membrane, and a part is transmitted directly to the inner ear through the cartilage.

On the other hand, the outgoing-talk unit (microphone) 1723, the controller 1739, and the short-range communication unit 1787 are arranged on the left-side elastic body cover 2084. The dual-use glass-cord cable 2039 has a glass cord design so that the eyeglasses can be hung on the neck when removed, and functions through wiring that connects each of the constituent elements of the incoming/outgoing-talk unit, which are arranged in a distributed fashion in the right-side elastic body cover 2082 and the left-side elastic body cover 2084. Connecting the right-side elastic body cover 2082 and the left-side elastic body cover 2084 using the dual-use glass-cord cable 2039 prevents one side from being misplaced when removed from the eyeglasses.

Twenty-Third Embodiment

Figure 36:
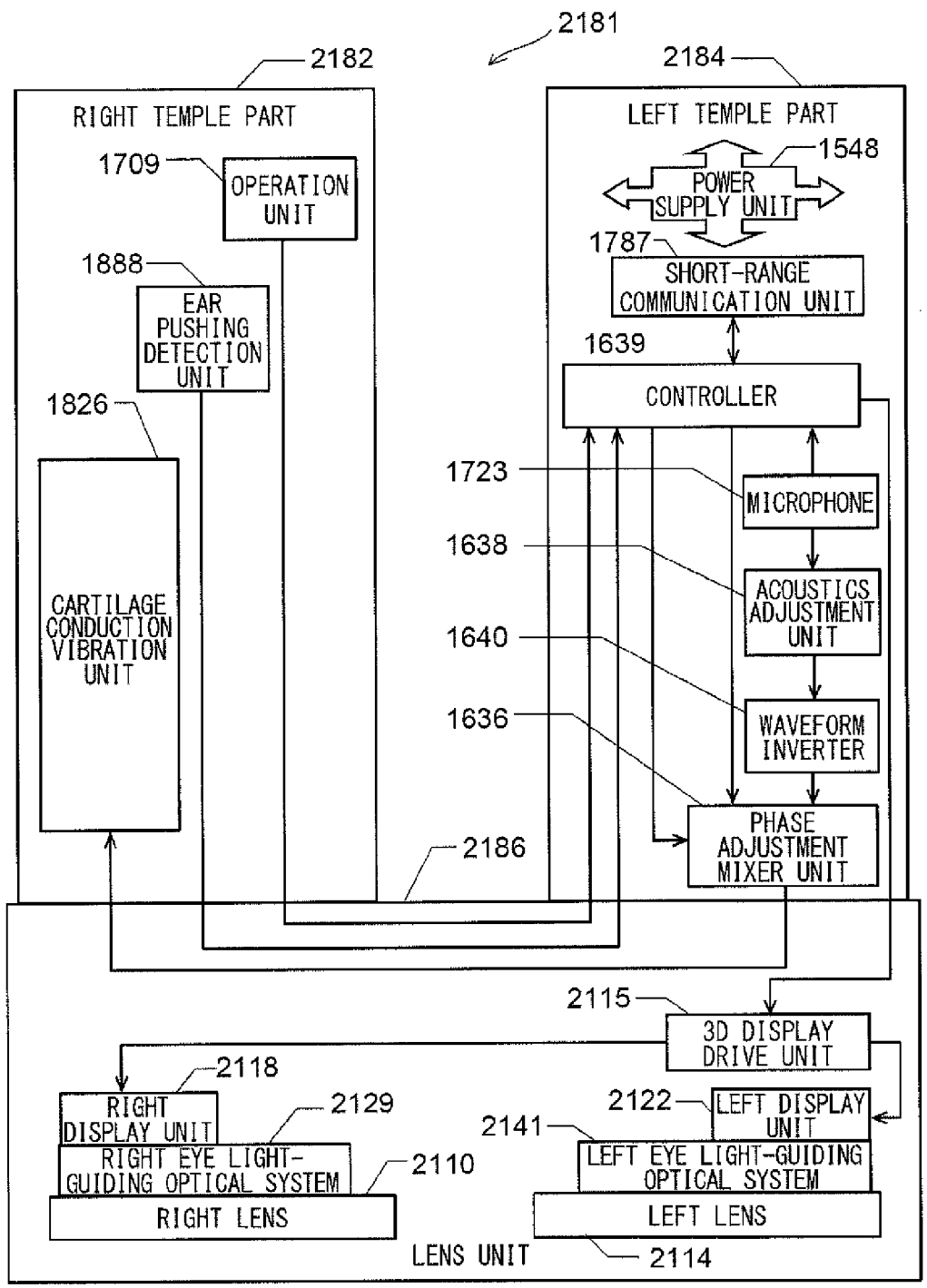
FIG. 36 is a block diagram of a twenty-third embodiment according to an aspect of the present invention (twenty-third embodiment)

FIG. 36 is a block diagram of the twenty-third embodiment according to an aspect of the present invention. The twenty-third embodiment, similarly with respect to either the nineteenth embodiment or the twentieth embodiment, includes eyeglasses 2181 configured as an incoming/outgoing-talk unit for a mobile telephone, and together with the mobile telephone 1401 (not shown) creates a mobile telephone system. Similarly with respect to the twenty-second embodiment, each element constituting the incoming/outgoing-talk unit in the twenty-third embodiment is arranged in a distributed fashion to a right temple unit 2182 and a left temple unit 2184. The individual constituent elements and the functions thereof can be understood in accordance with the block diagram of the seventeenth embodiment in FIG. 29 and that of the top view of the twenty-second embodiment in FIG. 35; therefore, portions that are in common have been given like reference numerals, a description thereof being omitted unless there is a particular need. In the twenty-third embodiment as well, the vibration of the cartilage conduction vibration unit 1826 arranged at the right temple unit 2182 is transmitted to the outer side of the cartilage of the base of the ear 28; this causes the cartilage around the entrance to the external auditory meatus to vibrate, whereby air conduction sound generated from the wall inside the external auditory meatus is transmitted to the tympanic membrane, and a part of the cartilage vibration is directly transmitted to the inner ear through the cartilage.

The twenty-third embodiment in FIG. 36 further has a configuration for visualizing a three-dimensional ("3D") image received from the mobile telephone 1401 in a lens unit 2186. The lens unit 2186 of the eyeglasses 2181 is provided with a right lens 2110 and a left lens 2114 originally intended for eyeglasses, and functions as ordinary eyeglasses. Furthermore, when the short-range communication unit 1787 receives 3D image information from the mobile telephone 1401, the controller 1639 instructs a 3D display drive unit 2115 to display same. The 3D display drive unit 2115, on the basis thereof, causes a right eye image and left eye image to be displayed on a right display unit 2118 and a left display unit 2122, respectively. These images are imaged on the retinas of the right eye and the left eye by a right eye light-guiding optical system 2129 and a left eye light-guiding optical system 2141, which comprise an imaging lens, a half mirror, and other components; and it will be possible to appreciate the 3D image in an aesthetic sense. This 3D image is viewed in a form that is synthesized with or superimposed on a raw image that enters the retinas from the right lens 2110 and the left lens 2114.

Twenty-Fourth Embodiment

Figure 37:
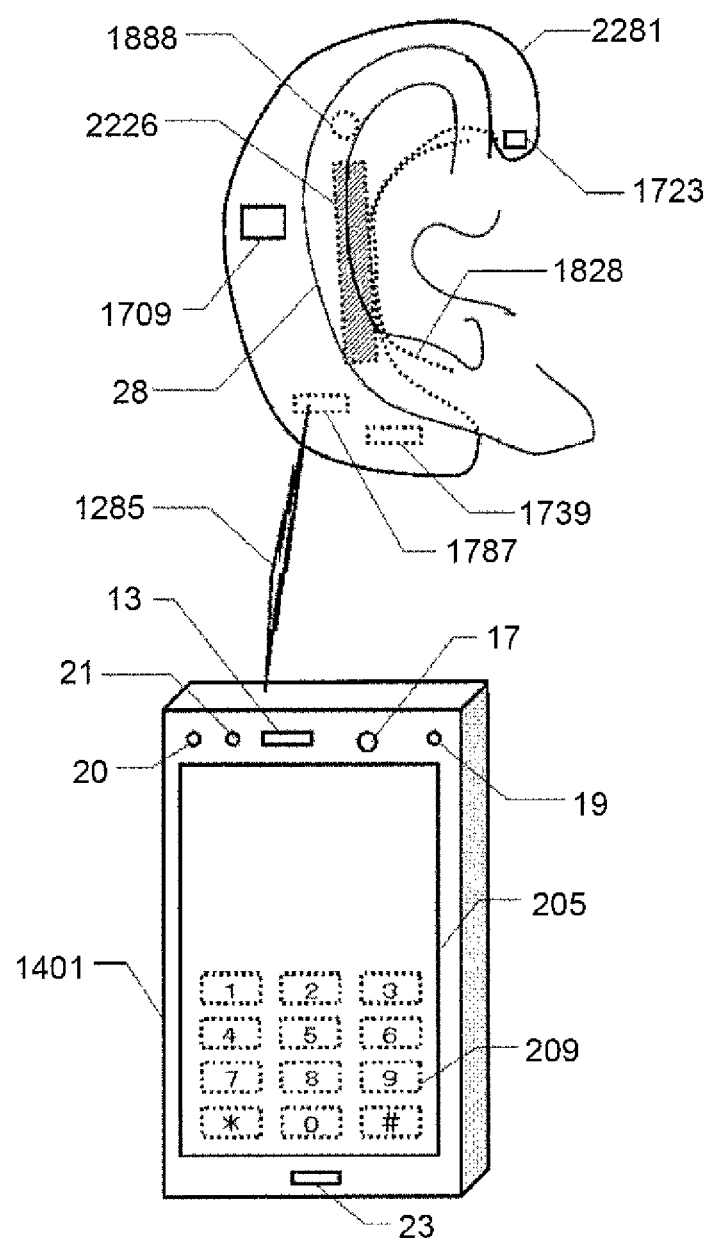
FIG. 37 is a diagram of the system of a twenty-fourth embodiment according to an aspect of the present invention (twenty-fourth embodiment)

FIG. 37 is a diagram of the system of the twenty-fourth embodiment according to an aspect of the present invention. The twenty-fourth embodiment is also configured as an incoming/outgoing-talk unit for a mobile telephone, and together with the mobile telephone 1401 creates a mobile telephone system. The incoming/outgoing-talk unit of the twenty-fourth embodiment, although being configured as a ear-hook unit 2281 used for hearing aids or the like, otherwise takes the configuration of a system in common with that of the twentieth embodiment in FIG. 33; therefore, portions that are in common have been given like reference numerals, a description thereof being omitted unless there is a particular need. Also similarly with respect to the twentieth embodiment, the mobile telephone 1401 in the twenty-fourth embodiment may in some cases have a special configuration to be used in combination with the ear-hook unit 2281 creating an incoming/outgoing-talk unit, and may in other cases be configured as a typical mobile telephone having a short-range communication function. In the latter case, the ear-hook unit 2281 takes on a configuration as an accessory of the mobile telephone 1401, similarly with respect to the twentieth embodiment.

In the twenty-fourth embodiment, the cartilage conduction vibration unit 2226 is arranged at a position coming up against the rear part of the outer side 1828 of the cartilage of the base of the ear 28. As a result thereof, similarly with respect to the twentieth embodiment, the vibration of the cartilage conduction vibration unit 2226 is transmitted to the outer side 1828 of the cartilage of the base of the ear 28; air conduction sound is generated from the inner wall of the external auditory meatus for transmission to the tympanic membrane via the cartilage around the entrance to the external auditory meatus, and a part is also transmitted directly to the inner ear through the cartilage. The outer side 1828 of the cartilage of the base of the ear 28, being close to the inner entrance of the external auditory meatus thereof, is suitable for generating air conduction to the interior of the external auditory meatus from the cartilage around the entrance to the external auditory meatus and for direct conduction to the inner ear through the cartilage. However, in the case in which the incoming/outgoing-talk unit is configured as an ear-hook unit 2281, as in the twenty-fourth embodiment, there is a great degree of freedom in the arrangement of the cartilage conduction vibration unit 2226 for making contact with the outer side 1828 of the cartilage of the base of the ear 28; therefore, the cartilage conduction vibration unit 2226 can be arranged at an optimum position, taking into consideration the mounting layout and vibration conduction effect for the structure of the incoming/outgoing-talk unit. Accordingly, similarly with respect to the twentieth embodiment, in the twenty-fourth embodiment there may also be employed an arrangement by which the cartilage conduction vibration unit 2226 comes up against the upper part of the outer side 1828 of the cartilage of the base of the ear 28.

The ear-hook unit 2281, similarly with respect to the case of the eyeglasses 1881 in the twentieth embodiment, is provided with an outgoing-talk unit (microphone) 1723, a controller 1739, a short-range communication unit 1787, an incoming/outgoing-talk operation unit 1709, and an ear pushing detection unit 1888, the associated functions being consistent therewith and an attendant description accordingly being omitted. In the case of the ear-hook unit 2281 of the twenty-fourth embodiment, the outgoing-talk unit (microphone) 1723 is arranged frontwardly with respect to the ear.

Twenty-Fifth Embodiment

Figure 38:
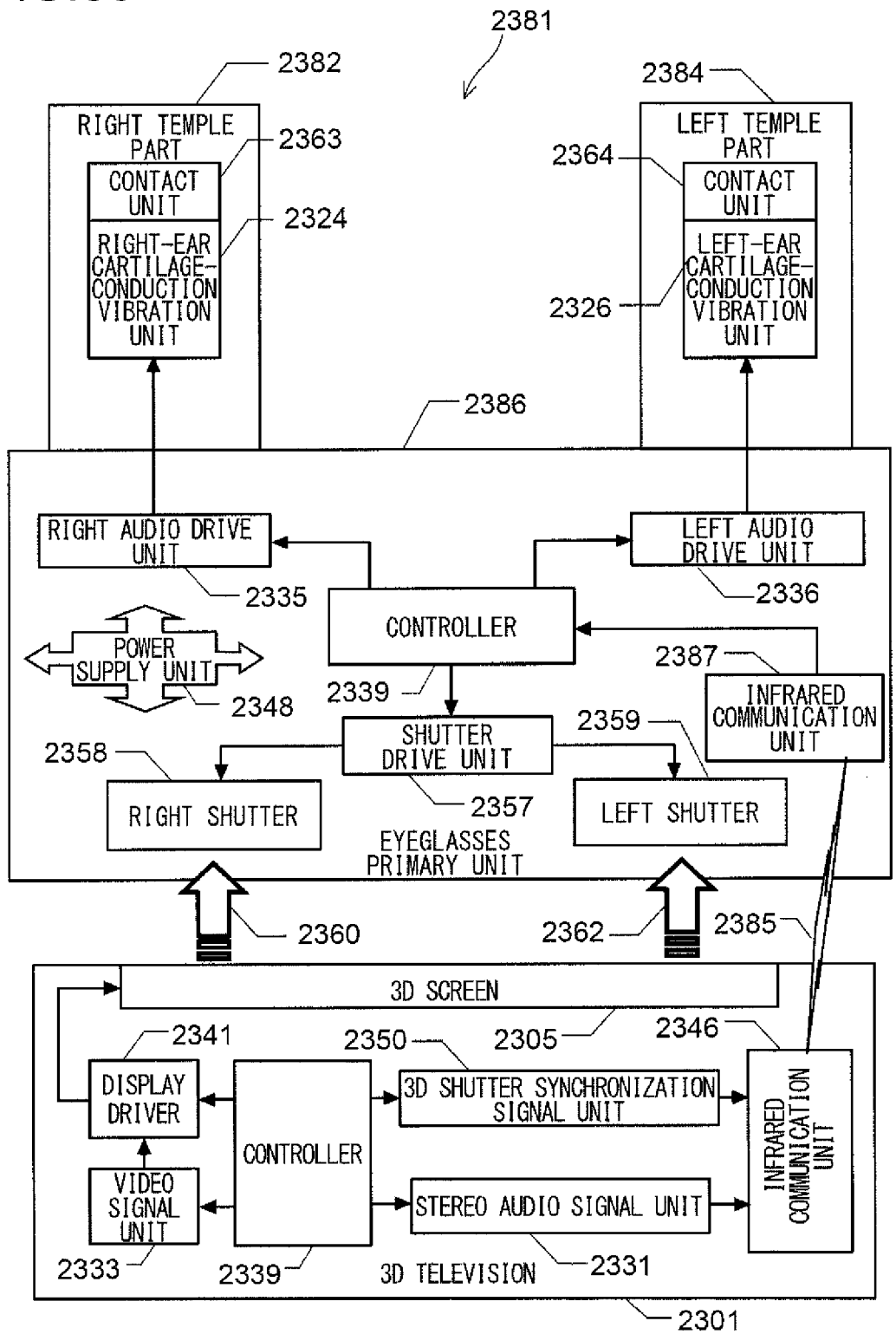
FIG. 38 is block diagram of a twenty-fifth embodiment according to an aspect of the present invention (twenty-fifth embodiment)

FIG. 38 is block diagram of the twenty-fifth embodiment according to an aspect of the present invention. The twenty-fifth embodiment is consistent with the twentieth to twenty-third embodiments in that the cartilage conduction vibration units 2324 and 2326 are arranged at the ear-fitting parts of the temples of an eyeglasses-type device and in that the vibration is transmitted to the outer side of the cartilage of the base of the ear 28; however, this embodiment is configured not as an incoming/outgoing-talk unit of a mobile telephone but rather as 3D television viewing eyeglasses 2381, and together with a 3D television 2301 creates a 3D television viewing system. The twenty-fifth embodiment makes it possible to experience stereo audio information; the vibration of a right-ear cartilage-conduction vibration unit 2324 arranged at the right temple unit 2382 is transmitted to the outer side of the cartilage of the base of the right ear via a contact unit 2363, and causes the cartilage around the entrance to the external auditory meatus to vibrate, air conduction sound that is thereby generated from the wall inside the external auditory meatus being transmitted to the right tympanic drum, and a part of the cartilage conduction being transmitted directly to the inner ear through the cartilage. Similarly, the vibration of a left-ear cartilage-conduction vibration unit 2326 arranged at the left temple unit 2384 is transmitted to the outer side of the cartilage of the base of the left ear via a contact unit 2364, and causes the cartilage around the entrance to the external auditory meatus to vibrate, whereby air conduction sound that is generated from the wall inside the external auditory meatus is transmitted to the left tympanic drum, and a part of the cartilage conduction is transmitted directly to the inner ear through the cartilage.

The viewing eyeglasses 2381 are configured to be wearable over ordinary eyeglasses by any person wearing the same; in this case, the vibrations of the right-ear cartilage-conduction vibration unit 2324 and the left-ear cartilage-conduction vibration unit 2326 are respectively transmitted to the cartilage of the base of the left and right ears, which are in direct contact therewith via the contact units 2363 and 2364, and are also respectively transmitted to the ear-hook units of the left and right temples of the ordinary eyeglasses and indirectly transmitted to the cartilage of the base of the ear via the ear-hook units. The contact units 2363 and 2364 are configured in a shape such that cartilage conduction appropriate for the cartilage of the base of the ear is generated, both in a case in which a person without eyeglasses wears the viewing eyeglasses 2381 and in a case in which they are worn over ordinary eyeglasses. A description thereof will be provided further below.

The 3D television 2301 generates an audio signal from a stereo audio signal unit 2331 on the basis of the control of the controller 2339; an infrared communication unit 2346 transmits this audio signal to an infrared communication unit 2387 of the viewing eyeglasses 2381 using infrared rays 2385. The controller 2339 of the viewing eyeglasses 2381 outputs a left and a right audio signal from a right audio drive unit 2335 and a left audio drive unit 2336 on the basis of the received audio signal, and causes the right-ear cartilage-conduction vibration unit 2324 and the left-ear cartilage-conduction vibration unit 2326 to vibrate. The aforementioned infrared communication unit 2387, the controller 2339, the right audio drive unit 2335, the left audio drive unit 2336, as well as a shutter drive unit 2357, a right shutter 2358 and a left shutter 2359 (to be described later), together with a power supply unit 2348, are arranged on an eyeglasses primary unit 2386.

On the other hand, the 3D television 2301 sends a video signal of a video signal unit 2333 to a display driver 2341 on the basis of the control of the controller 2339, and displays a 3D image on a 3D screen 2305 comprising a liquid crystal display unit or the like. The controller 2339 further synchronizes with the 3D image display to generate a synchronization signal from a 3D shutter synchronization signal unit 2350, and the infrared communication unit 2346 transmits this synchronization signal to the infrared communication unit 2387 of the viewing eyeglasses 2381 using the infrared rays 2385. The controller 2339 of the viewing eyeglasses 2381 controls the shutter drive unit 2357 on the basis of the received synchronization signal, and opens the right shutter 2358 and the left shutter 2359 in alternation. A right eye image 2360 and a left eye image 2362, which are displayed in alternation on the 3D screen 2305, are thereby made to be incident on the right eye and the left eye in synchronization. In the twenty-fifth embodiment, the stereo audio signal for driving the cartilage conduction vibration unit and the 3D shutter synchronization signal are thus transmitted by the infrared communication between the infrared communication units 2346 and 2387. These two signals are sent in parallel by either time division or by synthesis. The communication therebetween is not to be limited to communication by infrared rays, but rather may be achieved using short-range wireless communication, as in other embodiments.

Figure 39A:
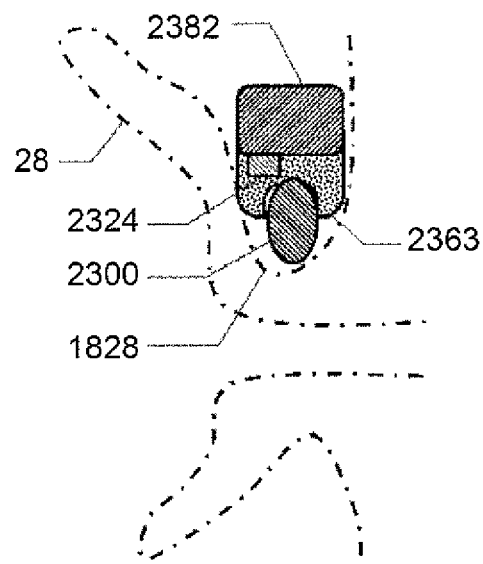
FIG. 39 is a cross-sectional view of the elements of the twenty-fifth embodiment.
Figure 39B:
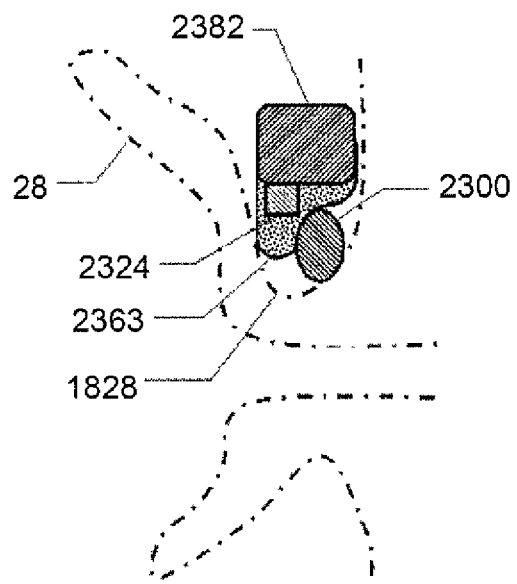

FIG. 39 is a cross-sectional view of the elements of the aforementioned twenty-fifth embodiment; the cross-section of the right temple unit 2382 is illustrated in a state in which the viewing eyeglasses 2381 have been worn since the ordinary eyeglasses were put on. FIG. 39A is a cross-section of the right temple unit 2382 relating to the twenty-fifth embodiment, and FIG. 39B illustrates a cross-section of a modification example thereof. First, a description of FIG. 39A shall be provided. A contact unit 2363 is provided to the portion of the bottom of the right temple unit 2382 that is worn on the ear 28. This contact unit 2363 comprises an elastic body having an acoustic impedance approximating that of ear cartilage, and the right-ear cartilage-conduction vibration unit 2324 is held in the right temple unit 2382 configured so as to be enveloped therein. The cross-section of the contact unit 2363, as is clear from FIG. 39A, is provided with a groove into which the ear-hook unit 2300 of the ordinary eyeglasses is to be fitted. The right temple unit 2382 of the viewing eyeglasses 2381 achieves reliable contact with the ear-hook unit 2300 of the temple of the ordinary eyeglasses, and the elasticity of the contact unit 2363 prevents the contacted portions of the right temple unit 2382 and the ear-hook unit 2300 from buzzing due to vibration. In the state of FIG. 39A, the vibration of the right-ear cartilage-conduction vibration unit 2324 is transmitted to the outer side 1828 of the cartilage of the base of the right ear 28, in direct contact therewith via the contact unit 2363, and is also transmitted to the ear-hook unit 2300 of the right temple of the ordinary eyeglasses, and indirectly transmitted to the outer side 1828 of the cartilage of the base of the ear 28 via this ear-hook unit 2300.

On the other hand, in a case in which a person without eyeglasses wears the viewing eyeglasses 2381 directly, the entire contact unit 2363 is in direct contact with the outer side 1828 of the cartilage of the base of the right ear 28, and transmits the vibration of the right-ear cartilage-conduction vibration unit 2324 thereto. The outer side of the contact unit 2363 is beveled, and therefore the right temple unit 2382 will fit to the ear 28 without discomfort even in this case.

Next, in a modification example in FIG. 39B, as is clear from the cross-sectional view thereof, a contact unit 2363 is provided to the portion of the bottom of the right temple unit 2382 that is worn on the ear 28, similarly with respect to FIG. 39A. Also similarly with respect to FIG. 39A, the contact unit 2363 comprises an elastic body having an acoustic impedance approximating that of ear cartilage, and the right-ear cartilage-conduction vibration unit 2324 is held at the right temple unit 2382 configured so as to be enveloped therein. As is clear from FIG. 39B, the cross-sectional shape of the contact unit 2363 is different in the modification example, a concave slope being provided instead of the groove; the right temple unit 2382 of the viewing eyeglasses 2381 thereby achieves reliable contact with the outer side of the ear-fitting part 2300 of the temple of the ordinary eyeglasses so as to be hooked on the ear 28, and the elasticity of the contact unit 2363 prevents the contact portions of the right temple unit 2382 and the ear-hook unit 2300 from buzzing due to vibration. In the state of FIG. 39B, the vibration of the right-ear cartilage-conduction vibration unit 2324 is transmitted to the outer side 1828 of the cartilage of the base of the right ear 28, in direct contact therewith via the contact unit 2363, and is also transmitted to the ear-hook unit 2300 of the right temple of the ordinary eyeglasses, and indirectly transmitted to the outer side 1828 of the cartilage of the base of the ear 28 via this ear-hook unit 2300.

On the other hand, in a case in which a person without eyeglasses wears the viewing eyeglasses 2381, the entire contact unit 2363 is in direct contact with the outer side 1828 of the cartilage of the base of the right ear 28, and transmits the vibration of the right ear conduction vibration unit 2324 thereto. The outer side of the contact unit 2363 is also beveled in the case of the modification example in FIG. 39B; the right temple unit 2382 is fitted to the ear 28 without discomfort even in a case in which the viewing eyeglasses 2381 are worn directly. As is clear from FIG. 39B, it is the contact with the ear cartilage of the bottom or the outer side of the temple of the eyeglasses that is essential in cartilage conduction, and not with the facial cartilage at the inner side of the temple of the eyeglasses; the shape of the contact unit is determined to meet this purpose.

As described above, in the twentieth to twenty-fifth embodiments, the vibration of the cartilage conduction vibration unit 2324 is transmitted to the outer side of the cartilage of the base of the ear. This causes the cartilage around the entrance to the external auditory meatus to vibrate, whereby air conduction sound that is generated from the wall inside the external auditory meatus is transmitted to the tympanic membrane, and a part of the cartilage conduction is directly transmitted to the right inner ear through the cartilage. Favorable conduction by contact with the outer side of the ear cartilage can accordingly be achieved merely by wearing the eyeglasses in an ordinary state. By contrast, in a case using conventional bone conduction, the bone at the front or the rear of the ear must be tightly tucked in by the portion of the inner side of the temple of the eyeglasses, which results in pain and renders long-term usage unbearable. The present invention does not have such a problem, it being possible to listen comfortably to audio information while experiencing a sensation similar to that of ordinary eyeglasses.

The various features of each of the embodiments described above are not to be restricted to individual embodiments, but rather can be substituted or combined with other appropriate embodiments. For example, in the description of the twenty-first embodiment in FIG. 34, the ear-hook unit of the other temple is covered with a dummy cover, but the configuration of FIG. 34 can be prepared as a pair; when the ear-hook units of the left and right temples are made to be each covered, it becomes possible to listen to stereo audio signals as in the twenty-fifth embodiment of FIG. 38. The two ear-hook units can also be connected by wireless connection at this time, but a connection by the dual-use glass-cord cable as in the twenty-second embodiment of FIG. 35 is also possible. Regarding the feature of the glass cord, a link between the configuration of FIG. 34 and the dummy cover in the twenty-first embodiment may be made with a glass cord, thus preventing misplacement. Regarding the aforementioned feature of achieving a stereo effect, when the twenty-third embodiment of FIG. 36 is also configured such that the constituent elements are not divided into left and right similarly with respect to the description above, but rather two sets of the required constituent elements are prepared and each is positioned at the left and right temple units, it becomes possible not only to make an image into 3D but also to listen to stereo audio signals, as in the twenty-fifth embodiment of FIG. 38. Referring to the twenty-fifth embodiment, a part the left-right configuration at this time can be shared as appropriate (for example, at least the controller and the power supply).

In the aforementioned embodiments, the effects of the present invention have been described by way of example using a mobile telephone and an incoming/outgoing-talk unit thereof or 3D video viewing eyeglasses. However, the advantages of the present invention are not to be limited thereto; the invention can be implemented in other applications. For example, the various features of the present invention described above would also be effective when implemented in a hearing aid.

Figure 40:
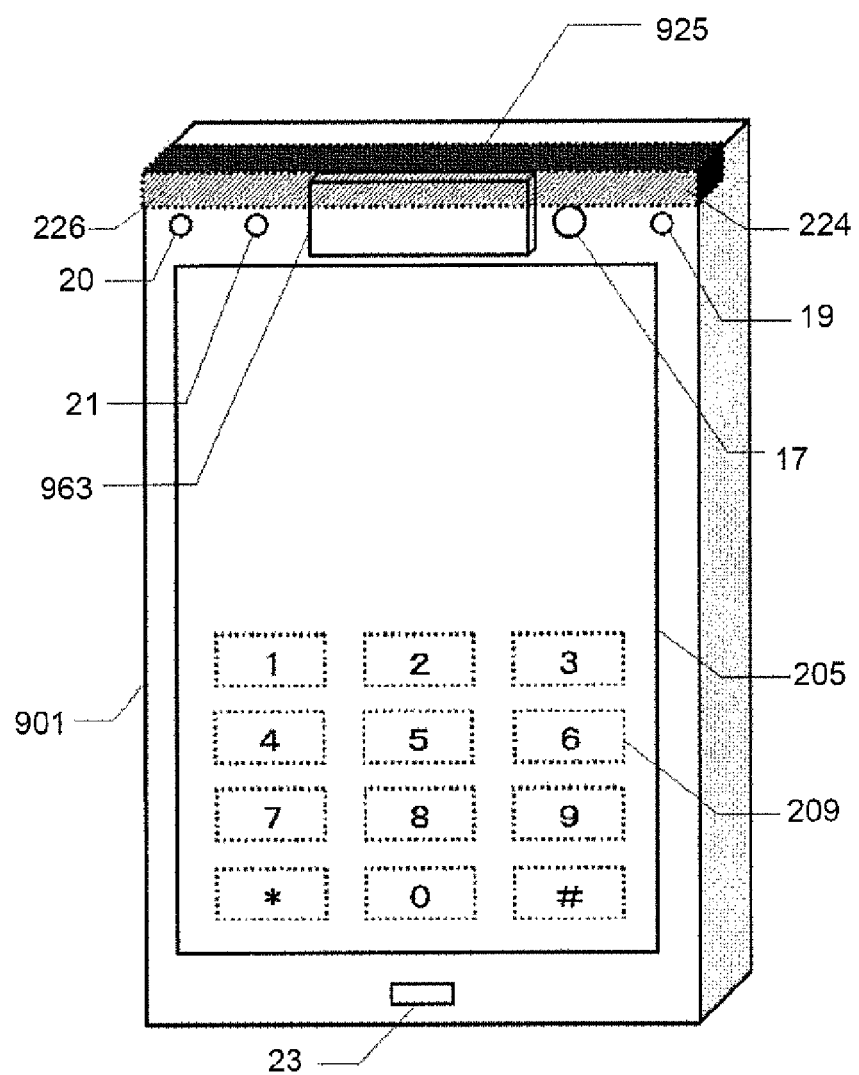
FIG. 40 is a perspective view illustrating a modification example of the tenth embodiment in FIG. 19.

The various features of each of the embodiments described above are not to be limited to the individual embodiments; rather, wherever it is possible to benefit from the feature of an embodiment, same may be variously implemented in an embodiment in which the feature has been modified. For example, FIG. 40 is a perspective view illustrating a modification example of the tenth embodiment in FIG. 19. In this modification example as well, similarly with respect to FIG. 19, the cartilage conduction vibration source 925, which comprises a piezoelectric bimorph element or the like, serves as the cartilage conduction vibration source, while also taking the role of a drive source of the incoming-talk unit for generating sound waves that are transmitted to the tympanic membrane by air conduction. However, the cartilage conduction vibration source 925 stretches to the side of the mobile telephone 901 in the modification example of FIG. 40, the right end 224 and left end 226 thereof being made to vibrate. Sound can accordingly be heard by cartilage conduction due to either one thereof being caused to contact the tragus, similarly with respect to the nineteenth embodiment. The cartilage conduction vibration source 925 vibrates as a whole, rather than vibrating at only the right end 224 and left end 226 thereof. Audio information can accordingly be transmitted regardless of where on the top inner edge of the mobile telephone 901 contact with the ear cartilage is made, similarly with respect to FIG. 19. Also, a point of similarity with FIG.

19 lies in that the cartilage conduction output unit 963, which is made of a material having an acoustic impedance approximating that of ear cartilage, is arranged frontwardly with respect to the cartilage conduction vibration source 925.

The following is a possible modification example for the twenty-third embodiment of FIG. 36. Namely, the outgoing-talk unit (microphone) 1723 in the twenty-third embodiment is an ordinary air conduction microphone, but when the outgoing-talk unit (microphone) 1723 is instead a bone conduction microphone (a microphone or pickup of the bone conduction contact type), it becomes possible to selectively pick up the audio of the speaking party without picking up any undesired sound when in the presence of noise. It further becomes possible to speak in an undertone that will not disturb the surroundings. It is natural that the temples of eyeglasses are generally in contact with the bone at the front of the ear (the zygomatic arch, or a part of the temporal bone on the zygomatic arch) or the bone at the rear of the ear (the mastoid process of the temporal bone). Accordingly, calling on FIG. 36, arranging the outgoing-talk unit (microphone) 1723, which is constituted of a microphone of the bone conduction contact type, at the contact unit with the aforementioned bones in the left temple unit 2184 of the eyeglasses makes it possible to pick up the audio of the speaking party by bone conduction. Dividing the cartilage conduction vibration unit 1826 and the outgoing-talk unit (microphone) 1723, constituted of a microphone of the bone conduction contact type, to the left and right temple units 2182 and 2184, as in FIG. 36, makes it possible to prevent the microphone of the bone conduction contact type from picking up the vibration from the cartilage conduction vibration unit 1826.

In the twenty-third embodiment of FIG. 36 or a modification example as described above, it is also possible to omit the configuration related to 3D display from the lens unit 2186 and to make an ordinary eyeglasses configuration with only the right lens 2110 and left lens 2114.

On the other hand, the following is another possible modification example, for the twenty-fifth embodiment of FIG. 38. Specifically, since the twenty-fifth embodiment is configured as the viewing eyeglasses 2381, the sound source of the stereo audio information resides in the 3D television 2301, and the right-ear cartilage-conduction vibration unit 2324 and the left-ear cartilage-conduction vibration unit 2326 are made to vibrate on the basis of the audio signal received by the infrared communication unit 2387. However, when the configuration is instead such that a stereo audio signal unit serving as the sound source unit of the stereo audio information, and an audio memory for providing data thereto, are housed in the eyeglasses primary unit 2386 or one of the right temple unit 2382 and the left temple unit 2384 of FIG. 38, or are divided and then housed in both, then the present invention can be configured as an independent portable music player. Calling on FIG. 38 to facilitate understanding of the configuration of such a modification example, the aforementioned stereo audio signal unit and audio memory for providing data thereto are to be included in the controller 2339. In the case of this modification example, there is no need for a link with the 3D television 2301; therefore, instead of the right shutter 2358, the left shutter 2359, and the shutter drive unit 2357 in FIG. 38, a right lens and left lens of ordinary eyeglasses such as in the twenty-third embodiment of FIG. 36 are arranged on the eyeglasses primary unit 2386.

In the case of the above-described modification example in which the right lens and left lens are arranged at the eyeglasses primary unit 2386 to make ordinary eyeglasses, the controller, the audio drive unit, the infrared communication units, the power supply unit, and the other respective constituent elements arranged at the eyeglasses primary unit 2386 in FIG. 38 may be divided and arranged at the right temple unit and the left temple unit as appropriate, as in the twenty-third embodiment of FIG. 36, thereby preventing any increase in the size of the eyeglasses primary unit 2386.

The infrared communication unit 2387 in the modification example is responsible for functions such as inputting sound source data from a PC or other external sound source data holding device. Using a handheld remote control or the like, the infrared communication unit 2387 can be made to function as a wireless communication unit for adjusting the volume from the right-ear cartilage-conduction vibration unit 2324 and the left-ear cartilage-conduction vibration unit 2326, or for adjusting the balance of the left and right vibration output. It is furthermore possible to receive the audio information of a mobile telephone when the portable music player is linked to the mobile telephone. In such a case, when the portable music player is provided with an air conduction microphone or a bone conduction microphone, the portable music player can be made to function as a device of the mobile telephone used for incoming talk or outgoing talk made with an external party.

The above-described innovative arrangement of the constituent elements to the eyeglasses primary unit 2386 and to the right temple unit 2382 and left temple unit 2384 is not to be limited to the aforementioned modification example. For example, the controller 2339, the infrared communication unit 2387, the power supply unit 2348, the right audio drive unit 2335, and the left audio drive unit 2336 may also be divided and arranged in the right temple unit 2382 and the left temple unit 2384 as appropriate in the case of the actual viewing eyeglasses 2381 in the twenty-fifth embodiment of FIG. 38.

Twenty-Sixth Embodiment

Figure 41:
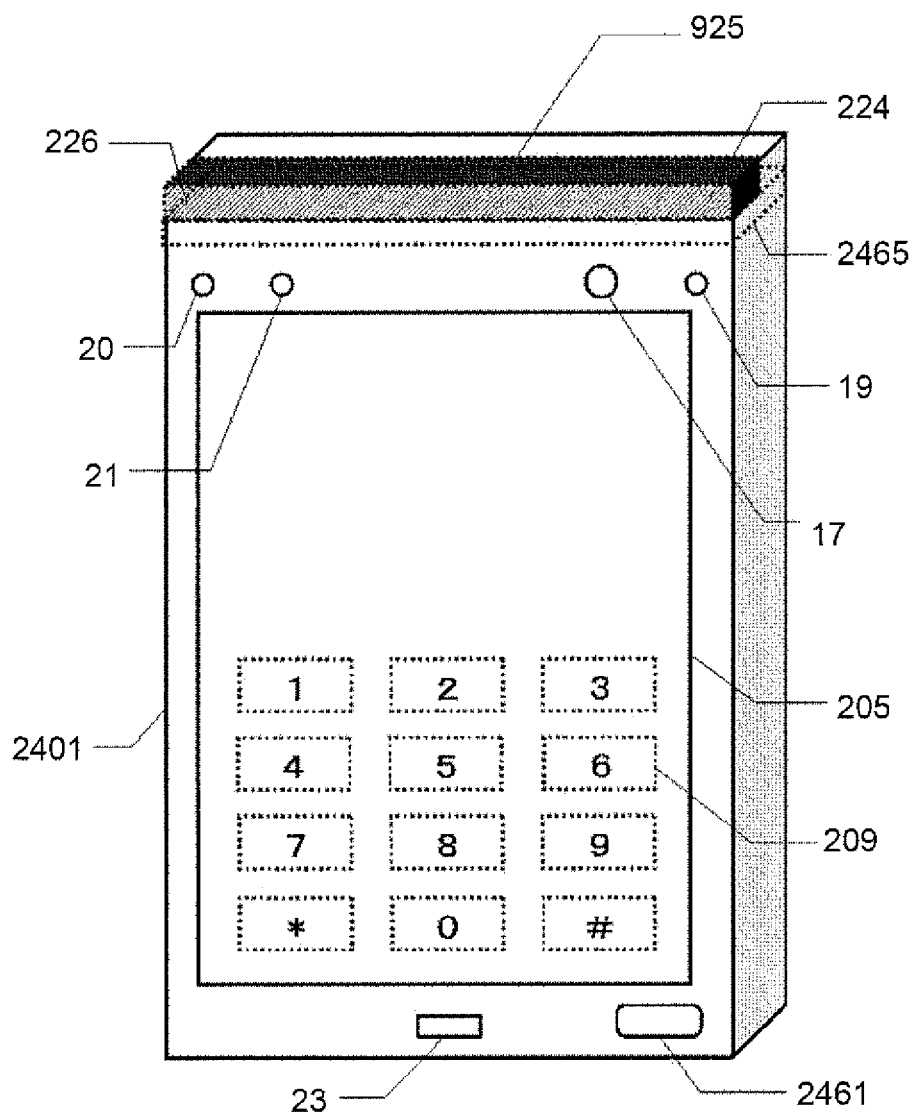
FIG. 41 is a perspective view of a twenty-sixth embodiment according to an aspect of the present invention (twenty-sixth embodiment)

FIG. 41 is a perspective view of the twenty-sixth embodiment according to an aspect of the present invention, and is configured as a mobile telephone. A mobile telephone 2401 of the twenty-sixth embodiment, similarly with respect to that of the modification example of the tenth embodiment depicted in FIG. 40, is an integrated type with no moving parts, and is configured as a "smartphone", which has the large-screen display unit 205 provided with GUI functions. There is much in common with the structure thereof, and so corresponding portions have been given like reference numerals as in FIG. 40, and a description has been omitted. Similarly with respect to the tenth embodiment and the modification example thereof, "upper part" in the twenty-sixth embodiment also does not signify a separated upper part but rather signifies the portion at the top of the integrated structure.

A point of difference in the twenty-sixth embodiment from the modification example of the tenth embodiment illustrated in FIG. 40 lies in that the vibration of the cartilage conduction vibration source 925 has a dual purpose as a vibration source for creating a feedback sensation for a touch operation in the touch panel function of the large-screen display unit 205. More specifically, a vibration isolation material 2465 made of a vinyl system, a urethane system, or another system is provided between the cartilage conduction vibration source 925 and the configuration located therebelow (the large-screen display unit 205), the configuration being such that an audio signal from the cartilage conduction is prevented from being likely to be transmitted to the large-screen display unit 205 or the like, due to the difference in acoustic impedance or the like. On the other hand, when the large-screen display unit 205 is touched and any type of input from the touch panel function thereof is thereby accepted, the cartilage conduction vibration source 925 is made to vibrate at a low frequency at or below the audible range, in order to provide feedback to the finger that has touched the same. The vibration frequency is selected to be a frequency that substantially matches the resonance frequency of the vibration isolation material 2465; therefore, the vibration isolation material 2465 resonates due to the vibration of the cartilage conduction vibration source 925, which vibration is then transmitted to the large-screen display unit 205. The vibration isolation material 2465, which prevents vibration in the audio region, thus functions as a vibration transmission material for low-frequency vibration for feedback. Low-frequency vibration can thereby be transmitted to the finger that touched the large-screen display unit 205, and it can be known that the touch input has been accepted. To prevent conflation of the impact of the touch operation itself with the feedback vibration in response thereto, the cartilage conduction vibration source 925 is provided with a predetermined delay from the moment of touch, and is made to provide the feedback vibration after the touch impact has settled.

The twenty-sixth embodiment is provided with an operation button 2461, which is used for operations such as turning the touch panel function of the large-screen display unit 205 on and off. Also, for the sake of simplifying the drawings, the configuration of the twenty-sixth embodiment omits the cartilage conduction output unit 963, which has been provided to the modification example of the tenth embodiment illustrated in FIG. 40; however, same can be provided as desired.

Figure 42:
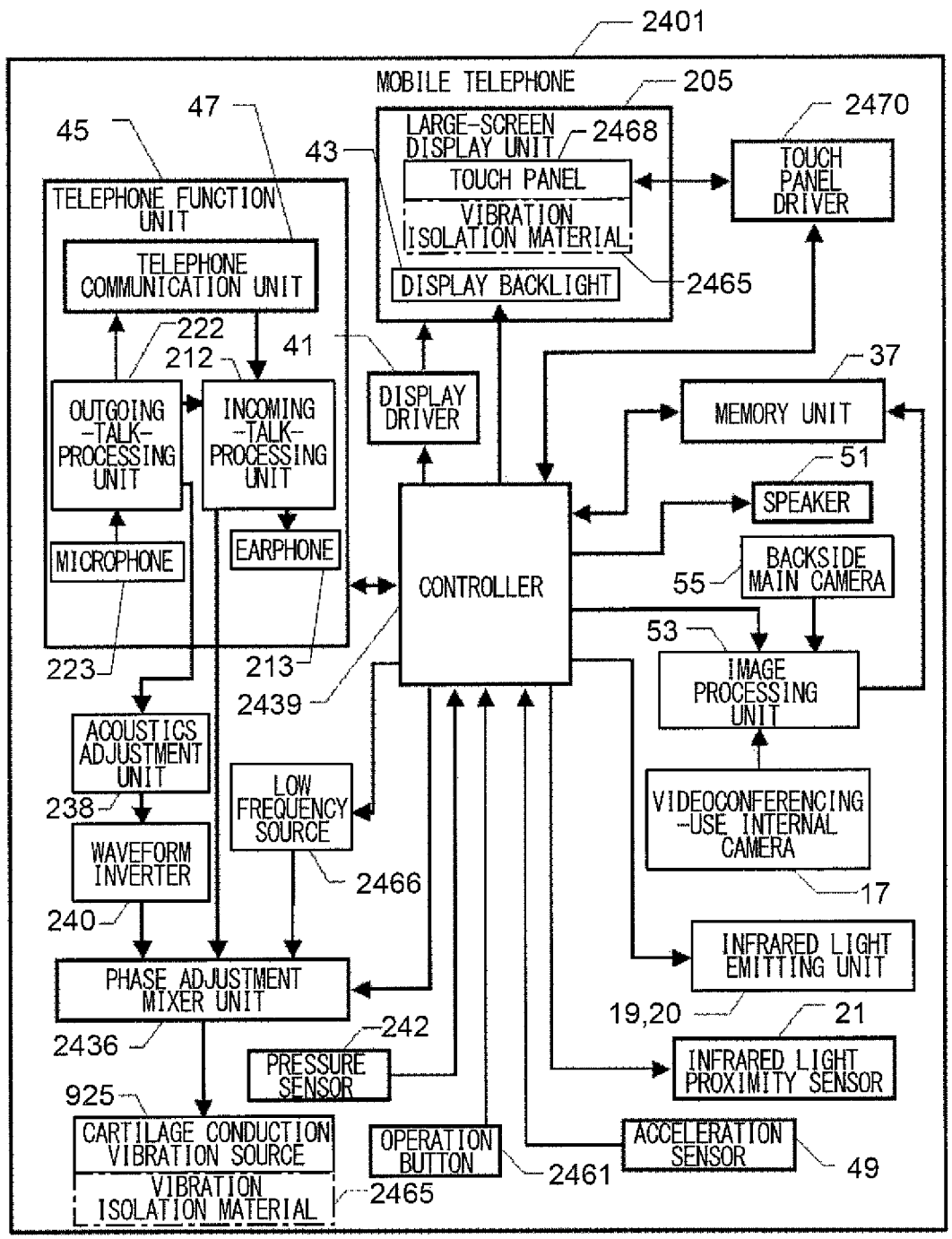
FIG. 42 is a block diagram of the twenty-sixth embodiment of FIG. 41.

FIG. 42 is a block diagram of the twenty-sixth embodiment; identical portions have been given like reference numerals to those in FIG. 41, and a description thereof has been omitted. The configuration of the block diagram in FIG. 42 has many points in common with the block diagram of the fourth embodiment in FIG. 8, and can call on the configuration of the conceptual block diagram of the elements in FIG. 9; therefore, parts of the configuration in common with FIG. 8 have been given like reference numerals and a description thereof has been omitted.

The large-screen display unit 205 of FIG. 42 is illustrated as having a touch panel 2468, and a touch panel driver 2470, which is controlled by a controller 2439 and drives the touch panel 2465; however, this is not specific to the twenty-sixth embodiment, but rather is shared with other embodiments in which the large-screen display unit 205 has a touch panel function, and has merely been omitted from the diagrams of the other embodiments in order to avoid complication. FIG. 42 illustrates vibration isolation materials 2465 respectively for the portions of the cartilage conduction vibration source 925 and the touch panel 2468, but this has been described in such a manner merely because of the space limitations of the block diagram. The vibration isolation material 2465 is the same, and the description does not mean that it is separated and provided to respective positions on the cartilage conduction vibration source 925 and the touch panel 2468. In other words, the intended illustration in FIG. 42 is that the vibration isolation material 2465 resonates due to the low-frequency vibration of the cartilage conduction vibration source 925, which vibration is transmitted to the touch panel 2468.

As illustrated in FIG. 42, the twenty-sixth embodiment is provided with a low-frequency source 2466 for generating a drive signal of a frequency that substantially matches the resonance frequency of the vibration isolation material 2465; the controller 2439 instructs that a low frequency be outputted from the low-frequency source 2466 after a predetermined delay has elapsed from when the touch panel driver 2470 senses the touch of a finger and accepts the input. The phase adjustment mixer unit 2436 drives the cartilage conduction vibration source 925 on the basis of a signal from the telephone function unit 45 in a call state; however, the signal from the telephone function unit 45 being blocked during a non-call operation state in which the touch panel 2468 is operated, the cartilage conduction vibration source 925 is instead driven on the basis of a signal from the low frequency source 2466. However, in a call state, the phase unit adjustment mixer unit 2436 blocks the signal from the low frequency source 2466.

The function of the controller 2439 of FIG. 42 in the twenty-sixth embodiment calls on the flow chart of the fourth embodiment in FIG. 10. Also, the dual purpose of the cartilage conduction vibration source 925 as a touch operation feedback sensation vibration source, which is a feature of the twenty-sixth embodiment, can be understood as a detailed function of step S42 in FIG. 10.

As described above, FIG. 43 serves to provide a detailed illustration of step S42 in FIG. 10; when the flow starts, step S222 first has a check for whether a non-call operation has been performed. This step is similar to step S6 in the first embodiment of FIG. 4, and is a check for the presence or absence of an e-mail operation and/or Internet operation, as well as other operations in which radio operations are not used, such as various settings and also downloaded games, and other non-call operations. Then, when there has been such an operation, the flow proceeds to step S224, in which there is performed a check for whether or not the touch panel 2468 is in a non-sensing state. When a non-sensing state is not in effect, the cartilage conduction vibration unit, including the cartilage conduction vibration source 925, is turned on in step S226. On the other hand, in a case in which it is detected in step S224 that the touch panel 2468 is in a non-sensing state, a non-call operation signifies one by the operation button 2461, and the flow therefore moves on to step S228, in which there is button setting processing corresponding to the operation. Subsequently, in step S230, there is performed a check for whether the touch panel 2468 has been set to be activated by the button operation; when this is true, the flow moves on to step S226. However, in either a case in which there is no detection in step S222 of a non-call operation, or a case in which there is no detection in step S230 of a setting to activate the touch panel 2468, the flow is immediately terminated.

When the cartilage conduction vibration unit is turned on in step S226, the flow proceeds to step S232, in which the phase adjustment mixer unit 2436 is controlled to sever the output from the telephone function unit 45; in step S234, the output of the low frequency source 2466 is connected to the cartilage conduction vibration source 925, and the flow arrives at step S236. In step S236 there is a check for the presence or absence of a touch panel operation; when there is a touch panel operation, the flow proceeds to step S238, and there is response processing in accordance with the operation. The flow then proceeds to step S240, in which a predetermined period of delay (for example, 0.1 seconds) is allowed to pass, and the flow moves on to step S242. In step S242, a low frequency is outputted from the low frequency source 2466 for a predetermined period of time (for example, 0.5 seconds), and the operation sensation is fed back to the finger with which the operation is performed; the flow then proceeds to step S244.

In step S244, there is performed a check for whether the touch panel 2468 has been in an operation-less state for a predetermined period of time (for example, 3 seconds) or longer after the latest touch panel operation; when this is not true, the flow returns to step S236. Afterwards, steps S236 to S244 are repeated as long as the touch panel 2468 is continuously operated for a predetermined period of time; the touch panel input and the operation sensation feedback by the cartilage conduction vibration source 925 are continued.

Figure 43:
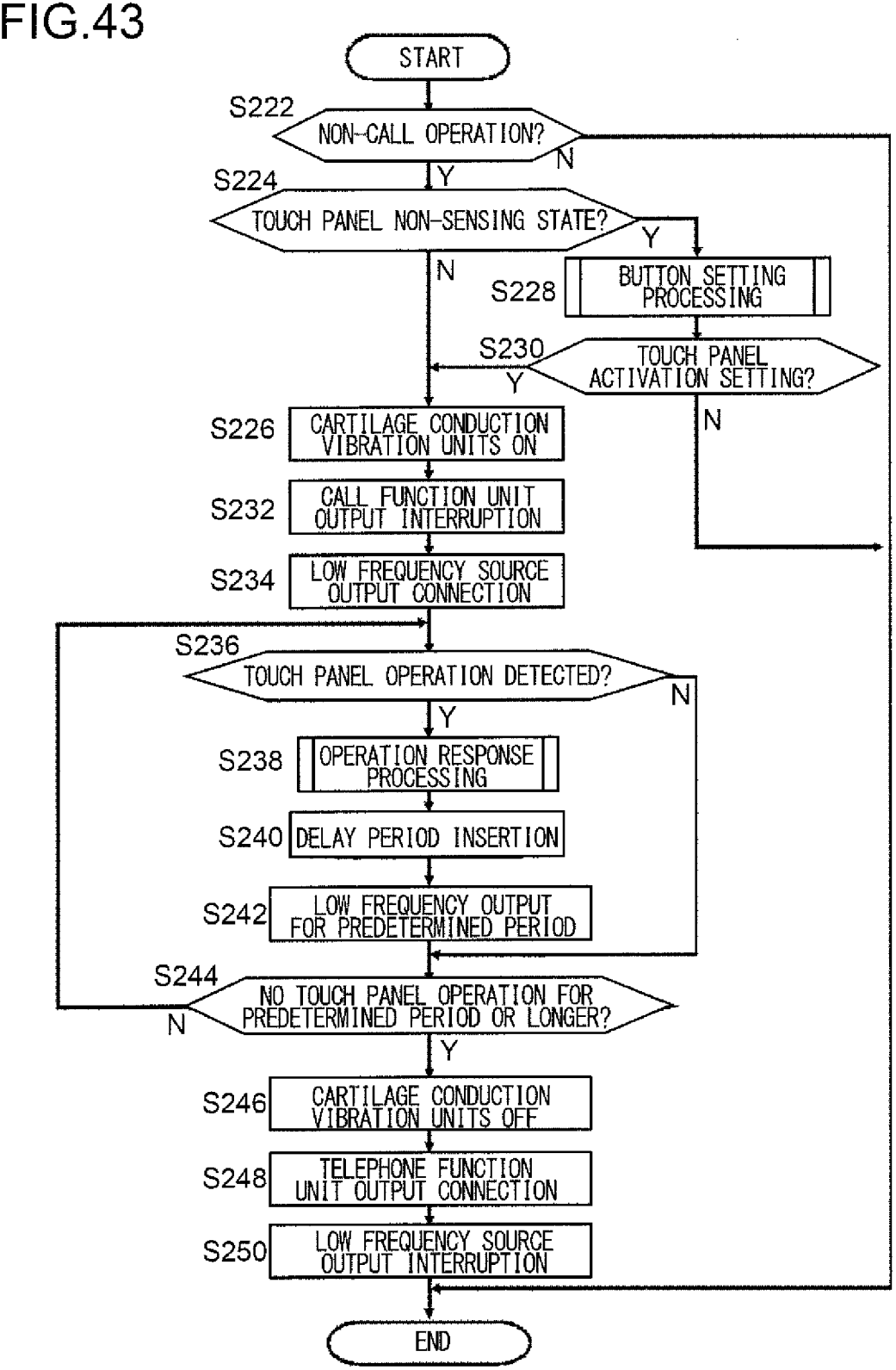
FIG. 43 is a flow chart relating to the operation of the controller in the twenty-sixth embodiment of FIG. 42, and shows step S42 of FIG. 10 in more detail.

On the other hand, when there is a detection in step S244 that the touch panel 2468 has remained in an operation-less state for the predetermined period of time or longer, the flow moves on to step S246, in which the cartilage conduction vibration unit is turned off; in step S248, the phase adjustment mixer unit 2436 is further controlled and the output from the telephone function unit 45 is connected to the cartilage conduction vibration source 925; and in step S250, the output of the low frequency source 2466 is severed, the flow then terminating for the time being. The flow thereafter being executed in accordance with FIG. 10, when no call is detected in step S44 of FIG. 10, the flow immediately moves to step S34; when the primary power supply is not off, the flow then returns to step S42; therefore, the flow in FIG. 43 is resumed. There is accordingly a swift return to step S236 whenever the operation of the touch panel lasts for the predetermined period of time and the flow in FIG. 43 from step S244 terminates, and the touch panel input and the operation sensation feedback by the cartilage conduction vibration source 925 can be continued.

The implementation of the present invention is not to be limited to the aforementioned embodiments; various modifications are possible. For example, the vibration isolation material 2465 in the twenty-sixth embodiment is not limited to a material having a band-pass filter function for transmitting the vibration of the resonance frequency, and may be a material having a low-pass filter function for blocking the vibration from the telephone function unit 45 at or above a predetermined frequency, which is in the audio signal region, and for transmitting the vibration of the low frequency source 2466 for the touch operation feedback, which is in a lower frequency region.

Twenty-Seventh Embodiment

The following calls on FIGS. 41 to 43 in the twenty-sixth embodiment to provide a description of the twenty-seventh embodiment of the present invention. In this case, the "touch panel 2468" in FIG. 42 is to be read as a "motion sensor 2468," and the "touch panel driver 2470" is to be read as a "motion sensor driver 2470." The twenty-seventh embodiment, as with the twenty-sixth embodiment, is configured such that, in a case in which the cartilage conduction vibration source 925 has a dual purpose for a touch operation in the GUI function of the large-screen display unit 205, a configuration is presented in that the cartilage conduction vibration source, rather than merely being utilized as a low frequency output element for touch sensation feedback, is additionally used as an impact input element for detecting a touch on the mobile telephone 2401. For this purpose, the cartilage conduction vibration source 925 in the twenty-seventh embodiment is constituted of a piezoelectric bimorph element. The specific configuration for the dual purpose of the piezoelectric bimorph element as an impact input element can be configured calling on the block diagram of the fourth embodiment described in FIG. 9 and on the flow chart of the eighteenth embodiment described in FIG. 31.

More specifically, the GUI function of the large-screen display unit 205 in the twenty-seventh embodiment, as mentioned above, is configured to make use not of a contact-type touch panel, but rather of a motion sensor 2468 for contactless detection of the motion of a finger in the vicinity of the large-screen display unit 205. The impact detection function of the cartilage conduction vibration source 925, which comprises a piezoelectric bimorph element, is used as an impact sensor for detecting the touch of a finger (corresponding to the "click" of a mouse or the like) for determining a function that is selected without contact. As a more specific example, scrolling and the selecting of an icon on the large-screen display unit 205 are conducted by the detection of the contactless motion of a finger, and the touch impact on the mobile telephone 2401 corresponding to a "click" operation is detected by the dual purpose of the piezoelectric bimorph element, whereby an operation of "CONFIRM" or "ENTER" is performed. The touch at this time is not on the large-screen display unit 205 but rather may be at any desired place on the outer wall of the mobile telephone, and therefore a "click" operation can be performed without leaving a fingerprint on the large-screen display unit 205.

The vibration isolation material 2465 in the twenty-seventh embodiment, which calls on FIG. 41, blocks the vibration from the telephone function unit 45 in the audio signal region, and transmits the transmittable components of the impact vibration in the band-pass filter region or low-pass filter region to the cartilage conduction vibration source 925, which comprises a piezoelectric bimorph. A point in common with the twenty-sixth embodiment lies in that after the cartilage conduction vibration source 925 detects the touch impact of a finger, a low frequency is generated from the low frequency source 2466 after a predetermined period of delay has passed, and the cartilage conduction vibration source 925 is made to vibrate, providing feedback to the finger that performed the touch. Then, in such a case, there is a need to switch the piezoelectric bimorph element to function as an input element and function as an output element, but this switch can be performed utilizing the aforementioned period of delay.

The implementation of the present invention is not to be limited to the aforementioned embodiments; various modification examples are possible. For example, instead of the impact detection function of the piezoelectric bimorph element, the acceleration sensor 49 in FIG. 42 may be used for detecting the click impact in the contactless-type motion sensor as in the twenty-seventh embodiment. Both the function of the acceleration sensor 49 and the impact detection function of the piezoelectric bimorph element may also be used in combination as appropriate.

The dual purpose of the cartilage conduction vibration source 925 as a low frequency vibration source, which is a feature of the twenty-sixth embodiment and the twenty-seventh embodiment, is also not limited to the purpose of providing touch sensation feedback to a finger, but rather can also have the purpose of a dual use as a vibrator for providing a noiseless notification of an incoming call to the mobile telephone 2401. In such a case, as shall be apparent, the introduction of the vibration signal of the low frequency source 2466 to the cartilage conduction vibration source 925 is not a touch detection but rather a response to an incoming call signal, at which time a delay is unnecessary. The introduction of the vibration signal is repeated continuously (interspersed, for example, by an interval of 0.5 second in which vibration is stopped) for a comparatively long period of time (for example, 2 seconds).

Each of the various features indicated in each of the embodiments described above is not necessarily specific to an individual embodiment; the features of each of the embodiments can be combined or rearranged with the features of other embodiments as appropriate, wherever it is possible to make use of the advantages thereof. For example, it is possible to combine the aforementioned eyeglasses-type stereo portable music player described as a modification example of the twenty-fifth embodiment in FIG. 38, as an external incoming/outgoing-talk unit for a mobile telephone provided with such features as in the twenty-sixth embodiment or the twenty-seventh embodiment. In such a case, stereo playback from a sound source housed in the music player can be enjoyed, and also audio signals can be received from the sound source of the mobile telephone to enjoy stereo playback. A hands-free call with the mobile telephone can then be made using an air conduction microphone or bone conduction microphone housed in the eyeglasses-type portable music player.

Twenty-Eighth Embodiment

Figure 44A:
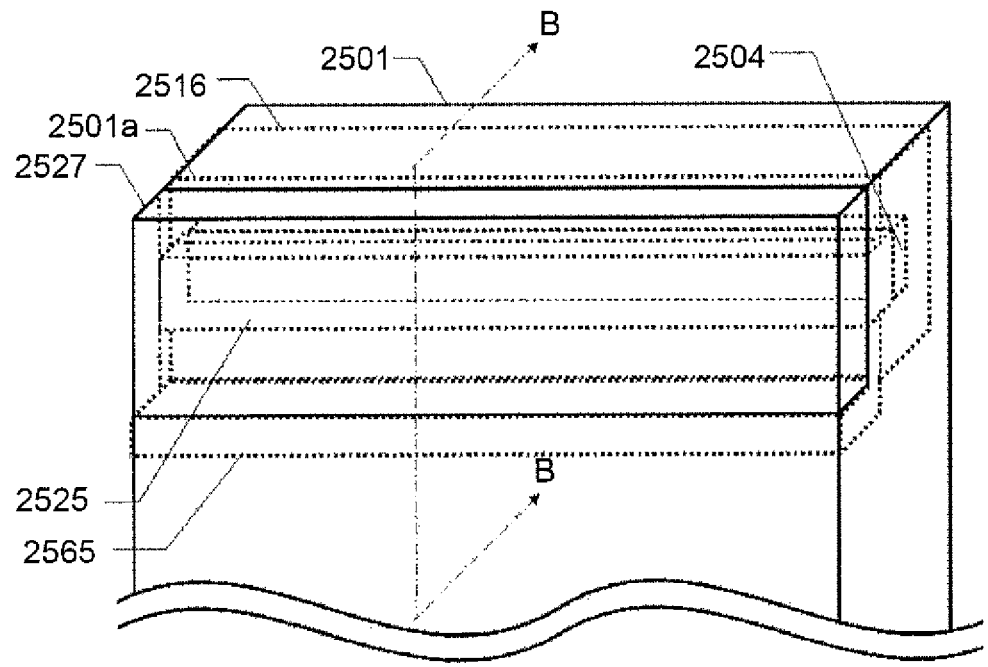
FIG. 44 is a perspective view and cross-sectional view of a twenty-eighth embodiment according to an aspect of the present invention (twenty-eighth embodiment)
Figure 44B:
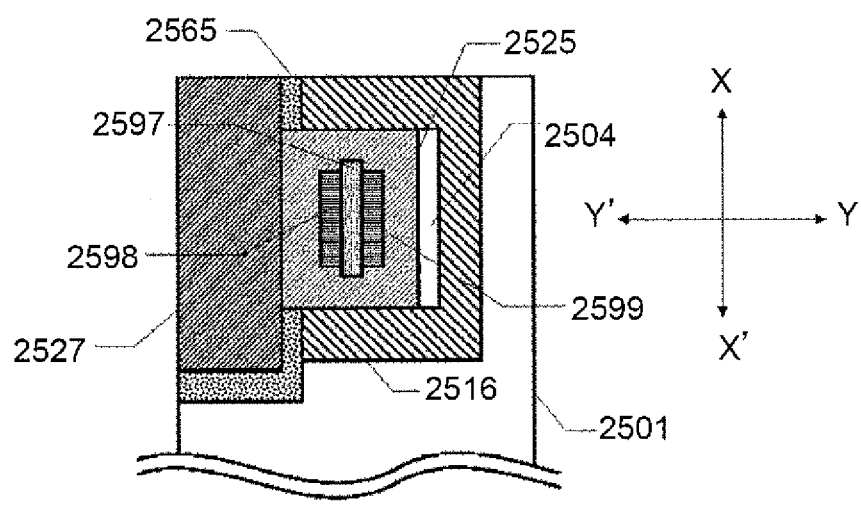

FIG. 44 relates to the twenty-eighth embodiment according to an aspect of the present invention; FIG. 44A is a perspective view illustrating a part of the upper end side thereof, and FIG. 44B is a cross-sectional view illustrating the B-B cross-section of FIG. 44A. The twenty-eighth embodiment is configured as a mobile telephone 2501, and is similar to the fourth embodiment illustrated in FIG. 7; the vibration of a cartilage conduction vibration source 2525 is transmitted to a vibration conductor 2527, the two end parts thereof being in respective contact with the right tragus and the left tragus, whereby sound can be listened to by cartilage conduction. Accordingly, the "upper part" in the twenty-eighth embodiment of FIG. 44 does not signify a separated upper part but rather signifies the portion at the top of the integrated structure.

A point of difference in the twenty-eighth embodiment of FIG. 44 from the fourth embodiment illustrated in FIG. 7 lies in the holding structure for holding the cartilage conduction vibration source 2525 and the vibration conductor 2527 in the mobile telephone 2501. For the configuration for inputting an audio signal into the cartilage conduction vibration source 2525 and the like there can be appropriately used the configuration according to the first to twenty-seventh embodiments, and therefore an illustration and description thereof has been omitted. The cartilage conduction vibration source 2525 of the twenty-eighth embodiment is configured as a piezoelectric bimorph element (and is hereinafter referred to as the "piezoelectric bimorph element 2525"), but, as in FIG. 44B, the structure piezoelectric bimorph element 2525 is one in which piezoelectric ceramic sheets 2598, 2599 are respectively bonded to the two sides of a metal sheet 2597, the circumference thereof being hardened using a resin. Vibration in this structure goes in the Y-Y' direction illustrated in FIG. 44B. Accordingly, the resin surface of the piezoelectric bimorph element 2525 has a larger Y-Y' direction component of vibration, and a smaller X-X' direction component of vibration.

Assuming the above-described structure for the piezoelectric bimorph element 2525, the holding structure of the twenty-eighth embodiment is such that, as is clear from the cross-sectional view of FIG. 44B, the piezoelectric bimorph element 2525 is sandwiched from the X-X' direction, which has a smaller vibration component, by a holding body 2516. The holding body 2516 and the piezoelectric bimorph element 2525 are joined using a bonding agent, and the holding body 2516 is rigidly coupled to the mobile telephone 2501. On the other hand, regarding the Y-Y' direction of the piezoelectric bimorph element 2525, a gap 2504 is provided in FIG. 44B in between the holding body 2516 and the inner surface side serving as the right side; vibration is unrestrictedly permitted in the Y-Y' direction in the piezoelectric bimorph element 2525, and the vibration component therein is less likely to be transmitted to the holding body 2516. A bonding agent is also used to join the vibration conductor 2527 rigidly to the outer surface side serving as the left side in FIG. 44B in the Y-Y' direction of the piezoelectric bimorph element 2525. The mobile telephone 2501 also has an opening part 2501a for exposing the vibration conductor 2527. Then, the vibration isolation material 2565 comprising an elastic body based on vinyl, urethane, or another substance is used to fill in the space between the vibration conductor 2527 and the holding body 2516, and the opening part 2501a of the mobile telephone 2501. Vibration is unrestrictedly permitted in the Y-Y' direction of the vibration conductor 2527, and the vibration component of the piezoelectric bimorph element 2525 is less likely to be transmitted to the holding body 2516 and the mobile telephone 2501. In the description above, the gap 2504 may also be configured so as to be filled in by an elastic body similar to the vibration isolation material 2565.

Due to the holding structure as described above, the force of the hand holding the mobile telephone 2501 is rigidly applied to the vibration conductor 2527, whereby the contact with the right tragus or left tragus and the pressure thereof can be easily controlled. Because the structure is such that vibration is unrestrictedly permitted in the Y-Y' direction of the vibration conductor 2527, the vibration conductor 2527 vibrates efficiently and the vibration thereof is transmitted to the cartilage of the ear; also, the vibration of the vibration conductor 2527 can be effectively prevented from being transmitted to the mobile telephone 2501 and generating unneeded air conduction.

Figure 45A:
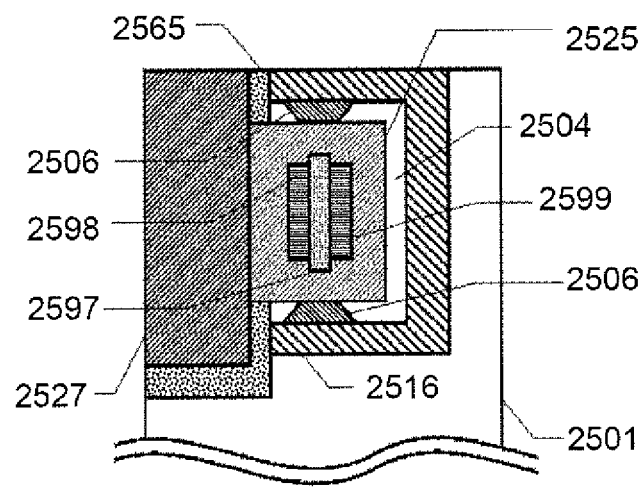
FIG. 45 is a cross-sectional view illustrating a first modification example and a second modification example of the twenty-eighth embodiment.
Figure 45B:
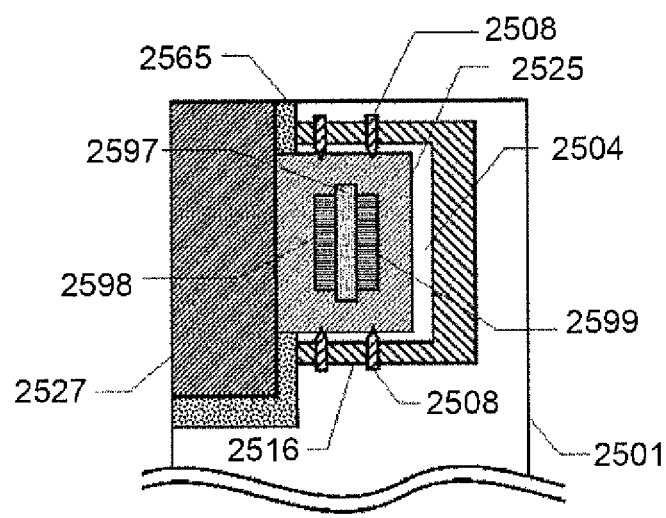

FIG. 45 is a cross-sectional view relating to modification examples of the twenty-eighth embodiment of FIG. 44. FIG. 45A is a cross-sectional view of a first modification example, and is illustrated in conformity with FIG. 44B, portions in common being given like reference numerals. Similarly, FIG. 45B illustrates a cross-sectional view of a second modification example. In the first modification example, illustrated by FIG. 45A, the gap 2504 is stretched over the entire space between the holding body 2516 and the piezoelectric bimorph element 2525, and an auxiliary holding unit 2506 for holding the piezoelectric bimorph element 2525 between the two from the X-X' direction is provided. The rigid material of the auxiliary holding unit 2506 is selected to have a different acoustic impedance from either both of or at least one of the holding body 2516 and the piezoelectric bimorph element 2525. The auxiliary holding unit 2506 may be an elastic body provided that there is no problem in terms of holding force. The auxiliary holding unit 2506 is configured to be arranged at the center part to avoid the vibration surface of the Y-Y' direction in the piezoelectric bimorph element 2525; therefore, even with an integrated molding of the same material, as a part of the holding body 2516, there is a more pronounced effect relative to FIG. 44(B) in permitting vibration in the Y-Y' direction in the piezoelectric bimorph element 2525 and in reducing the transmission of vibration to the mobile telephone 2501.

The second modification example of FIG. 45B also takes a configuration in which the gap 2504 is spread over the entire space between the holding body 2516 and the piezoelectric bimorph element 2525; however, a plurality of screws 2508 provided to important points in the middle part of the piezoelectric bimorph element 2525 are used to sandwich the piezoelectric bimorph element 2525 from the X-X' direction. The screws 2508 are threaded such that the sharp tips thereof are slightly wedged into the surface of the piezoelectric bimorph element 2525, ensuring the holding of the piezoelectric bimorph element 2525.

Figure 46A:
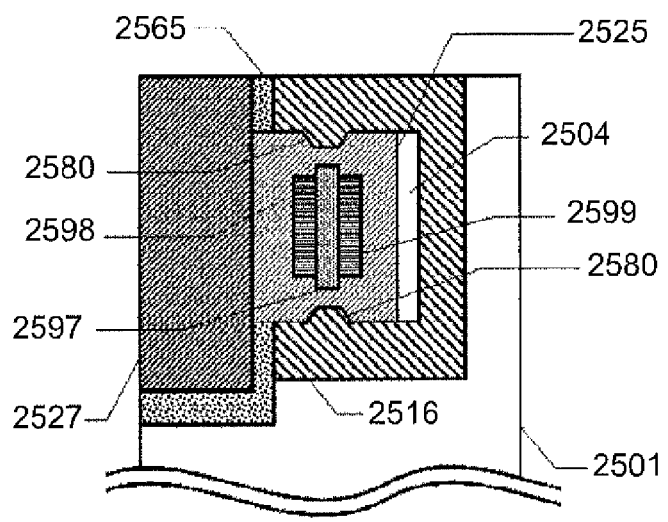
FIG. 46 is a cross-sectional view of a third modification example and a fourth modification example of the twenty-eighth embodiment.
Figure 46B:
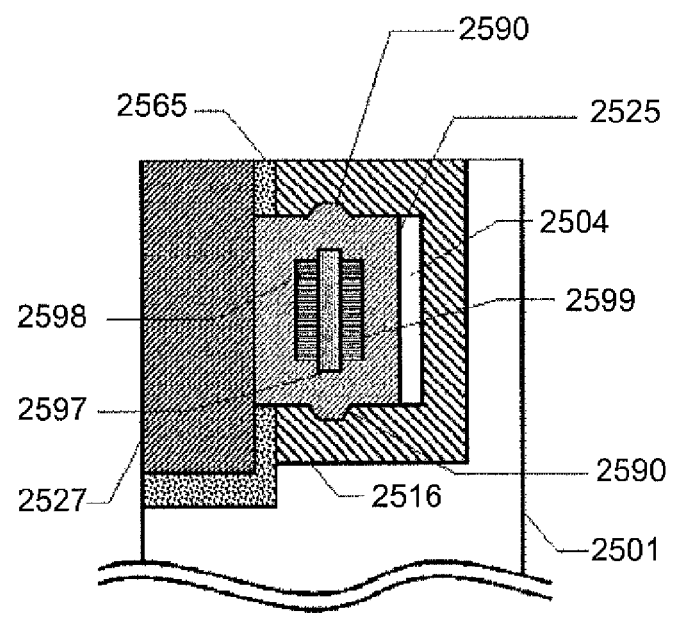

FIG. 46 is a cross-sectional view relating to yet further modification examples of the twenty-eighth embodiment of FIG. 44. FIG. 46A is a cross-sectional view of a third modification example, and, similarly with respect to FIG. 45, is illustrated in conformity with FIG. 44B, shared portions being given shared reference numerals. Similarly, FIG. 46B illustrates a cross-sectional view of a fourth modification example. In the third modification example illustrated in FIG. 46A, the surface of the piezoelectric bimorph element 2525 is molded using a resin such that a concavity 2580 is formed, and a convexity corresponding thereto is integrally molded in the holding body 2516. The engagement between these convex and concave parts ensures that the piezoelectric bimorph element 2525 is held by the holding body 2516. Upon assembly, the slight elasticity of the holding body 2516 may be utilized for fitting of the piezoelectric bimorph element 2525; alternatively, the configuration may be such that the holding body 2516 is constituted as two divided bodies, and after the piezoelectric bimorph element 2525 is sandwiched therebetween, same are integrally screwed together. In the fourth modification example illustrated by FIG. 46B, the surface of the piezoelectric bimorph element 2525 is molded with a resin such that a convexity 2590 is formed, and a concavity corresponding thereto is integrally molded in the holding body 2516. Then, similarly with respect to FIG. 46A, the engagement of these convex and concave parts ensures the holding of the piezoelectric bimorph element 2525 by the holding body 2516. Upon assembly, similarly with respect to FIG. 46A, the configuration may be such that the piezoelectric bimorph element 2525 may be fitted using the slight elasticity of the holding body 2516, or such that the holding body 2516 is constituted as two divided bodies, and after the piezoelectric bimorph element 2525 is sandwiched therebetween, the same are integrally screwed together.

Twenty-Ninth Embodiment

Figure 47A:
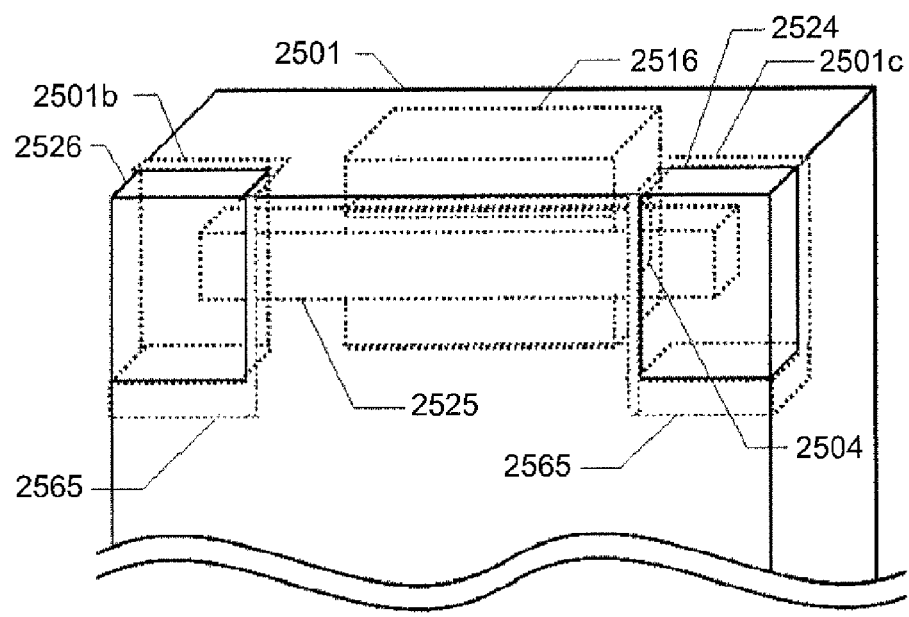
FIG. 47 is a perspective view illustrating a twenty-ninth embodiment according to an aspect of the present invention, and a modification example thereof (twenty-ninth embodiment)
Figure 47B:
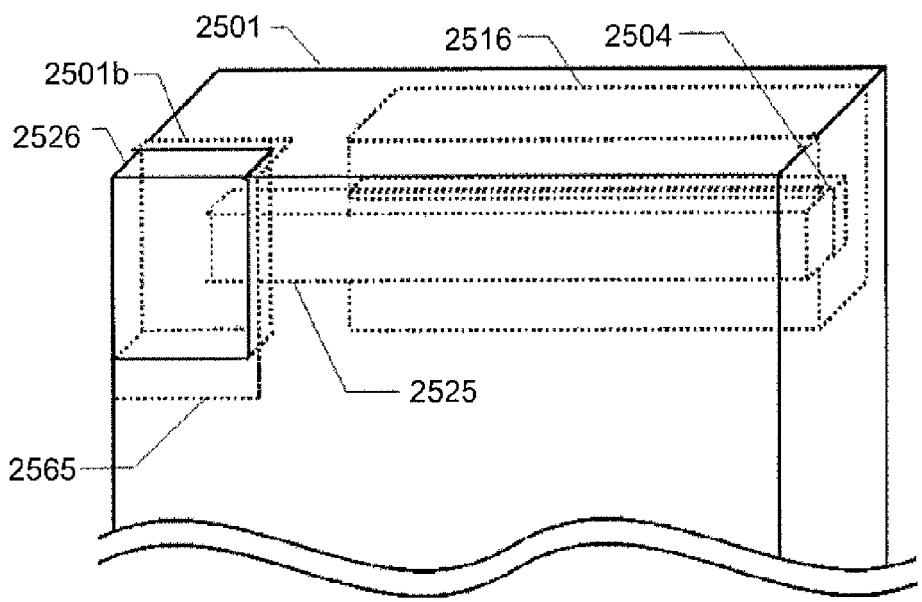

FIG. 47 relates to the twenty-ninth embodiment according to an aspect of the present invention; FIG. 47A is a perspective view illustrating a part of the upper end side thereof, and FIG. 47B is a perspective view illustrating a part of the upper end side in a modification example thereof. The twenty-ninth embodiment has a holding structure that is substantially the same as that of the twenty-eighth embodiment in FIG. 44, but has a different configuration, in which the vibration conductor in contact with the right tragus or the left tragus is exposed to the surface of the mobile telephone from openings 2501*b* and 2501*c* provided to the outer wall of the mobile telephone 2501. Portions in common with FIG. 44 are accordingly given the same reference numerals, and a description thereof has been omitted. The following provides only a description of the disparities relative to the twenty-eighth embodiment of FIG. 44.

The twenty-eighth embodiment of FIG. 44 is configured such that the vibration conductor 2527 is exposed in a strip on the entire upper end part of the mobile telephone 2501, both end parts thereof being in contact with the right tragus and left tragus respectively and also being capable of being in contact with the ear cartilage over a broad surface area. By contrast, the twenty-ninth embodiment of FIG. 47A is configured such that the vibration conductor is divided into a right ear vibration conductor 2524 and a left ear vibration conductor 2526, which are respectively bonded to the two ends of the piezoelectric bimorph element 2525. Then, only a portion of the separated right ear vibration conductor 2524 and left ear vibration conductor 2526 is made to be respectively exposed from the opening parts 2501*b* and 2501*c* of the two corner parts at the top end of the mobile telephone 2501. For this reason, the vibration isolation material 2565 for filling in the space between the mobile telephone 2501 and the right ear vibration conductor 2524 and left ear vibration conductor 2526 is also provided in respective separations.

On the other hand, the modification example of the twenty-ninth modification example illustrated by FIG. 47B is configured such that only the left ear vibration conductor 2526 is bonded to the piezoelectric bimorph element 2525. Then, only a portion of the left ear vibration conductor 2526 is exposed from the opening part 2501*b* of the corner part at the top end of the mobile telephone 2501. The vibration isolation material 2565 for filling in the space between the left ear vibration conductor 2526 and the mobile telephone 2501 is provided only to the left side corner part of the mobile telephone 2501. Also, the modification example of the twenty-ninth embodiment illustrated by FIG. 47B, although simplifying the configuration of FIG. 47A and being configured for dedicated left ear usage, is also capable of being configured such that the vibration conductor is exposed from an opening part provided to the right corner part for a configuration as a mobile telephone especially for right ear usage. As yet another modification of the modification example of the twenty-ninth embodiment illustrated by FIG. 47B, the piezoelectric bimorph element can also be directly exposed from the opening part, without the vibration conductor being interposed, in a case in which the surface of the piezoelectric bimorph element is fashioned into a shape suited for the outer surface of the mobile telephone. Such a modification is also possible in the twenty-ninth embodiment illustrated by FIG. 47A and in the twenty-eighth embodiment illustrated by FIG. 44.

Thirtieth Embodiment

Figure 48A:
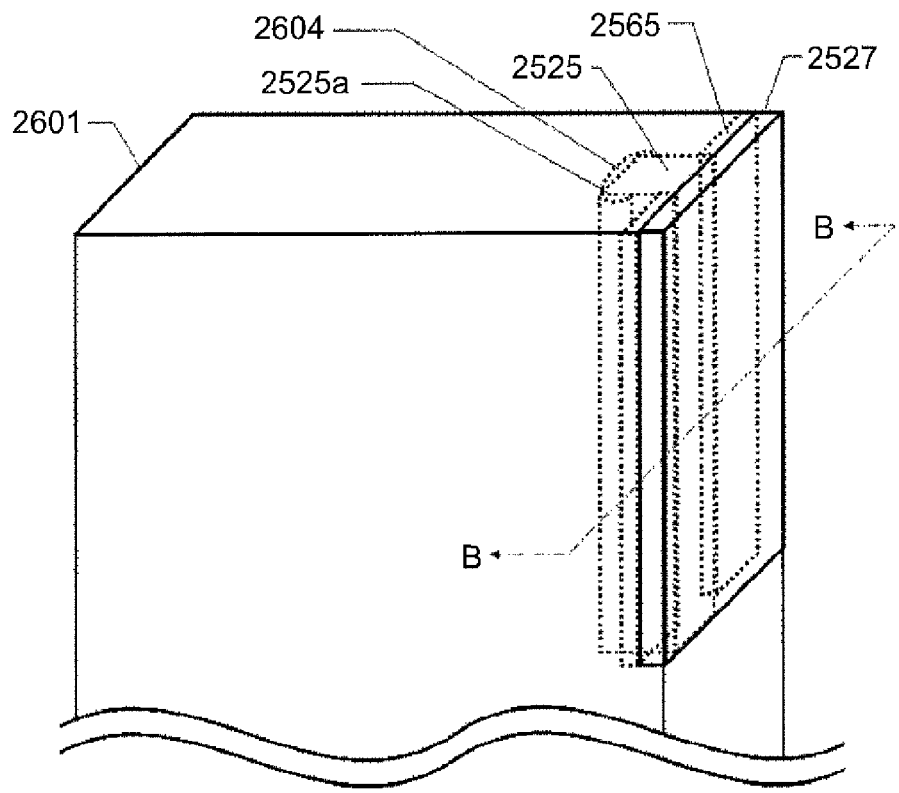
FIG. 48 is a perspective view and a cross-sectional view of a thirtieth embodiment according to an aspect of the present invention (thirtieth embodiment)
Figure 48B:
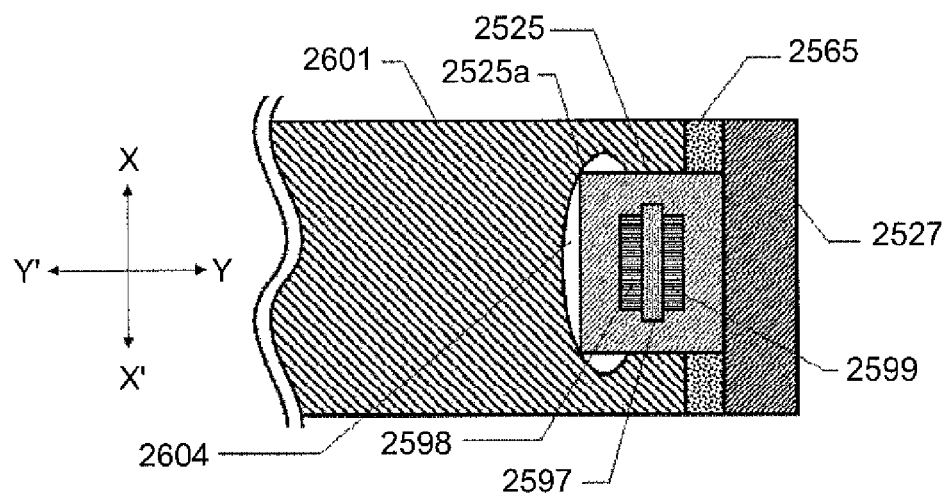

FIG. 48 relates to the thirtieth embodiment according to an aspect of the present invention; FIG. 48A is a perspective view illustrating a part of the upper end side thereof, and FIG. 48B is a cross-sectional view illustrating the B-B cross-section of FIG. 48A. The thirtieth embodiment is configured as a mobile telephone 2601 and is similar to the thirteenth embodiment illustrated by FIG. 24 and/or the fourteenth embodiment illustrated by FIG. 25. The cartilage conduction vibration unit is arranged on the side surface of the mobile telephone. The thirtieth embodiment of FIG. 48, similarly with respect to the twenty-eighth embodiment of FIG. 44, also features a holding structure for permitting vibration for ear cartilage conduction in the piezoelectric bimorph element and for reducing the transmission of vibration to the mobile telephone; therefore, portions in common with the twenty-eighth embodiment have been given like reference numerals, and a description thereof has been omitted. Another point of similarity with the twenty-eighth embodiment lies in the configuration for inputting an audio signal to the cartilage conduction vibration source 2525, of which a depiction and description has been omitted.

The thirtieth embodiment of FIG. 48 is configured such that the piezoelectric bimorph element 2525 is fitted into the side surface of the mobile telephone, but, as illustrated by FIG. 48B, the interior of the fitted-in part is curved; as a result thereof, a ridge part 2525*a* of the piezoelectric bimorph element 2525 is brought into contact with the inner surface of the curved part of the mobile telephone 2601. Due to such contact, the piezoelectric bimorph element 2525 is positioned in the fitting-depth direction, reinforcing the holding force relative to the direction pushing in on the piezoelectric bimorph element 2525. A crescent gap 2604 is created in the Y-Y' direction of the piezoelectric bimorph element 2525 due to the contact structure as described above, permitting free vibration. The piezoelectric bimorph element 2525 is fundamentally held from the X-X' direction in the thirtieth embodiment as well. For the sake of simplicity, the illustration in FIG. 48 is such that a part of the integral structure of the mobile telephone 2601 serves as the holding structure, but the configuration may also be such that a structure such as the holding body 2516 of the twenty-eighth embodiment and of the twenty-ninth embodiment is utilized, and anchored on the mobile telephone 2601. The structure can otherwise be understood with reference to FIG. 44, and therefore a description thereof has been omitted. The various modification examples illustrated in FIGS. 45 and 46 can also be applied to the thirtieth embodiment of FIG. 48.

Thirty-First Embodiment

Figure 49A:
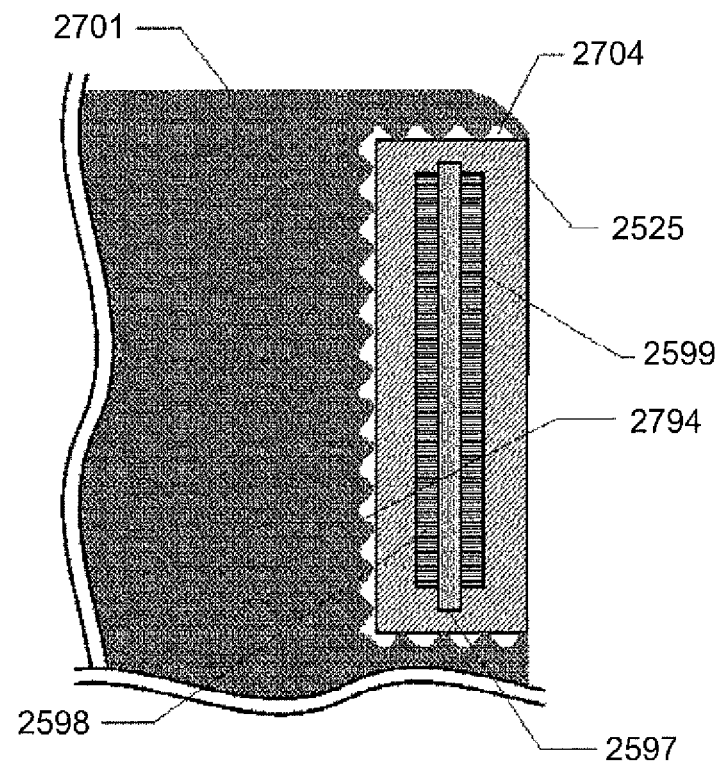
FIG. 49 is a longitudinal cross-sectional view and a latitudinal cross-sectional view of a thirty-first embodiment according to an aspect of the present invention (thirty-first embodiment)
Figure 49B:
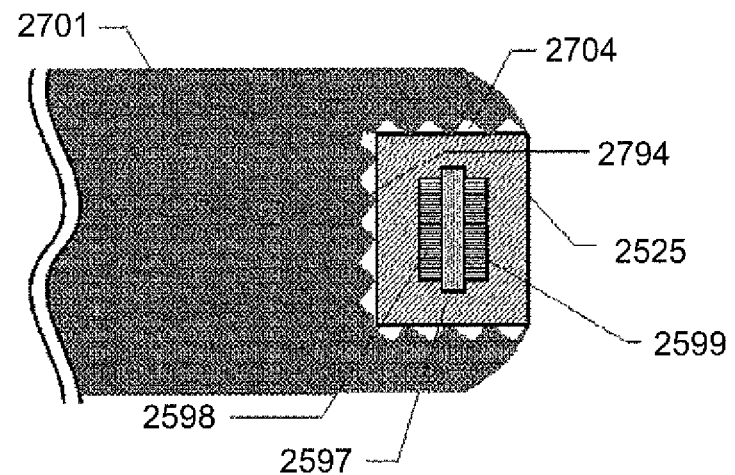

FIG. 49 relates to a thirty-first embodiment according to an aspect of the present invention; FIG. 49A is a longitudinal sectional view illustrating a part of the upper end side thereof. FIG. 49B is a transverse cross-sectional view of the same portions, and can be understood to be similar to FIG. 48B. The thirty-first embodiment is configured as a mobile telephone 2701, and is similar to the thirtieth embodiment illustrated in FIG. 48; the cartilage conduction vibration unit is arranged on the side surface of the mobile telephone. The feature thereof lies in the holding structure for permitting vibration for ear cartilage conduction in the piezoelectric bimorph element and for reducing the transmission of vibration to the mobile telephone; therefore, portions in common with the thirtieth embodiment of FIG. 48 have been given like reference numerals, and a description thereof has been omitted. Another point of similarity with the thirtieth embodiment lies in the configuration for inputting an audio signal to the cartilage conduction vibration source 2525 and the like, for which a depiction and description has been omitted.

A point of difference in the thirty-first embodiment of FIG. 49 from the thirtieth embodiment of FIG. 48 lies in the holding structure of the piezoelectric bimorph element 2525. The piezoelectric bimorph element 2525, similarly with respect to the thirtieth embodiment, takes a structure in which it is fitted into a groove in the side surface of the mobile telephone 2701, but as is clear from the longitudinal cross-sectional view of FIG. 49A and the transverse cross-sectional view of FIG. 49B, the inner surface of the groove becomes a corrugated surface 2794; as a result thereof, the piezoelectric bimorph element 2525 is held by a plurality of apices of the corrugated surface 2794, and a plurality of gaps 2704 are created in between the two. For the sake of simplicity, the illustration in FIG. 49 is also such that a part of the integral structure of the mobile telephone 2701 serves as the holding structure, but the configuration may also be one in which there is adopted a structure such as the holding body 2516 of the twenty-eighth embodiment and of the twenty-ninth embodiment, and same is anchored to the mobile telephone 2701. This is also a point of similarity with modification examples to be described later.

Figure 50A:
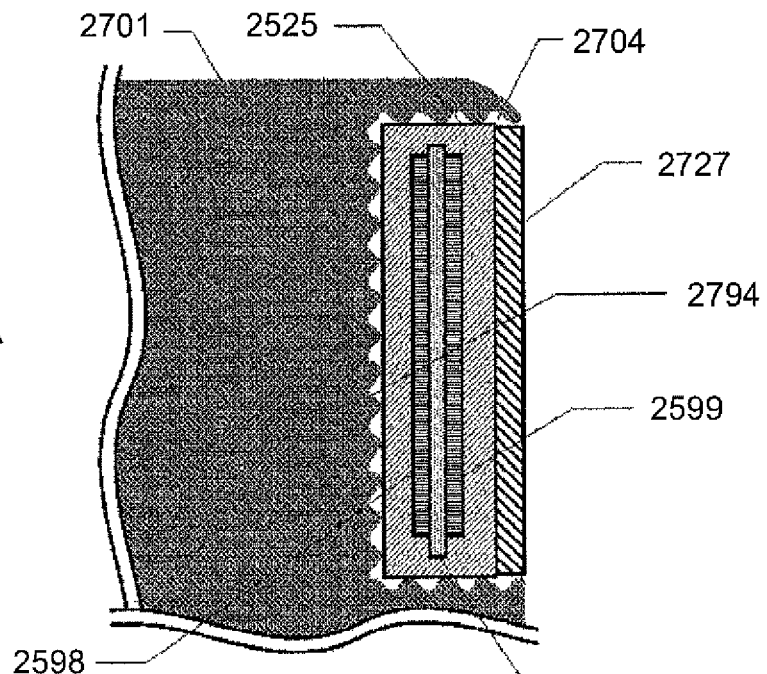
FIG. 50 is a cross-sectional view illustrating a first modification example and a second modification example of the thirty-first embodiment.
Figure 50B:
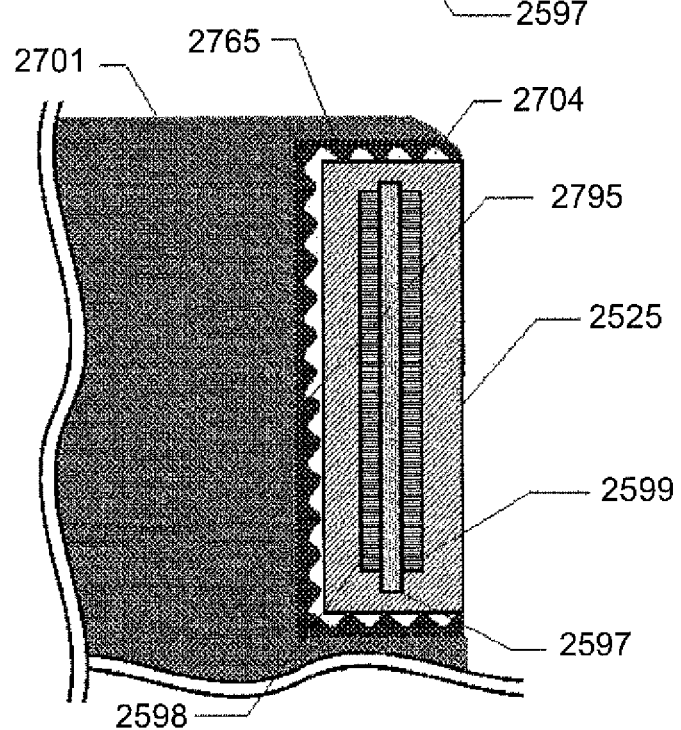

FIG. 50 is a longitudinal cross-sectional view illustrating modification examples of the thirty-first embodiment, and can be understood with reference to FIG. 49A. FIG. 50A is a first modification example, wherein a vibration conductor 2727 (silicon, urethane, or the like) is provided to the side of the piezoelectric bimorph element 2525 that comes up against the ear cartilage. FIG. 50B is a second modification example. A vibration isolation material 2765 is interposed between the piezoelectric bimorph element 2525 and the mobile telephone 2701, and the surface at which the vibration isolation material 2765 comes up against the piezoelectric bimorph element 2525 serves as the corrugated surface 2795. A modification example that combines the vibration conductor 2727 in the first modification example of FIG. 50A with the vibration isolation material 2765 in the second modification example of FIG. 50B is also possible.

Thirty-Second Embodiment

Figure 51A:
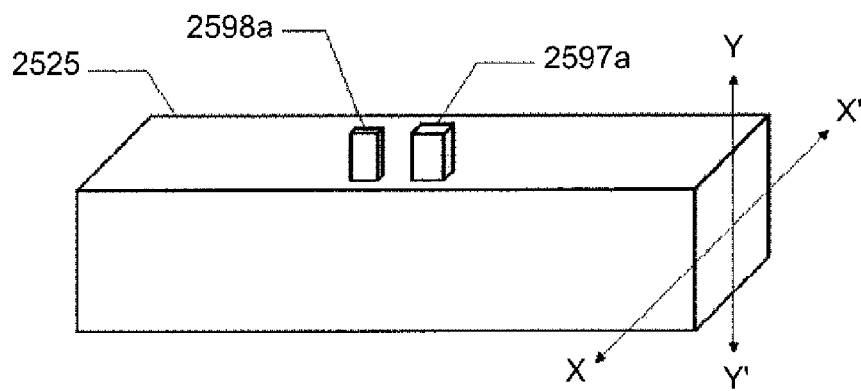
FIG. 51 is a perspective view of a thirty-second embodiment according to an aspect of the present invention, configured as a piezoelectric bimorph element adapted for use in the mobile telephone (thirty-second embodiment)
Figure 51B:
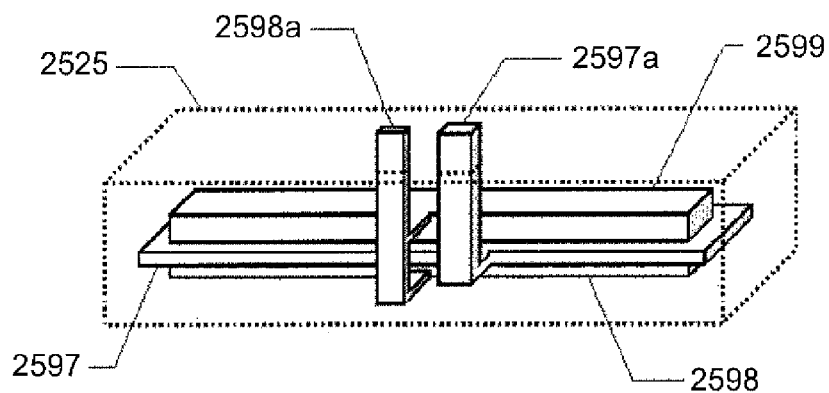

FIG. 51 is a perspective view of a thirty-second embodiment according to an aspect of the present invention. The thirty-second embodiment is configured as a piezoelectric bimorph element 2525 suited for use in, for example, the mobile telephone 2501 of the twenty-ninth embodiment illustrated in FIG. 47A. FIG. 51A is an external perspective view of the piezoelectric bimorph element 2525 of the thirty-second embodiment, and FIG. 51B is a transparent perspective view thereof. For convenience of illustration, FIG. 51 has been drafted such that the piezoelectric bimorph element 2525 is rotated 90 degrees from the state of FIG. 47A, where the Y-Y' direction becomes the vertical direction.

The holding body 2516 of the twenty-ninth embodiment of FIG. 47A, similarly with respect to that of the twenty-eighth embodiment of FIG. 44, sandwiches the piezoelectric bimorph element 2525 from the X-X' direction illustrated in FIG. 44B; vibration in the Y-Y' direction is unrestrictedly permitted, and the vibration component is prevented from being transmitted to the holding body 2516. Furthermore, the holding body 2516 is configured so as to sandwich the middle portion of the piezoelectric bimorph element 2525, in which the right ear vibration conductor 2524 and the left ear vibration conductor 2526 are respectively bonded to both ends.

The piezoelectric bimorph element 2525 illustrated in FIG. 51 assumes a configuration permitting the holding of the middle part of the piezoelectric bimorph element 2525 from the X-X' direction, as described above. Specifically, as illustrated in FIG. 51A, the piezoelectric bimorph element 2525 of the thirty-second embodiment is configured such that electrodes 2597*a* and 2598*a* for inputting a drive signal are positioned at the middle portion of the piezoelectric bimorph element 2525. Both end portions of the piezoelectric bimorph element 2525 are thereby released from a wired connection, and free vibration is permitted. Moreover, the direction in which the electrodes 2597*a* and 2598*a* project out is configured so as to assume a direction along the Y-Y' direction of the vibration direction. Thereby, when the middle portion of the piezoelectric bimorph element 2525 is sandwiched from the X-X' direction, the electrodes 2597*a* and 2598*a* are not obstructive and there is no need to provide the holding body 2516 with a special configuration, despite the arrangement of the electrodes 2597*a* and 2598*a* at the middle portion.

To permit such an arrangement of the electrodes, the piezoelectric bimorph element 2525 is configured, as illustrated in FIG. 51B, such that the electrode 2597*a*, which is drawn out from the middle portion of a metal sheet 2597, is curved upward at 90 degrees, and the electrodes 2598*a*, which are drawn out from piezoelectric ceramic sheets 2598 and 2599, and respectively connected to each one, are also curved upward at 90 degrees, each projecting from the upper surface of the resin. The middle portion of the piezoelectric bimorph element 2525 can thereby be readily supported sandwiched from the X-X' direction, without an electrode projecting out to the X-X' direction.

Also, as a modification of FIG. 51, the configuration can also be such that each of the electrode 2597*a* that is drawn out from the middle part of the metal sheet 2597 and the electrodes 2598*a* that are drawn out from the middle parts of the piezoelectric ceramic sheets 2598 and 2599 project out from the side surface of the resin. In such a case, to sandwich and support the middle portion of the piezoelectric bimorph element 2525 from the X-X' direction, the holding body 2516 is provided with a void for avoiding a portion that would interfere with the electrodes, and connects a signal line; alternatively, a socket structure is provided to the inner side of the holding body 2516 and a connection is made with the electrodes. In such a case as well, the holding body 2516 must be provided with a special configuration; however, no change is needed to provide the electrodes 2597a and 2598a to the middle part, and therefore it is possible to benefit from the advantage of releasing the two end portions of the piezoelectric bimorph element 2525 from wired connections and enabling free vibration.

Thirty-Third Embodiment

Figure 52A:
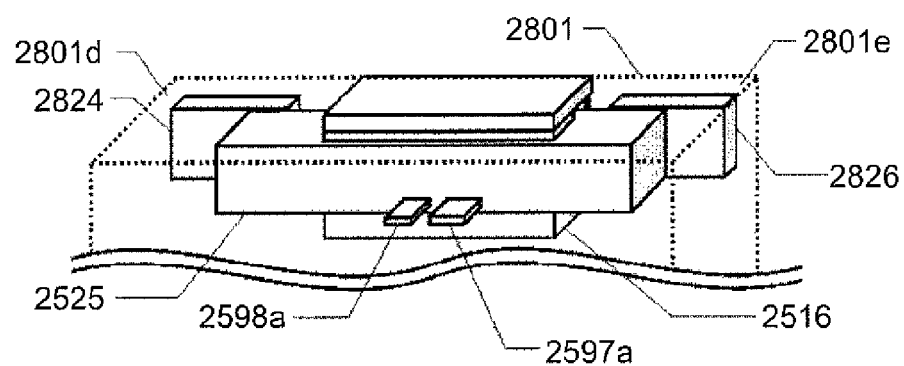
FIG. 52 is a transparent perspective view of a thirty-third embodiment according to an aspect of the present invention, and a modification example thereof (thirty-third embodiment)
Figure 52B:
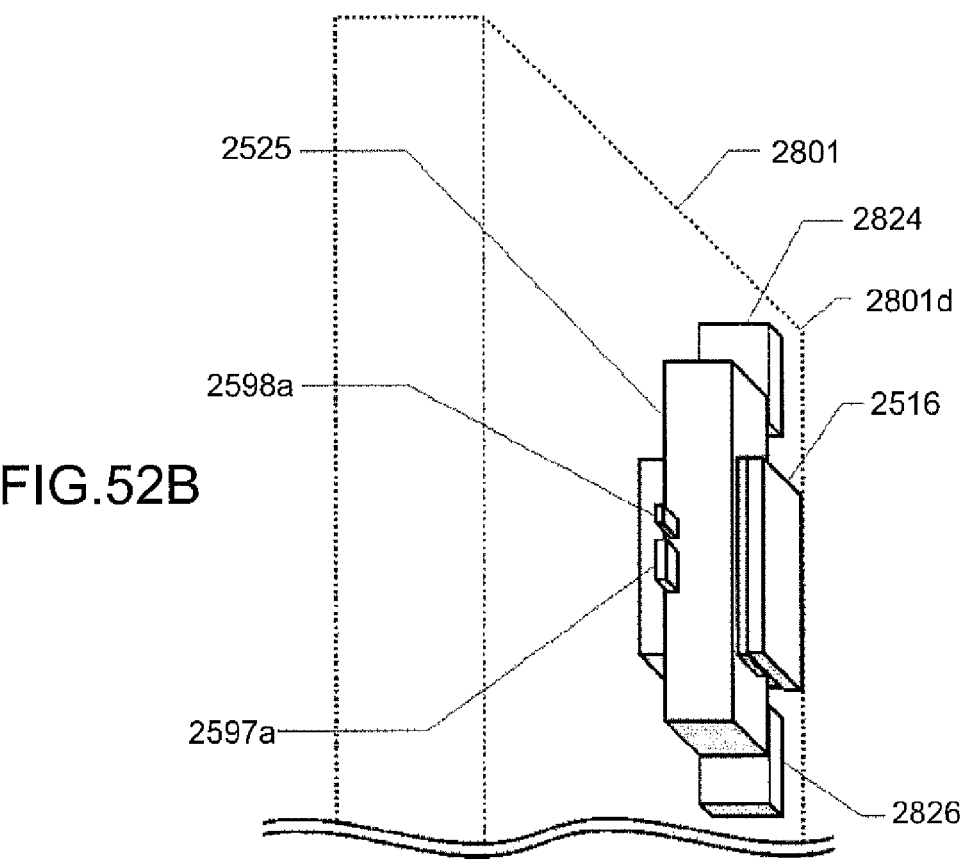

FIG. 52 relates to a thirty-third embodiment according to an aspect of the present invention, and is configured as a mobile telephone 2801. FIG. 52A is a transparent perspective view in which a part of the upper end side thereof is viewed from the rear, and FIG. 52B is a transparent perspective view in which a part of the upper end side in the modification example thereof is viewed from the side surface of the opposite side. The thirty-third embodiment illustrated in FIG. 52A has a holding structure that is substantially similar to that of the twenty-ninth embodiment in FIG. 47A, but has a different configuration in which a pair of vibration conductors 2824 and 2826 that are in contact with the ear cartilage are exposed on the surface of the mobile telephone.

Specifically, the vibration conductors 2524 and 2526 in the twenty-ninth embodiment of FIG. 47 are directly exposed at the upper corner parts of the mobile telephone 2501. By contrast, in the thirty-third embodiment of FIG. 52, corner parts 2801d, 2801e serve as a part of a sufficiently strong outer wall of the mobile telephone 2801 itself, and each of the vibration conductors 2824 and 2826 are exposed on the display surface side of the mobile telephone 2801 in such as form as to be guarded by the corner parts. A detailed description of this exposed state and the significance thereof will be provided later. The configuration is otherwise shared with that of the twenty-ninth embodiment of FIG. 47; therefore, in FIG. 52 portions that are in common have been given like reference numerals, and a description thereof has been omitted. The thirty-third embodiment also serves as an example of the implementation of the piezoelectric bimorph elements 2525 illustrated in the thirty-second embodiment, and also illustrates the positions of the electrodes 2597a and 2598a together.

In the modification example of the thirty-third embodiment in FIG. 52B, the same configuration as the vibration unit described with reference to FIG. 52A is attached such that the side surface of the mobile telephone 2801 is made to vibrate as in the thirtieth embodiment of FIG. 48 and/or the thirty-first embodiment of FIG. 49. In the modification example of the thirty-third embodiment in FIG. 52B as well, the vibration conductor 2824, which is the upper of the pair of vibration conductors, is guarded by the sufficiently strong corner part 2801d of the mobile telephone 2801 and is exposed to the side surface of the mobile telephone 2801. The vibration conductor 2826, which is lower, is not originally positioned at a corner part and is therefore guarded naturally.

Figure 53A:
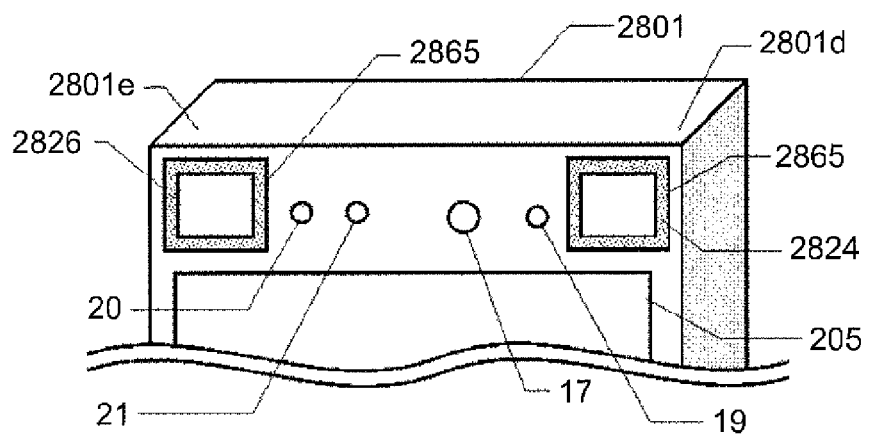
FIG. 53 is an external perspective view of the thirty-third embodiment and the modification example thereof.
Figure 53B:
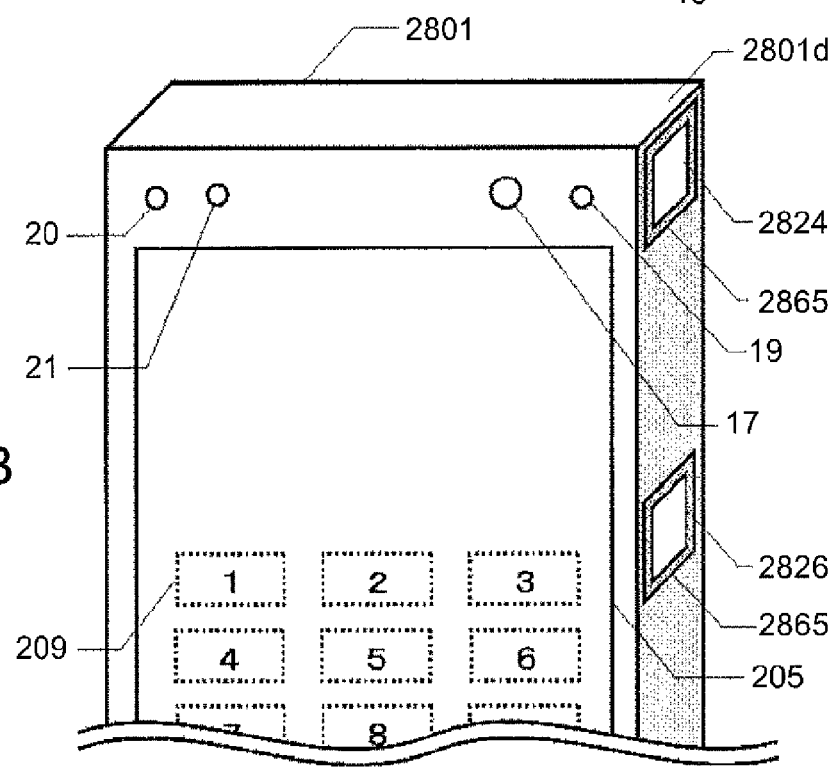

FIG. 53 is an external perspective view in which each of the thirty-third embodiment of FIG. 52 and the modification example thereof is viewed from the front; FIG. 53A belongs to the thirty-third embodiment, and FIG. 53B belongs to the modification example thereof. The configuration in FIG. 53 also has much in common with the twenty-sixth embodiment of FIG. 41 and the like; therefore, portions that are in common have been given like reference numerals, and a description thereof has been omitted.

As is clear from FIG. 53A, a pair of vibration conductors 2824 and 2826 are respectively exposed on the surface of the large-screen display unit 205 of a mobile telephone 2801 in such a form as to be respectively guarded by the corner parts 2801d and 2801e of the mobile telephone 2801. Similarly with respect to the twenty-ninth embodiment of FIG. 47, a vibration isolation material 2865 is also used in the thirty-third embodiment of FIG. 53A to fill in the space between the pair of vibration conductors 2824 and 2826 and the mobile telephone 2801.

Herein, a description will be provided for the significance of the aforementioned configuration of the thirty-third embodiment illustrated in FIGS. 52 and 53. The corner parts 2801d and 2801e of the mobile telephone 2801 are at sites that are suitable for coming up against the tragus or other ear cartilage, but are simultaneously also at sites that facilitate the direct application of impact when a drop or other event occurs. Accordingly, in a case assuming a configuration such as, for example, that of the twenty-ninth embodiment of FIG. 47, the vibration conductors 2524 and 2526, the piezoelectric bimorph element 2525 to which same are bonded, the holding body 2516 thereof, and other vibration units must have a configuration that is resilient against collision. By contrast, according to the configuration of the thirty-third embodiment illustrated in FIGS. 52 and 53, the vibration conductors 2524 and 2526 are guarded by the original corner parts 2801d and 2801e of the mobile telephone 2801; therefore, a countermeasure for impacts is more readily realized than in the case of the twenty-ninth embodiment.

In the modification example of FIG. 53B as well, as is clear from the diagram, the vibration conductor 2824, which is the upper of the pair of vibration conductors, is guarded by the corner part 2801d of the mobile telephone 2801 and is exposed to the side surface of the mobile telephone 2801. The vibration conductor 2826, which is lower, is positioned at a side surface that is less prone to the direct application of impact. Similarly with respect to the case of FIG. 53A, the vibration isolation material 2865 is used to fill in the spaces between the pair of vibration conductors 2824 and 2826 and the mobile telephone 2801.

In a case in which, as in the modification examples of the thirty-third embodiment illustrated in FIGS. 52B and 53B, the vibration conductors 2824 and 2826 are provided to two points on the side surface (one point of which is in the vicinity of the upper part corner 2801), it becomes possible for both to come up against two points of the ear cartilage in the longitudinal direction. In such a case, when the space between the vibration conductor 2824 and the vibration conductor 2826 is on the order of 2 to 5 cm, the upper vibration conductor 2824 is also able to come up against the ear cartilage when the lower vibration conductor 2826 comes up against the tragus. As shall be apparent, the use such that the upper vibration conductor 2824 is brought up against the tragus for listening is discretionary. Similarly, in the case of the thirty-third embodiment illustrated in FIGS. 52A and 53A as well, the vibration conductors 2824 and 2826 can also be brought up against two points of the ear cartilage in the transverse direction. The divided use of the vibration conductor 2824 for abutting the right tragus and of the vibration conductor 2826 for abutting the right tragus, such as in the twenty-ninth embodiment of FIG. 47, is also discretionary.

In any event, abutting the ear cartilage at two points permits the energies of both the simultaneously vibrating vibration conductors 2824 and 2826 to be introduced to the ear cartilage; the transmission is therefore energy-efficient. On the other hand, in a case in which the mobile telephone 2801 is pushed strongly against the tragus to obtain the earplug bone conduction effect, the pushing on and obstructing of the tragus is more readily achieved by bringing merely a single vibration conductor at the corner part up against the tragus.

Thirty-Fourth Embodiment

Figure 54:
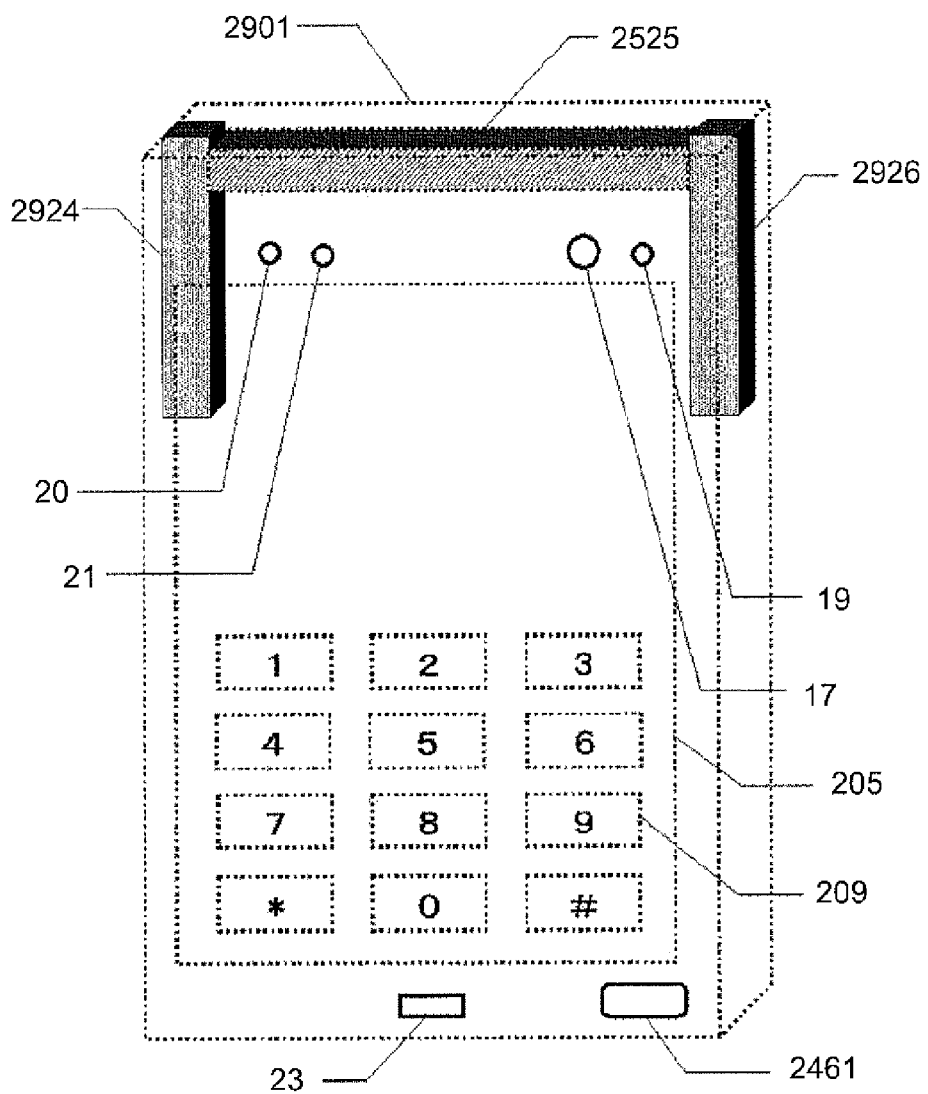
FIG. 54 is a transparent perspective view of a thirty-fourth embodiment according to an aspect of the present invention (thirty-fourth embodiment)

FIG. 54 is a transparent perspective view relating to a thirty-fourth embodiment according to an aspect of the present invention, the embodiment being configured as a mobile telephone 2901. The thirty-fourth embodiment is configured such that the side surface of the a mobile telephone 2901 is made to vibrate, as in the thirtieth embodiment of FIG. 48 and/or the thirty-first embodiment of FIG. 49, but both side surfaces are made to be capable of vibrating so as to be able to support both the case of right-hand-held and the case of left-hand-held usage. In other words, the thirty-fourth embodiment of FIG. 54 substitutes the pair of vibration conductors 2824 and 2826 in the thirty-third embodiment of FIG. 52A with a pair of vibration conductors 2924 and 2926 for a side surface arrangement; the vibration conductors 2924 and 2926 assume a vertically long shape so as to achieve contact with the ear cartilage over a broad range of the side surface. The holding structure of the piezoelectric bimorph element 2525 is shared with that of the thirty-third embodiment of FIG. 52A, but a more detailed illustration has been omitted in order to avoid complication.

In the thirty-fourth embodiment, the color of the vibration conductors 2924 and 2926 is made to be different from the color of the outer wall of the mobile telephone 2901, and the configuration may also be such that the user knows that the configuration is such that sound is listened to from the side surface and also knows what portion is thereupon brought up against the ear. On the other hand, in a case in which the user is notified that the configuration is such that sound is listened to from the side surface and what portion is thereupon brought up against the ear, there may be employed a design for implementing surface processing such that it is unknown whether the color of the vibration conductors 2924 and 2926 has been rendered as the same color as the color of the outer wall of the mobile telephone 2901, and such that the boundary with the outer wall of the mobile telephone 2901 is further unknown. The configuration of the thirty-fourth embodiment is otherwise shared with that of, for example, the twenty-sixth embodiment of FIG. 41, and therefore portions that are in common have been given like reference numerals, and a description thereof has been omitted.

Thirty-Fifth Embodiment

Figure 55:
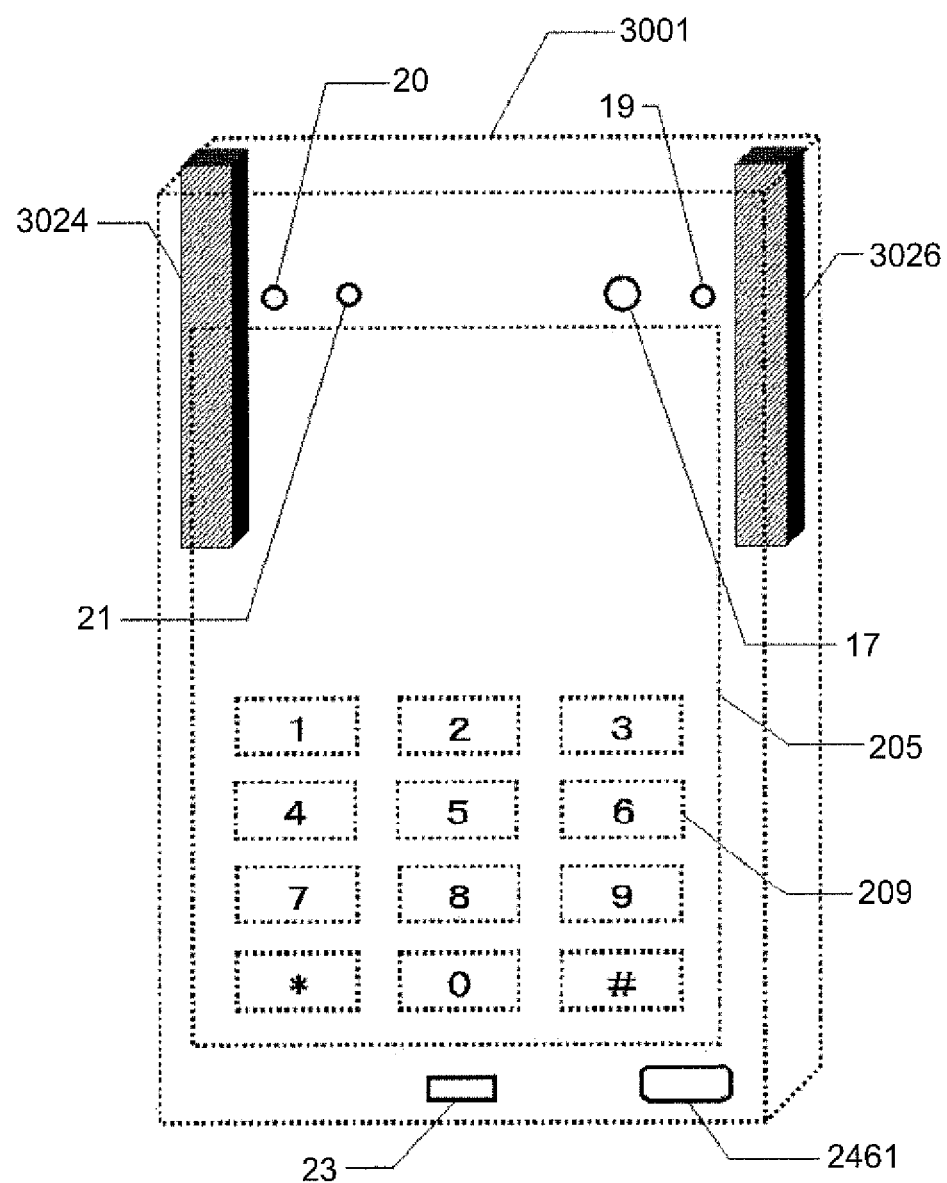
FIG. 55 is a transparent perspective view relating to a thirty-fifth embodiment according to an aspect of the present invention (thirty-fifth embodiment)

FIG. 55 is a transparent perspective view relating to a thirty-fifth embodiment according to an aspect of the present invention, the embodiment being configured as a mobile telephone 3001. The thirty-fifth embodiment is also configured such that the two side surfaces of the mobile telephone 3001 are made to vibrate across a broad range, similarly with respect to the thirty-fourth embodiment of FIG. 54. However, a point of difference from the thirty-fourth embodiment of FIG. 54 lies in that a pair of piezoelectric bimorph elements 3024 and 3026 are arranged in a vertically long position such that each of the two side surfaces can be independently controlled. It accordingly becomes possible to cause only the one piezoelectric bimorph element that is being used to vibrate automatically, similarly with respect to the first to third embodiments described in FIGS. 1 to 6. The holding of the piezoelectric bimorph elements 3024 and 3026 can utilize the holding structures in each of the embodiments described in FIGS. 44 to 52 and the like, as appropriate, and therefore a more detailed illustration has been omitted in order to avoid complexity.

The thirty-fifth embodiment may also be configured such that, when the piezoelectric bimorph elements 3024 and 3026 are arranged on the side surfaces, the piezoelectric bimorph elements 3024 and 3026 are covered with a material such as that of the vibration conductor 2527 in the thirtieth embodiment in FIG. 48, the color of the vibration conductor being made to be different from the color of the outer wall of the mobile telephone 3001, such that the user learns that the configuration is such that sound is listened to from the side surface and knows what portion is thereupon brought against the ear. On the other hand, similarly with respect to the thirty-fifth embodiment, in a case in which the user is notified that the configuration is such that sound is listened to from the side surface and is notified of what portion is thereupon brought up against the ear, the there may be employed a design for implementing surface processing such that it is unknown whether the color of the vibration conductor has been rendered as the same color as the color of the outer wall of the mobile telephone 3001, and such that the boundary with the other side surface portion in the outer wall of the mobile telephone 3001 is unknown. The configuration of the thirty-fifth embodiment is otherwise shared with that of, for example, the twenty-sixth embodiment of FIG. 41, and therefore portions that are in common have been given like reference numerals, and a description thereof has been omitted.

Thirty-Sixth Embodiment

Figure 56:
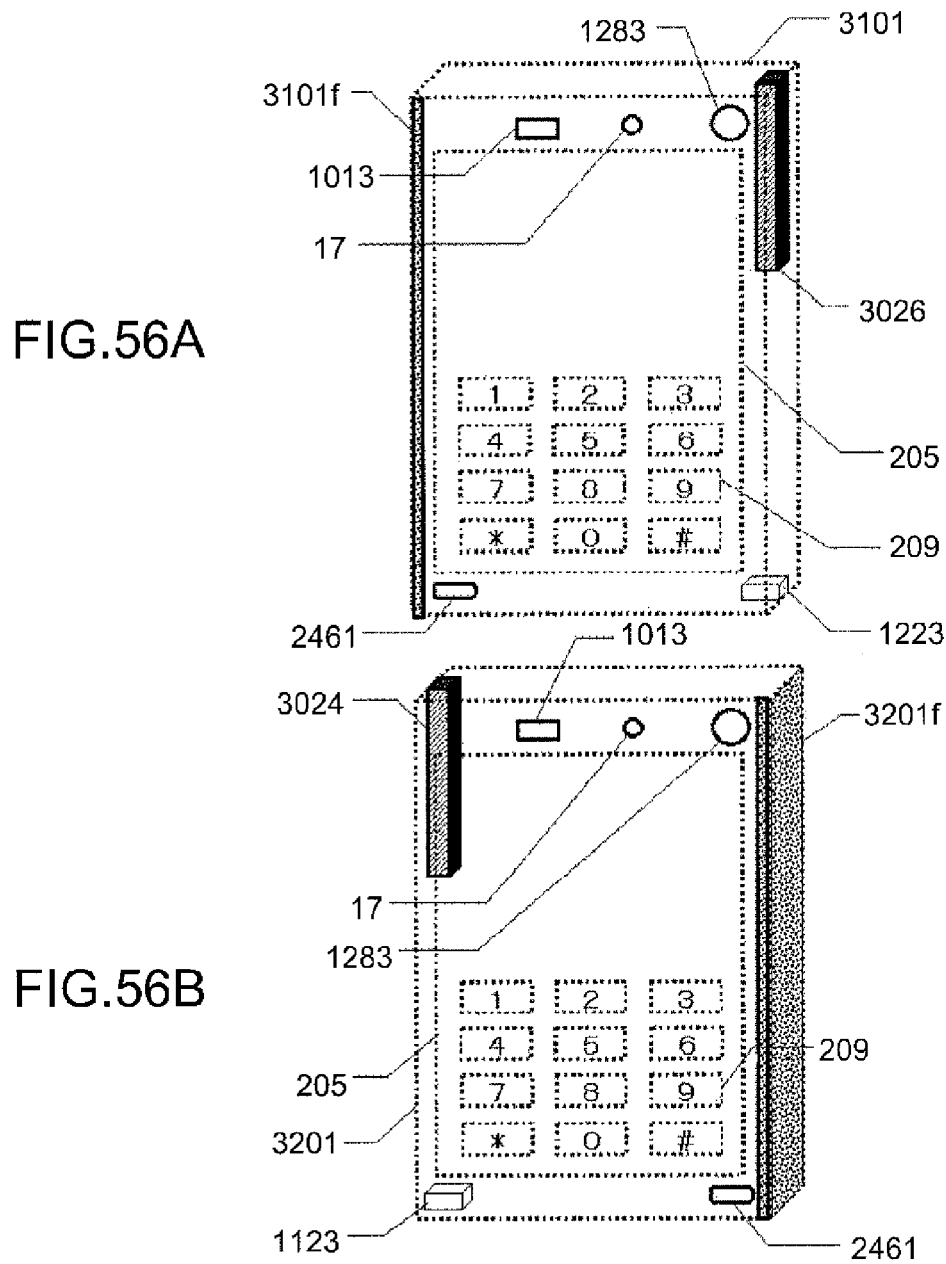
FIG. 56 is a transparent perspective view relating to a thirty-sixth embodiment according to an aspect of the present invention (thirty-sixth embodiment)

FIG. 56 is a transparent perspective view relating to a thirty-sixth embodiment according to an aspect of the present invention, and is configured as a mobile telephone 3101 and a mobile telephone 3201. The configuration of the thirty-sixth embodiment of FIG. 56 is substantially consistent with that of the thirty-fifth embodiment of FIG. 55, but the mobile telephone is configured as a left-handed mobile telephone 3101 illustrated in FIG. 56A and as a right-handed mobile telephone 3201 illustrated in FIG. 56B so as to provide the market with the ability to select either one. In other words, the left-handed mobile telephone 3101 of FIG. 56A is provided with a piezoelectric bimorph element 3024 for coming up against the left tragus, and the right-handed mobile telephone 3201 illustrated in FIG. 56B is provided with a piezoelectric bimorph element 3026 for coming up against the left tragus. Since usage is limited to a single side, for microphones and other outgoing-talk units, the left-handed mobile telephone 3101 of FIG. 56A is provided with a outgoing-talk unit (microphone) 1223 at the bottom of the left side surface, and the right-handed mobile telephone 3201 of FIG. 56B is provided with a outgoing-talk unit (microphone) 1123 at the bottom of the right side surface. The outgoing-talk units (microphones) 1123 or 1223 are similar to those of the twelfth embodiment or the thirteenth embodiment; during a videoconferencing function in which the large-screen display unit 205 is being observed, the outgoing-talk units (microphones) 1123 and 1223, which serve as outgoing-talk units, are switched, and are able to pick up audio uttered by the user while the large-screen display unit 205 is being observed.

In the thirty-sixth embodiment of FIG. 56, as described above, the piezoelectric bimorph elements and/or microphones and other audio-related configurations relating to listening and speaking are integrated at the side surface of the mobile telephone; and the visual-related configuration of the large-screen display unit 205 and the like is integrated at the front surface of the mobile telephone. Therefore, as the side surface is used when the mobile telephone 3101 or 3201 is brought up against the face at the ear or the like and the front surface is used when the mobile telephone 3101 or 3201 is being watched with the eyes, the two surfaces of the mobile telephone 3101 or 3201 describing a 90° angle can be used separately, and the front surface of the mobile telephone 3101 or 3201 can be prevented from having the display surface 205 or the like fouled by the face.

In the thirty-sixth embodiment of FIG. 56, the side surface that is the opposite side at which the piezoelectric bimorph element 3024 or 3026 is not arranged is primarily used to hold the mobile telephone, and therefore, in a natural manner of holding with the hands, the side surface is covered with a material 3101*f* or 3201*f* that is rough to the touch, facilitating holding and also permitting a clear understanding of which side is brought up against the ear. The thirty-sixth embodiment, similarly with respect to the thirty-fifth embodiment, may also be configured such that the color of the vibration conductor for covering the piezoelectric bimorph element 3024 or 3026 is different from the color of the outer wall of the mobile telephone 3101 or 3201. In a case in which the side surface of the opposite side in the thirty-sixth embodiment is covered with the material 3101*f* or 3201*f* that is rough to the touch, as described above, then the side surface of the side for listening to sound can be recognized, and accordingly there may be employed a design for implementing surface processing such that it is unknown whether the color of the vibration conductor has been rendered as the same color as the color of the outer wall of the mobile telephone 3101 or 3201, and such that the boundary with the other side surface portion in the outer wall of the mobile telephone 3101 or 3201 is further unknown. The configuration of the thirty-fifth embodiment is otherwise shared with that of, for example, the twenty-sixth embodiment of FIG. 41, and therefore portions that are in common have been given like reference numerals, and a description thereof has been omitted.

However, the terms "right-handed" and "left-handed" in the thirty-sixth embodiment anticipate, for example, a state in which the side surface to which the piezoelectric bimorph element 3024 is provided comes up against the left ear cartilage when the side surface of the mobile telephone 3101 comes up against the ear, without the wrist being turned, directly out of the state in which the mobile telephone 3101 of FIG. 56A is held with the left hand and the display surface 205 is viewed. However, the user's method of use is discretionary; when the wrist is rotated 180° to turn the mobile telephone 3101 of FIG. 56A over when the mobile telephone 3101 is held in the right hand and brought up against the ear, the side surface of the side to which the piezoelectric bimorph element 3024 is provided can be brought up against the right ear cartilage. Accordingly, the terms "right-handed" and "left-handed" are merely provisional; the user is capable of purchasing either one and unrestrictedly selecting how to use same. The mobile telephone 3101 of FIG. 56A can accordingly be identified as being "right-handed" for a user who turns the wrist for use in the manner described above.

Thirty-Seventh Embodiment

Figure 57:
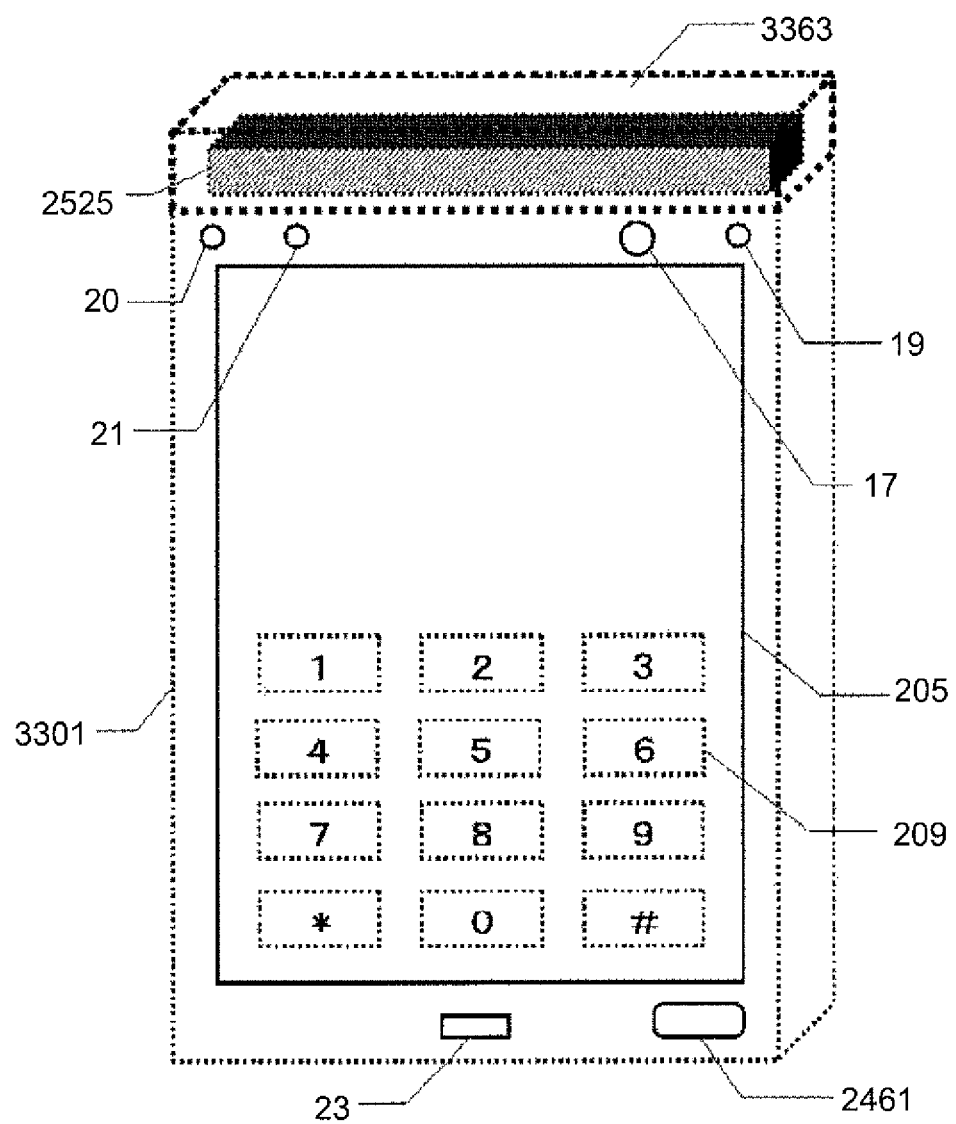
FIG. 57 is a transparent perspective view relating to a thirty-seventh embodiment according to an aspect of the present invention (thirty-seventh embodiment)

FIG. 57 is a transparent perspective view relating to a thirty-seventh embodiment according to an aspect of the present invention, and is configured as a mobile telephone 3301. The thirty-seventh embodiment of FIG. 57 has many portions in common with the modification example of the tenth embodiment in FIG. 40; therefore, portions in common have been given like reference numerals, and a description thereof has been omitted. A point of difference in the thirty-seventh embodiment from the modification example of the tenth embodiment lies in that the piezoelectric bimorph element 2525 is covered with a cartilage conduction output unit 3363, in which not only the front surface but also the upper side and the front, rear, left, and right sides at the top edge of the mobile telephone 3301 are formed of a material having an acoustic impedance approximating that of ear cartilage. This cartilage conduction output unit 3363, similarly with respect to the cartilage conduction output unit 963 in the tenth embodiment or in the modification example thereof, is formed using, for example, a silicone rubber; a mixture of a silicone rubber and a butadiene rubber; a natural rubber; or a material having a structure formed using these varieties of rubber in which air bubbles are sealed.

According to the configuration of the thirty-seventh embodiment, cartilage conduction can be obtained by any site anywhere on the top of the mobile telephone 3301 coming up against ear cartilage; therefore, sound can be listened to at an optimal volume merely by bringing the top part of the mobile telephone 3301 up against the ear, regardless of the location thereon.

The various features of each of the embodiments described above are not to be restricted to individual respective embodiments; they can be substituted or combined with other appropriate embodiments.

Thirty-Eighth Embodiment

Figure 58:
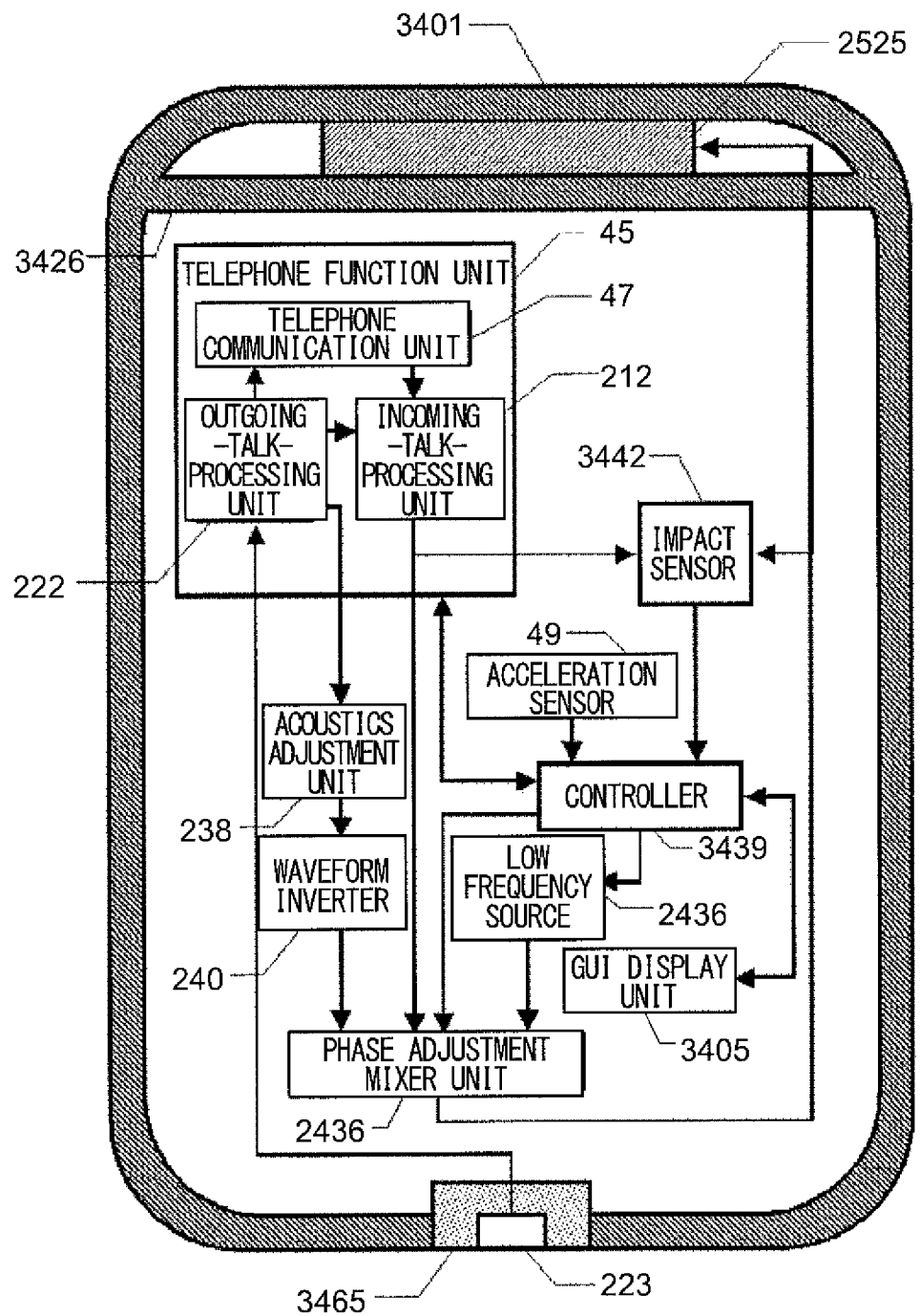
FIG. 58 is a cross-sectional block diagram relating a thirty-eighth embodiment according to an aspect of the present invention (thirty-eighth embodiment)

FIG. 58 is a cross-sectional block diagram relating to a thirty-eighth embodiment according to an aspect of the present invention, and is configured as a mobile telephone 3401. The thirty-eighth embodiment of FIG. 58 shares many portions with the twenty-sixth embodiment or the twenty-seventh embodiment, and therefore portions that are in common have been given the same reference numerals as in FIG. 42 and a description thereof has been omitted. A point of difference in the thirty-eighth embodiment from the twenty-sixth embodiment or from the twenty-seventh embodiment lies in it being configured such that the cartilage conduction vibration source 2525, which is constituted of a piezoelectric bimorph element, is anchored to a chassis structure 3426 of the mobile telephone 3401, and the vibration of the cartilage conduction vibration source 2525 is transmitted to the entire surface of the mobile telephone 3401. In anchoring the piezoelectric bimorph element constituting the cartilage conduction vibration source 2525, to actively transmit the vibration thereof, the gap 2504 such as in FIG. 44B is not provided, but rather there is a close bond to the chassis structure 3426, and the vibration in the primary vibration direction (the Y-Y' direction) is likely to be transmitted to the chassis structure 3426. The entire surface of the mobile telephone 3401 thereby acts as a vibration conductor, and cartilage conduction can be obtained regardless of what location on the surface of the mobile telephone 3401 is brought up against the ear cartilage.

Because the thirty-eighth embodiment has the aforementioned configuration, in a case in which a large portion of the surface area of the front surface or the back surface of the mobile telephone 3401 is brought up against the entire cartilage of the ear, similarly with respect to the fifth to ninth embodiments, the vibration of the cartilage conduction vibration source 2525 is transmitted to the ear cartilage over a broad contacted surface area of the surface of the mobile telephone 3401 via the chassis structure 3426. Air conduction sound that is generated by the vibration of the surface of the mobile telephone 3401 is also transmitted from the external auditory meatus to the tympanic membrane. Sound source information from the cartilage conduction vibration source 2525 can thereby be heard as a loud sound. The surface of the mobile telephone 3401 that is brought up against the ear assumes a form such that the external auditory meatus is obstructed, and therefore environment noise can be blocked. Increasing the force pushing the mobile telephone 3401 against the ear furthermore gives the result of substantially completely obstructing the external auditory meatus, and sound source information from the cartilage conduction vibration source 2525 can be heard as an even louder sound due to the earplug bone conduction effect.

In a case in which the side surface of the thirty-eighth embodiment is brought up against the ear cartilage, then the front surface of the mobile telephone to which the display surface and the like are provided can be prevented from being fouled by contact with the face, similarly with respect to the eleventh to fourteenth embodiments, the thirtieth embodiment, the thirty-first embodiment, the modification example of the thirty-third embodiment, and the thirty-fourth to thirty-sixth embodiments. Furthermore, in a case in which the upper edge corner of the thirty-eighth embodiment is brought up against the ear cartilage, contact with the tragus is readily achieved, and pushing on the tragus to obstruct the external auditory meatus can readily obtain the earplug bone conduction effect, similarly with respect to the first to fourth embodiments, the tenth embodiment and the modification example thereof, the twenty-sixth to twenty-ninth embodiments, and the thirty-third embodiment. The thirty-seventh embodiment of FIG. 57 is configured such that cartilage conduction can be obtained by any site anywhere on the top of the mobile telephone 3301 being brought up against ear cartilage, but the thirty-eighth embodiment of FIG. 58 expands on this feature; it is possible to listen to sound at an optimal volume merely by bringing the upper part of the mobile telephone 3401 up against the ear, at anywhere on the surface of the mobile telephone 3401, regardless of the place.

In the thirty-eighth embodiment of FIG. 58, the cartilage conduction vibration source 2525 is anchored to the chassis structure 3426 such that the primary vibration direction of the piezoelectric bimorph element (the Y-Y' direction) assumes an orientation orthogonal to that of a GUI display unit 3405 (conceptualized in the block diagram in FIG. 58, but is the large-screen display unit 205 having a touch panel function, when calling on the perspective view of FIG. 41, which relates to the twenty-sixth embodiment) (A cross-section of the anchoring is not illustrated in FIG. 58, but the manner of the anchoring will be described later). A large portion of the surface area of the front surface or the rear surface of the mobile telephone 3401, to which the GUI display unit 3405 is provided, thereby vibrates efficiently. There is comparatively less energy in the non-vibration direction of the piezoelectric bimorph element (the X-X' direction), due to the anchoring of the cartilage conduction vibration source 2525, but because vibration does occur, sound can be listened to by cartilage conduction whenever a side surface of the mobile telephone 3401 is brought up against the ear cartilage. It shall be noted that the GUI display unit 3405 of FIG. 58 is illustrated as a consolidation of the large-screen display unit 205 of FIG. 42, the display driver 41, and the touch panel driver 2470.

In the embodiment of FIG. 58, similarly with respect to the twenty-seventh embodiment, a function is selected by a motion sensor for the contactless detection of the motion of the finger in the vicinity of the GUI display unit 3405, and an impact detection function of the piezoelectric bimorph element constituting the cartilage conduction vibration source 2525 is utilized as an impact sensor for detecting the touch of a finger for determining the selected function. The impact sensor 3442 illustrated in FIG. 58 has a function similar to that of the pressure sensor 242 illustrated in FIG. 9, and extracts an impact detection signal of the piezoelectric bimorph element. The aforementioned arrangement of the primary vibration direction of the piezoelectric bimorph element (the Y-Y' direction) to be oriented orthogonally with respect to that of the GUI display unit 3405 is suited for detecting a touch from the front surface or the back surface of the mobile telephone 3401. The embodiment of FIG. 58, similarly with respect to the twenty-seventh embodiment, has the cartilage conduction vibration source 2525 serve a dual purpose as a low frequency output element for touch sensation feedback, but the aforementioned arrangement of the primary vibration direction of the piezoelectric bimorph element (the Y-Y' direction) is suited for efficiently transmitting feedback vibration to a finger for a touch from the front surface or back surface of the mobile telephone 3401. The embodiment of FIG. 58, similarly with respect to the description in the twenty-sixth embodiment, has the cartilage conduction vibration source 2525 serve a dual purpose as a vibration source of a vibrator for providing a noiseless notification of an incoming call to the mobile telephone 3401.

The embodiment of FIG. 58, further similarly with respect to the fourth embodiment and similarly with respect to the twenty-seventh embodiment, is configured such that a horizontal stationary state is detected by the acceleration sensor 49, and when this is true, the cartilage conduction vibration source 2525 is prohibited from vibrating. The potential generation of vibration noise with a desk due to the output of the other party's voice can thereby be prevented in a case in which the mobile telephone 3401 is placed on a desk or the like during a call. It is also appropriate to activate the aforementioned GUI operation or incoming call vibrator function in a case in which the mobile telephone 3401 is placed on a desk or the like, and thereof in such a case, the configuration is such that the cartilage conduction vibration source 2525 is not prohibited from vibrating whenever the horizontal stationary state is detected by the acceleration sensor 49. A more detailed description of this point will be provided later as a function of the controller 3439.

To configure the embodiment of FIG. 58 such that the chassis structure 3426 of the mobile telephone 3401 is actively made to vibrate, there is the possibility that such vibration will be transmitted to the microphone 223 and result in the Larsen effect. As a countermeasure thereof, in order to block acoustic conduction between the chassis structure 3426 and microphone 223 of the mobile telephone 3401, an insulation ring unit 3465 having an acoustic impedance different from that of the chassis structure 3426 is provided in between the two. A countermeasure for preventing the Larsen effect in a circuit-like manner is achieved using a signal conduction pathway from the outgoing-talk-processing unit 222 to the incoming-talk-processing unit 212 in the telephone function unit 45.

Figure 59A:
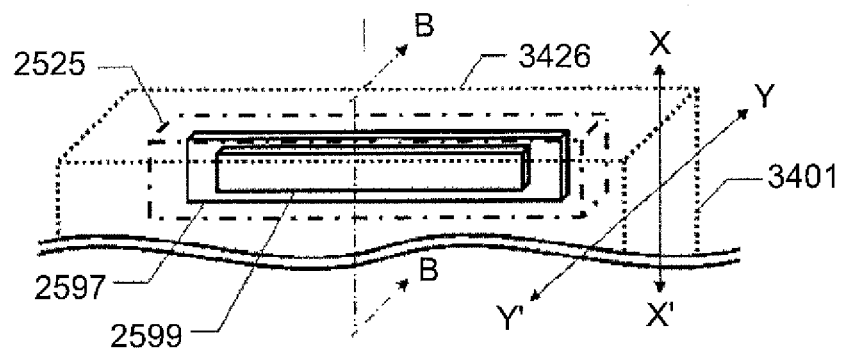
FIG. 59 is a back surface transparent view and cross-sectional view illustrating the manner in which a cartilage conduction vibration unit is anchored to the mobile telephone in the thirty-eighth embodiment.
Figure 59B:
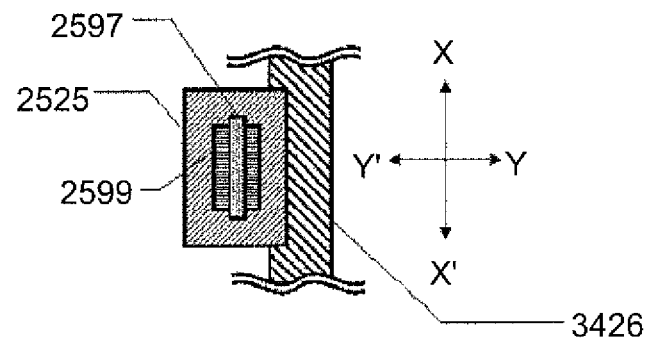
Figure 59C:
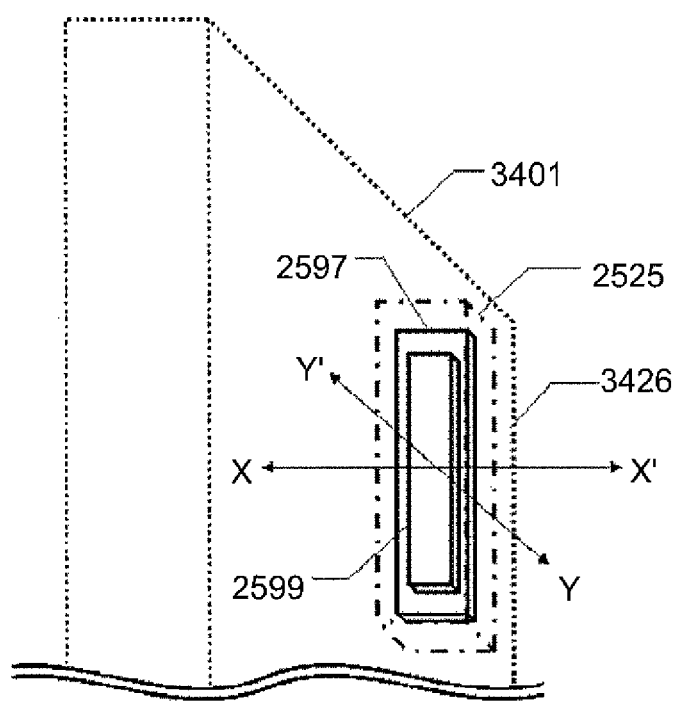

FIG. 59 is a back surface transparent view and cross-sectional view illustrating the manner in which the cartilage conduction vibration source 2525 is anchored to the chassis structure 3426 of the mobile telephone 3401 in the thirty-eighth embodiment of FIG. 58. FIG. 59A is a back surface perspective view illustrating a part of the top end side of the mobile telephone 3401 of the thirty-eighth embodiment, and FIG. 59B is a cross-sectional view illustrating the B-B cross-section of FIG. 59A. FIG. 59C is a transparent perspective view in which a part of the top end side in a modification example of the thirty-eighth embodiment is viewed from the side surface of the opposite side. The configuration of the piezoelectric bimorph element is similar to that in FIG. 44B, and therefore portions that are in common have been given like reference numerals.

As is clear from FIG. 59A, in the thirty-eighth embodiment, the metal sheet 2597 of the piezoelectric bimorph element constituting the cartilage conduction vibration source 2525 is arranged so as to be parallel to the front surface of the mobile telephone 3401; as a result thereof, the cartilage conduction vibration source 2525 is anchored to the chassis structure 3426 such that the Y-Y' direction, which is the primary vibration direction, is oriented to be orthogonal to the GUI display unit 3405. As is clear from FIG. 59B, the piezoelectric bimorph element constituting the cartilage conduction vibration source 2525 is tightly secured on the inner side of the chassis structure 3426 without any gap, the configuration being such that the vibration in the primary vibration direction (the Y-Y' direction) is prone to being transmitted to the surface of the chassis structure 3426.

In a modification example of the thirty-eighth embodiment in FIG. 59C, the metal sheet 2597 of the piezoelectric bimorph element constituting the cartilage conduction vibration source 2525 is arranged so as to be in parallel with the side surface of the mobile telephone 3401; as a result thereof, the cartilage conduction vibration source 2525 is anchored to the chassis structure 3426 such that the Y-Y' direction, which is the primary vibration direction, is oriented to be orthogonal to the side surface of the mobile telephone 3401. Cartilage conduction can thereby be efficiently obtained when the side surface of the mobile telephone 3401 is brought up against the ear. There is comparatively less energy in the non-vibration direction of the piezoelectric bimorph element (the X-X' direction), due to the anchoring of the cartilage conduction vibration source 2525, but because vibration does occur, sound can be listened to by cartilage conduction whenever the front surface or back surface of the mobile telephone 3401 is brought up against the ear cartilage. In the modification example of the thirty-eighth embodiment in FIG. 59C as well, similarly with respect to FIG. 59B, the piezoelectric bimorph element constituting the cartilage conduction vibration source 2525 is tightly secured to the inner side of the chassis structure 3426, without any gap, the configuration being such that the vibration in the primary vibration direction (the Y-Y' direction) is likely to be transmitted to the surface of the chassis structure 3426.

Figure 60:
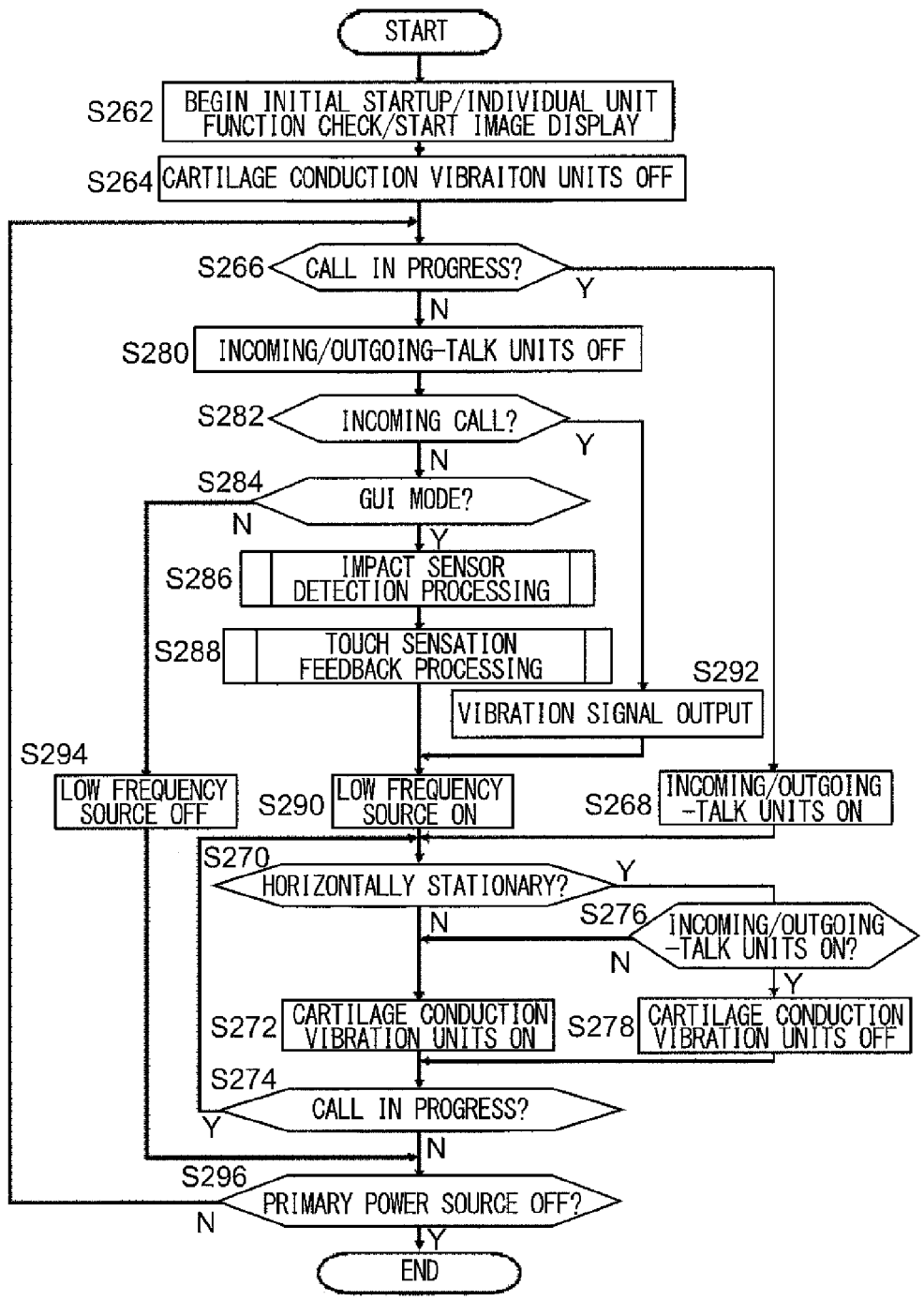
FIG. 60 is a flow chart of the operation of a controller 3439 in the thirty-eighth embodiment of FIG. 58.

FIG. 60 is a flow chart of the operation of a controller 3439 in the thirty-eighth embodiment of FIG. 58. The flow of FIG. 60 illustrates an abstraction of the operation that focuses on related functions, in order to primarily provide a description of the control of the cartilage conduction vibration source 2525; the controller 3439 also contains typical functions of mobile telephones and other operations not represented in the flow of FIG. 60. The flow of FIG. 60 begins when a main power source of the mobile telephone 3401 is turned on; in step S262 an initial startup and a check of each unit function are performed and a screen display on the GUI display unit 3405 is started. Subsequently, in step S264, the function of the cartilage conduction vibration source 2525 is turned off and the flow moves on to step S266.

In step S266, there is performed a check for whether or not the mobile telephone 3401 is in the middle of a call. When the line is newly connected, a call is in progress and therefore the flow proceeds to step S268, in which the outgoing-talk-processing unit 222 and the incoming-talk-processing unit 212 are turned on; the flow then moves on to step S270. In a case in which the line is connected and a call has already been in progress, the flow proceeds from step S266 to step S268; in such a case, the outgoing-talk-processing unit 222 and the incoming-talk-processing unit 212 are continuously kept on and the flow moves on to step S270.

In step S270, there is performed a check for whether or not a horizontal stationary state has been detected by the acceleration sensor 49; when there is no horizontal stationary state, the flow moves on to step S272, which turns on the cartilage conduction vibration source 2525, whereupon the flow moves on to step S274. However, when the cartilage conduction vibration source 2525 is already on, the on state continues. On the other hand, when there is a detection of a horizontal stationary state in step S270, the flow proceeds to step S276, which checks for whether the outgoing-talk-processing unit 222 and the incoming-talk-processing unit 212 are in an on state. Then, in such a case, since an on state is in effect, the flow proceeds to step S278. The cartilage conduction vibration source 2525 is turned off and the flow moves on to step S274. When the cartilage conduction vibration source 2525 is already off, the off state continues. In step S274, there is performed a check for whether or not a call is in progress; when a call is in progress, the flow returns to step S270. Thereafter, as long as a call is in progress, steps S270 to S278 are repeated. In this manner, when the mobile telephone 3401 is temporarily placed on a desk or the like during a call, then whenever the voice of the other party is received, the vibration of the cartilage conduction vibration source 2525 is interrupted therebetween, and the generation of uncomfortable noise from vibration with the desk is prevented. As shall be apparent, when a horizontal stationary state is not detected in step S270, the cartilage conduction vibration source 2525 is turned on in step S272 and the call is reactivated.

On the other hand, when it is detected in step S266 that a state in which a call is not in progress is in effect or that a call is not in progress due to the termination of the call, the flow proceeds to step S280, the outgoing-talk-processing unit 222 and the incoming-talk-processing unit 212 are turned off, and the flow moves on to step S282. However, when the outgoing-talk-processing unit 222 and the incoming-talk-processing unit 212 are off, the off state continues and the flow moves on to step S282. In step S282, there is performed a check for whether there is an incoming call; when there is no incoming call, the flow moves on to step S284, in which there is performed a check for whether or not a GUI mode is in effect. Then, when a GUI mode is in effect, the flow proceeds to step S286, in which there is impact sensor detection processing; then, in step S288, there is touch sensation feedback processing, and the flow moves on to step S290. The flow moves directly on to step S290 when there is no operation at all, and when there is an operation, Steps S286 and S288 perform processing for implementing impact sensor detection and touch sensation feedback, which are based on the operation.

In step S290, the low frequency source 2436 is turned on and prepared for the input of a touch sensation feedback signal or the like. The flow then proceeds to step S270, in which there is a check for the presence or absence of a detection of a horizontal stationary state. Then, when there is no horizontal stationary state, the flow moves on to step S272, in which the cartilage conduction vibration source 2525 is turned on and prepared for the input of a touch sensation feedback signal or the like. The flow moves on to step S276 when a horizontal stationary state is detected in step S270, but in such a case, the outgoing-talk-processing unit 222 and the incoming-talk-processing unit 212 are not on, and therefore the flow still moves on to step S272, and the cartilage conduction vibration source 2525 is turned on. In this manner, the cartilage conduction vibration source 2525 is turned on when the low frequency source 2436 is turned on, even when a horizontal stationary state is detected. When the cartilage conduction vibration source 2525 is turned on, the impact sensor function thereof is also maintained.

On the other hand, when an incoming call is detected in step S282, the flow proceeds to step S292, a "vibe" signal for providing a notification of the incoming call is outputted; the flow then moves on to step S290. In such a case as well, the low frequency source 2436 is turned on in step S290 and the cartilage conduction vibration source 2525 is turned on in step S272, but the flow also moves on to step S272 even when the horizontal stationary state is detected in step S270, and the fact that the cartilage conduction unit 2525 is turned on is a point of similarity with the case in which the GUI mode is in effect.

When it is detected in step S274 that no call is in progress, the flow moves on to step S296, in which there is performed a check for whether the primary power supply has been turned off. Once the low frequency source 2436 is turned on in step S290, no call is in progress even when step S274 is reached, and therefore the flow moves on to step S296. When there is no detection made in step S284 that a GUI mode is in effect, the flow proceeds to step S294, the low frequency source 2436 is turned off, and the flow then arrives at step 296. When it is detected in step S296 that the primary power supply has been turned off, the flow is terminated. On the other hand, in a case in which there is no detection made in step S296 that the primary power supply is off, the flow returns to step S266, following which steps S266 to S296 are repeated and various situational changes are supported.

The various features of each of the embodiments described above are not to be limited to the above embodiments; rather, wherever it is possible to benefit from the feature of an embodiment, same can also be implemented in other aspects. The various features of each of the embodiments described above are not to be restricted to individual respective embodiments, but rather can be substituted or combined with other appropriate embodiments. For example, regarding the control of the cartilage conduction vibration source 2525 relating to being horizontally stationary, the thirty-eighth embodiment described above can be configured such that, in a case in which there is check for whether or not a videoconferencing function mode is in effect and the mode is in effect, the videoconferencing function speaker is turned on in tandem with the cartilage conduction vibration source 2525 being turned off in step S278 of FIG. 60.

The mode in the thirty-eighth embodiment in which the cartilage conduction vibration source 2525 is supported by the chassis structure 3426 of the mobile telephone 3401 is not to be limited to a rigid, direct anchoring such as in the thirty-eighth embodiment. For example, the rigid support may be indirect, via another holding structure, provided that it remains possible to transmit vibration. The support is also not necessarily limited to being rigid; rather, holding may be achieved via an elastic body, provided that the acoustic impedance is approximated and vibration is transmitted to the chassis surface.

Thirty-Ninth Embodiment

FIG. 61 is a cross-sectional view relating to a thirty-ninth embodiment according to an aspect of the present invention as well as to various modification examples thereof, and is configured as mobile telephones 3501a to 3501d. The thirty-ninth embodiment is consistent with, for example, the thirty-eighth embodiment illustrated in FIGS. 58 to 60, except for the arrangement of the cartilage conduction vibration source 2525, which is constituted of a piezoelectric bimorph element (and which hereinafter is described using the example of the piezoelectric bimorph element 2525). Therefore, the diagram does not contain those portions for which no description is needed, and of the illustrated portions, shared portions have been given like reference numerals, a description thereof having been omitted unless there is a particular need.

FIG. 61A relates to the thirty-ninth embodiment, and is a cross-sectional view in which the mobile telephone 3501a is viewed from above as being cut in a plane that is perpendicular to the side surface thereof and to the display surface of the GUI display unit 3405. As is clear from the diagram, the piezoelectric bimorph element 2525 is arranged along one side surface of the mobile telephone 3501a as in the modification example of the thirty-eighth embodiment in FIG. 59C. However, in the thirty-ninth embodiment of FIG. 61, the primary vibration direction of the piezoelectric bimorph element 2525 (the Y-Y' direction) is not perpendicular to the side surface, but rather is supported so as to incline relative to the side surface. More specifically, the side surface of the thirty-ninth embodiment is provided with an inclined side surface 3507a to which four beveled side surface ridge portions are provided; the piezoelectric bimorph element 2525 has a primary vibration surface (the "outer surface of the piezoelectric bimorph element 2525 that is in parallel with the metal sheet 2597" is defined as the "primary vibration surface") that is bonded to one inner side of the inclined side surface 3507a for support. The primary vibration direction (which is the Y-Y' direction, and is the direction perpendicular to the primary vibration surface) of the piezoelectric bimorph element 2525 thereby becomes perpendicular to the inclined side surface 3507a.

Due to such a structure, the user of the mobile telephone 3501a can prevent the display surface of the GUI display unit 3405 from being fouled by contact with the cheek, and can also readily bring the inclined side surface 3507a of the mobile telephone 3501a up against the ear cartilage. The configuration, which integrates the audio-related configuration into the side surface of the mobile telephone and integrates the visual-related configuration into the front surface of the mobile telephone, as has already been described in the other embodiments, is significant in that the uses of the two surfaces of the mobile telephone 3501a can be divided such that the side surface is utilized when the mobile telephone 3501a is brought up against the ear or other part of the face and the front surface is utilized when the mobile telephone is watched with the eyes, and in that the front surface of the mobile telephone 3501a can be prevented from having the display surface of the GUI display unit 3405 fouled by the face. However, rather than causing the side surface in its entirety to make perpendicular contact with the ear during the usage of the side surface, it is also possible to conceive of a usage state in which the mobile telephone 3501a is caused to make contact with the ear such that the display surface of the GUI display unit 3405 is turned slightly toward the face. The thirty-ninth embodiment of FIG. 61A is configured in anticipation of such usage.

As mentioned above, the thirty-ninth embodiment of FIG. 61A has the direction of arrow 25A serving as the primary vibration direction in the inclined side surface 3507a, in which the piezoelectric bimorph element 2525 is bonded to the inner side, but since the primary vibration direction is inclined, there is created a vibration component having a direction that is perpendicular to the display surface of the GUI display unit 3405, illustrated by arrow 25B. A side surface vibration component illustrated by arrow 25C is also created. Sound can thereby be listened to even in a case in which the front surface of the mobile telephone 3501a (the display surface of the GUI display unit 3405) or the back surface thereof, and, furthermore, either of the two side surfaces of the mobile telephone 3501a, is brought up against the ear cartilage. Any position of the mobile telephone 3501a can accordingly be discretionarily used, taking the direction of arrow 25A as the best direction. In the thirty-ninth embodiment of FIG. 61A, the inclined side surface 3507a assumes an incline that is close to the display surface of the GUI display unit 3405; therefore, the vibration component of the direction illustrated by arrow 25B is greater than the vibration component of the direction illustrated by arrow 25C.

FIG. 61B is a first modification example of the thirty-ninth embodiment; the mobile telephone 3501b is configured such that the incline of the inclined side surface 3507b is substantially 45° relative to the display surface of the GUI display unit 3405, whereby the vibration component of the direction illustrated by arrow 25B becomes substantially even with the vibration component of the direction illustrated by arrow 25C. By contrast, FIG. 61C is a second modification example of the thirty-ninth embodiment. The mobile telephone 3501c is configured such that the inclined side surface 3507c assumes an incline that is close to the side surface, whereby the vibration component of the direction illustrated by arrow 25C becomes greater than the vibration component of the direction illustrated by arrow 25B.

FIGS. 61A to 61C are extreme illustrations for describing a broad overview of the inclines, but the extreme directivity in the vibration of the piezoelectric bimorph element 2525 is not maintained after having been transmitted to the mobile telephones 3501a to 3501c; therefore, subtle changes in the orientation of the primary vibration direction of the piezoelectric bimorph element 2525 provided to the side surface of the mobile telephone will not incur perceptible changes to the vibration components. However, there is great significance in adjusting the arrangement direction of the piezoelectric bimorph element 2525 as in the thirty-ninth embodiment and the modification examples thereof, when the best position of the contact with the ear cartilage is considered. For example, in a case as in FIGS. 61A to 61C in which a planar inclined side surface is provided, it is of practical utility for the front surface of the mobile telephones 3501a to 3501c (the display surface of the GUI display unit 3405) and the inclined side surfaces 3507a to 3507c to be imparted with an incline of between approximately 30 to 60°.

FIG. 61D is a third modification example of the thirty-ninth embodiment; the side surface of a mobile telephone 3501d serves as a semicylindrical surface 3507d. The configuration is such that support is provided by pushing on the inner side of the semicylindrical surface 3507d such that the primary vibration direction of arrow 25A assumes a substantially 45° angle relative to the display surface of the GUI display unit 3405, and the vibration component of the direction illustrated by arrow 25B becomes substantially equivalent to the vibration component of the direction illustrated by arrow 25C. The user is thereby able to bring up against the ear cartilage any desired place across the front surface of the mobile telephone 3501d (the display surface of the GUI display unit 3405) or across the back surface thereof, from the semicylindrical surface 3507d of the side surface. In the third modification example of the thirty-ninth embodiment of FIG. 61D, the primary vibration direction of arrow 25A is not limited to a case of having a substantially 45° angle relative to the display surface of the GUI display unit 3405, and can be established in various inclines such as in FIGS. 61A to 61C. Another possible configuration is one in which it is possible to adjust the incline of holding and in which a service for altering the incline in accordance with the user's desire can be provided.

Fortieth Embodiment

FIG. 62 represents cross-sectional views and a transparent perspective view of the elements relating to a fortieth embodiment according to an aspect of the present invention as well as to various modification examples thereof, and is configured as mobile telephones 3601a to 3601c. The fortieth embodiment is also consistent with the thirty-eighth embodiment illustrated in FIGS. 58 to 60, except for the arrangement of the cartilage conduction vibration source 2525, which is constituted of a piezoelectric bimorph element (and which hereinafter is described using the example of the piezoelectric bimorph element 2525). Therefore, the diagram does not contain those portions for which no description is needed, and of the illustrated portions, shared portions have been given like reference numerals, a description thereof having been omitted unless there is a particular need.

Figures 62A, 62B, 62C:
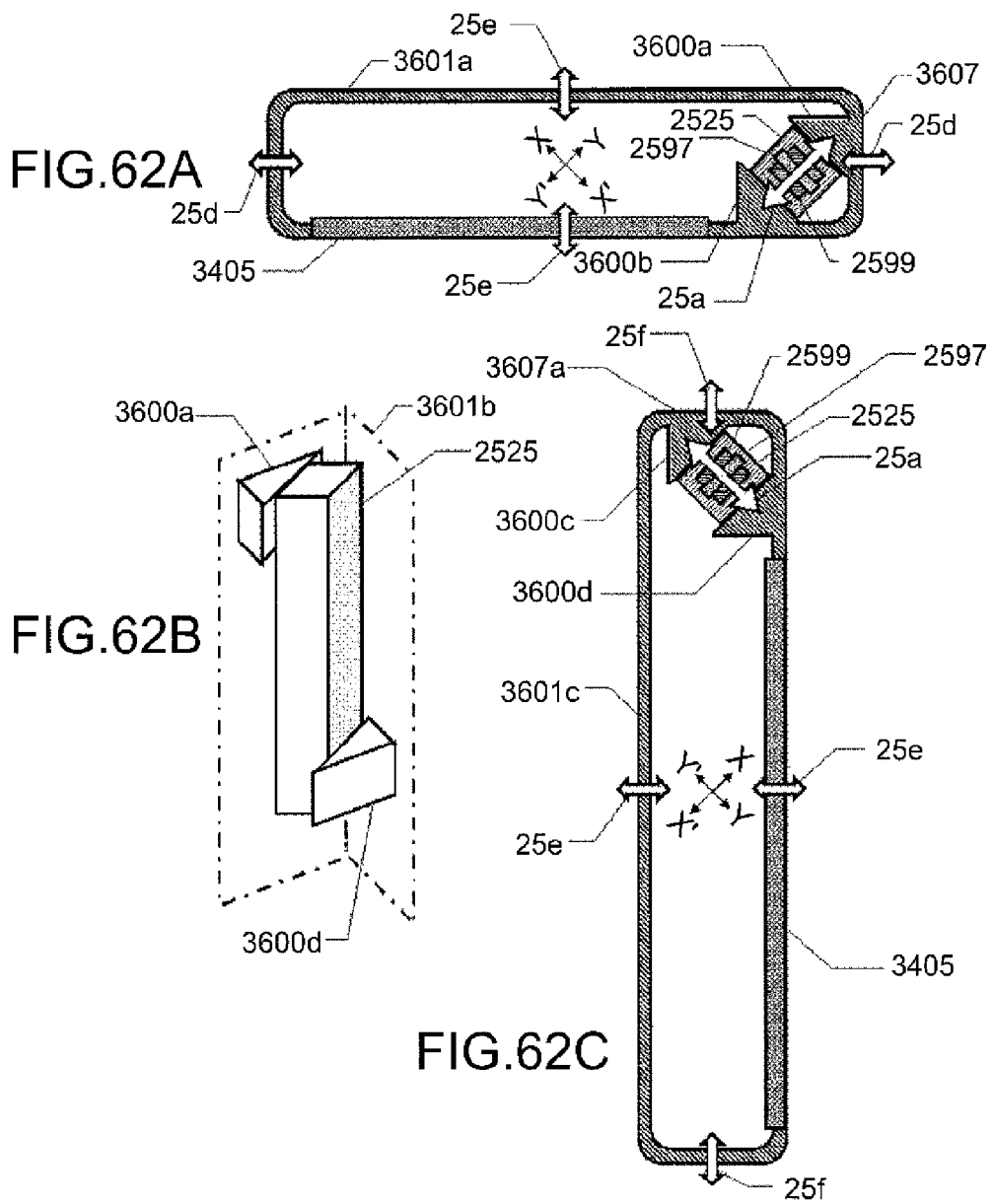
FIG. 62 is a cross-sectional view and a transparent perspective view of the elements of a fortieth embodiment according to an aspect of the present invention as well as various modification examples thereof (fortieth embodiment)

FIG. 62A relates to the fortieth embodiment, and is a cross-sectional view in which the mobile telephone 3601a is viewed from above as being cut in a plane that is perpendicular to a side surface 3607 thereof and to the display surface of the GUI display unit 3405. As is clear from the diagram, the piezoelectric bimorph element 2525 is arranged along one side surface 3607 of the mobile telephone 3601a as in the modification example of the thirty-eighth embodiment in FIG. 59C. However, in the fortieth embodiment of FIG. 62, similarly with respect to the thirty-ninth embodiment, the piezoelectric bimorph element 2525 has a primary vibration direction (the Y-Y' direction) that is not perpendicular to the side surface, the piezoelectric bimorph element 2525 being supported so as to be inclined relative to the side surface 3607. The fortieth embodiment is configured such that the vibrations from the primary vibration surfaces of the two sides of the piezoelectric bimorph element 2525 are respectively transmitted to the mutually orthogonal side surface 3607 and display surface of the GUI display unit 3405.

More specifically, the chassis of the mobile telephone 3601a of the fortieth embodiment in FIG. 62A is provided with a first support structure 3600a that extends to the inner side from the side surface 3607, and is bonded to one primary vibration surface of the piezoelectric bimorph element 2525; and is also provided with a second support structure 3600b that extends to the inner side from the chassis on the display surface of the GUI display unit 3405, and is bonded to the other primary vibration surface of the piezoelectric bimorph element 2525. The primary vibration in the direction illustrated by arrow 25A is thereby broken down into the vibration component illustrated by arrow 25D and the vibration component illustrated by arrow 25E having a direction orthogonal thereto, each of which being respectively transmitted to the side surface 3607 and the chassis surface on the display surface of the GUI display unit 3405. In this manner, the vibration of the two primary vibration surfaces in the piezoelectric bimorph element 2525 is transmitted broken down into orthogonal directions of the mobile telephone 3601a; and the vibration of the piezoelectric bimorph element 2525 can be heard regardless of which portion of the front surface, the back surface, or the side surface of the mobile telephone 3601a is brought up against the ear cartilage. The fortieth embodiment in FIG. 62A is provided with the first support structure 3600a and the second support structure 3600b so as to sandwich the same portion of the piezoelectric bimorph element 2525 from two sides.

By contrast, FIG. 62B is a transparent perspective view in which the elements of the mobile telephone 3601b of a first modification example of the fortieth embodiment are viewed from within. As is clear from FIG. 62B, in the first modification example of the fortieth embodiment, the first support structure 3600a and the second support structure 3600b are provided so as to be bonded to the mobile telephone 3601b in positions where the primary vibration surfaces facing the piezoelectric bimorph element 2525 mutually cross. The operation to bond to the piezoelectric bimorph element 2525 is thereby facilitated, the degree of freedom with which the piezoelectric bimorph element 2525 vibrates is less inhibited, and the vibration thereof can be efficiently transmitted to the chassis of the mobile telephone 3601b.

FIG. 62C is a cross-sectional view in which the mobile telephone 3601c of a second modification example of the fortieth embodiment is viewed from the side having been cut along a plane that is perpendicular to a side surface 3607a and the top surface. In the fortieth embodiment of FIG. 62A, the primary vibration directions of the piezoelectric bimorph element 2525 are broken down into vibration components having directions perpendicular to the front surface and the side surfaces respectively, but in the second modification example of the fortieth embodiment in FIG. 62C, the primary vibration directions of the piezoelectric bimorph element 2525 are broken down into vibration components having directions that are perpendicular to the front surface and the top surface respectively.

More specifically, as is clear from FIG. 62C, the chassis of the mobile telephone 3601c in the second modification example of the fortieth embodiment is provided with a first support structure 3600c that extends to the inner side from the top surface, and is bonded to one primary vibration surface of the piezoelectric bimorph element 2525. The chassis of the mobile telephone 3601c in the second modification example of the fortieth embodiment is also provided with a second support structure 3600d that extends to the inner side from the chassis on the display surface of the GUI display unit 3405, and is bonded to the other primary vibration surface of the piezoelectric bimorph element 2525. The primary vibration in the direction illustrated by arrow 25A is thereby broken down into the vibration component illustrated by arrow 25F and the vibration component illustrated by arrow 25E having a direction orthogonal thereto, each being respectively transmitted to the top surface and the chassis surface on the display surface of the GUI display unit 3405. In this manner, the vibration of the two primary vibration surfaces in the piezoelectric bimorph element 2525 is transmitted broken down into orthogonal directions of the mobile telephone 3601c; the vibration of the piezoelectric bimorph element 2525 can be heard regardless of which portion of the front surface, the back surface, the top surface, or the bottom surface of the mobile telephone 3601c is brought up against the ear cartilage. The second modification example of the fortieth embodiment in FIG. 62C has a cross-sectional view of a form in which the first support structure 3600c and the second support structure 3600d are provided such that the same portion of the piezoelectric bimorph element 2525 is sandwiched from both sides, similarly with respect to FIG. 62A; however, the configuration may be such that, as in FIG. 62B, crossing portions of the two surfaces of the piezoelectric bimorph element 2525 are respectively bonded.

The second modification example of the fortieth embodiment in FIG. 62C is not only suited for listening to sound by bringing the front surface or the rear surface of the mobile telephone 3601c alongside the ear cartilage, but is also appropriate for usage in which the top surface of the mobile telephone 3601c is brought up against the ear cartilage in such a form as to lightly push upward. This embodiment is also appropriate in that by such usage, not only is the display surface prevented from being fouled by contact with the face, but increasing the force pushing upward on the top surface obstructs the external auditory meatus with the tragus, and the earplug bone conduction effect is readily created.

Forty-First Embodiment

FIG. 63 is a cross-sectional view relating to a forty-first embodiment according to an aspect of the present invention, and is configured as a mobile telephone 3701. The forty-first embodiment is also consistent with the thirty-eighth embodiment illustrated in FIGS. 58 to 60, except for the arrangement of the cartilage conduction vibration source 2525, which is constituted of a piezoelectric bimorph element (and which hereinafter is described using the example of the piezoelectric bimorph element 2525); therefore, the diagram does not contain those portions for which no description is needed, and of the illustrated portions, shared portions have been given like reference numerals, a description thereof having been omitted unless there is a particular need.

Figure 63A:
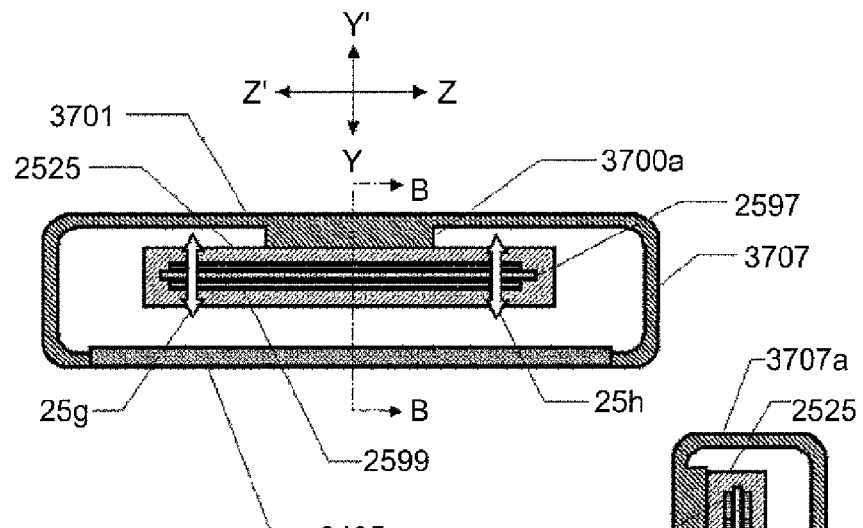
FIG. 63 is a cross-sectional view of a forty-first embodiment according to an aspect of the present invention (forty-first embodiment)

FIG. 63A is a cross-sectional view in which the mobile telephone 3701 of the forty-first embodiment is viewed from above as being cut in a plane that is perpendicular to a side surface 3707 thereof and to the display surface of the GUI display unit 3405. As is clear from the diagram, the piezoelectric bimorph element 2525 is arranged along the top surface of the mobile telephone 3701 as in the thirty-eighth embodiment in FIG. 59A. The primary vibration direction of the piezoelectric bimorph element 2525 (the Y-Y' direction) is a direction that is perpendicular to the display surface of the GUI display unit 3405. Specifically, the middle portion of the piezoelectric bimorph element 2525 is bonded to a support structure 3700a that extends to the inner side from the back surface of the mobile telephone 3701, and the two end portions of the piezoelectric bimorph element 2525 are supported together as free ends in a state in which vibration is not hampered. As a result, the counteraction of the free vibration of the two end portions of the piezoelectric bimorph element 2525 as illustrated by arrow 25G and arrow 25H is transmitted to the chassis of the mobile telephone 3701 via the support structure 3700a from the middle portion of the piezoelectric bimorph element 2525.

Figure 63B:
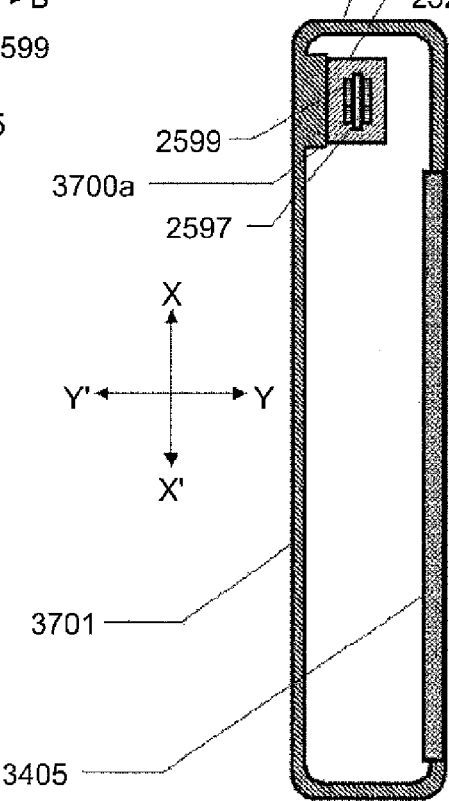

FIG. 63B is a cross-sectional view in which the B-B cross-section of FIG. 63A is viewed from the side of the mobile telephone 3701; it can be understood that the piezoelectric bimorph element 2525 is supported by the support structure 3700a in which the piezoelectric bimorph element 2525 extends to the inner side from the back surface of the mobile telephone 3701, and also that the piezoelectric bimorph element 2525 is arranged along the top surface of the mobile telephone 3701. As shown in FIG. 63, the structure, in which a part of the primary vibration surface of the piezoelectric bimorph element 2525 is supported on the inner side of the chassis of the mobile telephone 3701 and a part of the primary vibration surface is permitted to unrestrictedly vibrate in an unsupported manner, is appropriate for efficiently transmitting the vibration of the piezoelectric bimorph element 2525 to the chassis of the mobile telephone without adding any substantive change to the acoustic properties thereof. The support at the middle of the piezoelectric bimorph element 2525 such as in the forty-first embodiment is also particularly appropriate in a case of a piezoelectric bimorph element having a terminal positioned at the middle of the element, as in the thirty-second embodiment illustrated in FIG. 51.

FIG. 64 illustrates various modification examples of the forty-first embodiment of FIG. 63, and, similarly with respect to FIG. 63A, is a cross-sectional view in which the mobile telephone 3701 is viewed from above as being cut in a plane that is perpendicular to the side surface 3707 thereof and to the display surface of the GUI display unit 3405.

FIG. 64A is a first modification example of the forty-first embodiment, and is particularly suited to a case in which the terminal 2525*b* of the piezoelectric bimorph element 2525 is positioned at an end part of the element, the center of gravity is unbalanced, and the free vibration of the terminal 2525*b* illustrated by arrow 25G is slightly confined by the electrode connection to the element, compared to the vibration of the entire free end illustrated by arrow 25H. To compensate for the unbalancing, the first modification example of FIG. 64A shifts the position of the support structure 3701*b* to the left in the diagram compared to the support structure 3700*a* of the forty-first embodiment of FIG. 63.

FIG. 64B is a second modification example of the forty-first embodiment; each of the two ends of the piezoelectric bimorph element is bonded to a pair of support structures 3700*c* and 3700*d* that extend to the inner side from the back surface of the mobile telephone 3701. The vibration of the middle portion of the piezoelectric bimorph element illustrated by arrow 25I is thereby freed, and the counteraction of this vibration is transmitted to the chassis of the mobile telephone 3701 via the support structures 3700*c* and 3700*d*.

FIG. 64C is a third modification example of the forty-first embodiment, the terminal 2525*b* being bonded to a support structure 3700*e* extending inward from the back surface of the mobile telephone 3701, whereby the piezoelectric bimorph element 2525 is supported on a cantilever structure. The counteraction of the vibration of the free ends of the piezoelectric bimorph element 2525 illustrated by arrow 25H is thereby transmitted to the chassis of the mobile telephone 3701 via the support structure 3700*e*.

FIG. 64D is a fourth modification example of the forty-first embodiment; the piezoelectric bimorph element 2525 is bonded to the inner side of the chassis of the back surface of the mobile telephone 3701 interposed by a two-sided bonding sheet 3700*f* comprising an elastic body. The two-sided bonding sheet 3700*f* comprising an elastic body is made using an elastic body that has conductivity from the piezoelectric bimorph element 2525 to the chassis (a silicone rubber; a mixture of a silicone rubber and a butadiene rubber; a natural rubber; a structure formed using these varieties of rubber in which air bubbles are sealed; or the like) or the like. Due to such elastic bonding, each portion of the piezoelectric bimorph element 2525 obtains a degree of free vibration illustrated by arrows 25G, 25H, and 25I, and the vibration thereof is transmitted to the chassis of the mobile telephone 3701 via the two-sided bonding sheet 3700*f*.

The various features of each of the embodiments described above are not to be restricted to individual respective embodiments, but rather can be substituted or combined with other appropriate embodiments. For example, the support structure of the forty-first embodiment in FIGS. 63 and 64, in which consideration is given to the free vibration of the piezoelectric bimorph element 2525, can also be applied to the case of the inclined holding of the piezoelectric bimorph element 2525 in the thirty-ninth embodiment of FIG. 61 and the fortieth embodiment of FIG. 62. Specifically, the support structure in FIG. 62B has a point in common in the sense that the two ends of the piezoelectric bimorph element 2525 are supported and the middle part is freed. There is no limitation to this example; for example, rather than bonding the entire vibration plane to the inner side of the inclined side surface, it is also possible in the thirty-ninth embodiment of FIG. 61 and the modification examples thereof to provide a projection unit analogous to the support structure 3700*a* of FIG. 63A to the inclined side surface, only the middle portion of the piezoelectric bimorph element 2525 being bonded thereto to make the two end parts thereof into free ends. Alternatively, it is also possible in the thirty-ninth embodiment of FIG. 61 and the modification examples thereof to interpose an elastic body, as in the fourth modification example of the forty-first embodiment in FIG. 64D, when the piezoelectric bimorph element 2525 is bonded.

The implementation of the features of the present invention described above is not to be limited to the aspects in the above embodiments; the invention can be implemented using other aspects as well, wherever it is possible to benefit from the advantages thereof. For example, although the thirty-ninth embodiment of FIG. 61 has been described with the piezoelectric bimorph element 2525 being bonded to and supported by the inner side of the inclined side surface inside the mobile telephone, the specific structure for support is not to be limited thereto. For example, referring to the thirty-first embodiment of FIG. 49, the structure may be one in which a groove may be provided to the outer side of the inclined side surface and the piezoelectric bimorph element 2525 is fitted into this groove from the outer side.

Forty-Second Embodiment

FIG. 65 is a cross-sectional view relating to a forty-second embodiment according to an aspect of the present invention, and is configured as a mobile telephone 3801. The forty-second embodiment is consistent with the thirty-eighth embodiment illustrated in FIGS. 58 to 60, except for the arrangement of the cartilage conduction vibration source 2525, which is constituted of a piezoelectric bimorph element (and which hereinafter is described using the example of the piezoelectric bimorph element 2525), and except for the holding structure thereof; therefore, the diagram does not contain those portions for which no description is needed, and of the illustrated portions, shared portions have been given like reference numerals, a description thereof having been omitted unless there is a particular need.

Figure 65A:
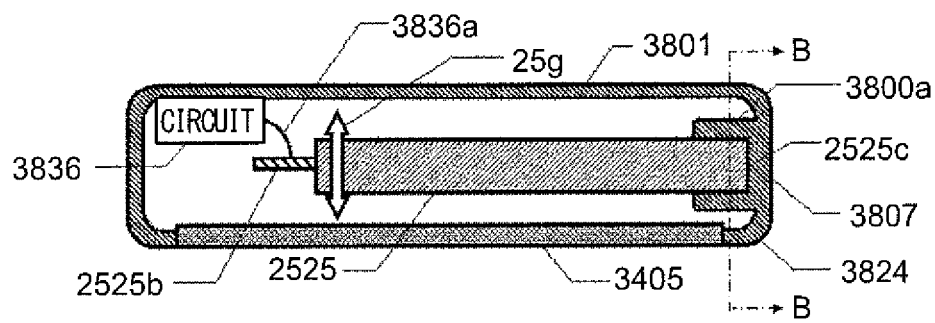
FIG. 65 is a cross-sectional view relating to a forty-second embodiment according to an aspect of the present invention (forty-second embodiment)
Figures 65B, 65C, 65D:
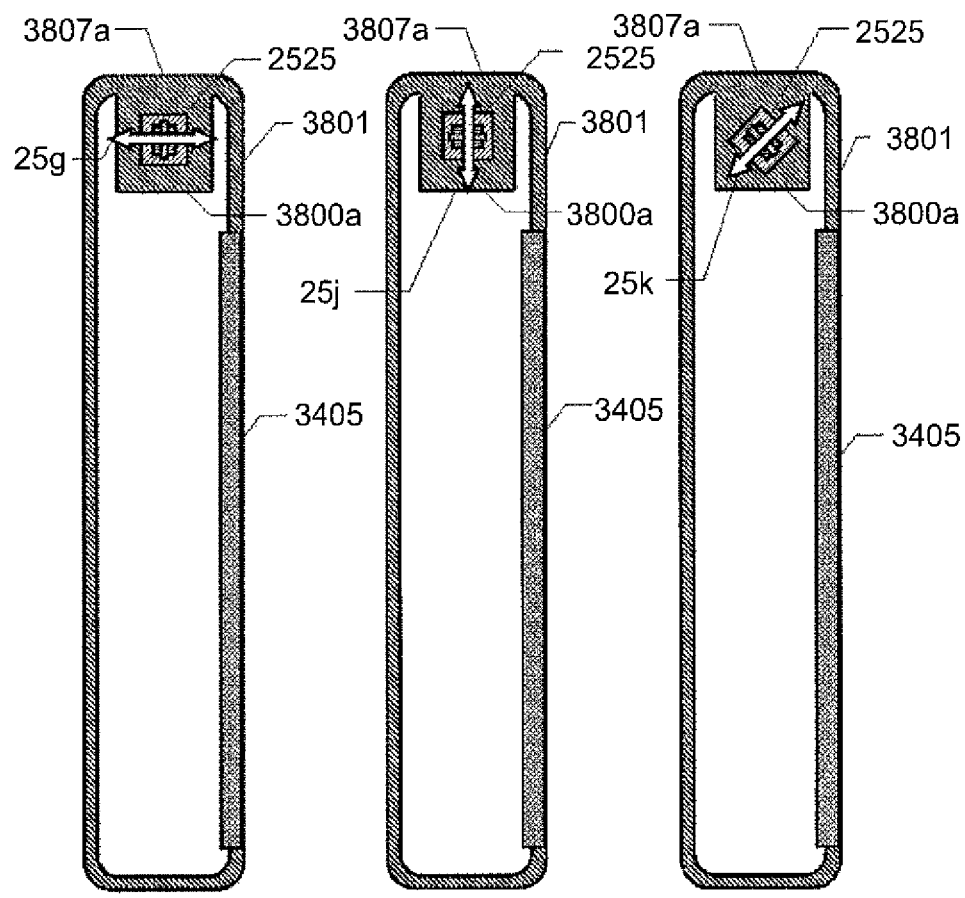

FIG. 65A is a cross-sectional view in which the mobile telephone 3801 of the forty-second embodiment is viewed from above as being cut in a plane that is perpendicular to a side surface 3807 thereof and to the display surface of the GUI display unit 3405. FIG. 65B is a cross-sectional view in which the B-B cross-section of FIG. 65A is viewed from the side of the mobile telephone 3801. As is clear from FIG. 65A, the piezoelectric element 2525 is arranged along the top surface of the mobile telephone 3801, similarly with respect to the thirty-eighth embodiment in FIG. 59A, the forty-first embodiment in FIG. 63, or the like. The primary vibration direction of the piezoelectric bimorph element 2525 is the direction perpendicular to the display surface of the GUI display unit 3405, as illustrated by arrow 25G. Thus, the forty-second embodiment of FIG. 65, in essence, has one side of the piezoelectric bimorph element 2525 supported by a cantilever structure, similarly with respect to the modification example of the forty-first embodiment illustrated in FIG. 64C. The counteraction of the vibration of the free end of the piezoelectric bimorph element 2525 illustrated by arrow 25G is thereby transmitted to the chassis of the mobile telephone 3801.

A point of difference in the forty-second embodiment of FIG. 65 from the modification example of the forty-first embodiment illustrated in FIG. 64C lies in it being configured such that an upper part corner 3824, which is a site on the chassis of the mobile telephone 3801 that is appropriate for being brought up against the tragus or other ear cartilage, is made to vibrate particularly efficiently, and also such that it is possible for the structure of the upper part corner 3824, which is also a site that is likely to bear the direct application of impact when a drop or the like occurs, to avoid having a structure that is low in terms of collision resistance. Specifically, as illustrated in FIGS. 65A and 65B, one end of the piezoelectric bimorph element 2525 is inserted and held in a hole of a support structure 3800a extending inward from the side surface 3807 and the top surface 3807a of the mobile telephone 3801, as a holding end 2525c. The holding end 2525c is an end to which the terminal 2525b is not provided. Thus, making the one end to which the terminal 2525b is not provided into a holding end 2525c permits the support position to be brought closer to the vicinity of the upper part corner 3824. By contrast, the other end to which the terminal 2525b is provided is made to vibrate as a free end. The terminal 2525b is connected to a circuit 3836 and flexible wiring 3836a installed in the chassis; the free vibration of the other end to which the terminal 2525b is provided will not be substantively hampered. The circuit 3836 comprises an amp or the like for boosting the drive voltage of the piezoelectric bimorph element 2525.

Due to the configuration described above, the counteraction of the free vibration of the other end of the piezoelectric bimorph element 2525 illustrated by arrow 25G is transmitted to the chassis of the mobile telephone 3801 via the support structure 3800a from the holding end 2525c of the piezoelectric bimorph element 2525. At this time, the support structure 3800a, as described above, is configured so as to extend to the inner side from the side surface 3807 and the top surface 3807a of the mobile telephone 3801 at the upper part corner 3824 of the chassis; therefore, the counteraction of the free vibration of the other end of the piezoelectric bimorph element 2525 is efficiently transmitted to the upper part corner 3824. As described above, the piezoelectric bimorph element 2525 is held in the inner side of the chassis of the mobile telephone 3801, and therefore the structure of the upper part corner 3824, which is also a site that is prone to the direct application of an impact, will not have low resistance to collision.

FIG. 65C is a first modification example of the forty-second embodiment; the piezoelectric bimorph element 2525 is held such that the primary vibration direction becomes the direction perpendicular to the top surface 3807a, as illustrated by arrow 25J. The structure is otherwise similar to that of the forty-second embodiment of FIGS. 65A and 65B, and therefore a description thereof has been omitted. The first modification example in FIG. 65C has a large vibration component in the direction perpendicular to the top surface 3807a, and is therefore suited for usage in which the top surface side of the upper part corner 3824 of the mobile telephone 3801 is brought up against the ear cartilage in such a form as to push lightly upward. This embodiment is also appropriate in that, due to such use, not only can the display surface of the GUI display unit 3405 be prevented from being fouled by contact with the face, but also increasing the force pushing upward on the top surface 3807a obstructs the external auditory meatus with the tragus, and the earplug bone conduction effect is readily created. The first modification example in FIG. 65C, similarly with respect to the forty-second embodiment of FIGS. 65A and 65B, can be used upon the display surface side of the upper part corner 3824 of the mobile telephone 3801 being brought up against the ear cartilage. In such a case as well, increasing the force with which the display surface is pushed against the ear cartilage makes it possible for the external auditory meatus to be obstructed with the tragus, and the earplug bone conduction effect can readily be created.

FIG. 65D is a second modification example of the forty-second embodiment. The primary vibration direction is inclined 45° relative to the top surface 3807a, as illustrated by arrow 25K. The vibration components are thereby broken down into the direction that is perpendicular to the top surface 3807a and the direction that is perpendicular to the display surface of the GUI display unit 3405, which is orthogonal thereto, and comparable cartilage conduction can be obtained regardless of the direction from which the upper part corner 3824 comes into contact with the ear cartilage.

Forty-Third Embodiment

FIG. 66 is a cross-sectional view relating to a forty-third embodiment according to an aspect of the present invention, and is configured as a mobile telephone 3901. The forty-third embodiment is consistent with the thirty-eighth embodiment illustrated in FIGS. 58 to 60, except for the arrangement of the cartilage conduction vibration source 2525, which is constituted of a piezoelectric bimorph element (and which hereinafter is described using the example of the piezoelectric bimorph element 2525), and except for the holding structure thereof. Therefore, the diagram does not contain those portions for which no description is needed, and of the illustrated portions, shared portions have been given like reference numerals, a description thereof having been omitted unless there is a particular need.

FIG. 66A is a cross-sectional view in which the mobile telephone 3901 of the forty-third embodiment is viewed in profile as being cut in a plane that is perpendicular to the upper surface 3907a thereof and to the display surface of the GUI display unit 3405. FIG. 66B is a cross-sectional view in which the B-B cross-section of FIG. 66A is viewed from above the mobile telephone 3901. In the forty-third embodiment of FIG. 66, similarly with respect to the forty-second embodiment of FIG. 65, the one end in the piezoelectric bimorph element 2525 to which the terminal 2525b is not provided serves as a holding end 2525c and is supported by a cantilever structure. A point of difference in the forty-third embodiment from the forty-second embodiment lies in that, as is clear from FIG. 66A, the piezoelectric bimorph element 2525 is arranged in parallel to the side surface of the mobile telephone 3901, similarly with respect to the thirty-ninth embodiment in FIG. 61 and the modification examples thereof. Further, the primary vibration direction of the piezoelectric bimorph element 2525 is the direction that is perpendicular to the display surface of the GUI display unit 3405, as illustrated by arrow 25M.

Accordingly, in the forty-third embodiment of FIG. 66 as well, an upper part corner 3924, which is a site on the chassis of the mobile telephone 3901 appropriate for being brought up against the tragus or other ear cartilage, vibrates particularly efficiently, and the structure of the upper part corner 3924 can avoid being low in terms of collision resistance. Specifically, similarly with respect to the forty-second embodiment, as illustrated in FIGS. 66A and 66B, one end of the piezoelectric bimorph element 2525 is inserted into and held in a hole of the support structure 3900a extending inward from the side surface and the top surface of the mobile telephone 3901, as a holding end 2525c. Accordingly, the one end of the piezoelectric bimorph element 2525 to which the terminal 2525b is not provided is made into a holding terminal 2525c in the forty-third embodiment as well, whereby the support position can be brought closer to the vicinity of the upper part corner 3924. This embodiment is otherwise consistent with the forty-second embodiment, and therefore a description has been omitted.

FIG. 66C is a first modification example of the forty-third embodiment; the piezoelectric bimorph element 2525 is held such that the primary vibration direction becomes the direction perpendicular to the side surface 3907, as illustrated by arrow 25N. The configuration is otherwise similar to that of the forty-third embodiment in FIGS. 66A and 66B, and therefore a description thereof has been omitted. The first modification example in FIG. 66C has a large vibration component in the direction perpendicular to the side surface 3907, and is therefore suited for usage in which the side surface 3907 of the mobile telephone 3901 is brought up against the ear cartilage and contact between the face and the display surface of the GUI display unit 3405 is avoided. In the first modification example in FIG. 66C, similarly with respect to the forty-third embodiment in FIGS. 66A and 66B, the display surface side of the mobile telephone 3901 can be brought up against the ear cartilage for use. In such a case as well, in a case in which the upper part corner 3924 is pushed against the ear cartilage, increasing the force thereof makes it possible to obstruct the external auditory meatus with the tragus, and to readily create the earplug bone conduction effect.

FIG. 66D is a second modification example of the forty-third embodiment. The primary vibration direction is inclined 45° relative to the side surface 3907, as illustrated by arrow 25P. The vibration components are thereby broken down into the direction that is perpendicular to the side surface 3907 and to the direction that is perpendicular to the display surface of the GUI display unit 3405, which is orthogonal thereto, and comparable cartilage conduction can be obtained regardless of the direction from which the upper part corner 3924 comes into contact with the ear cartilage.

Forty-Fourth Embodiment

FIG. 67 is a cross-sectional view relating to a forty-fourth embodiment according to an aspect of the present invention, and is configured as a mobile telephone 4001. The forty-fourth embodiment is consistent with the thirty-eighth embodiment illustrated in FIGS. 58 to 60, except for the structure and arrangement of the cartilage conduction vibration source 2525, which is constituted of a piezoelectric bimorph element, and except for the holding structure thereof. Therefore, the diagram does not contain those portions for which no description is needed, and of the illustrated portions, shared portions have been given like reference numerals, a description thereof having been omitted unless there is a particular need.

FIG. 67A is a cross-sectional view (which includes a partial conceptual block diagram) in which the mobile telephone 4001 of the forty-fourth embodiment is viewed from above as being cut in a plane that is perpendicular to the side surface thereof and to the display surface of the GUI display unit 3405, and is a cross-sectional view that can be understood to be similar with respect to the forty-second embodiment of FIG. 65A. FIGS. 67B1 and 67B2 are cross-sectional views in which the B1-B1 cross-section and B2-B2 cross-section of the elements in FIG. 67A are viewed from the side of the mobile telephone 4001, respectively. FIG. 67C is a detailed cross-sectional view of the important elements of FIG. 67A (including a partial conceptual block diagram). Portions in FIGS. 67B1, 67B2, and 67C that correspond to FIG. 67A have been given like reference numerals, and a description thereof has been omitted unless there is a particular need.

The forty-fourth embodiment of FIG. 67, similarly with respect to the forty-second embodiment of FIG. 65, has the piezoelectric bimorph element 2525 supported in parallel with the top surface, but differs from the forty-second embodiment in that the one end side to which the terminal 2525b is provided is supported by the cantilever structure, and in that a circuit 4036 for driving the piezoelectric bimorph element 2525 is integrated with the piezoelectric bimorph element 2525 for a configuration as a vibration unit. This embodiment is consistent with the forty-second embodiment in that the upper part corner, which is an appropriate site on the chassis of the mobile telephone 4001 to be brought up against the tragus or other ear cartilage, vibrates particularly efficiently, and also in that the upper part corner avoids having a structure that is low in terms of collision resistance.

Specifically, as illustrated in FIGS. 67A and 67C, the terminal 2525b of the piezoelectric bimorph element 2525 is connected to a circuit 4036 that is mounted onto the terminal 2525b using a wire 4036a. The terminal 2525b of the piezoelectric bimorph element 2525 and the circuit 4036 are repackaged using a resin package 4025 having an acoustic impedance approximating that of the resin in which the piezoelectric bimorph element 2525 has been packaged, and are integrated as a vibration unit. A connection pin 4036b penetrates the resin package 4025, projects outward from the circuit 4036, and makes contact with a controller and power supply unit 4039 secured to the chassis of the mobile telephone 4001.

As illustrated in FIG. 67C, the circuit 4036 comprises an amp 4036c for boosting the drive voltage of the piezoelectric bimorph element 2525, and an adjustment unit 4036d for electrically compensating for the variances of the piezoelectric bimorph element 2525. The adjustment unit 4036d performs adjustments so as to operate to prevent variances in the piezoelectric bimorph element 2525 relative to the power feed and control from the controller and power supply unit 4039; therefore, after adjustments are done, repackaging is done with the resin 4024. As an alternative configuration, it is possible for repackaging to be performed so that an adjustment operation unit or adjustment circuit pattern of the adjustment unit 4036d is exposed on the surface of the resin package 4025, and so that adjustments can be performed after assembly.

In the forty-fourth embodiment of FIG. 67, similarly with respect to the forty-second embodiment, a support structure 4000a extending inward from the side surface and top surface 4007a of the mobile telephone 4001 is provided, a portion of the resin package 4025 of the vibration unit formed by repackaging being inserted into a hole thereof, whereby the piezoelectric bimorph element 2525 is held. As has already been described, in the forty-fourth embodiment, one end side to which the terminal 2525b is provided is supported, and one end 2525c to which the terminal 2525b is not provided serves as a unrestrictedly vibrating end. The counteraction of the free vibration of the one end 2525c is then transmitted to the chassis of the mobile telephone 4001 via the support structure 4000a from the resin package 4025.

The various features indicated in the embodiments of the present invention can be unrestrictedly substituted or combined whenever the benefits thereof can be utilized. For example, in the forty-fourth embodiment of FIG. 67, the piezoelectric bimorph element 2525 is supported in parallel with the top surface, and the primary vibration direction thereof becomes the direction perpendicular to the display surface of the GUI display unit 3405, as illustrated by arrow 25H. However, the integrated packaging structure of the piezoelectric bimorph element 2525 and the circuit 4036 illustrated in the forty-fourth embodiment is not to be limited to the arrangement of FIG. 67, but rather can be utilized in a support arrangement such as in the modification example of the forty-second embodiment illustrated in FIGS. 65C and 65D, and in the forty-third embodiment illustrated in FIGS. 66A to 66D and the modification example thereof. The utilization thereof may be done in conformity with the relationships between FIGS. 65A and 67A, and in each case, the one end of the side of the piezoelectric bimorph element 2525 to which the terminal 2525b is provided serves as the support side, similarly with respect to FIG. 65A.

The support structures 3800a, 3900a, and 4000a in the forty-second embodiment of FIG. 65 to the forty-fourth embodiment in FIG. 67 are also not limited as extending inward from the side surface and top surface of the mobile telephone 4001; rather, a variety of support structures are possible. For example, a support structure may be configured so as to extend from only one of either the side surface or the top surface. Moreover, a variety of other structures are possible, including one extending from either the front surface or the back surface, one extending from the front surface and the top surface; one extending from the rear surface and the top surface; one extending from the side surface and the front surface; one extending from the side surface and the rear surface; or one extending from the rear side of the corner part as an elongation from all three of the top surface, the side surface, and the front surface. In each case, providing the piezoelectric bimorph element 2525 or the support unit of the resin packaging 4025 integrated therewith to the inner side of the chassis in the vicinity of the corner part can allow the corner part to avoid having a structure that is low in terms of collision resistance while also causing the corner part to vibrate efficiently due to the counteraction of the free vibration of the other end.

The various features indicated in each of the embodiments of the present invention are also not necessarily specific to individual embodiments; rather, the features of each respective embodiment can be modified and used or combined and used as appropriate, whenever it is possible to utilize the benefits thereof. For example, in the first embodiment of FIG. 1, the second embodiment of FIG. 5, the third embodiment of FIG. 6, and the thirty-fifth embodiment of FIG. 55, the interior of the mobile telephone is provided with two piezoelectric bimorph elements respectively for right ear use and left ear use. However, examples in which each of a plurality of piezoelectric bimorph elements is provided to a plurality of places in the mobile telephone in order to obtain desired cartilage conduction from a plurality of directions are not to be limited to these embodiments. On the other hand, in the thirty-ninth embodiment of FIG. 61, the fortieth embodiment of FIG. 62, the second modification example of the forty-second embodiment in FIG. 65D, and the second modification example of the forty-third embodiment in FIG. 66D, a single primary vibration direction of the piezoelectric bimorph element is given an incline and the vibration component is divided in a case in which cartilage conduction is to be generated in a plurality of directions, such as between the side surface and the front surface or between the top surface and the front surface; however, configurations for generating cartilage conduction in a plurality of directions are not to be limited to these embodiments.

Forty-Fifth Embodiment

Figure 68A:
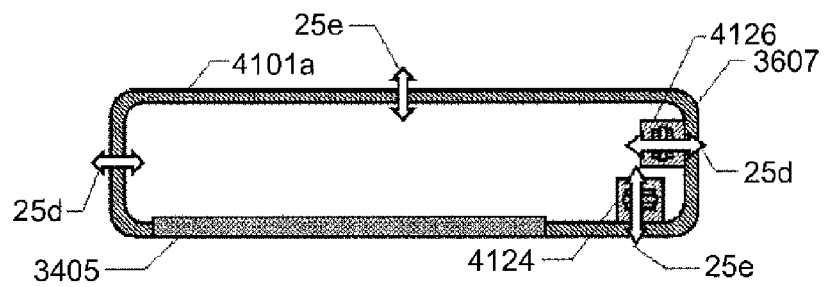
FIG. 68 is a cross-sectional view relating to a forty-fifth embodiment according to an aspect of the present invention (forty-fifth embodiment)
Figure 68B:
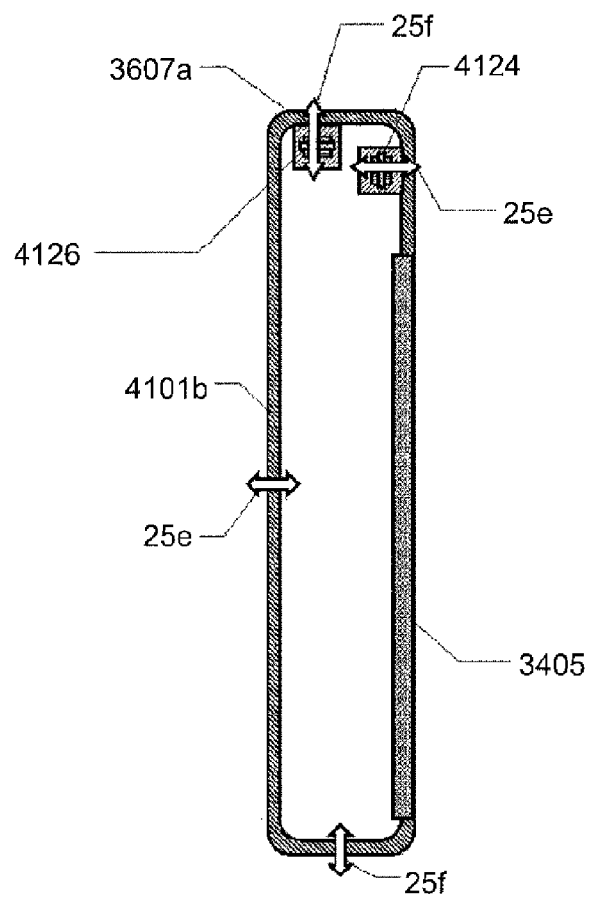

FIG. 68 is a cross-sectional view relating to the forty-fifth embodiment according to an aspect of the present invention, and serves to illustrate another example relating to the configuration described above in which cartilage conduction is generated in a plurality of directions, such as between the side surface and front surface, and between the top surface and the front surface. Specifically, in a mobile telephone 4101a of the forty-fifth embodiment illustrated in FIG. 68A and a mobile telephone 4101b of a modification example thereof illustrated in FIG. 68B, two piezoelectric bimorph elements are utilized in imitation of the thirty-fifth embodiment of FIG. 55 and the like, instead of the dividing of the vibration component of a single piezoelectric bimorph elements such as in the fortieth embodiment of FIG. 62. Then, the primary vibration directions of these piezoelectric bimorph elements 4124 and 4126 are set off from each other by 90° so as to become parallel to the front surface and side surface or to the front surface and top surface, respectively, the bimorph elements being supported on the inner side of the chassis of the mobile telephone. Similarly with respect to the fortieth embodiment of FIG. 62, cartilage conduction is thereby generated in a plurality of directions, such as between the side surface and front surface or between the top surface and front surface. The configuration of the forty-fifth embodiment of FIG. 68 is shared with that of the fortieth embodiment of FIG. 62, other than the fact that two piezoelectric bimorph elements are utilized; therefore, identical portions have been given like reference numerals, and extraneous description has been omitted. It shall be noted that FIGS. 68A and 68B correspond to FIGS. 62A and 62C, respectively.

In FIG. 68, the longitudinal directions of the two piezoelectric bimorph elements illustrate a parallel arrangement, but the arrangement of the plurality of piezoelectric bimorph elements is not limited thereto. For example, another possible arrangement is one in which the longitudinal directions of the two piezoelectric bimorph elements are mutually orthogonal, where one is along the top surface and the other is along the side surface. Furthermore, the support of the plurality of piezoelectric bimorph elements in which the primary vibration directions are set off from each other is not limited to the inner side of the chassis of the mobile telephone as in FIG. 68; rather, for example, the support may be on the outer side of the chassis, as in the thirtieth and thirty-first embodiments and the modification examples thereof illustrated in FIGS. 48 to 50.

Forty-Sixth Embodiment

FIG. 69 is a perspective view and a cross-sectional view relating to a forty-sixth embodiment according to an aspect of the present invention, and is configured as a mobile telephone 4201. The forty-sixth embodiment is consistent with the thirty-eighth embodiment illustrated in FIGS. 58 to 60, except for the arrangement of the cartilage conduction vibration source 2525, which is constituted of a piezoelectric bimorph element, and except for the holding structure thereof; therefore, the diagram does not contain those portions for which no description is needed, and of the illustrated portions, shared portions have been given like reference numerals, a description thereof having been omitted unless there is a particular need.

FIG. 69A is a perspective view in which the mobile telephone 4201 of the forty-fourth embodiment is viewed from the front surface; the four corner parts, which are susceptible to collision when the mobile telephone 4201 is dropped by mistake or in other circumstances, are provided with elastic body units 4263a, 4263b, 4263c, 4263d, which serve as protectors. The inner sides of the elastic body units 4263a and 4263b found at the two upper corner parts have a dual purpose as units for holding the piezoelectric bimorph element, and the outer sides of the elastic body units 4263a and 4263b have a dual purpose as cartilage conduction units for making contact with the ear cartilage. For this reason, at least the elastic body units 4263*a* and 4263*b* utilize an elastic material having an acoustic impedance approximating that of ear cartilage (a silicone rubber; a mixture of a silicone rubber and a butadiene rubber; a natural rubber; a structure formed using these varieties of rubber in which air bubbles are sealed; a structure, such as can be seen in transparent packaging sheet materials and the like, in which a layer of groups of air bubbles is sealed separated by a thin film of synthetic resin; or the like).

FIG. 69B is a cross-sectional view in the B1-B1 sectional plane of FIG. 69A, with a cross-section of the mobile telephone 4201 in the plane perpendicular to the front surface and the side surface. As is clear from FIG. 69B, the two ends of the piezoelectric bimorph element 2525 are supported by the inner sides of the elastic body units 4263*a* and 4263*b*. The elastic body unit 4263*a* supports the terminal 2525*b* side of the piezoelectric bimorph element 2525, and a flexible wiring 3836*a* for establishing a connection between the terminal 2525*b* and the circuit 3836 passes through the elastic body unit.

The elastic body units 4263*a* and 4263*b* are anchoringly supported on the chassis of the mobile telephone 4201, but the two ends of the piezoelectric bimorph element 2525 are ensured a certain degree of freedom to move by vibration, due to the elasticity of the elastic body units 4263*a* and 4263*b*, and the vibration of the piezoelectric bimorph element 2525 is less hampered. The middle part of the piezoelectric bimorph element 2525 is not in contact with anything and is free to vibrate. The outer sides of the elastic body units 4263*a* and 4263*b*, serve as an outer wall of the corner parts of the mobile telephone 4201, and have a dual purpose in acting as protectors for collisions with an external unit, and as cartilage conduction units for making contact with the ear cartilage. The mobile telephone 4201 can thereby be brought into contact with either of the right ear or the left ear for the purpose of cartilage conduction, as has been described in, for example, the first embodiment in FIGS. 2A and 2B. Furthermore, because the elastic body units 4263*a* and 4263*b* have a different acoustic impedance from that of the chassis of the mobile telephone 4201, the conduction component from the elastic body units 4263*a* and 4263*b* to the chassis of the mobile telephone 4201 can be reduced, and efficient cartilage conduction from the elastic body unit 4263*a* or 4263*b* to the ear cartilage can be achieved.

FIG. 69C is a cross-sectional view in the B2-B2 sectional plane illustrated in FIG. 69A or FIG. 69B, with a cross-section of the mobile telephone 4201 in the plane perpendicular to the front surface and the top surface. It can be understood from FIG. 69C as well that the elastic body units 4263*a* and 4263*b* hold the piezoelectric bimorph element 2525 and are anchoringly supported on the chassis of the mobile telephone 4201, and also that the outer sides thereof, without the outer wall of the corner parts of the mobile telephone 4201, serve as protectors for collisions with an external unit, and have a dual purpose as cartilage conduction units for making contact with the ear cartilage. As is clear from FIG. 69C, the forty-sixth embodiment assumes a structure in which the elastic body units 4263*c* and 4263*d*, which are at the lower two corners, function exclusively as protectors, and are covered by the chassis of the mobile telephone 4201.

Forty-Seventh Embodiment

Figure 70A:
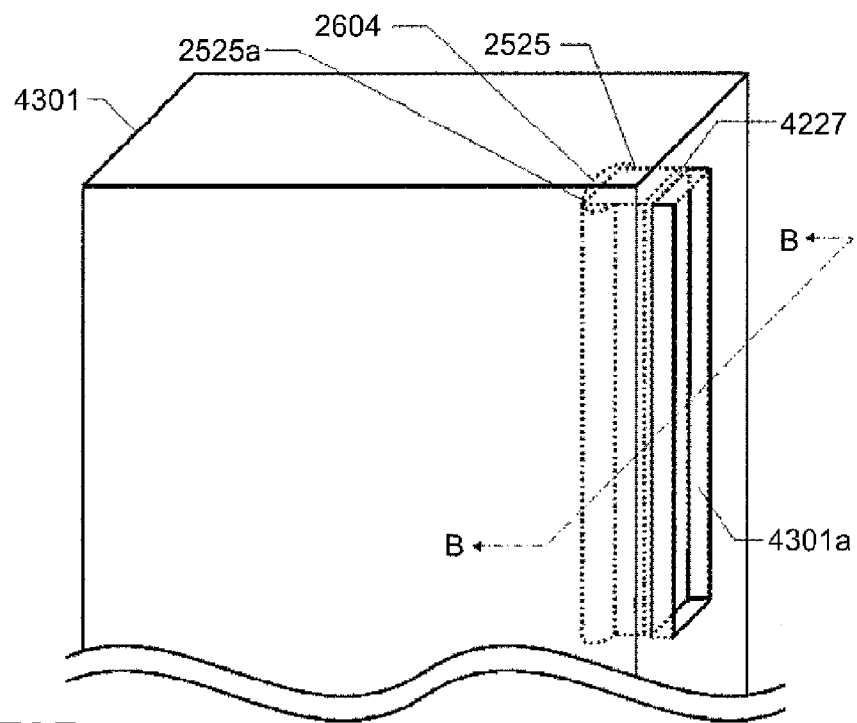
FIG. 70 is a perspective view and a cross-sectional view relating to a forty-seventh embodiment according to an aspect of the present invention (forty-seventh embodiment)
Figure 70B:
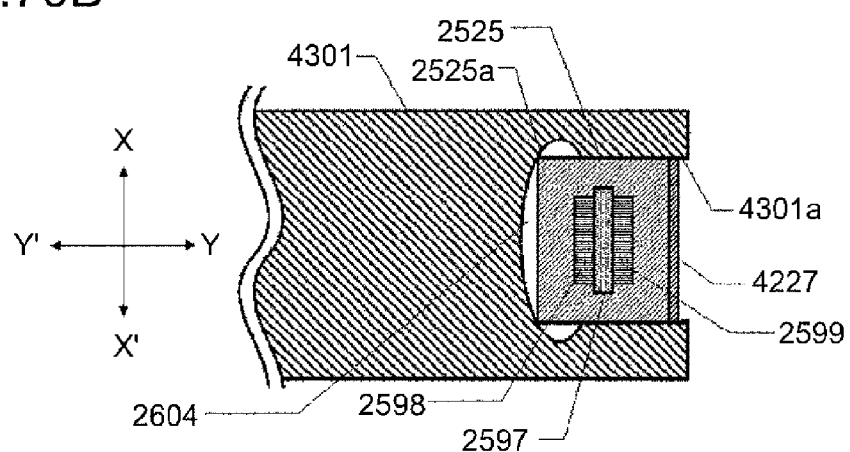

FIG. 70 relates to the forty-seventh embodiment according to an aspect of the present invention; FIG. 70A is a perspective view illustrating a part of the upper end side thereof, and FIG. 70B is a cross-sectional view illustrating the B-B cross-section of FIG. 70A. The seventieth embodiment is configured as a mobile telephone 4301, and assumes a structure in which the piezoelectric bimorph element 2525 is fitted into the side surface of the mobile telephone. Such a structure has much in common with the thirtieth embodiment illustrated in FIG. 48, and therefore common portions have been given like reference numerals, and a description thereof has been omitted. Further, similarly with respect to FIG. 48, FIG. 70 omits an illustration and description of the configuration for inputting an audio signal into the cartilage conduction vibration source 2525, and the like.

A point of difference in the forty-seventh embodiment of FIG. 70 from the thirtieth embodiment of FIG. 49 lies in the structure of the portions for transmitting the vibration of the piezoelectric bimorph element 2525 to the ear cartilage. Namely, in the forty-seventh embodiment of FIG. 70, the side surface of the mobile telephone 4301 is provided with a concavity 4301*a* that has a very slight step (for example, 0.5 mm), and is arranged such that the vibration plane of the piezoelectric element 2525 comes to a bottom part of this concavity 4301*a*. The vibration plane of the piezoelectric bimorph element 2525 may be exposed at the bottom part of the concavity 4301*a*, but in the forty-seventh embodiment, the piezoelectric bimorph element 2525 is covered with a thin protective layer 4227. This protective layer 4227 is applied or coated on with an elastic material, in order to prevent stretching of the vibration plane due to vibration of the piezoelectric bimorph element 2525 from being hampered.

Due to the structure described above, it is possible to bring the vibration plane of the piezoelectric bimorph element 2525 into direct contact with the ear cartilage wherever possible, and also it is possible to provide protection against damage to the piezoelectric bimorph element 2525 from any collision with an external unit. Specifically, the piezoelectric bimorph element 2525 is arranged at the bottom of the concavity 4301*a* and is at a position that is lower only by the step from the outer surface of the chassis of the mobile telephone 4301; because of the step, the piezoelectric bimorph element 2525 will not directly collide with an external unit even were the side surface of the chassis of the mobile telephone to collide with an external unit. As illustrated in FIG. 70A, in the forty-seventh embodiment, the concavity 4301*a* is provided to a place slightly lowered from the corner part in the side surface of the mobile telephone 4301, to prevent any damage to the piezoelectric bimorph element 2525 due to collision at the corner part. Ear cartilage is soft; therefore, it is readily deformed at the place of the very slight step and can be brought into contact with the vibration plane of the piezoelectric bimorph element 2525 or the covered surface thereof, even with an arrangement such that the vibration plane of the piezoelectric bimorph element 2525 comes to the bottom part of the concavity 4301*a*.

The various features indicated in the various embodiments of the present invention can be unrestrictedly modified, substituted or combined whenever the benefits thereof can be utilized. For example, the elastic body units 4263*a* and 4263*b* are arranged in the forty-sixth embodiment of FIG. 69 so as to be symmetrical relative to the center of the piezoelectric bimorph element 2525, but the support of the piezoelectric bimorph element 2525 is not to be limited to such an arrangement; another possible arrangement is an eccentric one in which the center of the piezoelectric bimorph element 2525 is closer to either of the opposing corner parts. For example, the piezoelectric bimorph element 2525, rather than being completely symmetrical relative to the center thereof, has a slightly different weight and degree of freedom to vibrate at the side that is not the side that has the terminal 2525b. The wiring 3836a also passes through the elastic body unit 4263a for supporting the terminal 2525b, and passes through to the circuit 3836. The configuration for eccentrically supporting the piezoelectric bimorph element 2525 between the two corner parts is effective in compensation for asymmetry such as described above. The respective lengths of the elastic body units 4263a and 4263b must be determined depending on the length of the piezoelectric bimorph element 2525 and on the width of the chassis of the mobile telephone 4201. In other words, the elastic body units 4263a and 4263b require enough length to reach up to the two ends of the piezoelectric bimorph element 2525 from the outer surface of the two corner parts of the chassis of the mobile telephone 4201. The configuration for eccentrically supporting the piezoelectric bimorph element 2525 between the two corner parts is effective in that the length can be adjusted as above while keeping the layout of the implemented parts inside the mobile telephone in consideration. In a case in which the elastic body unit 4263a or 4263b becomes longer, the configuration is such that the elastic body unit 4263a or 4263b is elongated inward so as not to make contact with the inner surface of the chassis, and reaches the end part of the piezoelectric bimorph element 2525, whereby it is also possible to increase the degree of freedom with which the end part of the piezoelectric bimorph element 2525 vibrates.

Figure 71B:
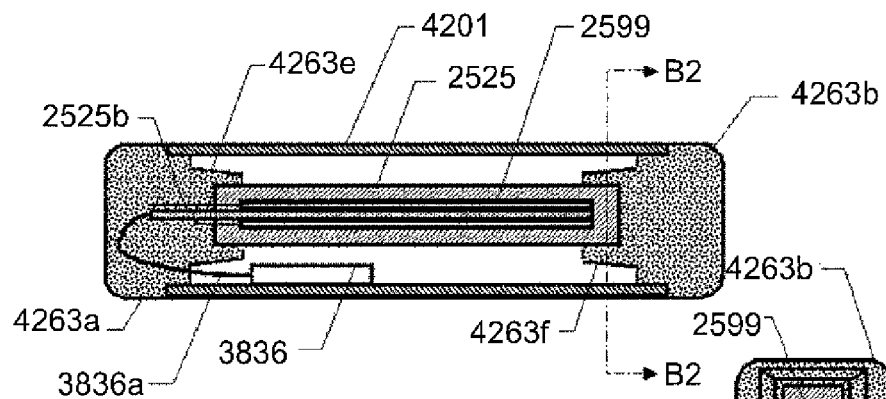
FIG. 71 is a perspective view and a cross-sectional view relating to a modification example of the forty-sixth embodiment according to an aspect of the present invention
Figure 71A:
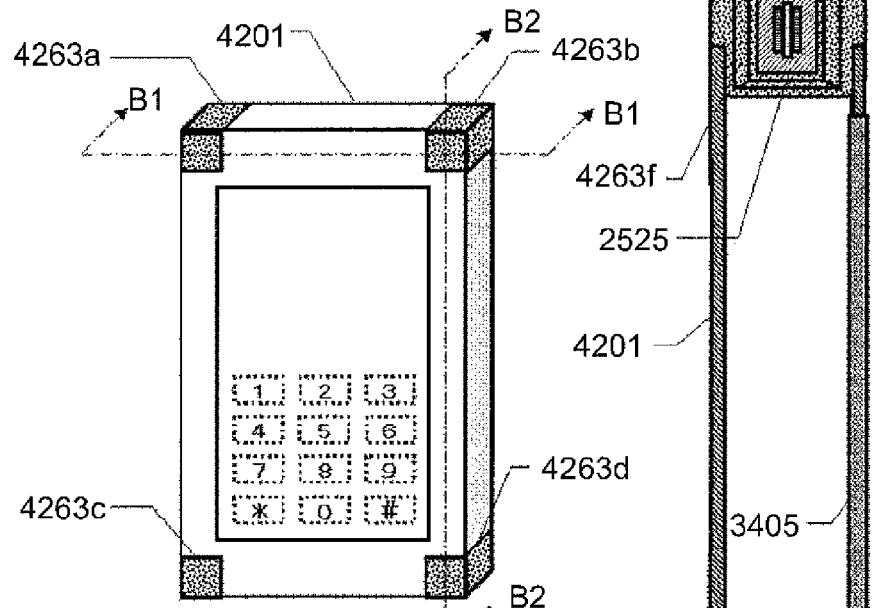
Figure 71C:

FIG. 71 is a perspective view and a cross-sectional view relating to a modification example of the forty-sixth embodiment according to an aspect of the present invention, and serves to illustrate the implementation of a configuration in a case in which the elastic body unit is longer, as described above. Specifically, a case in which, as illustrated in FIG. 71, the elastic body units 4263a and 4263b become longer utilizes a configuration in which there are provided elongation units 4263e and 4263f, by which the elastic body units 4263a and 4263b are elongated inward so as not to make contact with the inner surface of the chassis of the mobile telephone 4201, the two end parts of the piezoelectric bimorph element 2525 being held by these elongation units 4263e and 4263f. According to such a configuration, the elongation units 4263e and 4263f do not make contact with the inner surface of the chassis of the mobile telephone 4201, and therefore elastic deformation is readily possible, and the two end parts of the piezoelectric bimorph element 2525 can be held by such elongation units 4263e and 4263f, whereby the degree of freedom with which the piezoelectric bimorph element 2525 vibrates can be increased. The configuration of FIG. 71 is otherwise consistent with that of FIG. 69, and therefore shared portions have been given like reference numerals, and a description thereof has been omitted.

The various features indicated in the various embodiments of the present invention can be unrestrictedly modified, substituted, or combined whenever the benefits thereof can be utilized. For example, each of the embodiments above has been described with the cartilage conduction vibration source comprising a piezoelectric bimorph element or the like. However, barring particular cases described as pertaining to a configuration specific to the piezoelectric bimorph element, the various features of the present invention are not to be limited to cases in which a piezoelectric bimorph element is utilized as the cartilage conduction vibration source; the advantages thereof can also be realized in a case in which an electromagnetic vibrating element, a super magnetostrictive element, or other diverse elements are used for the cartilage conduction vibration source.

Forty-Eighth Embodiment

FIG. 72 is a perspective view and a cross-sectional view relating to a forty-eighth embodiment according to an aspect of the present invention, and is configured as a mobile telephone 4301. The forty-eighth embodiment serves as an example of a case in which an electromagnetic vibrating element is used as the cartilage conduction vibration source in the configuration of the forty-sixth embodiment in FIG. 69. FIG. 72A is a perspective view in which the mobile telephone 4301 of the forty-eighth embodiment is viewed from the front surface thereof; the outer appearance is similar to that of the perspective view of the forty-sixth embodiment in FIG. 69A. In other words, in the forty-eighth embodiment as well the four corner parts, which are susceptible to collision when the mobile telephone 4301 is dropped by mistake or in other circumstances, are provided with elastic body units 4363a, 4363b, 4363c, and 4363d, which serve as protectors. The elastic body units 4363a and 4363b, which are at the upper two corners, have a dual purpose as units for holding the cartilage conduction vibration source, and the outer sides of the elastic body units 4363a and 4363b have a dual purpose as cartilage conduction units for making contact with the ear cartilage. Then, the elastic body units 4363a and 4363b, similarly with respect to the forty-sixth embodiment, utilize an elastic material having an acoustic impedance approximating that of ear cartilage (a silicone rubber; a mixture of a silicone rubber and a butadiene rubber; a natural rubber; a structure formed using these varieties of rubber in which air bubbles are sealed; a structure, such as can be seen in transparent packaging sheet materials and the like, in which a layer of groups of air bubbles is sealed separated by a thin film of synthetic resin; or the like).

FIG. 72B is a cross-sectional view in the B-B sectional plane of FIG. 72A, wherein the mobile telephone 4301 (represented as 4301a in FIG. 72B) is sectioned along the plane perpendicular to the front surface and the side surface. As is clear from FIG. 72B, each of electromagnetic vibrating elements 4326a and 4324a is embedded in the elastic body units 4363a and 4363b, respectively. The primary vibration direction thereof is the direction perpendicular to the front surface of the mobile telephone 4301 to which a GUI display unit is provided, as illustrated by arrow 25M. In the configuration in which the electromagnetic vibrating elements 4326a and 4324a or other cartilage conduction vibration sources are embedded in the elastic body units 4363a and 4363b, the elastic body units 4363a and 4363b have a dual purpose as a protector function and a cartilage conduction unit function, as described above, and also, as described in the embodiment of FIG. 17, additionally have yet another purpose as a cushioning function for guarding the cartilage conduction vibration source against impact.

In the configuration in which, as in the forty-eighth embodiment in FIG. 72B, the separate electromagnetic vibrating elements 4326a and 4324a are provided to the elastic body unit 4363a and 4363 respectively, the electromagnetic vibrating elements 4326a and 4324a can be controlled independently. Accordingly, similarly with respect to the first embodiment illustrated in FIGS. 1 to 4, the configuration can be made to be such that the inclined direction of the mobile telephone 4301 is detected according to the gravity acceleration detected by the acceleration sensor, and, in accordance with which of the elastic body units 4363a and 4363b is brought up against the ear (in other words, in accordance with against which among the right ear and left ear the corner part of the mobile telephone has been brought, as illustrated in FIG. 2), the electromagnetic vibrating element on the side at the lower angle of inclination is made to vibrate, and the other is turned off. This is also similar to a modification example that will be described later.

FIG. 72C is a cross-sectional view of the first modification example of the forty-eighth embodiment, and, similarly with respect to FIG. 72B, is a cross-sectional view in the B-B sectional plane of FIG. 72A, wherein the mobile telephone 4301 (represented as 4301*b* in FIG. 72C) is sectioned along the plane perpendicular to the front surface and the side surface. Similarly with respect to the forty-eighth embodiment, the first modification example also has the electromagnetic vibrating elements 4326*b* and 4324*b* embedded in the elastic body units 4363*a* and 4363*b*, respectively. However, the primary vibration direction thereof becomes the direction perpendicular to the side surface of the mobile telephone 4301, as illustrated by arrow 25N. This modification example is otherwise similar to the forty-eighth embodiment of FIG. 72B.

FIG. 72D is a cross-sectional view of the second modification example of the forty-eighth embodiment, and, similarly with respect to FIG. 72B, is a cross-sectional view in the B-B sectional plane of FIG. 72A, wherein the mobile telephone 4301 (represented as 4301*c* in FIG. 72D) is sectioned along the plane perpendicular to the rear surface and the side surface. In the second modification example, similarly with respect to the forty-eighth embodiment, each of the electromagnetic vibrating elements 4326*c* and 4324*c* is embedded in the elastic body units 4363*a* and 4363*b*, respectively. However, the primary vibration direction thereof becomes a direction inclined 45° from the side surface of the mobile telephone 4301, as illustrated by arrow 25P. For this reason, similarly with respect to the second modification example of the forty-third embodiment in FIG. 66D, the vibration components are broken down into the direction that is perpendicular to the side surface and to the direction that is perpendicular to the front surface, which is orthogonal thereto, and comparable cartilage conduction can be obtained regardless of the direction from which the either the elastic body unit 4363*a* or 4363*b* comes into contact with the ear cartilage. This modification example is otherwise similar to the forty-eighth embodiment of FIG. 72B.

FIG. 72E is a cross-sectional view of the third modification example of the forty-eighth embodiment, and, similarly with respect to FIG. 72B, is a cross-sectional view in the B-B sectional plane of FIG. 72A, wherein the mobile telephone 4301 (represented as 4301*d* in FIG. 72E) is sectioned along the plane perpendicular to the front surface and the side surface. In the third modification example, electromagnetic vibrating elements 4326*d*, 4326*e*, and 4324*d*, 4324*e* are embedded in the elastic body units 4363*a*, 4363*b*, respectively. The vibration direction of the electromagnetic vibrating elements 4326*d* and 4324*d* is the direction perpendicular to the side surface, illustrated by arrow 25D, and that of the electromagnetic vibrating elements 4326*e* and 4324*e* becomes the direction perpendicular to the front surface, illustrated by arrow 25E. Similarly with respect to the forty-fifth embodiment illustrated in FIG. 68, earplug bone conduction is thereby generated to the side surface and the front surface from a plurality of different cartilage conduction vibration sources.

In the configuration in which, as in the third modification example of the forty-eighth embodiment in FIG. 72E, vibration that is directed perpendicularly with respect to the side surface is generated from the electromagnetic vibrating element 4324*d* and the like and vibration that is directed perpendicularly with respect to the front surface is generated from the electromagnetic vibrating element 4324*e* and the like, it is possible to independently control the electromagnetic vibrating elements 4324*d* and 4324*e* having different vibration directions. Specifically, a possible configuration is one in which the incline direction of the mobile telephone 4301 is detected by gravity acceleration, which is detected by an acceleration sensor such as the acceleration sensor 49 of the first embodiment illustrated in FIG. 3, where, in accordance with whether the elastic body unit 4363*b* is brought up against the ear from the side surface or the front surface, the electromagnetic vibrating element on the side brought up against the ear is made to vibrate and the vibration of the other one is turned off. Such independent control of the plurality of cartilage conduction vibration sources having different vibration directions is not limited to the case of the electromagnetic vibrating elements in FIG. 72D; rather, there are other possible cases of configurations in which, for example, the piezoelectric bimorph elements 4124 and 4126 of the forty-fifth embodiment illustrated in FIG. 68 are utilized.

Figure 73A:
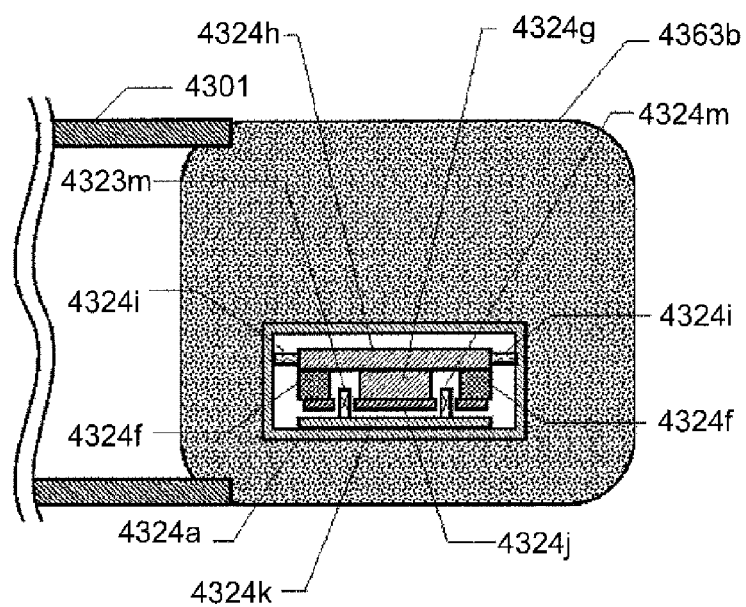
FIG. 73 is an enlarged cross-sectional view of the elements of the forty-eighth embodiment and a modification example thereof.

FIG. 73 is an enlarged cross-sectional view of the elements of the forty-eighth embodiment and the modification examples thereof. FIG. 73A enlarges the portions of the elastic body unit 4363*b* and the electromagnetic vibrating element 4324*a* of FIG. 72B, and in particular provides a detailed illustration of the electromagnetic vibrating element 4324*a*. The electromagnetic vibrating element 4324*a* has a yoke 4324*h* for holding a magnet 4324*f* and a central magnetic pole 4324*g* in a housing thereof, the yoke being suspended midair in a corrugation damper 4324*i*. A top plate 4324*j*, which has a gap, is anchored to the magnet 4324*f* and the central magnetic pole 4324*g*. The magnet 4324*f*, the central magnetic pole 4324*g*, the yoke 4324*h*, and the top plate 4324*j* become integrally movable in the vertical direction when viewed in FIG. 73 relative to the housing of the electromagnetic vibrating element 4324*a*. On the other hand, a voice coil bobbin 4324*k* is anchored to the inside of the housing of the electromagnetic vibrating element 4324*a*, and a voice coil 4323*m* wrapped therearound penetrates into the gap of the top plate 4324*j*. In such a configuration, when an audio signal is inputted into the voice coil 4323*m*, relative displacement occurs between the yoke 4324*h* and the like, and the housing of the electromagnetic vibrating element 4324*a*; the vibration thereof is transmitted to the ear cartilage in contact therewith via the elastic body unit 4363*b*.

Figure 73B:
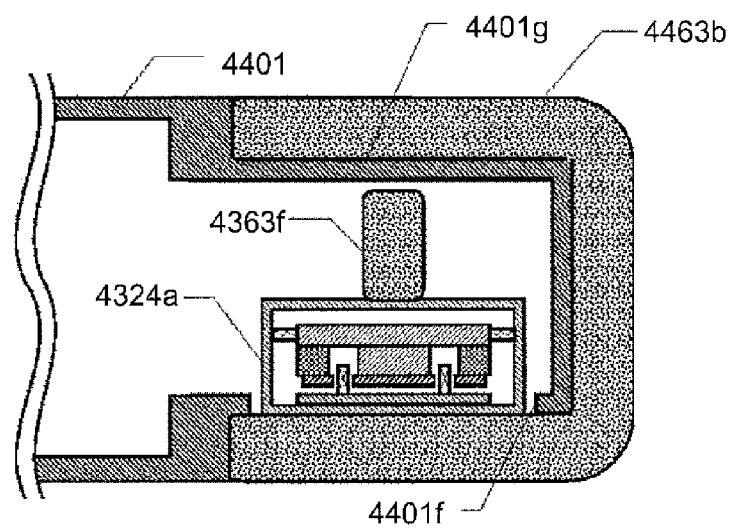

FIG. 73B illustrates a fourth modification example of the forty-eighth embodiment, and provides an enlarged illustration of the portions corresponding to FIG. 73A. The internal configuration of the electromagnetic vibrating element 4324*a* is similar to that of FIG. 73A; therefore, to avoid complication, an illustration of the reference numerals of each unit has been omitted, and the description thereof has also been left out. The fourth modification example in FIG. 73B assumes a configuration in which the corner part of the mobile telephone 4401 is provided with a stepped unit 4401*g*, the outer side thereof being covered by the elastic body unit 4463*b*. The front surface side of the stepped unit 4401*g* is provided with a window unit 4401*f*, the electromagnetic vibrating element 4324*a* being bonded to the rear side of the elastic body unit 4463*b* that faces the portion of the window unit 4401*f*. A cushioning unit 4363*f* comprising an elastic body is also bonded to the opposite side of the electromagnetic vibrating element 4324*a*. The cushioning unit 4363*f* is provided with a gap so as to not be in contact with the rear side of the stepped unit 4401*g* in the ordinary vibrating state, and acts as a cushioning material for preventing the elastic body unit 4463*b* thereabove from making contact with and being unrestrictedly pushed into the rear side of the stepped unit 4401*g* when there is an excessive push against the elastic body unit 4463*b* from collision with an external unit or the like. Adverse events such as when the electromagnetic vibrating element 4324*a* detaches due to deformation of the elastic body unit 4463*b* are thereby prevented. The cushioning unit 4363f functions as a balancer in the ordinary vibrating state, and therefore the shape and weight thereof or the like can be adjusted to design the electromagnetic vibrating element 4324a to have optimal acoustic properties. The cushioning unit 4363f may be a rigid body rather than an elastic body in a case of functioning only as a balancer. Although not depicted in FIG. 73B, the corner part of the opposite side in the fourth modification example of the forty-eighth embodiment (corresponding to the position of the elastic body unit 4363a in FIG. 72B) also assumes a configuration having left-right symmetry with FIG. 73B.

The fourth modification example in FIG. 73B is based on the arrangement of the electromagnetic vibrating elements in the orientation in FIG. 72B. However, a configuration such as that of the fourth modification is not limited thereto, and can also be applied to the arrangement of the electromagnetic vibrating elements in the various orientations in FIGS. 72C to 72E.

In the forty-eighth embodiment illustrated in FIGS. 72 and 73A, the elastic body unit 4363b and the electromagnetic vibrating element 4324a are configured as replaceable unit parts. When the outer appearance of the elastic body unit 4363b is sullied by collision with an external unit, in terms of aesthetics, the elastic body unit 4363b and the electromagnetic vibrating element 4324a can be replaced as a unit. This is a point of similarity with the fourth modification example of the forty-eighth embodiment illustrated in FIG. 73B as well; the elastic body unit 4463b, the electromagnetic vibrating element 4324a, and the cushioning unit 4363f are configured as a replaceable unit part. When the outer appearance of the elastic body unit 4463b is damaged in terms of aesthetics, the whole can be replaced as a unit. Such a configuration as a unit part is a useful feature that is consistent with the fact that the elastic body unit 4463b or the like is configured as a protector and is a part positioned at a corner part predicted to collide with an external unit. The configuration is also a useful feature that is consistent with the fact that the corner susceptible to collision is a suitable location for making contact for cartilage conduction. Furthermore, the feature in which the cartilage conduction vibration units are configured as replaceable unit parts is fundamentally consistent with the configuration of the other portions of the mobile telephone, and is useful in providing a commercial product to which cartilage conduction vibration units having acoustic properties that are optimized in accordance with the user's age or other parameters (for example, where the shape and/or weight of the cushioning unit 4363f illustrated in FIG. 73B are adjusted) are attached. The feature is also fundamentally consistent with the configuration of the other portions of the mobile telephone and is useful in providing a commercial product that can be modified not only for acoustic properties but also in accordance with user preferences; for example, in accordance with a request regarding which of the cartilage conduction vibration units from FIGS. 72B to 72E is used.

The specific configuration in which the cartilage conduction vibration source is provided to the elastic body unit of the corner part is not limited to what is illustrated in FIG. 73; the design can be modified where appropriate. For example, the cushioning unit 4363f illustrated in FIG. 73B may be bonded to the rear side of the stepped unit 4401g, instead of being bonded to the opposite side of the electromagnetic vibrating element 4324a. In such a case, the cushioning unit 4363f is provided with a gap so as to prevent contact with the opposite side of the electromagnetic vibrating element 4324a in the ordinary vibrating state. The cushioning unit 4363f may also be omitted in a case in which the elastic body unit 4463b is able to withstand pushing due to collision with an external unit or another cause.

The various features of each of the embodiments described above are not to be limited to the above embodiments; rather, wherever it is possible to benefit from the feature of an embodiment, same can also be implemented in other embodiments. The various features of each of the embodiments described above are not to be restricted to individual respective embodiments, but rather can be substituted or combined with other appropriate embodiments. The forty-eighth embodiment and the modification examples thereof serve as illustrations of examples in which the electromagnetic vibrating element is utilized as a cartilage conduction vibration unit and in which independently controllable and separate electromagnetic vibrating elements are provided to the elastic body units at different corners. However, the implementation of the present invention is not to be limited thereto. For example, in a case in which, as has already been described, a piezoelectric bimorph element is utilized as the cartilage conduction vibration unit, the cartilage conduction vibration units separately provided to different corners as in the first embodiment of FIG. 1 can be controlled independent of each other. In such a case, referring to the forty-eighth embodiment, the piezoelectric bimorph element can also be provided to the elastic body units at different corners. Conversely, even a case in which an electromagnetic vibrating element is utilized as the cartilage conduction vibration unit can be configured such that the vibration of a single electromagnetic vibrating element is transmitted to the left and right corners, as in the fourth embodiment of FIG. 7, the fifth embodiment of FIG. 11, the tenth embodiment of FIG. 19, the eleventh embodiment of FIG. 20, and the like. In such a case, referring to the forty-eighth embodiment, the vibration conductors to the left and right corner parts can be constituted of elastic bodies regardless of whether the cartilage conduction vibration unit is a piezoelectric bimorph element or an electromagnetic vibrating element. Also, referring to the forty-sixth embodiment and the modification examples thereof, the configuration may be such that the two sides of the electromagnetic vibrating element are supported by elastic bodies provided to the left and right corner parts, depending on the shape of the electromagnetic vibrating element.

Forty-Ninth Embodiment

FIG. 74 is a perspective view and a cross-sectional view relating to a forty-ninth embodiment according to an aspect of the present invention as well as to a modification example thereof, and is configured as a mobile telephone 4501. The forty-ninth embodiment is consistent with the forty-sixth embodiment of FIG. 69 except for the configuration for switching air conduction (to be described later); therefore, like reference numerals have been assigned and the description thereof is called upon. More specifically, the forty-ninth embodiment is illustrated in FIGS. 74A to 74D, of which FIGS. 74A to 74C correspond to FIGS. 69A to 69C, which relate to the forty-sixth embodiment. FIG. 74D is an enlarged view of the elements of FIG. 74C. FIG. 74E is an enlarged view of the elements relating to a modification of the forty-ninth embodiment.

As is clear from the B2-B2 cross-sectional view of FIG. 74C, the forty-ninth embodiment is provided with a transparent resonance chamber 4563 such that the display unit 3405 is covered. The transparent resonance chamber 4563 has air removal holes partially provided to the interior side of the mobile telephone 4501 in the hollow. The transparent resonance chamber 4563 is extremely thin, and therefore the user can observe the display unit 3405 through the transparent resonance chamber 4563. As is clear from FIGS. 74B and 74C, the middle portion of the piezoelectric bimorph element 2525 is provided with a vibration conductor 4527 that can slide in the vertical direction. When the vibration conductor 4527 is at the position indicated by the solid line illustrated in FIG. 74C, the transmission of vibration from the middle portion of the piezoelectric bimorph element 2525 to the transparent resonance chamber 4563 is cut off, and when the vibration conductor 4527 is at the position indicated by the dotted line in FIG. 74C and comes into contact with the upper part of the transparent resonance chamber 4563, the vibration of the middle portion of the piezoelectric bimorph element 2525 is transmitted to the transparent resonance chamber 4563 via the vibration conductor 4527, whereby air conduction sound is generated from the entire transparent resonance chamber 4563 and the entire transparent resonance chamber 4563 becomes a surface speaker. This aspect is clearly illustrated by the enlarged view of the elements of FIG. 74D. The up and down of the vibration conductor 4527 is performed by causing an external manual operation knob 4527a of the mobile telephone 4501 to slide up and down. The manual operation knob 4527a has a click function for determining the two up-down positions. The vibration conductor 4527 also is resilient so as to effectively make contact with the transparent resonance chamber 4563 when made to slide to the position of the dotted line.

As described above, air conduction sound is generated from the entire transparent resonance chamber 4563 and cartilage conduction is generated from the elastic body units 4263a and 4263b in the state in which the vibration conductor 4527 is at the position indicated by the dotted line in FIGS. 74C to 74D. The user can accordingly bring the elastic body unit 4263a or 4263b up against to ear to listen to sound by cartilage conduction, and can also bring any desired portion of the display unit 3405 to which the transparent resonance chamber 4563 is provided close to or up against the ear to listen to sound by air conduction. In this manner, a variety of uses become possible in accordance with the user's preferences and status. On the other hand, the transmission of vibration to the transparent resonance chamber 4563 is cut off and the generation of air conduction sound from the transparent resonance chamber 4563 can be stopped in the state in which the vibration conductor 4527 is at the position indicated by the solid line illustrated in FIGS. 74C to 74D; therefore, because sound leakage by air conduction is prevented, particularly in the state in which the environment is quiet, it is possible to listen to sound by cartilage conduction while preventing any disturbance to the surroundings or leakage of sensitive information.

The modification example of the forty-ninth embodiment in FIG. 74E is configured such that a vibration conductor 4527b is made to rotate, whereby vibration from the middle portion of the piezoelectric bimorph element 2525 is intermittently transmitted to the transparent resonance chamber 4563. Specifically, when the vibration conductor 4527b is at the position indicated by the solid line illustrated in FIG. 74E, the vibration conductor 4527b separates from both the middle portion of the piezoelectric bimorph element 2525 and the transparent resonance chamber 4563, and the transmission of vibration is cut off. On the other hand, when the vibration conductor 4527b is rotated clockwise and is at the position indicated by the dotted line in FIG. 74E, the vibration conductor 4527b is in contact with both the middle portion of the piezoelectric bimorph element 2525 and the upper part of the transparent resonance chamber 4563, and the vibration of the middle portion of the piezoelectric bimorph element 2525 is transmitted to the transparent resonance chamber 4563 via the vibration conductor 4527b. This modification example is otherwise similar to the forty-ninth embodiment of FIGS. 74A to 74D. The rotation of the vibration conductor 4527b is performed by the rotation of an external manual operation dial 4527c of the mobile telephone 4501. The manual operation dial 4527c has a click function for determining the two positions of the rotation. The vibration conductor 4527b is resilient as well, and, when rotated to the position of the dotted line, presses effectively against the middle portion of the piezoelectric bimorph element 2525 and the upper part of the transparent resonance chamber 4563.

Switching between cartilage conduction and air conduction in the manner described above is not to be limited to the forty-ninth embodiment illustrated in FIG. 74 and to the modification examples thereof; various configurations are possible. For example, in FIG. 74, the piezoelectric bimorph element 2525 and the transparent resonance chamber 4563 are secured, and the vibration conductor 4527 or 4527b is moved therebetween, whereby intermittent vibration is performed. However, intermittent vibration between the two can also be performed instead by rendering at least one of the piezoelectric bimorph element 2525 and the transparent resonance chamber 4563 movable. The movement at this time may be performed by at least a part of either the piezoelectric bimorph element 2525 or the transparent resonance chamber 4563. Furthermore, FIG. 74 serves to illustrate an example of switching between the case of cartilage conduction together with air conduction and the case of only cartilage conduction (to be precise, there is also a slight air conduction component, but for the sake of simplicity, this case is hereinafter referred to as "only cartilage conduction"), but another possible configuration is one in which, in exchange, the switching is between a case of only cartilage conduction and a case of only air conduction or the switching is between a case of cartilage conduction together with air conduction and a case of only air conduction. Also, FIG. 74 serves to illustrate an example of manual switching, but another possible configuration is one in which a noise sensor for differentiating between whether the environment is quiet or not is provided and the vibration conductor 4527 or 4527b is automatically driven on the basis of the output of the noise sensor, whereby a case of cartilage conduction together with air conduction is automatically switched to a case of cartilage conduction only when the noise detected by the noise sensor is at or above a predetermined level.

Fiftieth Embodiment

Figure 75:
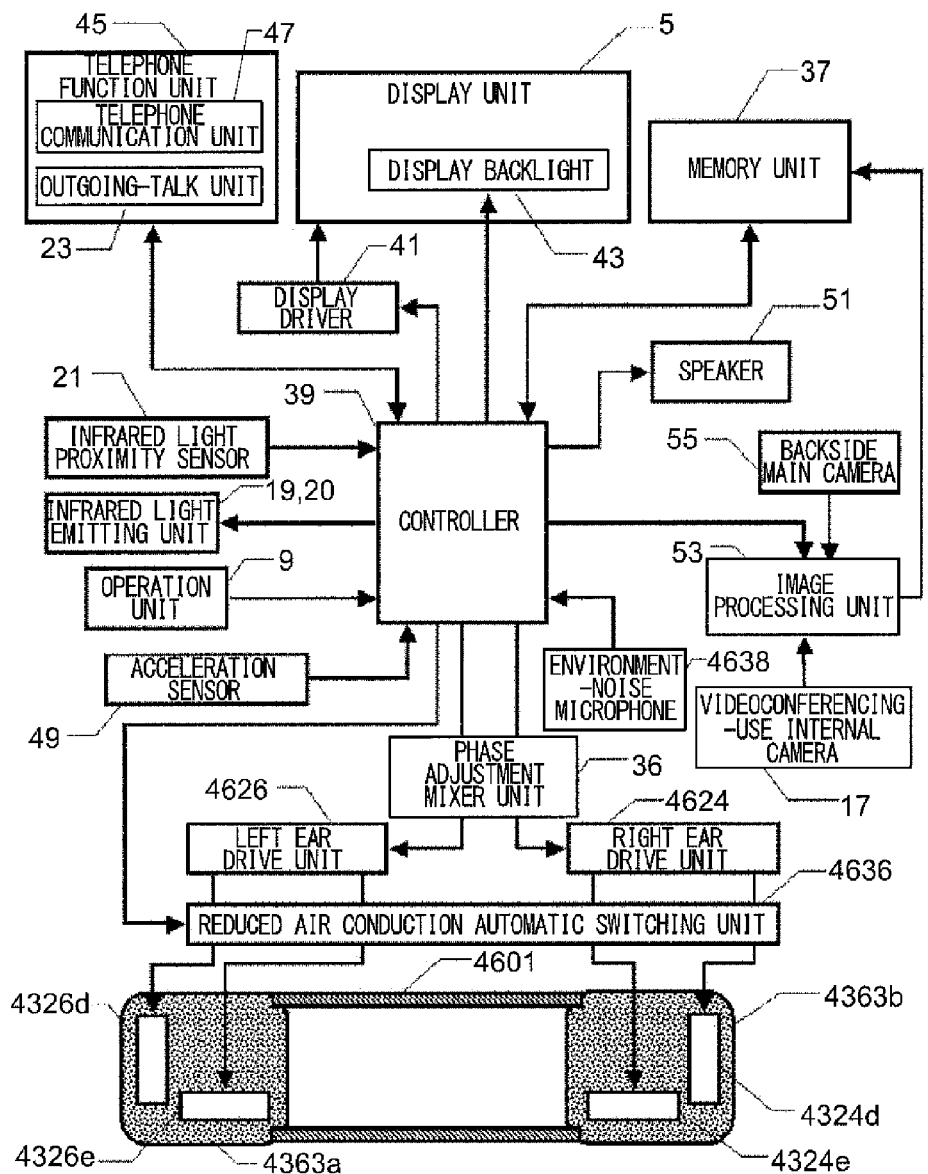
FIG. 75 is a block diagram combining a partial cross-sectional view relating to a fiftieth embodiment according to an aspect of the present invention (fiftieth embodiment)

FIG. 75 is a block diagram relating to a fiftieth embodiment according to an aspect of the present invention, and is configured as a mobile telephone 4601. The fiftieth embodiment is based on the configuration of the third modification example of the forty-eighth embodiment, the cross-section of which is illustrated in FIG. 72E; the electromagnetic vibrating elements 4326d, 4326e, 4324d, and 4324e thereof are controlled by a configuration that is substantially consistent with the block diagram of the first embodiment in FIG. 3. In terms of the need to describe the arrangement, the portions of the electromagnetic vibrating elements are illustrated by a composite of the cross-sectional views. Because the fiftieth embodiment is configured as described above, portions in FIG. 75 that are shared with FIGS. 3 and 72E are assigned shared reference numerals, and a description thereof has been left out, except where necessary. The fiftieth embodiment is not provided with any incoming-talk unit other than the electromagnetic vibrating elements 4326*d*, 4326*e*, 4324*d*, and 4324*e*, and therefore the phase adjustment mixer unit 36, a right ear drive unit 4624, a left ear drive unit 4626, a reduced air conduction automatic switching unit 4636, and the electromagnetic vibrating elements 4326*d*, 4326*e*, 4324*d*, and 4324*e* (which are illustrated in FIG. 75) constitute the incoming-talk unit in the telephone function unit 45 (which in FIG. 3 is the incoming-talk unit 13). The fiftieth embodiment configured in the manner described above assumes separate embodiments relating to the switch between cartilage conduction and air conduction illustrated in the forty-ninth embodiment, the switch being performed both electrically and automatically. The following description focuses on this point.

As described in FIG. 72E as well, the fiftieth embodiment of FIG. 75 assumes a configuration in which cartilage conduction is respectively generated from a plurality of different electromagnetic vibrating elements 4326*e*, 4326*d*, 4324*e*, and 4324*d*, to the side surface and the front surface. The pair of electromagnetic vibrating elements 4326*d* and 4326*e*, which are embedded in the elastic body unit 4363*a*, are controlled by the left ear drive unit 4262, and the pair of electromagnetic vibrating elements 4324*d* and 4324*e*, which are embedded in the elastic body unit 4363*b*, are controlled by the right ear drive unit 4264. In such a configuration, similarly with respect to the first embodiment, the acceleration sensor 49 is used to detect which of the elastic body unit 4363*a* and the elastic body unit 4363*b* is in a state of being brought up against an ear, where either the right ear drive unit 4624 or the left ear drive unit 4626 is turned on and the other is turned off. In addition, either the pair of electromagnetic vibrating elements 4326*d* and 4326*e* or the pair of electromagnetic vibrating elements 4324*d* and 4324*e* is rendered able to vibrate and the other is rendered unable to vibrate.

The fiftieth embodiment of FIG. 75 is further provided with an environment-noise microphone 4638 for differentiating between whether or not the environment is quiet. When the noise detected by the environment-noise microphone 4638 is at or above a predetermined level, the reduced air conduction automatic switching unit 4636 functions according to a command from the controller 39 and causes the pair of electromagnetic vibrating elements 4326*d* and 4326*e* or the pair of electromagnetic vibrating elements 4324*d* and 4324*e* to vibrate. On the other hand, in a quiet situation, which is determined by the controller 39 when the noise detected by the environment-noise microphone 4638 is at or below a predetermined level, only the electromagnetic vibrating element 4326*d* or the only the electromagnetic vibrating element 4324*d* is made to vibrate, according to the function of the reduced air conduction switching unit 4636, and the vibration of the electromagnetic vibrating elements 4326*e* and 4324*e* is stopped. However, for the purpose of detecting the magnitude of environment noise, instead of there being separately provided a dedicated environment-noise microphone 4638 such as in FIG. 75, the microphone output in the outgoing-talk unit 23 of the telephone function unit 45 may be used to extract the noise component. The extracting can be performed by analyzing the frequency spectrum of the microphone output, utilizing the microphone output from when audio is interrupted, or the like.

The following is a description of the significance of the configuration described above. As illustrated in FIG. 72E as well, the vibration direction of the electromagnetic vibrating elements 4326*d* and 4324*d* in the fiftieth embodiment of FIG. 75 is the direction perpendicular to the side surface, and the vibration direction of the electromagnetic vibrating elements 4326*e* and 4324*e* is the direction perpendicular to the front surface. Because the electromagnetic vibrating elements 4326*e* and 4324*e* vibrate in the direction perpendicular to the front surface on which the display unit 5 or the like is arranged, the entire front surface, which in the mobile telephone 4601 has a large surface area, resonates and has a larger vibration component than the vibration of the side surface from the electromagnetic vibrating elements 4326*d* and 4324*d*. For this reason, and with respect to the forty-ninth embodiment, the case in which the pair of electromagnetic vibrating elements 4326*e* and 4326*d* vibrate or the case in which the pair of electromagnetic vibrating elements 4324*e* and 4324*d* vibrate corresponds to the "case of cartilage conduction plus air conduction." On the other hand, the case in which only the electromagnetic vibrating element 4326*d* vibrates or the case in which only the electromagnetic vibrating element 4324*d* vibrates corresponds to the "case of cartilage conduction only." However, a certain amount of an air conduction component remains in the "case of cartilage conduction only," as has been described in the forty-ninth embodiment, and therefore the distinction between these cases is based on a strictly relative comparison of the size of the air conduction component.

As has been described above, in a case in which the electromagnetic vibrating elements 4326*e* and 4326*d* vibrate or in a case in which the electromagnetic resonators 4324*e* and 4324*d* vibrate, the user can bring the elastic body unit 4263*a* or 4263*b* against the ear to listen to sound by cartilage conduction, and can also bring any desired portion of the front surface of the mobile telephone 4601 close to or up against the ear to listen to sound by air conduction. In this manner, a variety of uses become possible in accordance with the user's preferences and status. On the other hand, in a case in which only the electromagnetic vibrating element 4326*d* vibrates or in a case in which only the electromagnetic vibrating element 4324*d* vibrates, because relatively less air conduction is generated and sound leakage by air conduction is prevented, particularly in the state in which the environment is quiet, it is possible to listen to sound by cartilage conduction while preventing any disturbance to the surroundings or leakage of sensitive information. In the fiftieth embodiment, air conduction is automatically reduced in a state in which the environment is quiet, due to the functions of the environment-noise microphone 4638 and the reduced air conduction automatic switching unit 4636.

Although the fiftieth embodiment of FIG. 75 is configured using electromagnetic vibrating elements, the configuration for electrically and automatically switching between cartilage conduction and air conduction is not limited to the case in which the electromagnetic vibrating elements are used as cartilage conduction vibration sources. For example, as in the forty-fifth embodiment of FIG. 68, in a case in which a plurality of independently controllable piezoelectric bimorph elements are provided to mutually different directions, the same can be automatically controlled in conformity with the fiftieth embodiment. Another possible configuration in the fiftieth embodiment of FIG. 75 is one in which a transparent resonance chamber 4563 for generating air conduction is provided, such as in the forty-ninth embodiment of FIG. 74, and one or both of the electromagnetic vibrating element 4326*e* and the electromagnetic vibrating element 4324*e* is brought into constant contact with such a transparent resonance chamber 4563, whereby air conduction is actively generated from the front surface of the mobile telephone 4601.

The various features of each of the embodiments described above are not to be limited to the above embodiments; rather, wherever it is possible to benefit from the feature of an embodiment, the same can also be implemented in other embodiments. The various features of each of the embodiments are not to be restricted to individual respective embodiments, but rather can be substituted or combined with other appropriate embodiments. For example, in the present invention, ear-contacting units for cartilage conduction are provided to the corner parts of the mobile telephone. This feature will now be considered, for example, for the mobile telephone 301 configured as a smartphone as in the fourth embodiment of FIG. 7 (which hereinafter is referred to as the smartphone 301, for the sake of simplicity). The smartphone 301 as in FIG. 7 has a large-screen display unit 205 provided with GUI functions on the front surface thereof, and assumes an arrangement in which an ordinary incoming-talk unit 13 is relegated to the upper angled region of the smartphone 301. Moreover, since the ordinary incoming-talk unit 13 is provided to the middle portion of the part of the smartphone 301, there is assumed an arrangement in which it is difficult to bring the large-screen display unit 205 up against the cheek bone and to bring the incoming-talk unit 13 close to the ear in a case in which the smartphone 301 is brought up against the ear; and pressing the ordinary incoming-talk unit 13 strongly against the ear so that the voice of the other party can be better heard incurs a result where the large-screen display unit 205 is in contact with the ear or cheek and is fouled by sebum or the like. By contrast, when the right ear vibration unit 224 and the left ear vibration unit 226 are arranged at the corner parts of the smartphone 301 in FIG. 7, as is illustrated in FIG. 2 which relates to the first embodiment, the corner parts of the smartphone 301 are accommodated in the recess around the entrance to the external auditory meatus in the vicinity of the tragus 32. It thereby becomes possible to readily push the audio output unit of the smartphone 301 against the area around the entrance to the external auditory meatus, and contact made by the large-screen display unit 205 with the ear or cheek can be naturally avoided even in a case of strong pushing. Such an arrangement of the audio output unit at the corner part of the mobile telephone is not limited to the case of using cartilage conduction, and is useful also in a case of an incoming-talk unit that uses an ordinary air conduction speaker. In such a case, air conduction speakers for right ear use and left ear use are preferably provided to the two corners of the upper part of the smartphone.

As has already been described, cartilage conduction conducts differently depending on the amount of force pushing on the cartilage, and a state of effective conduction can be obtained by increasing the amount of force that is pushing. This means that when it is difficult to hear the incoming sound, a natural behavior such as increasing the force pushing the mobile telephone against the ear can be utilized to adjust the volume. Furthermore, when the amount of pushing force is increased until a state in which the hole of the ear is obstructed, the volume is further increased due to the earplug bone conduction effect. Even when such a function is not explained to the user in, for example, the instruction manual, the user can still intuitively understand the function through natural behavior. Such an advantage in terms of usage can also be achieved in an artificial sense in a case of an incoming-talk unit in which an ordinary air conduction speaker is used, without the cartilage conduction vibration unit being used as the audio output unit, and can serve as a useful feature of the mobile telephone.

Fifty-First Embodiment

Figure 76:
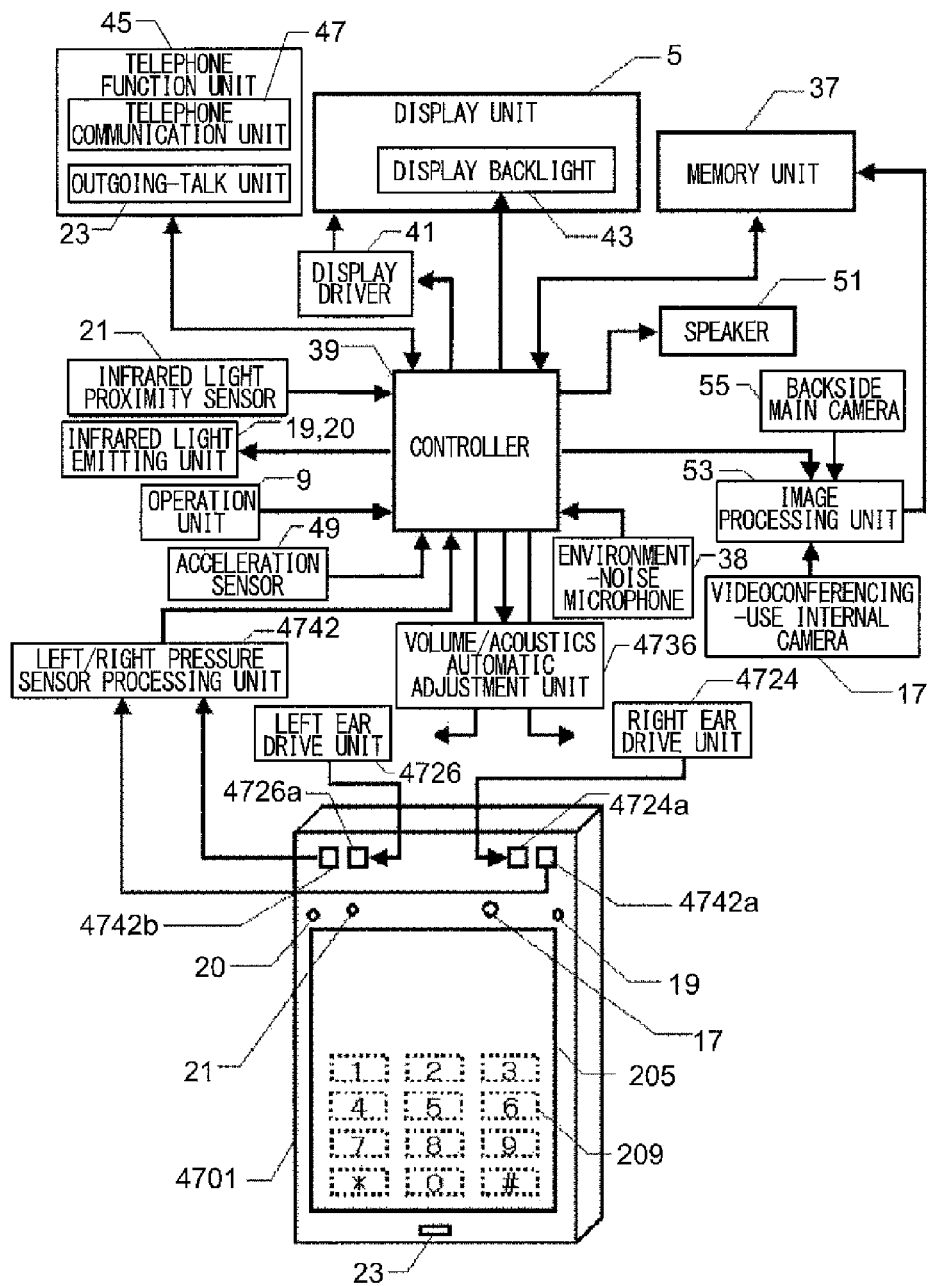
FIG. 76 is a block diagram combining a partial cross-sectional view relating to a fifty-first embodiment according to an aspect of the present invention (fifty-first embodiment)

FIG. 76 is a block diagram relating to a fifty-first embodiment according to an aspect of the present invention, and is configured as a mobile telephone 4701. The fifty-first embodiment does not utilize a cartilage conduction vibration unit as the audio output unit as described above but rather uses an ordinary air conduction speaker, and is configured such that automatic volume adjustment can be artificially achieved by a natural behavior. In terms of the need to describe the arrangement of the outer appearance, a composite schematic view of the mobile telephone is illustrated in the block diagram. The majority of the block diagram of FIG. 76 is consistent with the first embodiment of FIG. 3, and the majority of the general overview is consistent with the fourth embodiment of FIG. 7; therefore, portions in common have been given like reference numerals, and a description thereof has been left out except where necessary. A volume/acoustics automatic adjustment unit 4736, a right ear drive unit 4724, a left ear drive unit 4726, a right ear air conduction speaker 4724a, and a left ear air conduction speaker 4726a illustrated in FIG. 76 constitute the incoming-talk unit in the telephone function unit 45 (which in FIG. 3 is the outgoing-talk unit 13).

The right ear air conduction speaker 4724a of the fifty-first embodiment in FIG. 76 is controlled by the right ear drive unit 4524, and the left ear air conduction speaker 4726a is controlled by the right ear drive unit 4526. Also, similarly with respect to the fiftieth embodiment, the acceleration sensor 49 is used to detect which of the right ear air conduction speaker 4724a and the left ear air conduction speaker 4726a is in a state of being brought up against an ear, where either the right ear drive unit 4524 or the left ear drive unit 4526 is turned on and the other is turned off. In addition, either the right ear air conduction speaker 4724a or the left ear air conduction speaker 4726a is turned on and the other is turned off.

A right ear pressure sensor 4742a and a left ear pressure sensor 4742b are respectively provided to the vicinity of the right ear air conduction speaker 4724a and the left ear air conduction speaker 4726a and detect pressure on whichever of the right ear air conduction speaker 4724a or left ear air conduction speaker 4726a is turned on. A left/right pressure sensor processing unit 4742 analyzes the magnitude of the detected pressure and sends volume/acoustics control data to the controller 39. The controller 39 commands a volume/acoustics automatic adjustment unit 4736 on the basis of the volume/acoustics control data and automatically adjusts the volume of whichever of the right ear drive unit 4524 or left ear drive unit 4526 is on. The volume is basically adjusted such that the volume increases with an increase in pressure and, when it is difficult to listen to the incoming-talk unit sound, is set so as to be a suitable response to a natural behavior such as increasing the force pushing the mobile telephone 4701 against the ear.

A supplementary detailed description of the function of the volume/acoustics automatic adjustment unit 4736 will now be provided. To avoid unstable volume changes due to changes in pressure, first, volume changes are configured such that the volume only undergoes stepwise changes in the increasing direction and in accordance only with an increase in pressure. Furthermore, to avoid unintentional volume changes, the volume/acoustics automatic adjustment unit 4736 is configured such that volume increases in a stepwise manner in reaction only to when a predetermined pressure increase lasts on average for a predetermined period of time (for example, 0.5 seconds) or longer. The volume/acoustics automatic adjustment unit 4736 is also configured such that volume is instantaneously lowered to a baseline state in a case in which it is detected that the state in which the pressure has fallen to a predetermined value (corresponding to the state in which whichever of the right ear air conduction speaker 4724a or left ear air conduction speaker 4726a is turned on is brought away from the ear) or lower has lasted for a predetermined period of time (for example, 1 second) or longer. The user is thereby able to intentionally bring the mobile telephone 4701 slightly away from the ear in a case in which the volume has been excessively increased or the like (which is also consistent with a natural operation such as bringing a sound source away from the ear when the sound is too loud), and once the volume has been reset to the baseline state, the force of the pressure is again increased to achieve a desired volume.

The volume/acoustics automatic adjustment unit 4736 is further able to automatically adjust the acoustics. This function is related to the environment-noise microphone 38 described in relation to the first embodiment in FIG. 3. Namely, in the first embodiment, the environment noise picked up by the environment-noise microphone 38, is mixed into the right-ear cartilage-conduction vibration unit 24 and the left-ear cartilage-conduction vibration unit 26 upon undergoing wavelength inversion; the environment noise, which is contained in the audio information through the incoming-talk unit 13, is canceled and the audio information of the party on the line becomes easier to comprehend through listening. The volume/acoustics automatic adjustment unit 4736 in the fifty-first embodiment utilizes this function to turn the noise-canceling function off when the pressure is equal to or less than a predetermined value and to turn the noise-canceling function on when the pressure is equal to or above a predetermined value. The degree to which the environment noise inversion signal is mixed can also be adjusted in a stepwise manner, whereby the noise-canceling function, rather than merely being turned on and off, can also undergo continuous or stepwise increases and decreases. In this manner, the volume/acoustics automatic adjustment unit 4736 is capable of automatically adjusting not only the volume but also the acoustics, on the basis of the output of the left/right pressure sensor processing unit 4742. The fifty-first embodiment of FIG. 76 is an embodiment that serves to illustrate that the aforementioned advantage, in which the right ear audio output unit and the left ear audio output unit are arranged at the corner parts of the smartphone, is not limited to a case in which cartilage conduction is used; benefits may also accrue therefrom in a case in which an outgoing-talk unit using ordinary air conduction speakers is utilized.

The various features of each of the embodiments described above are not to be limited to the above embodiments; rather, wherever it is possible to benefit from the feature of an embodiment, the same can also be implemented in other embodiments. The various features of each of the embodiments are not to be restricted to individual respective embodiments, but rather can be substituted or combined with other appropriate embodiments. For example, in the fifty-first embodiment of FIG. 76, a determination is made as to which of the right ear air conduction speaker 4724a or left ear air conduction speaker 4726a is to be turned on according to the output of the acceleration sensor 49, but the configuration may be such that the outputs of the right ear pressure sensor 4742a and left ear pressure sensor 4742b are used to turn on whichever of the right ear air conduction speaker 4724a or left ear air conduction speaker 4726a has more pressure, and to turn the other off.

Also, the fifty-first embodiment of FIG. 76 is provided with the right ear air conduction speaker 4724a and the left ear air conduction speaker 4726a as well as the right ear pressure sensor 4742a and left ear pressure sensor 4742b corresponding thereto, but when there is only the purpose of automatic volume/acoustics adjustment by pressure, then a single conventional air conduction speaker may be provided to the middle of the upper part of the mobile telephone, and a single pressure sensor may be provided correspondingly with respect thereto. Furthermore, the fifty-first embodiment of FIG. 76 has illustrated how environment noise is canceled out by waveform inversion as a fundamental configuration of the automatic adjustment of acoustics by the volume/acoustics automatic adjustment unit 4736, but such a configuration is not provided by way of limitation. For example, the configuration may be such that the volume/acoustics automatic adjustment unit 4736 is provided with a filter for cutting out environment noise (for example, a low-frequency-band-cutting filter), the filter being turned off when the pressure is at or below a predetermined value and the filter function being turned on when the pressure is at or above a predetermined value. The configuration may also be such that, instead of a low-frequency band or the like being cut out by the filter, the gain of the low-frequency band is dropped (or the gain of a high frequency area is raised). The filter function or the frequency-band-selective gain function can also be adjusted in a stepwise manner, whereby the filter function or the frequency-selective gain function, rather than merely being turned on and off, can also alter the environment noise reduction capability in a stepwise or continuous manner in accordance with the pressure.

Fifty-Second Embodiment

Figure 77:
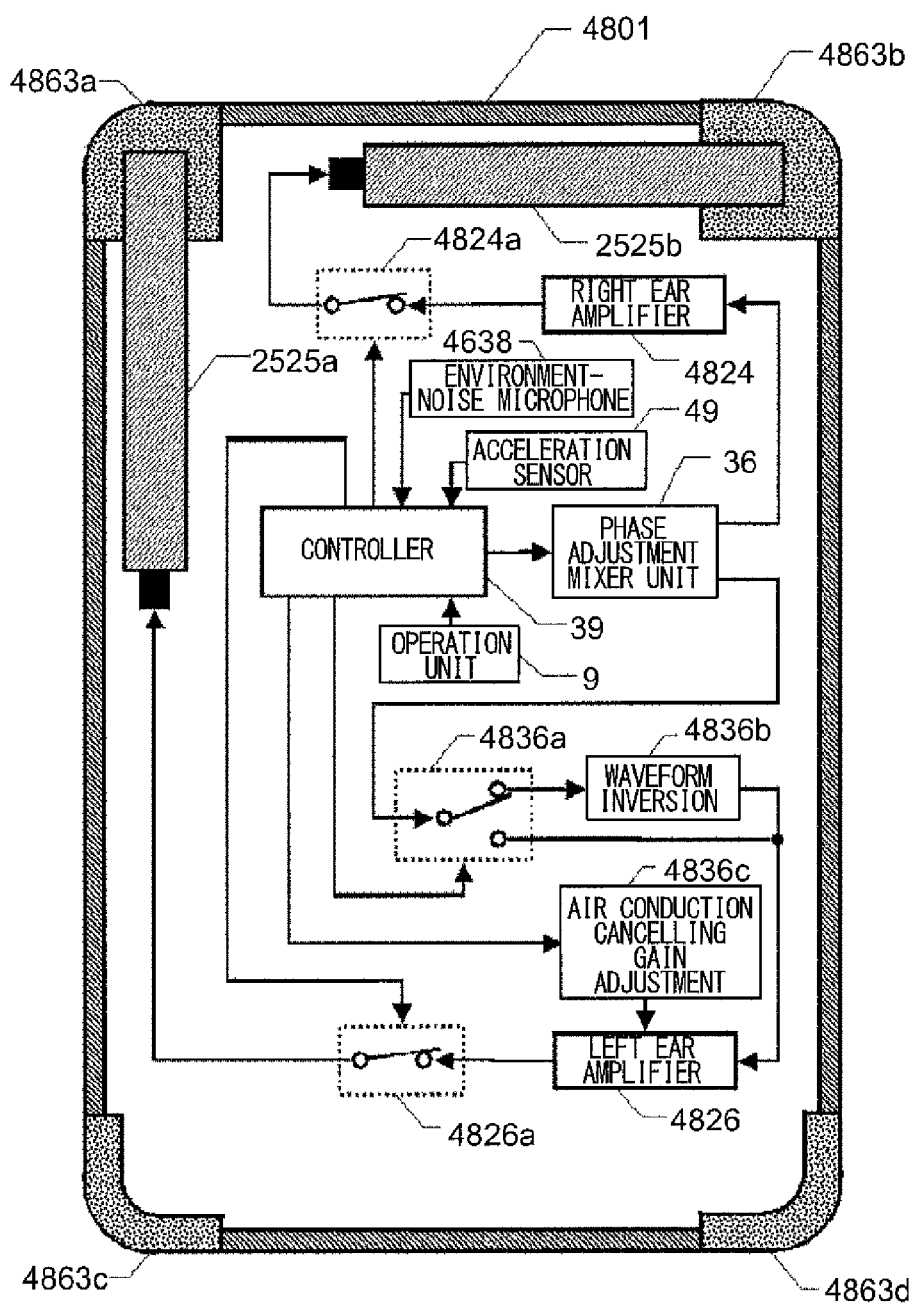
FIG. 77 is a cross-sectional view and interior block diagram relating to a fifty-second embodiment according to an aspect of the present invention (fifty-second embodiment)

FIG. 77 is a cross-sectional view relating to a fifty-second embodiment according to an aspect of the present invention, and is configured as a mobile telephone 4801. FIG. 77 provides a cross-sectional view of the mobile telephone 4801, depicted in order to describe the support structure and arrangement of piezoelectric bimorph elements 2525a and 2525b serving as cartilage conduction vibration sources, while the interior of the cross-sectional view, which relates to the control of the mobile telephone, depicts not an actual arrangement but rather a block diagram. The block diagram portion, being founded on the block diagram of the first embodiment illustrated in FIG. 3, essentially omits a depiction of shared portions, with the exception of those needed to understand the interrelationships, and like portions, when depicted, have been assigned like reference numerals, a description thereof being omitted unless needed.

The fifty-second embodiment of FIG. 77, similarly with respect to the forty-ninth embodiment of FIG. 74 and the fiftieth embodiment of FIG. 75, is configured as an embodiment permitting the interchange of "the case of cartilage conduction plus air conduction" and "the case of cartilage conduction only." Further, the fifty-second embodiment of FIG. 77, similarly with respect to the forty-sixth embodiment of FIG. 69, has elastic body units 4863a, 4863b, 4863c, and 4863d serving as protectors provided to the four corners susceptible to impact when the mobile telephone 4801 is accidentally dropped. However, rather than a two-sided support structure for the elastic body units 4863a, 4863b to support the piezoelectric bimorph elements 2525a and 2525b, a single side thereof is supported on a cantilever structure, similarly with respect to the forty-second embodiment of FIG. 65 and the forty-third embodiment of FIG. 66. As above, the fifty-second embodiment of FIG. 77 is related to features of various embodiments having already been described, wherefore a repetitive description of the individual features has been avoided unless needed, since the same are readily understood from the descriptions of the corresponding embodiments.

First, the structure and arrangement of the fifty-second embodiment of FIG. 77 will now be described. As has already been mentioned, the four corners of the mobile telephone

4801 are provided with the elastic body units 4863*a*, 4863*b*, 4863*c*, and 4863*d*, serving as protectors. The outer sides of the corners of such elastic members are beveled in a smooth convex shape to prevent the occurrence of slight pain when held against the ear cartilage. Although a more detailed description will also be provided later, the shape of the corner parts allows for a suitable fit with the cartilage around the external auditory meatus and for comfortable listening by cartilage conduction.

In the fifty-second embodiment of FIG. 77, the piezoelectric bimorph element 2525*b* for the right ear and the piezoelectric bimorph element 2525*a* for the left ear are employed as described above, and can be controlled separately, similarly with respect to the first embodiment illustrated in FIGS. 1 to 4. The piezoelectric bimorph elements 2525*b* and 2525*a* are appropriately long enough to obtain suitable frequency output properties, but in order for both to be compactly arranged within the mobile telephone 4801, the piezoelectric bimorph element 2525*b* for the right ear, as illustrated in FIG. 77, is laid horizontally, the end to which no terminal is provided being supported by the elastic body unit 4863*b*. On the other hand, the piezoelectric bimorph element 2525*a* for the left ear is stood upright, the end to which no terminal is provided being supported by the elastic body unit 4863*a* (however, the vertical and horizontal arrangement of the piezoelectric bimorph elements for the right ear and for the left ear may be inverted from the description above). A terminal is provided to the other ends of each of the piezoelectric bimorph elements 2525*b* and 2525*a*, but serves as a free end in terms of the support structure due to the connection thereof with the controller 39 by a flexible lead. In this manner, the vibration of the free ends of the piezoelectric bimorph elements 2525*b* and 2525*a* exhibits opposite actions on the elastic body unit 4863*b* and the elastic body 4863*a*, and cartilage conduction can be obtained by bringing the same into contact with the ear cartilage. The primary vibration direction of the piezoelectric bimorph elements 2525*b* and 2525*a* is the direction perpendicular to the plan in FIG. 77.

Next, the manner in which the piezoelectric bimorph elements 2525*b* and 2525*a* are controlled will be described. The piezoelectric bimorph element 2525*b* for the right ear, which is supported by the elastic body unit 4863*b*, is driven by a right ear amplifier 4824 via a switch 4824*a*. On the other hand, the piezoelectric bimorph element 2525*a* for the left ear, which is supported by the elastic body unit 4863*a*, is driven by a left ear amplifier 4826 via a switch 4826*a*. An audio signal from the phase adjustment mixer unit 36 is inputted into the right ear amplifier 4824 and the left ear amplifier 4826; the audio signal to the left ear amplifier 4826 is phase-inverted by a waveform inverter 4836*b* and then inputted via a switch 4836*a*. As a result, in the state depicted in FIG. 77, vibrations having mutually inverted phases are conducted to and mutually canceled out in the chassis of the mobile telephone 4801 from the elastic body unit 4863*a* and the elastic body unit 4863*b*, and the generation of air conduction sound from the entire surface of the chassis of the mobile telephone 4801 is substantially eliminated.

In a case where, for example, the cartilage of the right ear is brought into contact with the elastic body unit 4863*b*, there will be direct cartilage conduction to the ear cartilage from the elastic body 4863*b*, whereas, by contrast, the vibration of the elastic body unit 4863*a* reaches the elastic body unit 4863*b* and is conducted to the ear cartilage as cartilage conduction only after having been first conducted to the chassis of the mobile telephone 4801. Accordingly, since a difference emerges in the intensities of the phase-inverted vibrations, the difference will be conducted to the ear cartilage as cartilage conduction from the elastic body unit 4863*b* without having been canceled out. The same is also true of a case where the cartilage of the left ear is brought into contact with the elastic body unit 4863*a*. Accordingly, the state depicted in FIG. 77 in the fifty-second embodiment becomes a state corresponding to the "case of cartilage conduction only" in the forty-ninth embodiment of FIG. 74 and the fiftieth embodiment of FIG. 75. An air conduction cancelling gain adjustment unit 4836*c* serves to adjust the gain of the left ear amplifier 4826 so as to cancel out vibration to the chassis of the mobile telephone 4801 from the elastic body unit 4863*a* and the elastic body unit 4863*b* as described above, whereby the generation of air conduction sound will be minimized. Also, rather than being provided to the left ear amplifier 4826 side, the aforesaid switch 4836*a*, waveform inverter 4836*b*, and air conduction cancelling gain adjustment unit 4836*c* may also be instead provided to the right ear amplifier 4824 side. Alternatively, the air conduction cancelling gain adjustment unit 4836*c* only may be provided to the right ear amplifier 4824 side.

The fifty-second embodiment of FIG. 77 is provided with the environment-noise microphone 4638 for determining whether or not the environment is silent. When the noise detected by the environment-noise microphone 4638 is at or above a predetermined amount, the switch 4836*a* is switched to a signal pathway (the lower one in FIG. 77) by a command from the controller 39. An audio signal from the phase adjustment mixer unit 36 is thereby conducted to the left ear amplifier 4826 without waveform inversion. At such a time, the vibration conducted to the chassis of the mobile telephone 4801 from the elastic body unit 4863*a* and the elastic body unit 4863*b* is not canceled out, but rather air conduction sound from the entire surface of the chassis of the mobile telephone 4801 is conversely generated at a two-fold increase. Such a state serves as a state corresponding to the "case of cartilage conduction plus air conduction" in the forty-ninth embodiment of FIG. 74 and the fiftieth embodiment of FIG. 75. Because of the two-fold increase in air conduction sound from the entire surface of the chassis, such a state is suitable for a case where the mobile telephone 4801 is taken away from the ear and audio is listened to, as is done during a videoconferencing function or similar circumstances; in the case of the videoconferencing function mode, the switch 4836*a* is switched to the signal pathway (the lower one in FIG. 77) by a command from the controller 39 irrespective of the detection of the environment-noise microphone 4638.

In circumstances determined to be silent by the controller 39 when the noise detected by the environment-noise microphone 4638 is at or below a predetermined amount, the switch 4836*a* is switched to the state depicted in FIG. 77 by a command from the controller 39. As described above, the vibrations conducted to the chassis of the mobile telephone 4801 from the elastic body unit 4863*a* and the elastic body unit 4863*b* are thereby mutually canceled out, substantially eliminating the generation of air conduction sound, which serves as a state corresponding to the "case of cartilage conduction only."

Further, similarly with respect to the first embodiment, it is possible in the fifty-second embodiment of FIG. 77 for the state of whether the elastic body unit 4863*a* or the elastic body unit 4863*b* has been brought up against the ear to be detected by an acceleration sensor 49, and for the switch 4824*a* and a switch 4826*a* to be controlled by the control of the controller 39. Then, the operation unit 9 can be used to switch between a two-sided always-on mode in which both the switch 4824*a* and the switch 4826*a* are on irrespective of the state detected by the acceleration sensor 49, and a one-sided on mode in which one of either the switch 4824*a* or the switch 4826*a* is turned on and the other is turned off on the basis of the state detected by the acceleration sensor 49. In the one-sided on mode, for example, the switch 4824*a* is turned on and the switch 4826*a* is turned off when the right ear is brought up against the elastic body unit 4863*b*. The inverse occurs when the left ear is brought up against the elastic body unit 4863*a*.

The one-sided on mode further incorporates the function of the environment-noise microphone 4638; when the environmental noise detected by the environment-noise microphone 4638 is at or above a predetermined amount, one of either the switch 4824*a* or the switch 4826*a* is turned on and the other is turned off on the basis of the state detected by the acceleration sensor 49. In circumstances determined to be silent by the controller 39 when the noise detected by the environment-noise microphone 4638 is at or below a predetermined amount, both the switch 4824*a* and the switch 4826*a* are turned on by a command from the controller 39 irrespective of the state detected by the acceleration sensor 49, the switch 4836*a* being switched to the state depicted in FIG. 77, and the vibrations conducted to the chassis of the mobile telephone 4801 from the elastic body unit 4863*a* and the elastic body unit 4863*b* are thus mutually canceled out.

Figure 78:
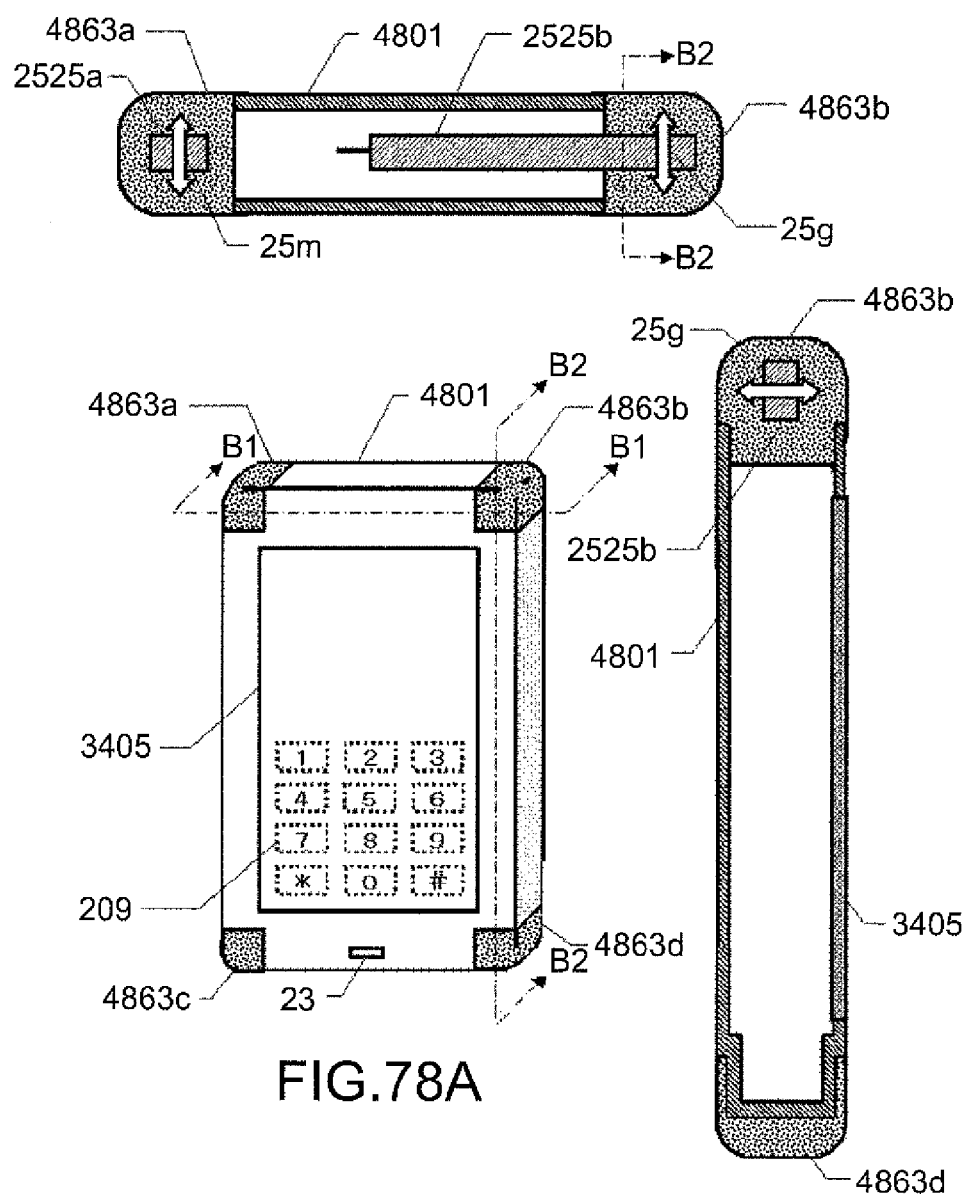
FIG. 78 is a perspective view and cross-sectional views relating to the fifty-second embodiment of FIG. 77.

FIG. 78 is a perspective view and cross-sectional views relating to the fifty-second embodiment of FIG. 77. FIG. 78A is a perspective view in which the mobile telephone 4801 of the fifty-second embodiment is seen from the front surface, and illustrates the manner in which the outer surfaces of the corners of the elastic body units 4863*a*, 4863*b*, 4863*c*, and 4863*d* provided as protectors to the four corners of the mobile telephone 4801 are beveled so as to have a smooth, convex shape. As described above, such an outer surface shape of the corner parts of the mobile telephone 4801 prevents the occurrence of slight pain when the elastic member 4863*a* or 4863*b* is brought up against the ear cartilage, and also allows for the corner parts of the mobile telephone 4801 to be suitably fitted to the cartilage around the entrance part of the external auditory meatus inside the auricle, permitting comfortable listening by cartilage conduction. The occlusion of the entrance part of the external auditory meatus by the beveled corner parts produces the earplug bone conduction effect, which intensifies the audio signal from the mobile telephone 4801 in the external auditory meatus and also makes it easier to listen to the audio signal in the presence of noise, due to the noise of the external environment being blocked by the occlusion of the entrance part of the external auditory meatus.

FIG. 78B is a cross-sectional view cutting through the mobile telephone 4801 on the B1-B1 cross-sectional plane of FIG. 78A, on the plane perpendicular to the front view and side view; FIG. 78C is a cross-sectional view cutting through the mobile telephone 4801 on the B2-B2 cross-sectional plane illustrated in FIG. 78A or 78B, on the plane perpendicular to the plan view and the top view. The manner in which the outer surfaces of the corners of the elastic body units 4863*a*, 4863*b*, 4863*c*, and 4863*d* are beveled so as to have a smooth, convex shape will be readily understood from either of FIG. 78B or 78C. As illustrated by the arrow 25*g* in FIGS. 78B and 78C, the primary vibration direction of the piezoelectric bimorph element 2525*b* is the direction perpendicular to the display surface of the GUI display unit 3405. Further, as illustrated by the arrow 25*m* in FIG. 78B, the primary vibration direction of the piezoelectric bimorph element 2525*a* is the direction perpendicular to the display surface of the GUI display unit 3405.

Although each of the switches 4824*a*, 4826*a*, and 4836*a* in the fifty-second embodiment are symbolically depicted in FIG. 77 as mechanical switches, in practice the same are preferably constituted of electrical switches. Also, except in the case of switching between the two-sided always-on mode and the one-sided on mode, the switches in the fifty-second embodiment have been depicted by way of the example of automatically switching on the basis of the results detected by the acceleration sensor 49 and/or the environment-noise microphone 4638, but the configuration may also permit manual switching as desired, by the operation unit 9. It is also possible to omit the switches, as appropriate. For example, when the fifty-second embodiment is simplified so as to always be in the connection state depicted in FIG. 77, a mobile telephone is obtained in which the generation of air conduction sound from the entire surface of the chassis is substantially eliminated and cartilage conduction occurs when the elastic body unit 4863*a* or the elastic body unit 4863*b* is brought into contact with the ear cartilage.

The various features of each embodiment described above are not to be restricted to individual respective embodiments, but rather can be substituted or combined with other appropriate embodiments. For example, although the fifty-second embodiment of FIGS. 77 and 78 employs the piezoelectric bimorph elements as cartilage conduction vibration sources, the cartilage conduction vibration sources may be substituted for other vibrators, such as with the magnetic vibrators in the forty-eighth embodiment of FIGS. 72 and 73, the fiftieth embodiment of FIG. 75, or the fifty-first embodiment of FIG. 76.

Figure 79:
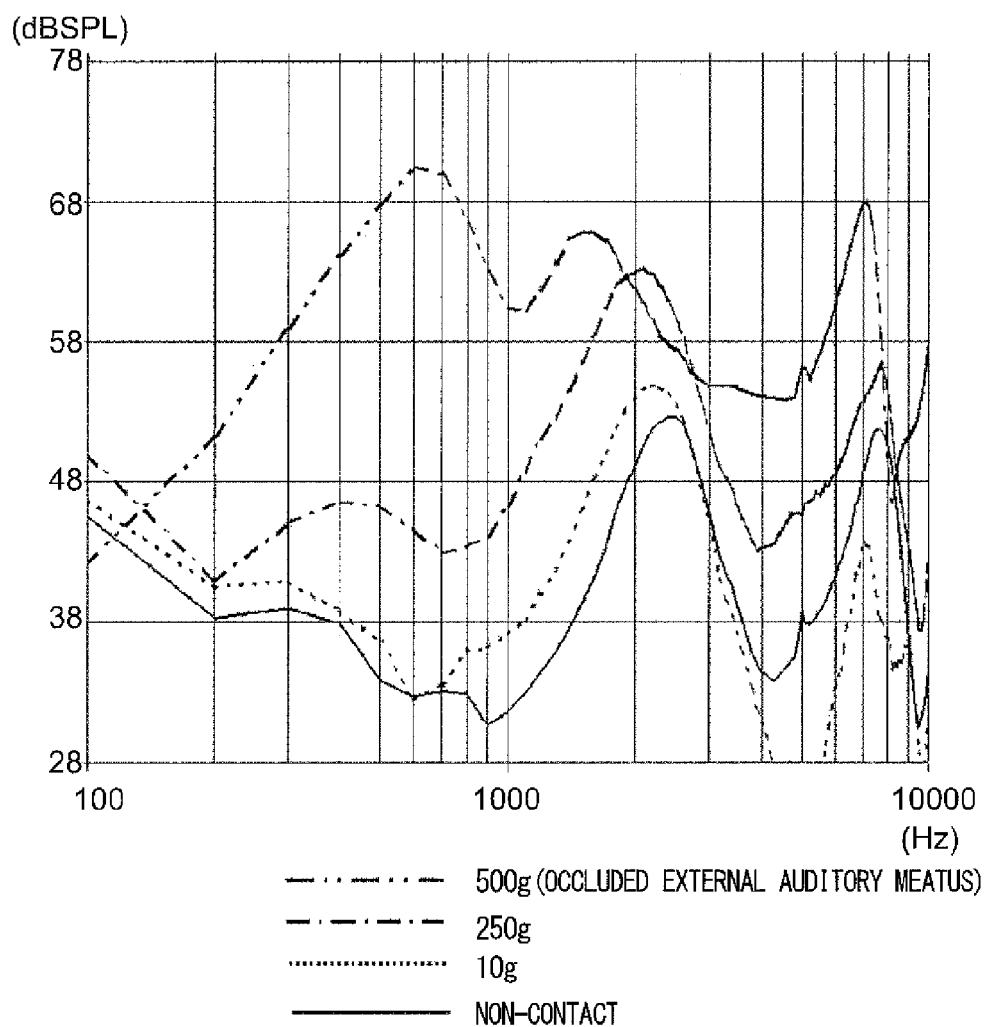
FIG. 79 is a graph illustrating an example of measurement data of the mobile telephone configured on the basis of the forty-sixth embodiment of FIG. 69.

FIG. 79 is a graph illustrating an example of measurement data of the mobile telephone configured on the basis of the forty-sixth embodiment of FIG. 69. In the graph of FIG. 79, the mobile telephone 4201 of the forty-sixth embodiment (in which configuration the vibration from the vibration source inside the outer wall is transmitted to the surface of the outer wall) is used to illustrate, in relation to the frequency, the sound pressure within the external auditory meatus 1 cm from the entrance part of the external auditory meatus when, without contact with the auricular helix, the surface of the outer wall of the corner parts of the mobile telephone 4201 is brought into contact with at least a part of the ear cartilage around the entrance part of the external auditory meatus, according to FIGS. 2A and 2B, which have been used to describe the first embodiment. In the graph, the vertical axis is the sound pressure (in dBSPLs), and the horizontal axis is the frequency on a logarithmic scale (in Hz). In terms of the contact pressure relationship between the surface of the outer wall of the corner parts of the mobile telephone 4201 and the cartilage around the entrance part of the external auditory meatus, the graph uses a solid line to illustrate the sound pressure during a non-contact state, a short-dashed line to illustrate the sound pressure in a state of slight contact (10 grams of contact pressure), a single-dotted line to illustrate the sound pressure in a state in which the mobile 4201 is being used normally (250 grams of contact pressure), and a double-dotted line to illustrate the sound pressure in a state in which the external auditory meatus is occluded by increased contact pressure (500 grams of contact pressure). As illustrated, the sound pressure increases from the non-contact state due to contact of 10 grams of contact pressure and increases further due to the contact pressure increasing to 250 grams; the sound pressure increases even more when the contact pressure is increased further from such a state to 500 grams.

It will be readily understood from the graph of FIG. 79 that when the surface of the outer wall of the mobile telephone 4201, which has the vibration source arranged inward from the surface of the outer wall and is configured such that the vibration of the vibration source is transmitted to the surface of the outer wall, is brought into contact with at least a part of the ear cartilage around the entrance part of the external auditory meatus without making contact with the auricular helix, the sound pressure in the external auditory meatus about 1 cm from the entrance part of the external auditory meatus has an increase of at least 10 dB in the main frequency range of speech (500 Hz to 2,300 Hz), compared to the non-contact state (to be contrasted with the non-contact state illustrated by the solid line and the state in which the mobile telephone 4201 is being used normally, illustrated by the single-dotted line).

It will also be readily understood from the graph of FIG. 79 that when the surface of the outer wall of the mobile telephone 4201 is brought into contact with at least a part of the ear cartilage around the entrance part of the external auditory meatus without making contact with the auricular helix, the sound pressure in the external auditory meatus about 1 cm from the entrance part of the external auditory meatus has an at least 5 dB change in the main frequency range of speech (500 Hz to 2,500 Hz) according to the change in contact pressure (to be contrasted with the slight contact state illustrated by the short-dashed line and the contact state in the state in which the mobile telephone 4201 is being used normally, illustrated by the single-dotted line).

It will further be readily understood from the graph of FIG. 79 that when the entrance part of the external auditory meatus is occluded by the surface of the outer wall of the mobile telephone 4201 being brought into contact with at least a part of the ear cartilage around the entrance part of the external auditory meatus without making contact with the auricular helix (for example, when the surface of the outer wall of the mobile telephone 4201 is strongly pressed against the outside of the tragus, thus folding the tragus over and occluding the external auditory meatus), the sound pressure in the external auditory meatus about 1 cm from the entrance part of the external auditory meatus has an increase of at least 20 dB in the main frequency range of speech (300 Hz to 1,800 Hz) compared to the non-contact state (to be contrasted with the non-contact state illustrated by the solid line and the state in which the external auditory meatus is occluded, illustrated by the double-dotted line).

The measurements in FIG. 79 are all in a state in which the output of the vibration source does not change. The measurements in FIG. 79 for the state where the surface of the outer wall is brought into contact with at least a part of the ear cartilage around the external auditory meatus without making contact with the auricular helix are performed in a state where the surface of the outer wall was in contact from the outside of the tragus. The measurements in FIG. 79 made in a state of the external auditory meatus being occluded were performed by creating a state where the external auditory meatus was occluded by the tragus being folded due to being more strongly pressed against from the outside, as described above.

As described above, the measurements in FIG. 79 were performed in a state where the surface at the corner parts of the outer wall in the mobile telephone 4201 of the forty-sixth embodiment illustrated in FIG. 69 was brought into contact with the outside of the tragus, but the corner parts of the forty-sixth embodiment serve as the elastic body units 4263a, 4263b acting as protectors, and are constituted of a material different from the other portions of the outer wall. The vibration source is supported on the inner surface of the corner parts of the outer wall constituted of the elastic body units 4263a, 4263b. The corner parts of the outer wall of the mobile telephone 4201 are susceptible to impact from the outside, and are firmly bonded to prevent the occurrence of relative deviation between the outer wall and the other portions even in a case of being constituted of the elastic body units 4263a, 4263b.

The measurement graph of FIG. 79 is merely an example; upon further scrutiny, there are individual differences. Also, the measurement graph of FIG. 79 was measured in a state where the surface of the outer wall was brought into contact only with a small surface area of the outside of the tragus, for the sake of simplifying and standardizing the phenomenon. However, an increase in sound pressure due to contact also relies on the area of contact with the cartilage, and in a case where the surface of the outer wall is brought into contact with the ear cartilage around the entrance part of the external auditory meatus without making contact with the auricular helix, the increase in sound pressure is elevated further when there is contact with a portion of the cartilage wider than around the entrance part of the external auditory meatus. In consideration of the facts above, the values illustrated in the measurement graph of FIG. 79 have a certain universality in illustrating the configuration of the mobile telephone 4201, and can be reproduced by a non-specific number of test subjects. Further, the measurement graph of FIG. 79 was achieved by the tragus being pressed from the outside when the entrance part of the external auditory meatus is occluded, thus increasing the contact pressure and folding the tragus over, but similar results are also obtained in a case where the corner parts of the mobile telephone 4201 are pressed on the entrance part of the external auditory meatus, which is then occluded. The measurements in FIG. 79 were measured by the vibration source being held on the inside of the corner parts of the outer wall, as in the mobile telephone 4201 of the forty-sixth embodiment of FIG. 69, but there is no limitation thereto, and the measurements are also reproducible in other embodiments as well. For example, [the measurements] are also reproducible with a configuration in which the vibration source is held on the interior of the elastic body units 4363a, 4363b serving as protectors, as illustrated in FIG. 72 (for example, an embedded configuration).

In other words, the measurement graph of FIG. 79 suffices to explain the characteristic of the mobile telephone of the present invention, in that when the surface of the outer wall of the mobile telephone, which has the vibration source arranged inward from the surface of the outer wall and is configured such that the vibration of the vibration source is transmitted to the surface of the outer wall, is brought into contact with at least a part of the ear cartilage around the entrance part of the external auditory meatus without making contact with the auricular helix, the sound pressure inside the external auditory meatus about 1 cm from the entrance part of the external auditory meatus has an at least 10 dB increase in at least a part (for example, 1,000 Hz) of the main frequency range of speech (500 Hz to 2,300 Hz), compared to the non-contact state.

The graph in FIG. 79 also suffices to explain the characteristic of the mobile telephone of the present invention, in that when the surface of the outer wall of the mobile telephone is brought into contact with at least a part of the ear cartilage around the entrance part of the external auditory meatus without making contact with the auricular helix, the sound pressure inside the external auditory meatus about 1 cm from the entrance part of the external auditory meatus has an at least 5 dB increase in at least a part (for example, 1,000 Hz) of the main frequency range of speech (500 Hz to 2,500 Hz) due to the increase in contact pressure.

The graph in FIG. 79 further suffices to explain the characteristic of the mobile telephone of the present invention, in that when the entrance part of the external auditory meatus is occluded by the surface of the outer wall of the mobile telephone 4201 being brought into contact with at least a part of the ear cartilage around the entrance part of the external auditory meatus without making contact with the auricular helix, the sound pressure in the external auditory meatus about 1 cm from the entrance part of the external auditory meatus has an increase of at least 20 dB in at least a part (for example, 1,000 Hz) of the main frequency range of speech (300 Hz to 1,800 Hz) compared to the non-contact state.

The mobile telephone of the present invention as confirmed by the measurements in the graph of FIG. 79 is significant in the following manner. Namely, the present invention provides a mobile telephone having a vibration source arranged inward from the surface of an outer wall, and volume adjustment means, the vibration of the vibration source being transmitted to the surface of the outer wall, and sound being listened to by bringing the surface of the outer wall into contact with at least a part of the ear cartilage around the entrance part of the external auditory meatus without making contact with the auricular helix; the features thereof are defined as follows. Namely, in a room where the noise level (the A-weighted sound pressure level) is 45 dB or less, [the mobile telephone] being brought into proximity with the entrance part of the external auditory meatus and the surface of the outer wall being arranged so as to not be in contact, the volume is minimized and pure sound at 1,000 Hz is generated from the vibration source. In addition, narrow-band noise at 1,000 Hz (⅓ octave-band noise) at a marginal level where the pure sound at 1,000 Hz is masked and cannot be heard is generated from a loudspeaker at a position separated from the entrance part of the external auditory meatus by 1 m. This can be confirmed by sequentially increasing narrow-band noise at 1,000 Hz and determining the magnitude at which pure sound at 1,000 Hz is masked and can no longer be heard. The narrow-band noise at 1,000 Hz is subsequently increased by 10 dB from the marginal level, but according to the mobile telephone of the present invention, bringing the surface of the outer wall into contact with at least a part of the ear cartilage around the entrance part of the external auditory meatus without making contact with the auricular helix makes it possible to listen to pure sound at 1,000 Hz without the need to adjust or change the volume adjusting means.

When the narrow-band noise at 1,000 Hz is further increased by 20 dB from the marginal level as determined above, according to the mobile telephone of the present invention, bringing the surface of the outer wall into contact with at least a part of the ear cartilage around the entrance part of the external auditory meatus without making contact with the auricular helix makes it possible to listen to pure sound at 1,000 Hz without the need to adjust or change the volume adjusting means.

Figure 80A:
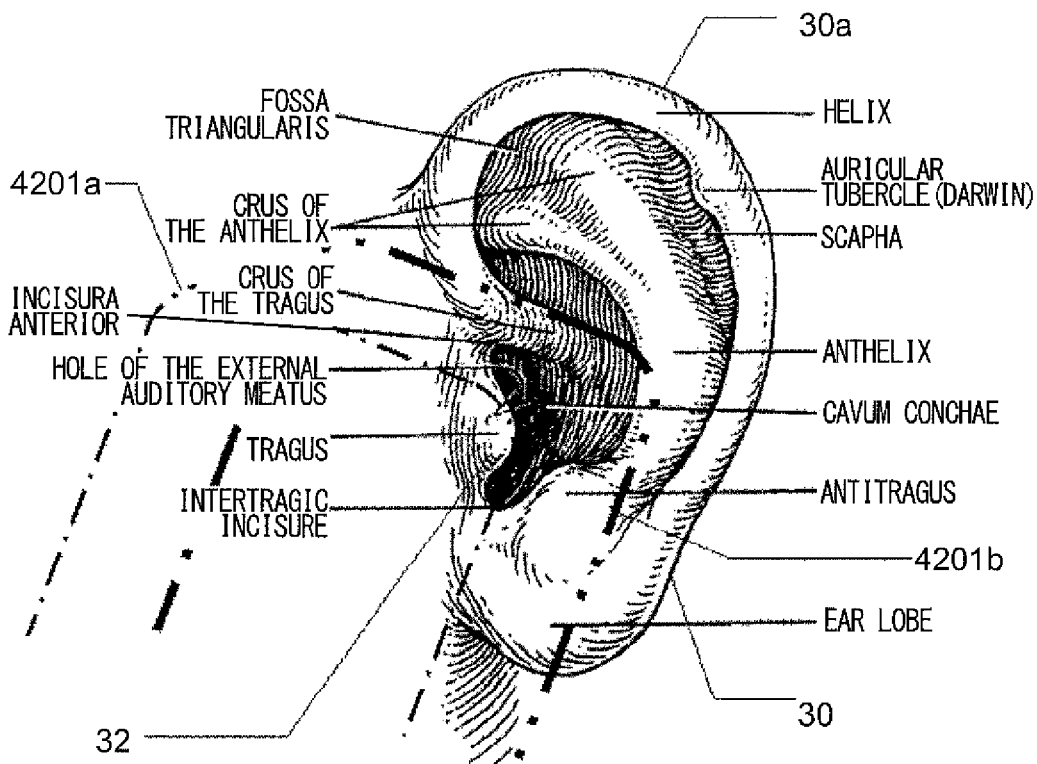
FIG. 80 is a side view and a cross-sectional view of an ear, intended to illustrate the relationship between the detailed structure of the ear and the mobile telephone of the present invention.

FIG. 80 is a side view and a cross-sectional view of an ear, intended to illustrate the relationship between the detailed structure of the ear and the mobile telephone of the present invention. FIG. 80A is a side view of the left ear 30, where a position 4201a shown with a single-dotted line depicts the state where the corner part of the mobile telephone 4201 is brought into contact with the outside of the tragus. The position 4201a corresponds to the state in which the measurements of FIG. 79 were performed. Meanwhile, a position 4201b shown by the double-dotted line is a depiction of the state where the corner part of the mobile telephone 4201 is brought into contact with a portion of cartilage wider than that around the entrance part of the external auditory meatus. At the position 4201b, an increase in sound pressure greater than what is illustrated in FIG. 79 can be achieved through the contact with the ear cartilage.

Figure 80B:
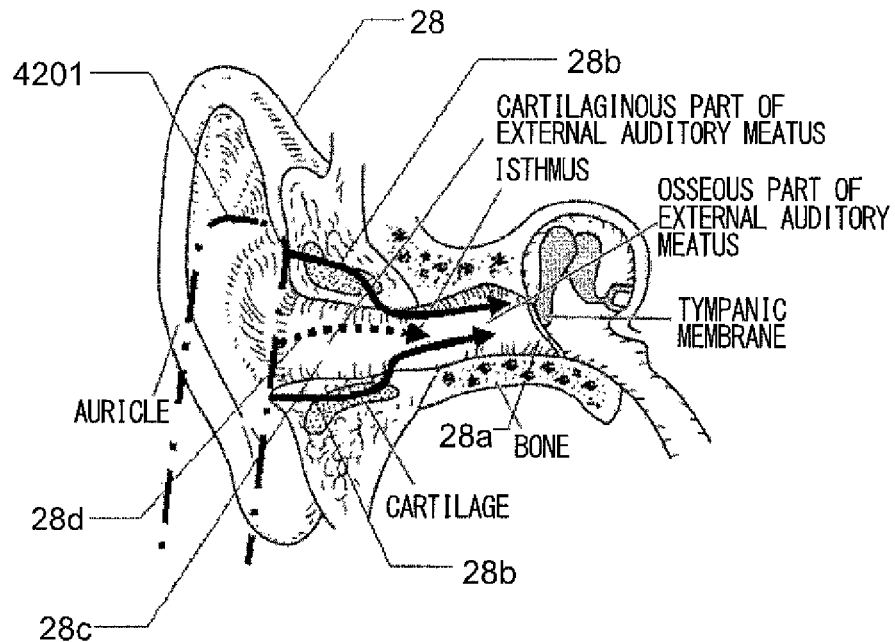

FIG. 80B is a cross-sectional view of the right ear 28, and depicts the manner in which the vibration of the vibration source generated from the corner part of the mobile telephone 4201 is conducted to the tympanic membrane 28a. The mobile telephone 4201 in the state in FIG. 80B has been brought into contact with a portion of cartilage wider than that around the entrance part of the external auditory meatus, according to the position 4201b in FIG. 80A (though it may not be evident from the portion of the cross-sectional view alone, the entrance part of the external auditory meatus is not occluded in such a state). A vibration 28b generated from the corner part of the mobile telephone 4201 is conducted to the cartilage around the entrance part of the external auditory meatus from the portion of contact, and air conduction sound is subsequently generated in the external auditory meatus 28c from the surface of cartilage part of external auditory meatus. The air conduction sound then proceeds through the inside of the external auditory meatus 28c and reaches the tympanic membrane 28a. Direct air conduction 28d is also generated from the corner part of the mobile telephone 4201, and naturally also proceeds through the inside of the external auditory meatus 28c and reaches the tympanic membrane 28a. In the state where the mobile telephone 4201 is not in contact with the cartilage, solely the direct air conduction 28 reaches the tympanic membrane 28a.

An additional description shall now be provided for the frequency characteristics of the piezoelectric bimorph element 2525 used in the forty-sixth embodiment of FIG. 69 and elsewhere. The frequency characteristics of the piezoelectric bimorph element 2525 used in embodiments of the present invention in regard to the generation of direct air conduction are not flat; rather, the generation of air conduction at frequencies below substantially approximately 1 kHz is correspondingly less than at frequencies above the boundary. Such a frequency characteristic in the piezoelectric bimorph element 2525 in regard to the generation of direct air conduction is ideally matched to the frequency characteristic in a case where there is air conduction sound from the piezoelectric bimorph element 2525 in the external auditory meatus directly via the cartilage. Namely, the sound pressure in the external auditory meatus according to the frequency characteristics in air conduction sound through cartilage conduction is greater in frequencies below about 1 kHz than frequencies that are higher than this boundary. Therefore, in a case involving the use of the piezoelectric bimorph element 2525 of the frequency characteristic described above for the generation of direct air conduction, the fact that the two are complementary results in the frequency characteristic of sound reaching the tympanic membrane being approximately flat. Thus, the cartilage conduction vibration source used in the present invention exhibits a frequency characteristic for the generation of air conduction sound that trends inversely with respect to the frequency characteristic in cartilage conduction.

FIG. 79, which is the measurement data from the forty-sixth embodiment of FIG. 69, provides a specific description of such facts. In the graph of FIG. 79, sound pressure is viewed by applying a sine wave with a varying frequency at the same voltage to the piezoelectric bimorph element 2525 having the structure illustrated in FIG. 69, wherefore the sound pressure in non-contact illustrated by the solid line in the graph of FIG. 79 substantially exhibits the frequency characteristic for generating air conduction sound generated from the piezoelectric bimorph element 2525. In other words, as is clear from the solid line in the graph of FIG. 79, the frequency characteristic for generating air conduction sound by the piezoelectric bimorph element 2525 is not flat, but rather, when there is a focus on a band between, for example, 100 Hz and 4 kHz, then the comparative sound pressure is low primarily in the low-frequency band (for example, 200 Hz to 1.5 kHz), and the sound pressure is high primarily in the high-frequency band (for example, 1.5 kHz to 4 kHz) (the sound pressure measured in FIG. 79 is that in the external auditory meatus at about 1 cm from the entrance part of the external auditory meatus, and therefore the influence of the effect of unoccluded ear gain in increasing sound pressure is observed between 2.5 kHz and 3.5 kHz, but it is clear that the high-frequency band has a relatively higher sound pressure than the low-frequency band even when interpreted with this portion subtracted). In this manner, viewed from FIG. 79 as well, the frequency characteristic of the piezoelectric bimorph element 2525 used in the forty-sixth embodiment of FIG. 69 and elsewhere is not flat, but rather the generated air conduction sound at low frequencies will be readily understood to be relatively less than that at high frequencies, the boundary being substantially at about 1 kHz.

Next, in the graph of the normal state of contact 250g shown in FIG. 79 with a single-dotted line, a marked increase in sound pressure compared to the state of non-contact is observed beginning at a few hundred Hz, closer to the lower-frequency region than to 1 kHz; the increase persists until at least about 2.5 kHz. Accordingly, the frequency characteristic of sound measured in the external auditory meatus for the piezoelectric bimorph element 2525, which is the same vibration source, exhibits a clear difference between direct air conduction and air conduction through cartilage conduction (that is, air conduction through cartilage conduction has a large increase in sound pressure, particularly at a few hundred Hz to 2.5 kHz, compared to direct air conduction). As a result, as illustrated by the graph of the normal state of contact 250g shown in FIG. 79 by the single-dotted line, as regards the sound pressure in the external auditory meatus in the case of air conduction through cartilage conduction, the frequency characteristic of the sound that reaches the tympanic membrane as a result is closer to being flat than in the case of direct air conduction illustrated by the solid line.

Additionally, a state of external auditory meatus occlusion 500g illustrated by FIG. 79 with a double-dotted line has a further pronounced increase in sound pressure between a few hundred Hz to 1 kHz, due to the earplug bone conduction effect, and the piezoelectric bimorph element 2525, which is the same vibration source, exhibits disparate frequency characteristic clearly different from both the state of normal contact 250g and the state of non-contact. However, because unoccluded ear gain ceases to be present in the state of external auditory meatus occlusion 500g illustrated with the double-dotted line, presumably there appears a result such that the effect from the peak sound pressure at 2.5 kHz to 3.5 kHz observed in the state of open external auditory meatus has disappeared.

Fifty-Third Embodiment

Figure 81:
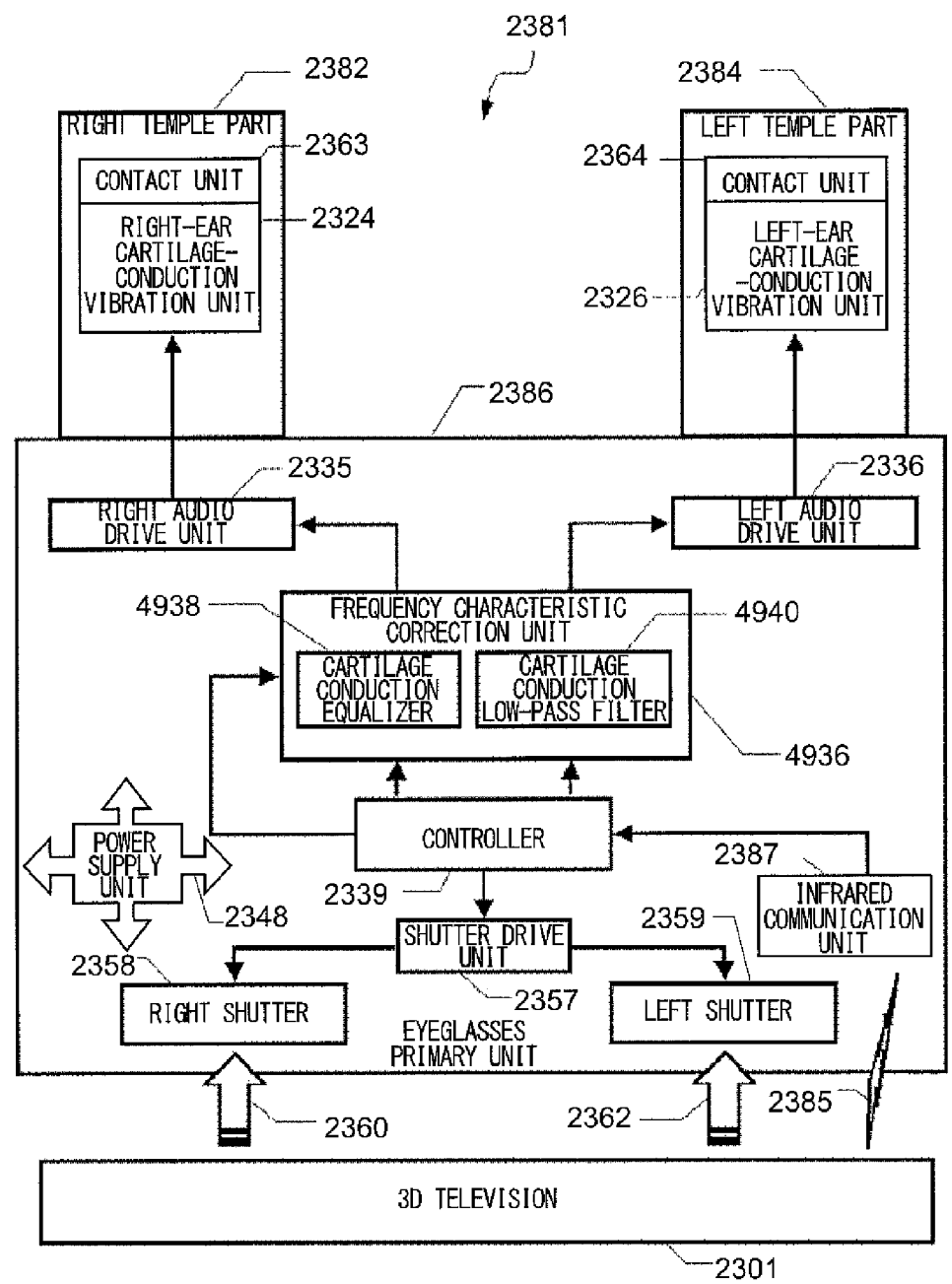
FIG. 81 is a block diagram of a fifty-third embodiment according to an aspect of the present invention (fifty-third embodiment)

FIG. 81 is a block diagram of a fifty-third embodiment according to an aspect of the present invention. The fifty-third embodiment, similarly with respect to the twenty-fifth embodiment of FIG. 38, is configured as 3D television viewing eyeglasses 2381 by which stereo audio information can be experienced, and forms a 3D television viewing system together with a 3D television 2301. Also similarly with respect to the twenty-fifth embodiment, the vibration of a right-ear cartilage-conduction vibration unit 2324 arranged at a right temple unit 2382 is transmitted to the outer side of the cartilage of the base of the right ear via a contact unit 2363, and the vibration of a left-ear cartilage-conduction vibration unit 2326 arranged at a left temple unit 2384 is transmitted to the outer side of the cartilage of the base of the left ear via a contact unit 2364. The fifty-third embodiment has much in common with the twenty-fifth embodiment, and shared portions have therefore been given like reference numerals, a description thereof having been omitted unless there is a particular need. Further, although a depiction in FIG. 81 has been omitted, the internal configuration of the 3D television 2301 is the same as is illustrated in FIG. 38.

The fifty-third embodiment of FIG. 81, similarly with respect to the twenty-fifth embodiment of FIG. 38, uses the piezoelectric bimorph element 2525 having a similar structure to that of the forty-sixth embodiment of FIG. 69, as the right-ear cartilage-conduction vibration unit 2324 and the left-ear cartilage-conduction vibration unit 2326. In other words, the right-ear cartilage-conduction vibration unit 2324 and the left-ear cartilage-conduction vibration unit 2326 exhibit a frequency characteristic for the generation of direct air conduction that trends inversely with regard to the frequency characteristic in cartilage conduction, the generation of air conduction at frequencies below substantially approximately 1 kHz being correspondingly less than at frequencies above the boundary. Specifically, the right-ear cartilage-conduction vibration unit 2324 and the left-ear cartilage-conduction vibration unit 2326 employed in the fifty-third embodiment of FIG. 81 have a difference of 5 dB or greater between the mean air conduction output from 500 Hz to 1 kHz and the mean air conduction output from 1 kHz to 2.5 kHz, compared to an average, typical speaker designed in consideration of air conduction, and exhibit a frequency characteristic that would be undesirable for a typical speaker.

A point of difference in the fifty-third embodiment of FIG. 81 from the twenty-fifth embodiment of FIG. 38 lies in that the driving of the above-described right-ear cartilage-conduction vibration unit 2324 and left-ear cartilage-conduction vibration unit 2326 is performed via a frequency characteristic correction unit 4936. The frequency characteristic correction unit 4936 is provided with a cartilage conduction equalizer 4938 for correcting the frequency characteristic of the sound pressure serving as air conduction sound in the external auditory meatus so as to approach flatness, in consideration of the frequency characteristic specific to cartilage conduction. The cartilage conduction equalizer 4938 fundamentally corrects the frequency characteristic of the drive signals to the right-ear cartilage-conduction vibration unit 2324 and to the left-ear cartilage-conduction vibration unit 2326 equally, but it is also possible to utilize separately corrections for the variations between the right-ear cartilage-conduction vibration unit 2324 and the left-ear cartilage-conduction vibration unit 2326. The frequency characteristic correction unit 4936 is further provided with a cartilage conduction low-pass filter 4940 for trimming higher frequencies (e.g., trimming 10 kHz and higher). [The cartilage conduction low-pass filter 4940] is intended to prevent the unpleasant outward divergence of air conduction, because the right-ear cartilage-conduction vibration unit 2324 and the left-ear cartilage-conduction vibration unit 2326 in the fifty-third embodiment are shaped such that the ear is not covered. The characteristics of the low-pass filter have been determined in consideration that the frequency region advantageous for cartilage conduction (for example, 10 kHz and lower) not be trimmed. In terms of acoustics, it is disadvantageous for an audio device to trim out the audible range (for example, 10 kHz to 20 kHz) and the frequency band thereabove, and the configuration is therefore such that the functions of the cartilage conduction low-pass filter 4940 can be turned off manually in an environment where consideration need not be given to the unpleasant outward divergence of air conduction.

Fifty-Fourth Embodiment

Figure 82:
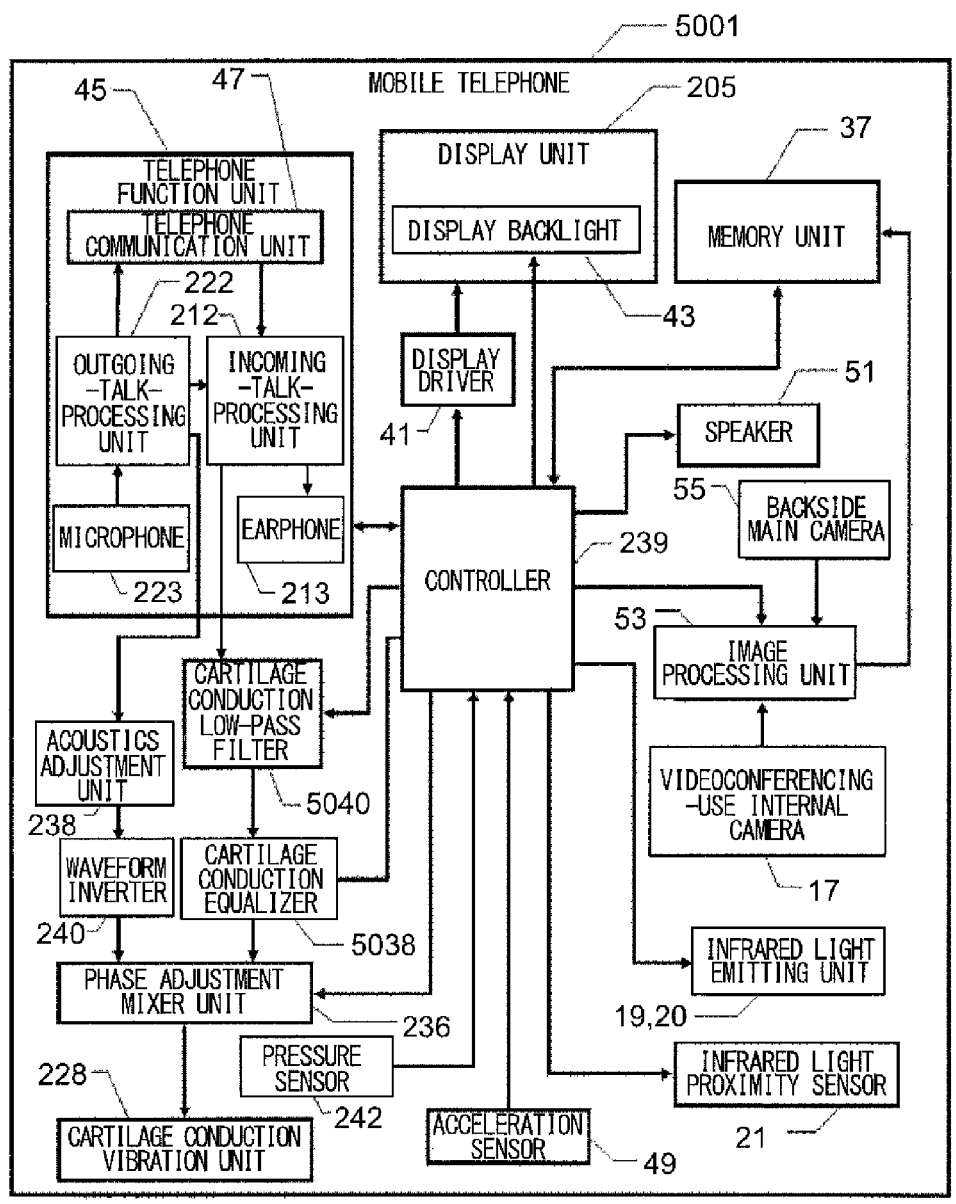
FIG. 82 is a block diagram of a fifty-fourth embodiment according to an aspect of the present invention (fifty-fourth embodiment)

FIG. 82 is a block diagram of a fifty-fourth embodiment according to an aspect of the present invention. The fifty-fourth embodiment, similarly with respect to the fourth embodiment of FIG. 8, is configured as a mobile telephone 5001. The fifty-fourth embodiment has much in common with the fourth embodiment, and shared portions have therefore been given like reference numerals, a description thereof having been omitted unless there is a need. The fifty-fourth embodiment of FIG. 82, similarly with respect to the fifty-third embodiment of FIG. 81, uses the piezoelectric bimorph element 2525 having a similar structure to that of the forty-sixth embodiment of FIG. 69, serving as the vibration source of the cartilage conduction vibration unit 228. In other words, the vibration source of the cartilage conduction vibration unit 228 exhibits a frequency characteristic for the generation of direct air conduction that trends inversely with regard to the frequency characteristic in cartilage conduction, the generation of air conduction at frequencies below substantially approximately 1 kHz being correspondingly less than at frequencies above the boundary. Specifically, as with the fifty-second embodiment, the piezoelectric bimorph element employed in the fifty-fourth embodiment of FIG. 82 has a difference of 5 dB or greater between the mean air conduction output from 500 Hz to 1 kHz and the mean air conduction output from 1 kHz to 2.5 kHz, compared to an average, typical speaker designed with the expectation of air conduction, and exhibits a frequency characteristic that would be undesirable for a typical speaker.

A point of difference in the fifty-fourth embodiment of FIG. 82 from the fourth embodiment of FIG. 8 lies in the manner in which the above-described piezoelectric bimorph element of the vibration source of the cartilage conduction vibration unit 228 is driven, being performed via a cartilage conduction low-pass filter 5040 for trimming higher frequencies (e.g., trimming 2.5 kHz and higher) and via a cartilage conduction equalizer 5038. The cartilage conduction equalizer 5038, similarly with respect to the fifty-third embodiment, corrects the frequency characteristic of the sound pressure serving as air conduction sound in the external auditory meatus so as to approach flatness, in consideration of the frequency characteristic specific to cartilage conduction. An audio signal passed via the cartilage conduction equalizer 5038 will have undergone a frequency characteristic correction in consideration of the frequency characteristic specific to cartilage conduction, and therefore has a different frequency characteristic from an audio signal to the speaker 51 for a videoconferencing function, in which the generation of direct air conduction is presumed.

The cartilage conduction equalizer 5038 of the fifty-fourth embodiment, upon detection by the pressure sensor 242 of the state where the ear hole is blocked and the earplug bone conduction effect occurs, automatically switches the frequency characteristic to be corrected from the frequency characteristic used in the normal state of contact to the frequency characteristic used in the state where the earplug bone conduction effect is generated. The difference in correction for the frequency correction to which a switch is thereupon made corresponds to, for example, the difference between the single-dotted line (normal contact 250g) and double-dotted line (external auditory meatus occlusion 500g) in FIG. 79. Specifically, the frequency characteristic is corrected so as to prevent an over-emphasis of the lower sound region when the earplug bone conduction effect occurs and so as to compensate for the loss of unoccluded ear gain due to the occlusion of the external auditory meatus, thus attenuating the change in acoustics between the presence and absence of the earplug bone conduction effect.

The cartilage conduction low-pass filter 5040 in the fifty-fourth embodiment has the objectives of preventing sound in the band that can be heard by ear from leaking out and of protecting privacy, and is particularly useful at times of silence. The characteristics of the cartilage conduction low-pass filter 5040 have been determined in consideration that the frequency band at which contact with the ear cartilage has a pronounced effect in increasing sound pressure (for example, 2.5 kHz and lower) not be trimmed. The audio of the mobile telephone, from the start, is trimmed at 3 kHz or higher, but the band from a few hundred Hz to about 2.5 kHz, where the effect of cartilage conduction in increasing sound pressure is high even without unoccluded ear gain, is actively used; frequencies at 2.5 kHz and higher, other than the band at which the effect specific to cartilage conduction emerges, are trimmed, whereby the aforementioned privacy protection can reasonably be fulfilled. As noted above, the effects of the cartilage conduction low-pass filter 5040 are particularly important at times of silence, and therefore, in a preferred configuration, can be turned on and off manually, or can be automatically turned on only in times of silence by the environment-noise microphone 4638 provided in the fiftieth embodiment of FIG. 75 or a similar element. In the configuration in which [the cartilage conduction low-pass filter 5040] can be turned on and off manually, there is the expectation that noise is louder when the cartilage conduction equalizer 5038 uses the frequency characteristic of the state where the earplug bond conduction effect occurs; therefore, the cartilage conduction low-pass filter 5040 is configured so as to be forcibly turned off when turned on manually.

The implementation of the features of the present invention illustrated by the embodiments above is not to be limited to the respective embodiments above. For example, the fifty-third embodiment and fifty-fourth embodiment above combine the cartilage conduction vibration source and cartilage conduction equalizer for imparting the generation of air conduction sound having a frequency characteristic that differs from the normal frequency characteristic for generating air conduction in that the final frequency characteristic of air conduction sound having passed through cartilage conduction approaches flatness; however, it is also possible to omit either one thereof. For example, the cartilage conduction equalizer can be omitted when the cartilage conduction vibration source used is well suited for the frequency characteristic of cartilage conduction. Conversely, another possible configuration is one where the cartilage conduction vibration source employed has a frequency characteristic for imparting the generation of air conduction sound according to a normal air conduction speaker, and the function adapted to bring the final frequency characteristic of air conduction having passed through cartilage conduction closer to flatness is concentrated in the cartilage conduction equalizer.

Fifty-Fifth Embodiment

FIG. 83 is a perspective view and a cross-sectional view relating to a fifty-fifth embodiment according to an aspect of the present invention, which is configured as a mobile telephone 5101. The fifty-fifth embodiment is consistent with the forty-sixth embodiment illustrated in FIG. 69, except for the holding structure of the cartilage conduction vibration source 2525, which is constituted of a piezoelectric bimorph element, and except for the addition of a T-coil (described later), and therefore shared portions have been assigned like reference numerals and a description thereof has been omitted unless there is a need.

First, the holding structure for the cartilage conduction vibration source 2525 in the fifty-fifth embodiment shall now be described. As is clear from the perspective view in FIG.

83A, the left and right corner parts of the mobile telephone 5101 are provided with cartilage conduction units 5124 and 5126 composed of a hard material. Examples of suitable materials for the cartilage conduction units 5124 and 5126 include an ABS resin, fiber-reinforced plastic, or high-toughness fine ceramic. Elastic bodies 5165*b* and 5165*a* made of a vinyl-based, urethane-based, or other type of material are interposed between the cartilage conduction units 5124 and 5126 and the chassis of the mobile telephone 5101, and function as a vibration isolation material and as a cushioning material.

As is also clear from FIGS. 83B and 83C, the cartilage conduction units 5124 and 5126 are structured to hold the piezoelectric bimorph element 2525 at the inside thereof. The piezoelectric bimorph element 2525 is also structured to be held at the chassis of the mobile telephone 5101, without making direct contact, by the interposed elastic bodies 5165*b* and 5165*a*. The vibration energy of the piezoelectric bimorph element 2525 is thereby concentrated on the cartilage conduction units 5124 and 5126, and also thereby prevented from being dispersed to the chassis of the mobile telephone 5101.

Further, as illustrated in FIG. 83A by the short-dashed line, a T-coil 5121 is arranged inside the center of the upper part of the mobile telephone 5101 in the fifty-fifth embodiment. The T-coil 5121 is intended to transmit audio information by electromagnetic induction to a hearing aid provided with a corresponding T-coil. A description of the relationship between the manner in which the T-coil transmits audio information and the manner in which cartilage conduction transmits audio information will be provided later.

Figure 84:
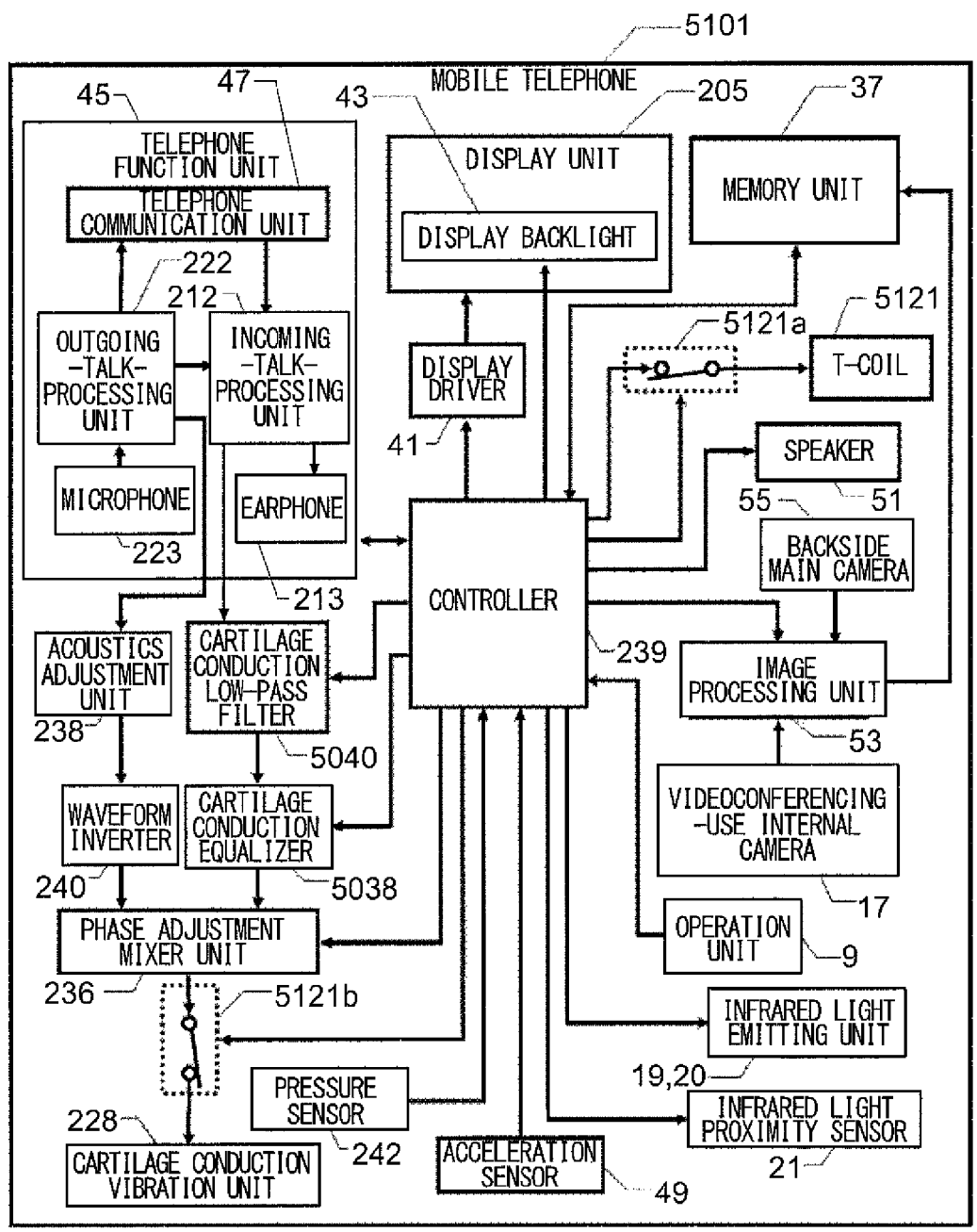
FIG. 84 is a block diagram of the fifty-fifth embodiment of FIG. 83.

FIG. 84 is a block diagram of the fifty-fifth embodiment of FIG. 83, in which like portions have been assigned like reference numerals to those in FIG. 83 and a description thereof has been omitted. The configuration of the block diagram of FIG. 84 has much in common with the block diagram of the fifty-fourth embodiment in FIG. 82. Since these elements can be referenced, shared parts of the configuration have been given like reference numerals and a description thereof has been omitted.

The fifty-fifth embodiment includes the T-coil 5121, as has already been described, and in a case where the user of the mobile telephone 5101 is wearing a hearing aid provided with a T-coil, audio information can be transmitted to the hearing aid by electromagnetic induction through the T-coil 5121. The T-coil function of the hearing aid provided with a T-coil can be turned on and off, the configuration being such that a selection can be made to turn the microphone of the hearing aid on or off in a case where the T-coil has been turned on. Correspondingly, a switch 5121*a* of the mobile telephone 5101 of the fifty-fifth embodiment can be turned on or off in response to an operation of the operation unit 9 and a selection can be made as to whether or not to cause the T-coil 5121 to function. In a case where a selection is made to turn the T-coil 5121 on, there is provided a switch 5121*b* for forcibly turning off, in conjunction therewith, the cartilage conduction vibration unit 228, which includes the piezoelectric bimorph element 2525.

As has already been described, in the state where the ear is plugged as well, cartilage conduction generates air conduction sound within the external auditory meatus along with the earplug bone conduction effect. As a result, in a case where the entrance to the external auditory meatus is blocked by the hearing aid, sound can still be heard without the T-coil 5121 being turned on, due to cartilage conduction, the vibration source of which is the piezoelectric bimorph element 2525. The cartilage conduction occurs fundamentally due to the cartilage conduction unit 5124 or 5126 being brought into contact with the ear cartilage, but bringing the cartilage conduction unit 5124 or 5126 into contact with the hearing aid also makes [cartilage conduction] possible due to the generation of air conduction sound inside the external auditory meatus due to the vibration thereof being conducted to the ear cartilage around the hearing aid. Also, depending on the manner in which the cartilage conduction unit 5124 or 5126 is held thereagainst, contact can be made with both the ear cartilage and the hearing aid, air conduction sound being generated inside the external auditory meatus in such a state of concurrence. In this manner, the mobile telephone 5101 of the present invention can be utilized by the user of the hearing aid even in the state where the T-coil 5121 has been turned off.

The switch 5121*b* is intended to prevent the simultaneous occurrence of the above-described cartilage conduction when the switch 5121*a* has been turned on to cause the T-coil 5121 to function, and the occurrence of any awkwardness compared to sound normally listened to with the T-coil, and is also intended to prevent the unnecessary consumption of power due to cartilage conduction during the operation of the T-coil 5121. To prevent accidental confusion where cartilage conduction is turned off when the T-coil 5121 is turned on by a mistaken operation, the configuration is such that typically a menu to turn the T-coil 5121 on will not appear in the operation menu of the operation unit 9 displayed on the large-screen display unit 205; in a preferred configuration, the T-coil 5121 will not turn on unless a predetermined procedure is followed to intentionally operate the operation unit 9.

FIG. 85 is a side view for describing the manner in which the vibration energy is distributed in the mobile telephone 5101 in the fifty-fifth embodiment described above, and has much in common with FIG. 2; shared portions have therefore been given like reference numerals and a description thereof has been omitted. As illustrated in FIG. 83, the cartilage conduction units 5124 and 5126, which directly hold the piezoelectric bimorph element 2525, are held at the chassis of the mobile telephone 5101 by the interposed elastic bodies 5165*b* and 5165*a*. The vibration of the piezoelectric bimorph element 2525 is thereby effectively conducted to the ear cartilage from the cartilage conduction units 5124 and 5126, and moreover the vibration is less prone to be conveyed to the chassis of the mobile telephone 5101, because the piezoelectric bimorph element 2525 is not in direct contact therewith. In other words, the structure is such that the vibration energy of the piezoelectric bimorph element 2525 is concentrated on the cartilage conduction units 5124 and 5126, and is not dispersed to the chassis of the mobile telephone 5101.

Figures 85A, 85B:
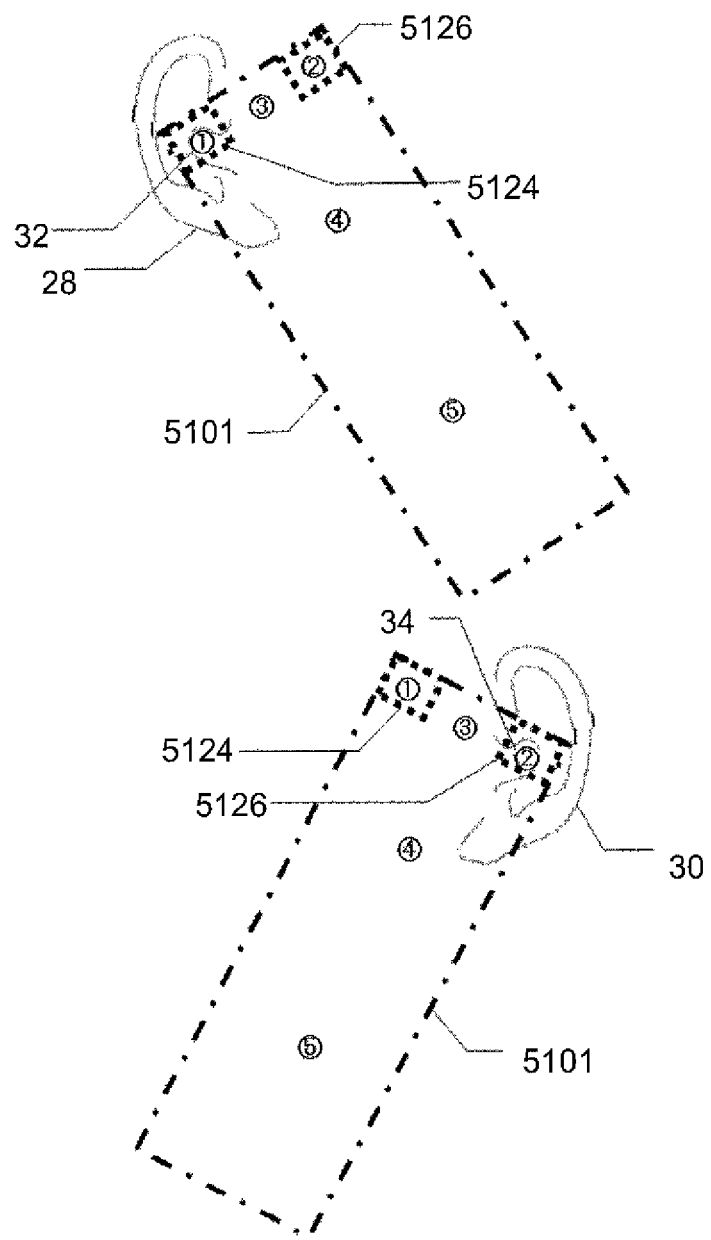
FIG. 85 is a side view intended to describe the distribution of vibration energy in a mobile telephone in the fifty-fifth embodiment of FIG. 83.

A specific description by way of FIG. 85 shall now be provided. Because the vibration energy is concentrated on the cartilage conduction units 5124 and 5126, the amplitude and acceleration of vibration are greatest at positions (1) and (2) on the surface of the chassis of the mobile telephone 5101 (see the encircled numbers 1, 2 in FIG. 85), and a position (3) between the cartilage conduction units 5124 and 5126 on the chassis of the mobile telephone 5101 (see the encircled number 3 in FIG. 85) has somewhat less amplitude and acceleration of vibration. Also, a position (4) and a position (5) (see the encircled numbers 4, 5 in FIG. 85) are separated form the positions (1) and (2) in that order, and have correspondingly decreasing amplitude and acceleration of vibration on the surface of the chassis of the mobile telephone 5101. For example, the amplitude and acceleration of vibration on the surface of the chassis of the mobile telephone 5101 at the position (5), which is separated from each of the positions (1) and (2) by 5 cm or more, become ¼ or less (25% or less) of the amplitude and acceleration of vibration on the surface at the cartilage conduction units 5124 and 5126. FIG. 85A illustrates the state where the mobile telephone 5101 in which vibration is thus distributed is held up to the right ear 28 and suitable cartilage conduction is obtained, and FIG. 85B illustrates the state where the mobile telephone 5101 is held up to the left ear 30 and similarly suitable cartilage conduction is obtained.

The feature by which the vibration energy for the cartilage conduction described above is concentrated at the parts of expected contact with the ear cartilage at the entrance part of the external auditory meatus is not limited to the fifty-fifth embodiment illustrated in FIGS. 83 to 85, and also appears in several other embodiments that have already been described. For example, the first to third, eleventh to fourteenth, twenty-ninth to thirty-third, thirty-fifth, thirty-sixth, forty-second to forty-fourth, forty-sixth to fiftieth, fifty-second, and fifty-fifth embodiments are examples where the vibration acceleration or amplitude of vibration at the parts of expected contact is greater than the vibration acceleration or amplitude of vibration at portions separated from the parts of expected contact, [this effect] being particularly pronounced in configurations as in the twenty-ninth, thirtieth to thirty-third, forty-second to forty-third, forty-sixth to fiftieth, fifty-second, and fifty-fifth embodiments, as will be described later. For reasons that will be described later, the vibration acceleration or amplitude of vibration decreases monotonically, relative to the parts of expected contact, as the distance from the parts of expected contact increases.

The parts of expected contact, at which the vibration energy for cartilage conduction is concentrated in the present invention, do not protrude from the chassis, and are not shaped so as to hinder the use of the mobile telephone. Further, the parts of expected contact are found at positions removed from both the central up-down axis and central left-right axis of the chassis, and are suitably disposed in contact with the ear cartilage at the entrance part of the external auditory meatus. Specifically, the parts of expected contact are found at corner parts or an upper side part or side surface part in the vicinity of the corner parts of the mobile telephone. In other words, the arrangement configuration described above obtains a suitable configuration by which the surface of the outer wall is brought into contact with at least a part of the ear cartilage around the entrance part of the external auditory meatus without making contact with the auricular helix.

As described above, in the present invention, the vibration energy can be concentrated at the parts of expected contact with the ear cartilage at the entrance part of the external auditory meatus not only in the fifty-fifth embodiment of FIGS. 83 to 85 but also in other embodiments. To classify this feature, firstly, the twenty-ninth embodiment, the thirtieth embodiment, the second modification example of the thirty-first embodiment, the thirty-second embodiment, the thirty-third embodiment, and the fifty-fifth embodiment are first examples where elastic bodies create an isolation between the parts of expected contact and the chassis of the mobile telephone, whereby the feature is realized. The twenty-ninth embodiment, the thirtieth embodiment, the thirty-second embodiment, and the thirty-third embodiment are second examples where the primary vibration direction of the piezoelectric bimorph element is avoided and the same is supported on the chassis of the mobile telephone, whereby the vibration energy is concentrated at the parts of expected contact. The thirtieth embodiment, the thirty-first embodiment, and the forty-seventh embodiment are third examples where there is a reduced surface area of contact between the parts of expected contact and the chassis of the mobile telephone supporting the same, whereby the vibration energy is concentrated at the parts of expected contact. The forty-second to forty-fourth embodiment, the forty-sixth embodiment and the modification example thereof, the forty-eighth to fiftieth embodiments, the fifty-second embodiment, and the fifty-fifth embodiment are fourth examples where the holding position of the vibrator is limited to the vicinity of the parts of contact, whereby the vibration energy is concentrated at the parts of expected contact. The forty-sixth embodiment and the modification example thereof, the forty-eighth to fiftieth embodiments, the fifty-second embodiment, and the fifty-fifth embodiment are fifth examples where the parts of expected contact have a different material from that of the chassis of the mobile telephone, whereby the vibration energy is concentrated at the parts of expected contact. However, as is clear from the fact that some embodiments are duplicated in the classifications described above, the features classified as above can in practice be employed in a plurality of combinations.

The various features of the present invention described above are not limited to the embodiments described above. For example, as a modification example of the fifty-fifth embodiment, another possible configuration is one where a hole having a greater cross-sectional area than that of the piezoelectric bimorph element 2525 is opened at each of the elastic bodies 5165b and 5165a, the cross-section of which is illustrated by FIG. 83B, the piezoelectric bimorph element 2525 being held through the holes by the cartilage conduction units 5124 and 5126. Such a case is structured such that the piezoelectric bimorph element 2525 does not make direct contact with the elastic bodies 5165b and 5165a, and it becomes possible to prevent the vibration energy of the piezoelectric bimorph element 2525 from being dispersed to the chassis of the mobile telephone 5101 via the elastic bodies 5165b and 5165a.

The fifty-fifth embodiment described above, similarly with respect to the forty-sixth embodiment illustrated in FIG. 69, is structured such that the vibration of both ends of a single piezoelectric bimorph element 2525 is conducted to the left and right cartilage conduction units 5124 and 5126; however, the implementation of a feature such as that of the fifty-fifth embodiment is not to be limited thereto. For example, the holding structure of the fifty-fifth embodiment of FIG. 83 may be applied to the structure in which one side of the piezoelectric bimorph element 2525 is supported by the cantilever structure, as in the forty-second embodiment of FIG. 65. Furthermore, in a configuration as in the fifty-second embodiment of FIG. 77, where the right ear piezoelectric bimorph element 2525b and the left ear piezoelectric bimorph element 2525a are employed, the holding structure of the fifty-fifth embodiment of FIG. 83 may be applied to the manner in which the same are each supported by the cantilever structure.

As has already been described, the ability to independently control the right ear and left-ear cartilage-conduction vibration unit s, as in the first to third embodiments in FIGS. 1 to 7 and the fifty-second embodiment in FIG. 77, makes it possible to stop the vibration of the vibration unit, which is not brought into contact with the ear cartilage. In such a case, in the distribution of vibration energy in the case where the vibration of the cartilage conduction unit 5126 is stopped in FIG. 85A illustrating the state where the cartilage conduction unit 5124 is held against the right ear 28, the amplitude and acceleration of vibration are greatest at the position (1); the amplitude and acceleration of vibration subsequently decrease at the position (3), the position (2), the position (4), and the position (5), in this order. By contrast, in the distribution of vibration energy in the case where the vibration of the cartilage conduction unit 5124 is stopped in FIG. 85B illustrating the state where the cartilage conduction unit 5126 is held against the left ear 30, the amplitude and acceleration of vibration are greatest at the position (2); the amplitude and acceleration of vibration subsequently decrease at the position (3), the position (1), the position (4), and the position (5), in this order.

Fifty-Sixth Embodiment

Figure 86B:
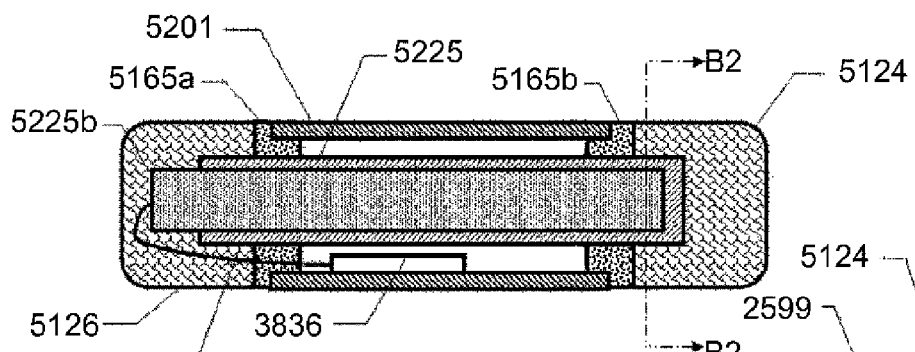
FIG. 86 is a perspective view and a cross-sectional view of a fifty-sixth embodiment according to an aspect of the present invention (fifty-sixth embodiment)
Figure 86A:
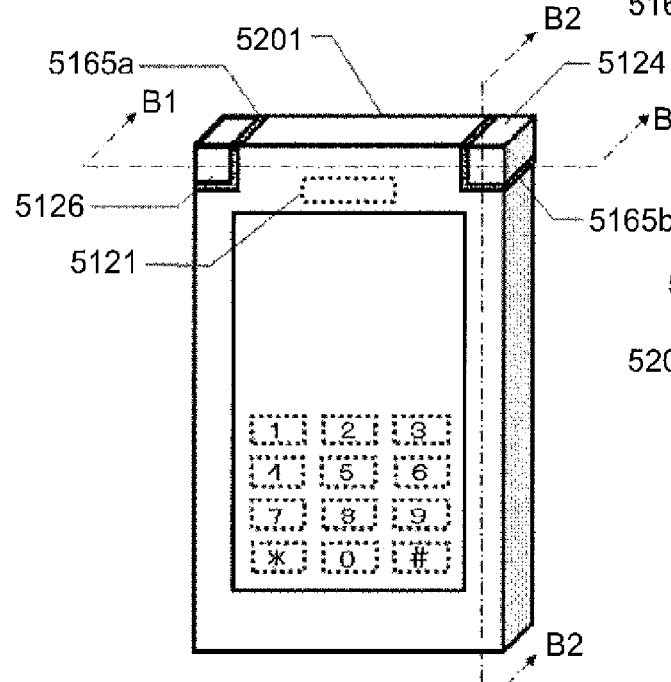
Figure 86C:
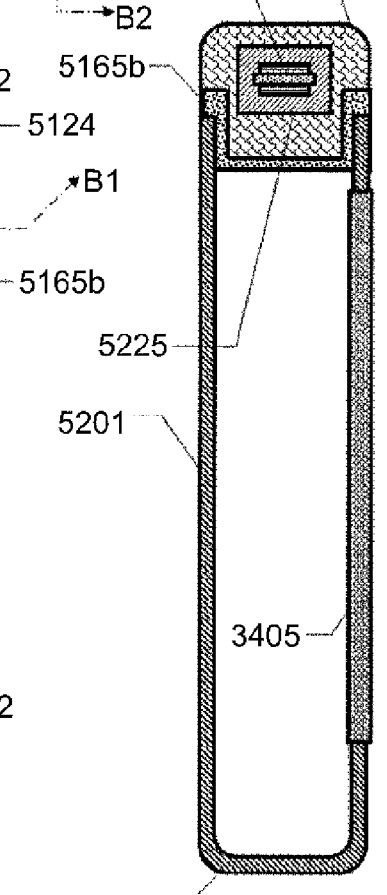

FIG. 86 is a perspective view and a cross-sectional view relating to a fifty-sixth embodiment according to an aspect of the present invention, which is configured as a mobile telephone 5201. The fifty-sixth embodiment is consistent with the fifty-fifth embodiment illustrated in FIG. 83, except for the holding direction of the cartilage conduction vibration source 2525 constituted of the piezoelectric bimorph element; shared portions have been given like reference numerals, and a description thereof has been omitted unless there is a need.

In the fifty-fifth embodiment of FIG. 83, the metal sheet 2597 of the cartilage conduction vibration source 2525 is arranged so as to be parallel to the front surface of the mobile telephone 5101, and the primary vibration direction is oriented orthogonal to the GUI display unit 3405. By contrast, in the fifty-sixth embodiment of FIG. 86, a metal sheet 2599 of a cartilage conduction vibration unit 5225 is arranged so as to be perpendicular to the front surface of the mobile telephone 5201, as a result of which the primary vibration direction of the cartilage conduction vibration unit 5225 becomes parallel to the GUI display unit 3405, similarly with respect to the first modification example of the forty-second embodiment illustrated in FIG. 65C. The configuration of the fifty-sixth embodiment is suitable for usage where, the front surface side of a corner part (the cartilage conduction unit 5124 or 5126) of the mobile telephone 5201 being held against the ear cartilage identically with respect to the case illustrated in FIG. 85, the top surface side of the corner part is held against the ear cartilage in such a form as to lightly push upward, similarly with respect to the first modification example of the forty-second embodiment. Because the vibration is concentrated on the cartilage conduction unit 5124 or 5126, sufficient cartilage conduction can be obtained merely by bringing only the front surface side of a corner part (the cartilage conduction unit 5124 or 5126) up against the ear cartilage.

In the fifty-sixth embodiment of FIG. 86, because the primary vibration direction of the cartilage conduction vibration unit 5225 is parallel to the front surface of the mobile telephone 5201 (which includes the GUI display unit 3405), there is a smaller vibration component transmitted to the front surface and rear surface, which account for a large surface area of the outer surfaces of the mobile telephone 5201. As a result, there can be a further reduction in sound leakage due to air conduction sound generated at such portions of the large surface area.

The cartilage conduction vibration unit 5225 oriented in the manner described above as in the fifty-sixth embodiment of FIG. 86 is not limited to the fifty-sixth embodiment, but rather can also be employed in the forty-sixth embodiment of FIG. 69, the forty-sixth embodiment of FIG. 71, the forty-ninth embodiment of FIG. 74, and other embodiments.

Fifty-Seventh Embodiment

Figure 87:
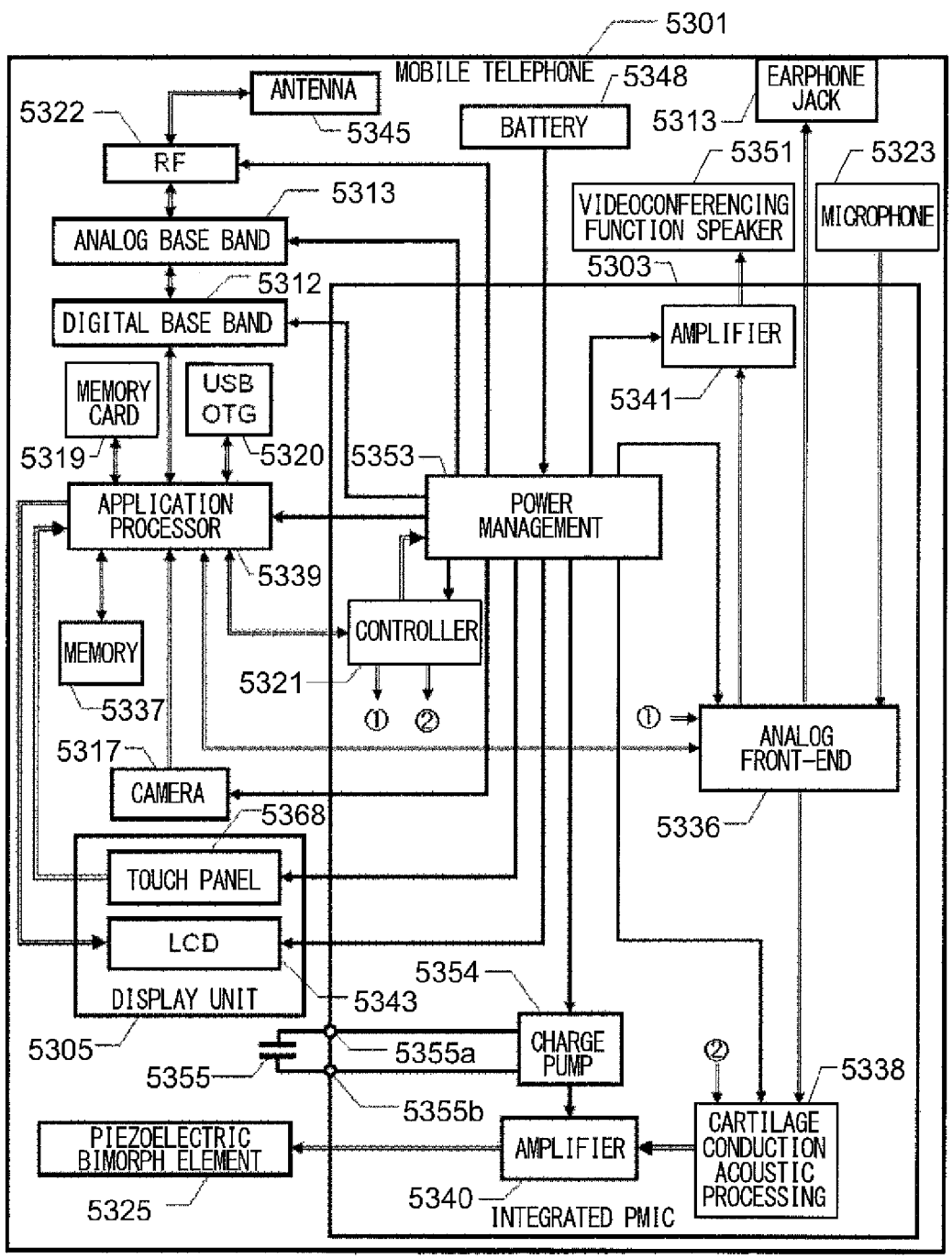
FIG. 87 is a block diagram of a fifty-seventh embodiment according to an aspect of the present invention (fifty-seventh embodiment)

FIG. 87 is a block diagram relating to a fifty-seventh embodiment according to an aspect of the present invention, which is configured as a mobile telephone 5301. A piezoelectric bimorph element 5325 constituting the cartilage conduction vibration unit in the fifty-seventh embodiment has a drive circuit configured as a power management circuit for supplying, together with a single-chip integrated power management IC 5303, power to each of the parts of the mobile telephone 5301.

The integrated power management IC 5303 has a power management unit 5353 and supplies different, respectively predetermined power voltages to an RF circuit unit 5322 connected to an analog baseband unit 5313 and an antenna 5345 and coupled to a digital baseband unit 5312, and to other elements constituting the telephone communication unit, on the basis of the power supply from a battery 5348. The power management unit 5353 further supplies different, respectively predetermined power voltages to: an application processor 5339 corresponding to the controller 39 or the like illustrated in other embodiments, a camera unit 5317 (depicted as a consolidation of the backside main camera and videoconferencing function internal camera illustrated in other embodiments), a liquid crystal display device 5343 and touch panel 5368 in a display unit 5305, and other elements. The application processor 5339, which is linked with a memory 5337 (depicted as a consolidation of a program holding function and a data writing and holding function), controls the entirety of the mobile telephone 5301 and is capable transferring signals with external apparatuses via a memory card 5319 (depicted as a consolidation of a slot and a card) and a USB™ connection terminal 5320.

The power management unit 5353 also supplies different, respectively predetermined power voltages to a controller 5321, an analog front-end unit 5336, an amplifier 5341 for a videoconferencing function speaker 5351, a cartilage conduction acoustic processing unit 5338, a charge pump circuit 5354, and other elements within the integrated power management IC 5303. The charge pump circuit 5354 is intended to boost the voltage for the piezoelectric bimorph element 5325, which requires high voltage.

The analog front-end unit 5336 receives an analog audio signal from the application processor 5339, which is outside the integrated power management IC 5303 and supplies the same to the videoconferencing function speaker 5351 via the amplifier 5341, also supplying the analog audio signal to an earphone jack 5313 and the cartilage conduction acoustic processing unit 5338. The analog front-end unit 5336 also transmits an analog audio signal picked up from the user by the microphone 5323 to the outside application processor 5339.

The charge pump circuit 5354 operates to boost voltage in cooperation with an exterior attached condenser 5355, which is connected via exterior attached terminals 5355a and 5355b, and supplies to the amplifier 5340 the voltage needed to drive the piezoelectric bimorph element 5325. The audio signal from the analog front-end unit 5336 thereby drives the piezoelectric bimorph element 5325 via the cartilage conduction acoustic processing unit 5338 and the amplifier 5340. Examples corresponding to the functions of the cartilage conduction acoustic processing unit 5338 include the acoustics adjustment unit 238 and waveform inverter 240 illustrated in the fourth embodiment of FIG. 8, the cartilage conduction low-pass filter 5040 and cartilage conduction equalizer 5038 illustrated in the fifty-fourth embodiment of FIG. 82, but there is no limitation thereto.

The controller 5321 transfers digital control signals with the application processor 5339, which is outside the integrated power management IC 5303, and controls the power management unit 5353. The controller 5321 controls the analog front-end unit 5336 on the basis of a command from the application processor 5339, and performs such operations as switching between sending the analog audio signal received from the application processor 5339 to the amplifier 5341 or sending the same to the cartilage conduction acoustic processing unit 5338, in order to drive the videoconferencing function speaker 5351. The analog front-end unit 5336 also performs such processing as preventing the "popping sound" that accompanies the switching from being outputted to the earphone jack 5313 and other elements.

The controller 5321 also transfers digital control signals with the application processor 5339, which is outside the integrated power management IC 5303, and controls the cartilage conduction acoustic processing unit in a manner relating to the acoustics adjustment, waveform inversion, the cartilage conduction low-pass filter, and the cartilage conduction equalizer, among others as exemplified above.

Because the fifty-seventh embodiment of FIG. 87, as described above, has the drive circuit of the cartilage conduction vibration unit configured as a single-chip integrated IC together with a power management circuit, the cartilage conduction vibration unit can be driven directly, and power voltage can be supplied to the cartilage conduction vibration unit integratedly with the supply of power voltage to the various constituent elements inside the mobile telephone, it being possible to also integrate the control thereof. Also, having the cartilage conduction acoustic processing unit for the cartilage conduction vibration unit configured as a single-chip integrated IC together with a power management unit further allows for the control of the audio signals of the piezoelectric bimorph element to be integrated. In a case where the piezoelectric bimorph element is employed as the cartilage conduction vibration unit, although high voltage is needed to drive the same, having the drive circuit of the cartilage conduction vibration unit configured as a single-chip integrated IC together with a power management unit, as in the fifty-seventh embodiment of FIG. 87, makes it possible to drive the piezoelectric bimorph element without the need to add a separate chip for a boosted-voltage circuit. Having the cartilage conduction acoustic processing unit dedicated to driving the cartilage conduction vibration unit configured as a single-chip integrated IC together with a power management unit further allows for the control of the audio signals of the piezoelectric bimorph element to be integrated. It is accordingly possible to endow the mobile telephone with a suitable cartilage conduction function merely by inputting an ordinary audio signal to the integrated IC and connecting the cartilage conduction vibration unit to the integrated IC.

Further, having the analog-front end unit configured as a single-chip integrated IC together with the power management unit allows for the output of audio signals to be collectively switched and adjusted. Specifically, the transfer of digital control signals between the integrated IC and the application processor, relating to the functions of the overall mobile telephone inclusive of the functions of the cartilage conduction vibration unit, can be integrated with the transfer of analog audio signals between the integrated IC and the application processor.

The circuit configuration in which the drive circuit of the cartilage conduction vibration unit is configured as the power management unit and the single-chip integrated IC, as in the fifty-seventh embodiment of FIG. 87, can also be applied to the various other embodiments that have already been described.

Fifty-Eighth Embodiment

FIG. 88 is a perspective view and a cross-sectional view relating to a fifty-eighth embodiment according to an aspect of the present invention, which is configured as a mobile telephone 5401. The fifty-eighth embodiment is consistent with the fifty-fifth embodiment illustrated in FIG. 83, except for a configuration intended as a countermeasure against sound leakage due to air conduction sound (described later), and therefore shared portions have been given like reference numerals and a description thereof has been omitted unless there is a need.

In the fifty-eighth embodiment of FIG. 88, similarly with respect to the fifty-fifth embodiment illustrated in FIG. 83, there is slight vibration conducted to the chassis of the mobile telephone 5401 via the elastic bodies 5165*b* and 5165*a* from the cartilage conduction units 5124 and 5126 composed of a hard material, which hold the cartilage conduction vibration source 2525. The front surface and rear surface of the mobile telephone 5401, which account for a large surface area of the outer surfaces thereof, are thereby made to vibrate, and slight sound leakage due to air conduction sound is generated. In the fifty-eighth embodiment of FIG. 88, the outer surface of the chassis of the mobile telephone 5401, except for the portions of the GUI display unit 3405 and the microphone 23, is covered by an elastic body 5463, as a countermeasure against such sound leakage. Herein, the elastic body 5463 is bonded so as to be integrated with the chassis of the mobile telephone 5401. The portion of the GUI display unit 3405 then becomes an opening part so as not to hinder GUI operation. The portion of the microphone 23 is configured as the microphone cover unit 467 having a sponge-like or similar structure that will not hinder the air conduction of audio, similarly with respect to the fifth embodiment of FIG. 11

The elastic body 5463 for covering the outer surface of the chassis of the mobile telephone 5401 is preferably made of the same vinyl-based, urethane-based, or other type of vibration insulation material and cushioning material as the elastic bodies 5165*b* and 5165*a*, or such a material similar thereto. The cartilage conduction units 5124 and 5126 composed of a hard material, which hold the cartilage conduction vibration source 2525, are, in the fifty-eighth embodiment of FIG. 88, thereby in contact with the chassis of the mobile telephone 5401 through being included via the elastic bodies 5165*b*, 5165*a* and the elastic body 5463. The cartilage conduction vibration source 2525 accordingly does not make direct contact with the chassis of the mobile telephone 5401.

Also, because the elastic body 5463 is not an insertable/releasable cover as in the fifth embodiment of FIG. 11, but is bonded so as to be integrated with a large portion of the surface area of the surface of the chassis of the mobile telephone 5401, the vibration of the large portion of the surface area of the surface of the chassis of the mobile telephone 5401 is suppressed by the weight and elasticity thereof in both the interior and exterior directions over the amplitude of vibration, and vibration energy is also absorbed. The surface of the mobile telephone 5401, which is contact with the air, is also given elasticity. The air conduction sound generated from the surface of the chassis of the mobile telephone 5401, caused by the vibration of the cartilage conduction vibration source 2525 across the chassis of the mobile telephone 5401, is thereby attenuated. On the other hand, because the elastic body 5463 has an acoustic impedance approximating that of the ear cartilage, there is favorable cartilage conduction to the ear cartilage from the cartilage conduction units 5124 and 5126. The manner in which the elastic body 5463 covers the surface of the chassis of the mobile telephone 5401 also functions as a protection for when the mobile telephone 5401 collides with an external unit.

Fifty-Ninth Embodiment

FIG. 89 is a perspective view and a cross-sectional view relating to a fifty-ninth embodiment according to an aspect of the present invention, which is configured as a mobile telephone 5501. The fifty-ninth embodiment is consistent with the forty-second embodiment illustrated in FIG. 65, except for a configuration intended as a countermeasure against sound leakage due to air conduction sound, and therefore portions shared by cross-sectional views in FIGS. 89B and 89C with the cross-sectional views in FIGS. 65A and 65B have been assigned like reference numerals, and a description thereof has been omitted unless there is a need. The perspective view of FIG. 89A is consistent with the fifty-eighth embodiment of FIG. 88A, and therefore shared portions have been assigned like reference numerals and a description thereof has been omitted unless there is a need.

In the fifty-ninth embodiment of FIG. 89, one end of the piezoelectric bimorph element 2525 is held in a hole in a support structure 3800a for holding the cartilage conduction vibration source 2525, the support structure 3800a extending inward from a side surface 3807 and top surface 3807a of the mobile telephone 5501. The vibration of the cartilage conduction vibration source 2525 is therefore conducted to the chassis of the mobile telephone 5501 via the side surface 3807 and top surface 3807a of the mobile telephone 5501 from the support structure 3800a, and the front surface and rear surface of the mobile telephone 5501, which account for a large surface area of the outer surfaces thereof, are therefore made to vibrate. There is also greater sound leakage due to the air conduction sound generated thereby than there is in the case of the fifty-sixth embodiment of FIG. 86. However, in the fifty-ninth embodiment of FIG. 89, similarly with respect to the fifty-eighth embodiment of FIG. 88, the outer surface of the chassis of the mobile telephone 5501, except for the portions of the GUI display unit 3405 and the microphone 23, is covered by an elastic body 5563, as a countermeasure against such sound leakage. Herein, the elastic body 5563 is bonded so as to be integrated with the chassis of the mobile telephone 5501. The portion of the GUI display unit 3405 then becomes an opening part so as not to hinder GUI operation. The portion of the microphone 23 is configured as the microphone cover unit 467 having a sponge-like or similar structure that will not hinder the air conduction of audio, similarly with respect to the fifth embodiment of FIG. 11. This is a point of similarity with the fifty-eighth embodiment of FIG. 88.

The elastic body 5563 for covering the outer surface of the chassis of the mobile telephone 5501 is preferably made of a vinyl-based, urethane-based, or other type of vibration insulation material and cushioning material, similarly with respect to the fifty-eighth embodiment of FIG. 88. Due to the above configuration, in the fifty-ninth embodiment of FIG. 89 as well, the vibration of a large portion of the surface area of the surface of the chassis of the mobile telephone 5501 is suppressed by the weight and elasticity of the covering elastic body 5563 in both the interior and exterior directions over the amplitude of vibration, and vibration energy is also absorbed. The surface of the mobile telephone 5501, which is contact with the air, is also given elasticity. The air conduction sound generated from the surface of the chassis of the mobile telephone 5501, caused by the vibration of the cartilage conduction vibration source 2525, is thereby attenuated. On the other hand, because the elastic body 5563 has an acoustic impedance approximating that of the ear cartilage, there is favorable cartilage conduction to the ear cartilage from the upper part corner 3824, which is a suitable site to be brought up against the tragus or other part of the ear cartilage. A further point of similarity with the fifty-eighth embodiment of FIG. 88 is that the manner in which the elastic body 5563 covers the surface of the chassis of the mobile telephone 5501 also functions as a protection for when the mobile telephone 5501 collides with an external unit.

Sixtieth Embodiment

FIG. 90 is a perspective view and a cross-sectional view relating to a sixtieth embodiment according to an aspect of the present invention, which is configured as a mobile telephone 5601. The sixtieth embodiment is consistent with the forty-sixth embodiment illustrated in FIG. 69, except for a configuration intended as a countermeasure against sound leakage due to air conduction sound, and therefore shared portions are given like reference numerals, and a description thereof has been omitted unless there is a need.

In the sixtieth embodiment of FIG. 90, similarly with respect to the forty-sixth embodiment of FIG. 69, elastic body units 5663a and 5663b, serving as protectors, are provided to the two corners of the upper part of the mobile telephone 5601. The inner sides thereof have a dual purpose as units for holding both ends of the cartilage conduction vibration source 2525, and the outer sides have a dual purpose as cartilage conduction units for making contact with the ear cartilage. The elastic body units 5663a and 5663b utilize an elastic material having an acoustic impedance approximating that of ear cartilage (a silicone rubber; a mixture of a silicone rubber and a butadiene rubber; a natural rubber; a structure formed using these varieties of rubber in which air bubbles are sealed; a structure, such as can be seen in transparent packaging sheet materials and the like, in which a layer of groups of air bubbles is sealed separated by a thin film of synthetic resin; or the like).

In the sixtieth embodiment of FIG. 90 as well, a substantial component of the vibration of the elastic body units 5663a and 5663b for holding the cartilage conduction vibration source 2525 is conducted to the chassis of the mobile telephone 5601, and the front surface and rear surface of the mobile telephone 5601, which account for a large surface area of the outer surfaces thereof, are made to vibrate, thus generating air conduction sound. However, in the sixtieth embodiment of FIG. 90 as well, there extends in a sheet-shaped manner from the elastic body units 5663a and 5663b an elastic body 5663 composed of the same material, as a countermeasure against sound leakage caused by the aforesaid air conduction sound; the elastic body 5663 covers the outer surfaces of the mobile telephone 5601 except for the portions of the GUI display unit 3405 and the microphone 23. In the sixtieth embodiment of FIG. 90 as well, similarly with respect to the fifty-eighth embodiment of FIG. 88 and the fifty-ninth embodiment of FIG. 89, the elastic body 5663 is bonded so as to be integrated with the chassis of the mobile telephone 5601. The portion of the GUI display unit 3405 then becomes an opening part so as not to hinder GUI operation. The portion of the microphone 23 is configured as the microphone cover unit 467 having a sponge-like or similar structure that will not hinder the air conduction of audio, similarly with respect to the fifth embodiment of FIG. 11. This is a point of similarity with the fifty-eighth embodiment of FIG. 88 and the fifty-ninth embodiment of FIG. 89.

Due to the above configuration, in the sixtieth embodiment of FIG. 90 as well, the vibration of a large portion of the surface area of the surface of the chassis of the mobile telephone 5601 is suppressed by the weight and elasticity of the covering elastic body 5663 in both the interior and exterior directions over the amplitude of vibration, and vibration energy is also absorbed. The surface of the mobile telephone 5601, which is in contact with the air, is also given elasticity.

The air conduction sound generated from the surface of the chassis of the mobile telephone 5601, caused by the vibration of the cartilage conduction vibration source 2525, is thereby attenuated. The manner in which the elastic body 5663 covers the surface of the chassis of the mobile telephone 5601 also functions as a protection for those portions other than the elastic body units 5663a and 5663b.

Sixty-First Embodiment

FIG. 91 is a perspective view and a cross-sectional view relating to a sixty-first embodiment according to an aspect of the present invention, which is configured as a mobile telephone 5701. The sixty-first embodiment is consistent with the fifty-fifth embodiment illustrated in FIG. 83, except for a configuration intended as a countermeasure against sound leakage due to air conduction sound, and therefore shared portions are given like reference numerals, and a description thereof has been omitted unless there is a need.

In the sixty-first embodiment of FIG. 91, similarly with respect to the fifty-fifth embodiment illustrated in FIG. 83, both ends of the cartilage conduction vibration source 2525 are held by the cartilage conduction units 5124 and 5126 composed of a hard material, and are supported by the chassis of the mobile telephone 5701 via the elastic bodies 5165b and 5165a. In such a structure, as has already been described in the fifty-eighth embodiment of FIG. 88, there is slight vibration conveyed to the chassis of the mobile telephone 5701, thus generating sound leakage due to air conduction sound generated from the front surface and rear surface thereof. As a countermeasure to this sound leakage, the sixty-first embodiment of FIG. 91 has a pressure-fixation structure 5701h made of a screwed-in metal sheet or the like for pressing and affixing internal configuration components 5748 of the mobile telephone 5701, including a battery and the like, to the inner surface of the chassis of the mobile telephone 5701. The weight of the internal configuration 5748, including the battery and the like, is thereby integrated with the chassis of the mobile telephone 5701, and the vibration of a large portion of the surface area of the chassis is thereby suppressed across both the interior and exterior directions in the amplitude thereof, wherefore the generation of air conduction sound is attenuated.

In the sixty-first embodiment of FIG. 91, there is further a surplus space within the chassis of the mobile telephone 5701, which is filled in with a sound-absorbent packing material 5701i composed of nonwoven cloth or the like. The surplus space within the chassis of the mobile telephone 5701 is thereby finely sub-divided and the air within the chassis is prevented from resonating, thus attenuating the generation of air conduction sound. To facilitate understanding, FIG. 91C provides a simplified depiction of the manner in which the internal configuration 5748, the pressure fixation structure 5701h, and the sound-absorbent packing material 5701i are packed, but the structure therefor is in practice very complex; also, the pressure fixation structure 5701h is not limited to pressing and fixing the internal configuration 5748 only to the rear surface side of the mobile telephone 5701, as is depicted. For the fine sub-division of the surplus space within the chassis of the mobile telephone 5701, a barrier wall also may be provided to the inner side of the chassis, instead of packing in the sound-absorbing packing material 5701i.

The implementation of the various features of the present invention illustrated by the embodiments above is not to be limited to the respective embodiments above. For example, in the eighty-eighth to ninetieth embodiments above, on the rear surface and other portions accounting for a large surface area of the outer surfaces of the mobile telephone, the width of the cross-sections of the elastic bodies for covering has been depicted as being approximately equivalent to the width of the cross-section of the chassis. However, as long as the strength of the chassis is maintained, the thickness of the cross-section of the chassis can be reduced as much as possible, and the thickness of the cross-section of the elastic body for covering the same can be increased as much as possible, so that the chassis theoretically comprises the elastic body, and the effect of preventing sound leakage is improved. At such a time, a configuration in which the barrier wall for finely sub-dividing the surplus space is provided to the interior of the chassis is further advantageous in retaining strength, and contributes to rendering the chassis thinner.

In the sixtieth embodiment illustrated in FIG. 90, the elastic body units 5663a and 5663b having multiple purposes as protectors, as parts for holding both ends of the cartilage conduction vibration source 2525, and as cartilage conduction units are contiguous with the elastic body 5663, being of the same material, but there is no limitation to such a configuration. For example, the elastic body units 5663a and 5663b may be components that are separated from the elastic body 5663, or may necessarily not be in contact. The elastic body units 5663a and 5663b may also be constituted of a different material from that of the elastic body 5663.

Further, for the sake of simplicity, the fifty-eighth to sixtieth embodiments illustrated in FIGS. 88 to 90 depict configurations in which the vibration of the chassis of the mobile telephone is covered and suppressed by an exterior elastic body, and the sixty-first embodiment of FIG. 91 depicts a configuration in which the vibration of the chassis of the mobile telephone is suppressed by the pressure fixation of the weight of the internal configuration of the mobile telephone. However, there is no limitation to the case where these elements are employed separately, as in the embodiments, but rather the configuration may be such that the two are used concurrently and the vibration of the interior and exterior of the chassis of the mobile telephone is suppressed therefrom.

<Summary>
The following is a description summarizing the various technical features that have been disclosed in the present specification.
<First Technical Feature>
A first technical feature disclosed in the present specification provides a mobile telephone in which the upper part of the mobile telephone is provided with a cartilage conduction vibration unit that makes contact with ear cartilage. It is thereby possible to provide a mobile telephone which makes use of the excellent performance exhibited by ear cartilage in regard to transmitting audio information, and which can be used without a sense of discomfort from pressure or insertion into the ear, the user experience being similar to that of the normal state of a telephone call.

According to a specific feature, the cartilage conduction vibration unit is configured so as not to protrude from the outer wall of the mobile telephone. It is thereby possible to achieve a shape whose absence of awkward protruding parts caused by the arrangement of the cartilage conduction vibration unit compromises neither the function nor the aesthetics of the mobile telephone.

According to a more specific feature, the cartilage conduction vibration unit is arranged at an upper part corner on the ear side of the mobile telephone. It is thereby possible to achieve an arrangement where the cartilage conduction vibration unit does not protrude from the outer wall of the mobile telephone, by which natural contact with the ear cartilage can be realized.

According to an even more specific feature, the cartilage conduction vibration unit is arranged on one of the upper part corners on the ear side of the mobile telephone that faces diagonally downward in the usage posture. It is thereby possible for the cartilage conduction vibration unit to be brought into contact with the ear cartilage in a state that is awkward neither to the person making the telephone call nor to onlookers, due to the posture approximating the normal state of a telephone call, in which the mobile telephone is held by hand and brought up against the ear. Such a posture is doubly suitable, due to being suitable for making contact with the tragus and due to the tragus being particularly highly effective in terms of cartilage conduction.

According to another specific feature, there are two of the cartilage conduction vibration units provided to the upper part of the mobile telephone. Such a configuration is suitable by virtue of there being more effective contact with the ear cartilage. The two cartilage conduction vibration units can, for example, be configured such that one is made to vibrate in accordance with whether the right ear or the left ear is being used, thus providing support for switching between holding with the left and right hand.

According to a further specific feature, a sensor for detecting which of the two cartilage conduction vibration units is in contact with the ear is provided to the upper part of the mobile telephone, and one of the two cartilage conduction vibration units is made to vibrate in accordance with the output of the sensor. Alternatively, a gravitational acceleration detection unit is instead provided, one of the two cartilage conduction vibration units being made to vibrate in accordance with the direction of gravitational acceleration detected by the gravitational acceleration detection unit. The elements described above may also be used concurrently to detect when the hand holding the mobile telephone is switched.

According to another feature, in a mobile telephone having a videoconferencing function, the functions of the cartilage conduction vibration unit are prohibited whenever the videoconferencing function is in operation. The cartilage conduction vibration unit can thereby be prevented from functioning without purpose in the state where the mobile telephone is not to be brought up against the ear.

According to yet another feature, a folding structure is included, the functions of the cartilage conduction vibration unit being prohibited in a folded state in a case where the cartilage conduction vibration unit is arranged at a position at which contact with the ear cartilage becomes impossible in the folded state. The cartilage conduction vibration unit can thereby be prevented from functioning without purpose in the state where the mobile telephone cannot be held up against the ear.

According to another feature, there is provided an audio output device, comprising: an audio output unit; a controller for simultaneously outputting audio information to the audio output unit and the cartilage conduction vibration unit; and a phase adjustment unit for phase-adjusting the phase of an audio signal being outputted to the audio output unit and the cartilage conduction vibration unit. It is thereby possible to prevent the adverse event caused when the same audio information is transmitted by two systems, i.e., bone conduction and air vibration from the external auditory meatus.

According to another feature, there is provided an audio output device, comprising: a bone conduction vibration unit; an environment noise microphone; and a phase adjustment unit for inverting the phase of, and then outputting to the cartilage conduction vibration unit, audio information that has been picked up by the environment noise microphone. It thereby becomes possible to cancel out the environment noise from the environment noise and useful audio information conducted by air vibration from the external auditory meatus.

<Second Technical Feature>

A second technical feature disclosed in the present specification provides a mobile telephone having cartilage conduction vibration unit, which includes a cartilage conduction vibration source, as well as a cartilage conductor for guiding the vibration of the cartilage conduction vibration source to the upper part of the mobile telephone in contact with the ear cartilage. It is thereby possible to provide a mobile telephone that makes use of the excellent performance exhibited by ear cartilage in regard to transmitting audio information, and which can be used without a sense of discomfort from pressure or insertion into the ear, the user experience approximating that of the normal state of a telephone call. Furthermore, according to the configuration of the cartilage conduction vibration unit described above, the vibration of the cartilage conduction vibration source is guided by the cartilage conductor to a desired position, which is advantageous in that a greater amount of freedom is provided for the layout of the cartilage conduction vibration source itself and in that the cartilage conduction vibration unit can be installed on a mobile telephone lacking any available extra space.

According to a specific feature, the cartilage conduction vibration source and the cartilage conductor are configured so as not to protrude from an outer wall of the mobile telephone. It is thereby possible to achieve a shape whose absence of awkward protruding parts caused by the arrangement of the cartilage conduction vibration unit compromises neither the function nor the aesthetics of the mobile telephone. According to an even more specific feature, the end part of the cartilage conductor is arranged at an upper part corner of the ear side of the mobile telephone. It is thereby possible to achieve an arrangement where the cartilage conduction vibration units do not protrude from the outer wall of the mobile telephone, by which a natural contact with the ear cartilage can be realized. According to a further specific feature, the end part of the cartilage conductor is arranged on one of the upper part corners on the ear side of the mobile telephone that faces diagonally downward during the usage posture. It is thereby possible for the cartilage conduction vibration unit to be brought into contact with the ear cartilage in a state that is awkward neither to the person making the telephone call nor to onlookers, due to the posture approximating the normal state of a telephone call, in which the mobile telephone is held by hand and brought up against the ear. Such a posture is doubly suitable, because it is suitable for contact with the tragus and also because the tragus is particularly highly effective in terms of cartilage conduction.

According to another specific feature, the two ends of the end parts of the cartilage conductor are arranged at both corners of the upper part on the ear side of the mobile telephone. Such a configuration is suitable by virtue of there being more effective contact with the ear cartilage. One of the two ends of the end parts of the cartilage conductor can, for example, be brought into contact with the ear cartilage as appropriate, in accordance with whether the right ear or the left ear is being used, thus providing support for readily switching between holding the mobile telephone with the left and right hand.

According to another feature, there is provided a mobile telephone comprising: a cartilage conduction vibration unit brought into contact with ear cartilage; a gravitational acceleration detection unit; and a controller for prohibiting the cartilage conduction vibration unit from vibrating whenever the gravitational acceleration detection unit detects that the mobile telephone is in a stationary state. It is thereby possible to prevent the cartilage conduction vibration unit from uselessly vibrating and generating a distracting sound when, for example, the mobile telephone is placed on a desk or the like with the cartilage conduction vibration unit facing down.

According to a specific feature, the mobile telephone includes a sensor for detecting the presence or absence of an object in proximity with the cartilage conduction vibration unit, where the controller causes the cartilage conduction vibration unit to vibrate in accordance with whether the sensor detects an object in proximity, and prohibits the cartilage conduction vibration unit from vibration, irrespective of whether the sensor detects an object in proximity, whenever the gravitational acceleration detection unit detects that the mobile telephone is in a stationary state. The sensor for detecting the presence or absence of an object in proximity is a useful configuration for detecting when the mobile telephone has been brought up against the ear and causing the cartilage conduction vibration unit to vibrate, but when, for example, the mobile telephone has been placed on a desk or the like, there is the potential for this [state] to be falsely confirmed as contact to the ear and for the cartilage conduction vibration unit to be made to vibrate. Herein, the aforesaid specific feature can prevent the generation of uncomfortable sound due to the vibration of the cartilage conduction vibration unit based on such false confirmation.

According to another feature, there is provided a mobile telephone comprising: a cartilage conduction vibration unit to be brought into contact with ear cartilage; an audio input unit; a phase inverter for phase-inverting audio information inputted from the audio input unit; and a controller for outputting, from the cartilage conduction vibration unit, the audio information having been phase-inverted by the phase inverter. It is thereby possible to appropriately minimize any discomfort based on one's own voice during a conversation by mobile telephone in the state where the cartilage conduction vibration unit has been brought into contact with the ear cartilage.

According to a specific feature, the mobile telephone includes an acoustics adjustment unit, where the controller outputs, from the cartilage conduction vibration unit, audio information that has been acoustically adjusted by the acoustics adjustment unit and also phase-inverted by the phase inverter. It is thereby possible to more appropriately minimize any discomfort that is based on one's own voice during a conversation by mobile telephone.

According to another specific feature, the mobile telephone includes a contact state detection unit for detecting the state where the cartilage conduction vibration unit is in contact with the ear cartilage, where the controller determines whether or not to output, from the cartilage conduction vibration unit, audio information that has been phase-inverted by the phase inverter in accordance with the state detected by the contact state detection unit. It is thereby possible to more appropriately control the discomfort that is based on one's own voice in accordance with the state where the mobile telephone is in contact with the ear cartilage.

According to a more specific feature, the contact state detection unit detects when the cartilage conduction vibration unit is in contact with the ear cartilage in the state where the ear hole is blocked by the mobile telephone being in contact with the ear cartilage, the earplug bone conduction effect thus occurring, where the controller outputs, from the cartilage conduction vibration unit, audio information that has been phase-inverted by the phase inverter in accordance with a detection that the cartilage conduction vibration unit is in contact with the ear cartilage in the state where the earplug bone conduction effect occurs. The earplug bone conduction effect, which occurs due to the ear hole being blocked, achieves a listening status with dual effects, in which audio information from the cartilage conduction vibration unit is conducted by even louder sound and in which environmental noise is obstructed. However, the earplug bone conduction effect is meanwhile accompanied by the discomfort of one's own voice through bone conduction from the vocal cords. The aforesaid feature is advantageous in attenuating such discomfort of one's own voice.

According to another feature, there is provided a piezoelectric element control device comprising: a conduction vibration unit that includes a piezoelectric element and transmits vibration of the piezoelectric element by being brought into contact with a body to which conduction is directed; a signal output unit for outputting conduction vibration information to the piezoelectric element; and a pressure detection unit for detecting, through the piezoelectric element, changes in the contact pressure between the conduction vibration unit and the body to which conduction is directed. By such a configuration, the piezoelectric element can serve a dual purpose as an output element for contact vibration and also as a contact pressure sensor, and conduction vibration can be outputted in accordance with a variety of circumstances. Such a piezoelectric element control device is configured as a mobile telephone, the body to which conduction is directed being the ear cartilage, and is suitable for detecting the state where the cartilage conduction vibration unit is in contact with the ear cartilage depending on the pressure changes sensed by the piezoelectric element.

<Third Technical Feature>

A third technical feature disclosed in the present specification provides a mobile telephone comprising a cartilage conduction vibration source and a conductor for guiding the vibration of the cartilage conduction vibration source to the ear cartilage, wherein the conductor is an elastic body. It is thereby possible to effectively listen to the audio information from the cartilage conduction vibration source, and possible to achieve softer contact with the ear.

According to a specific feature, the conductor is sized so as to contact the ear cartilage at a plurality of points. Effective cartilage conduction can thereby be obtained.

According to another specific feature, the conductor is sized so as to contact the ear cartilage and block the external auditory meatus. It is thereby possible to effectively listen to audio information from the cartilage conduction vibration source, and effectively reduce exterior noise.

According to another specific feature, the conductor has at least a surface area approximating that of the ear lobe. It is thereby possible to effectively listen to audio information from the cartilage conduction vibration source, and block the external auditory meatus in a natural manner according to need.

According to another specific feature, the conductor has an acoustic impedance approximating the acoustic impedance of ear cartilage. Audio information from the cartilage conduction vibration source can accordingly be effectively guided to the ear cartilage.

According to another specific feature, the conductor is configured as a cover for the mobile telephone. According to such a configuration, housing the mobile telephone in the cover makes it possible to effectively listen to audio information from the cartilage conduction vibration source in a natural manner.

According to a more specific feature, the mobile telephone includes an outgoing-talk unit (microphone), and the cover of the mobile telephone includes Larsen effect prevention means between the conduction vibration source and the outgoing-talk unit. It is thereby possible to prevent the Larsen effect while also possible to effectively listen to the audio information from the cartilage conduction vibration source. According to another more specific feature, the mobile telephone includes an outgoing-talk unit, and the cover of the mobile telephone includes an air conduction unit in the vicinity of the outgoing-talk unit. It is thereby possible to listen to the voice of the other party, which is generated by the bone conduction vibration source, while also sending one's own voice from the outgoing-talk unit, and also thereby possible to have a two-way conversation in a natural manner, even while the mobile telephone remains housed in the cover.

According to another specific feature, the conductor is configured as a grip unit of the mobile telephone. It is thereby possible to introduce, to the mobile telephone, an elastic body for effectively guiding the audio information of the conductor, in a manner that is in harmony with the other functions of the mobile telephone.

According to another feature, there is provided a mobile telephone comprising: a cartilage conduction vibration source serving as an incoming-talk unit; a conduction vibration source serving as an incoming-talk unit; and a shared outgoing-talk unit. It is thereby possible to provide a mobile telephone permitting a two-way conversation in accordance with the environment of the telephone call. Specifically, providing the shared outgoing-talk unit to an end part of the mobile telephone is useful for the aforesaid [configuration].

According to another feature, there is provided a mobile telephone comprising: a cartilage conduction vibration source; and a conductor for guiding vibration of the cartilage conduction vibration source to the ear cartilage; wherein the conductor is sized so as to contact the ear cartilage at a plurality of points; is sized so as to contact the ear cartilage and block the external auditory meatus; has at least a surface area approximating that of an ear lobe; or has an acoustic impedance approximating the acoustic impedance of the ear cartilage. Any of these features or a combination thereof makes it possible to listen effectively to sound information using the cartilage conduction vibration source.

<Fourth Technical Feature>

A fourth technical feature disclosed in the present specification provides a mobile telephone comprising: a cartilage conduction vibration source; a mobile telephone body; an anti-impact cushioning part provided between the mobile telephone body and the cartilage conduction vibration source; and a conductor for guiding the vibration of the cartilage conduction vibration source to the ear cartilage. A vibration source resistant to impact can thereby be employed in a mobile telephone as the cartilage conduction vibration source. According to a specific feature, the conductor is an elastic body. It is thereby possible to cushion impact on the mobile telephone body and additionally impact from outside the conductor, and also thereby possible to obtain effective cartilage conduction. According to another specific feature, a vibration source resistant to impact and suitable as a cartilage conduction vibration source includes a piezoelectric bimorph element.

According to another specific feature, the anti-impact cushioning part and the conductor are configured so as to enclose the cartilage conduction vibration source. It is thereby possible to effectively cushion the cartilage conduction vibration source while also rendering the cartilage conduction more effective, rather than compromising the efficacy of cartilage conduction. According to yet another specific feature, the conductor and the anti-impact cushioning part are composed of the same material. According to a further specific feature, the cartilage conduction vibration source is inserted into and integrally molded with the conductor and anti-impact cushioning part. It is thereby made possible to provide a practical configuration by which cushioning efficacy and favorable cartilage conduction efficacy can be simultaneously achieved. According to another specific feature, the conductor and anti-impact cushioning part are joined sandwiching the cartilage conduction vibration source. It is thereby made possible to provide another practical configuration by which cushioning efficacy and favorable cartilage conduction efficacy can be simultaneously achieved.

According to yet another feature, the conductor is sized so as to contact the ear cartilage at a plurality of points. According to another specific feature, the conductor is sized so as to contact the ear cartilage and block the external auditory meatus. According to yet another specific feature, the conductor has at least a surface area approximating that of the ear lobe. According to another specific feature, the conductor has an acoustic impedance approximating the acoustic impedance of the ear cartilage. These features make it possible to render cartilage conduction more effective and to reduce exterior noise in accordance with need, while simultaneously cushioning the cartilage conduction vibration source.

According to another feature, there is provided a mobile telephone comprising: a cartilage conduction vibration source; a conductor for guiding the vibration of the cartilage conduction vibration source to the ear cartilage; and a resonator for converting the vibration of the cartilage conduction vibration source to air conduction. It is thereby made possible to create a dual use for the cartilage conduction vibration source and to simultaneously obtain both favorable cartilage conduction from the conductor and air conduction from the resonator; it is also thereby possible to effectively listen to sound information.

According to a specific feature, the conductor is a rigid body. Cartilage conduction conducts differently depending on the amount of force pushing on the cartilage, and a state of effective conduction can be obtained by increasing the amount of force that is pushing, but this means that when it is difficult to hear the incoming sound, a natural behavior such as increasing the force pushing the mobile telephone against the ear can be utilized to adjust the volume. Such a function also makes it possible to more effectively adjust the volume through adjusting the force that is pushing, due to the conductor being constituted of a rigid body.

According to another specific feature, the resonator is an elastic body. The resonator thereby creates cartilage conduction through contact with the tragus or other part of the ear cartilage, and sound from the outer surface of the resonator, which resonates according to the vibration of the cartilage conduction vibration source, is conducted to the tympanic membrane from the external auditory meatus as sound waves. It is thereby possible to effectively listen to sound.

According to another specific feature, the resonator is sized so as to contact the ear cartilage at a plurality of points. According to another specific feature, the resonator is sized so as to contact the ear cartilage and block the external auditory meatus. According to yet another specific feature, the resonator has an acoustic impedance approximating the acoustic impedance of the ear cartilage. These features make it possible to render cartilage conduction more effective and to reduce exterior noise in accordance with need.

According to another specific feature, the resonator constitutes the incoming-talk unit of the mobile telephone by air conduction. It is thereby made possible to create a dual use for the cartilage conduction vibration source and constitute a typical incoming-talk unit, and also possible to listen to sound in a natural posture, on the basis of the vibration of the cartilage conduction vibration source, without the incoming-talk unit being provided separately.

According to another feature, there is provided a mobile telephone comprising: a cartilage conductor for conducting vibration for cartilage conduction to ear cartilage; a resonator for generating sound waves to be conducted to the tympanic membrane through the external auditory meatus by air conduction; and a shared vibration source having a dual purpose as a vibration source for the cartilage conductor and the resonator. It is thereby made possible to create a dual use for the shared vibration source and constitute a cartilage conduction output unit and a typical incoming-talk unit, and also possible to listen to sound in a natural posture, on the basis of the vibration of the shared vibration source, without the incoming-talk unit being provided separately.

According to a specific feature, a suitable example of the vibration source includes a piezoelectric bimorph element. It is thereby possible to provide a vibration source suitable for generating favorable cartilage conduction and suitable for a typical incoming-talk unit for generating sound to be conducted to the tympanic membrane from the external auditory meatus.

<Fifth Technical Feature>

A fifth technical feature disclosed in the present invention provides a mobile telephone comprising: a display surface; a side surface relative to the display surface; and a cartilage conduction vibration unit provided to the side surface and capable of coming into contact of the ear cartilage. The display surface can thereby be prevented from making contact with the ear, cheek, or other body part and from becoming fouled when the cartilage conduction vibration unit is brought into contact with the ear cartilage.

According to a specific feature, cartilage conduction vibration units are provided to each of both side surfaces of the display surface. The cartilage conduction vibration unit can thereby be brought into contact with the right ear or the left ear from the state where the display screen is being viewed, without the need to switch the hand holding the mobile telephone. According to a further specific feature, there is provided an incoming-talk unit which is used consistently in any case where either of the cartilage conduction vibration units is being used.

According to another specific feature, the incoming-talk unit is provided nearer to the side surface to which the cartilage conduction vibration unit is provided. In such a case, merely providing the cartilage conduction vibration unit to the side surface on a single side allows for the cartilage conduction vibration unit to be brought into contact with the right ear or the left ear by the mobile telephone being turned over. According to a further specific feature, the cartilage conduction vibration unit and the incoming-talk unit form an incoming/outgoing talk unit, which can be inserted into and removed from the mobile telephone. The ability to insert or remove such an incoming/outgoing talk unit allows for flexible usage. According to a further specific feature, the incoming/outgoing-talk unit is configured so as to be capable of short-range wireless communication or so as to be capable of wired communication with the mobile telephone.

According to another specific feature, an auxiliary holding unit is provided to the side surface of the side opposite the side surface to which the cartilage conduction vibration unit is provided. The mobile telephone can thereby be more readily held when the cartilage conduction vibration unit is brought into contact with the ear cartilage, and the display surface can thereby be prevented from becoming fouled by fingerprints or the like due to being held during a telephone call. According to a more specific feature, the auxiliary holding unit is configured so as to be extensible from the side surface, in order to prevent the compactness of the mobile telephone from being compromised when the auxiliary holding unit is not needed.

According to another feature, there is provided a mobile telephone comprising: a display surface; a cartilage conduction vibration unit which can be brought into contact with the ear cartilage; a detection unit for detecting when the cartilage conduction vibration unit has been contacted with the ear cartilage; and a display controller for changing the display of the display unit to a privacy protection display on the basis of the detection by the detection unit.

The feature above makes it possible to prevent another person from catching a glance of a display relating to the call destination or other form of private information during a telephone call. Such a configuration is suitable for when the state becomes such that the display surface is no longer hidden by the posture of the mobile telephone when the cartilage conduction vibration unit is brought into contact with the ear cartilage. An example of a privacy protection display is a predetermined display not containing any private information or a state where nothing is displayed. According to a more specific feature, the display unit is turned on during the privacy protection display, and the display unit is turned off in order to conserve power whenever the detection by the detection unit continues for a predetermined period of time or longer.

According to another feature, there is provided a mobile telephone system which includes: a mobile telephone body; and an incoming/outgoing-talk unit, which can be inserted into or removed from the mobile telephone body, and which includes an incoming-talk unit and a cartilage conduction vibration unit that can be brought into contact with the ear cartilage.

The feature above makes it possible to enable cartilage conduction in the state where the incoming/outgoing-talk unit is incorporated into the mobile telephone body as well as cartilage conduction in the state where the incoming/outing-talk unit is separated therefrom, and also makes it possible to provide a system permitting flexible usage in accordance with the circumstances. According to a specific feature, the incoming/outgoing-talking unit is configured so as to be capable of short-range wireless communication or so as to be capable of wired communication with the mobile telephone body.

According to another feature, there is provided an incoming/outgoing-talk unit for a mobile telephone including a cartilage conduction vibration unit which can be brought into contact with the ear cartilage, an incoming-talk unit, and a unit for communicating with the mobile telephone. Such an incoming/outgoing-talk unit is not only suitable for constituting a mobile telephone system by being combined with a specific mobile telephone, but also assumes a configuration suitable for serving as an incoming/outgoing-talk accessory for a general mobile telephone having a communication unit. According to a specific feature, the incoming/outgoing-talk unit is configured in a pencil shape in which the cartilage conduction vibration unit and the incoming-talking unit are arranged in the vicinity of both ends. According to another specific feature, the communication unit is configured as a short-range wireless communication unit. According to yet another feature, the communication unit is configured so as to include a cable for wired communication with the mobile telephone.

According to another specific feature, the communication unit transmits, to the mobile telephone, information relating to the state of contact between the cartilage conduction vibration unit and the ear cartilage. It is thereby made possible for information specific to the usage of the cartilage conduction vibration unit to be transmitted to the mobile telephone, and it is also thereby possible for there to be a favorable link with the mobile telephone.

<Sixth Technical Feature>
A sixth technical feature disclosed in the present specification provides an incoming/outgoing talk unit for a mobile telephone comprising: an ear-attachment unit; a cartilage conduction vibration unit for making contact with the ear cartilage in the state of attachment by the attachment unit; an outgoing-talk unit; and a short-range wireless communication unit for use with the mobile telephone. This makes it possible to achieve an incoming/outgoing-talk unit suitable for a mobile telephone. An example of suitable ear cartilage in the above is the tragus, by which typically audio information can be transmitted without the ear hole being blocked.

According to a specific feature, the incoming/outgoing-talk unit includes a movable unit that is movable relative to the attachment unit, and the cartilage conduction vibration unit is held to the movable unit. According to a further specific feature, the movable unit can be moved in order to alter the state where the cartilage conduction vibration unit is in contact with the cartilage.

According to another specific feature, the short-range wireless communication unit transmits, to the mobile telephone, information relating to the position of the movable unit. The mobile telephone is thereby able to transmit appropriate audio information to the incoming/outgoing-talk unit. According to a more specific feature, the short-range wireless communication unit transmits, to the mobile telephone, information relating to the position of the movable unit relative to the attachment unit.

According to another feature, the cartilage conduction vibration unit is held via an elastic body. It is thereby possible to cushion an impact against the cartilage conduction vibration unit and also to allow the cartilage conduction vibration unit to move. According to a further specific feature, the cartilage conduction vibration unit is contained and held in the elastic body. This makes it possible to achieve greater cushioning for the cartilage conduction vibration unit.

According to a more specific feature, the aforesaid elastic body containing the cartilage conduction vibration unit has an acoustic impedance approximating the acoustic impedance of the ear cartilage. Cushioning for the cartilage conduction vibration unit and suitable cartilage conduction via the elastic body are thereby rendered possible.

According to another specific feature, the cartilage conduction vibration source includes a piezoelectric bimorph element. Suitable cartilage conduction vibration is thereby provided. Being held by the aforesaid elastic body is beneficial for the cushioning of such a piezoelectric bimorph element.

According to another specific feature, a phase inverter for phase-inverting audio information inputted from the outgoing-talk unit and a controller for outputting, from the cartilage conduction vibration unit, audio information that has been phase-inverted by the phase inverter are positioned in the incoming/outgoing-talk unit. It is thereby possible to provide a highly versatile incoming/outgoing-talk unit making use of the advantages specific to cartilage conduction. According to a further specific feature, an acoustics adjustment unit is provided to the incoming/outgoing-talk unit, and the aforesaid controller outputs, from the cartilage conduction vibration unit, audio information that has been acoustically adjusted by the acoustics adjustment unit and phase-inverted by the phase inverter. More appropriate control is thereby made possible.

According to a more specific feature, a contact state detection unit for detecting the state where the cartilage conduction vibration unit is in contact with the ear cartilage is provided to the incoming/outgoing-talk unit, and the controller determines whether or not to output, from the cartilage conduction unit, audio information that has been phase-inverted by the phase inverter, in accordance with the state detected by the contact state detection unit. Appropriate control is thereby made possible.

According to another specific feature, the attachment unit is an ear-hooking unit, and the incoming/outgoing-talk unit is configured as a headset. The various features described above are suitable for constituting such a headset.

According to another specific feature, the attachment unit is the temple of a pair of eyeglasses, and the incoming/outgoing-talk unit is configured as a pair of eyeglasses. The various features described above are suitable for constituting such a pair of eyeglasses. According to a more specific feature, the cartilage conduction vibration unit can be moved relative to the temple of the eyeglasses. It is thereby possible to withdraw the incoming/outgoing-talk unit whenever a two-way conversation is not being held.

<Seventh Technical Feature>
A seventh technical feature disclosed in the present specification provides an incoming-talk unit which includes: an ear-attachment unit; and a cartilage conduction vibration unit for conduction cartilage conduction from the outer side of the ear cartilage in the state of attachment by the attachment unit. It is thereby possible to listen to audio information without the external auditory meatus being blocked in both a natural state and a normal state. There are conventionally known eyeglasses-type and other types of bone conduction incoming-talk devices for listening to audio information without the external auditory meatus being blocked, but in the case of using bone conduction, the bone at the front or the rear of the ear must be tightly tucked in by the portion of the inner side or other part of the temple of the eyeglasses, which results in pain and renders long-term usage unbearable. An incoming-talk unit provided with the feature above will not have such a problem, it being possible to listen comfortably to audio information while experiencing a sensation similar to that of ordinary eyeglasses. According to a specific feature, the ear cartilage to which the cartilage conduction is to be conducted is the base of the ear. The outer side of the cartilage of the base of the ear, being close to the inner entrance of the external auditory meatus, is suitable for transmitting sound to the tympanic membrane by generating air conduction to the interior of the external auditory meatus from the cartilage around the entrance to the external auditory meatus, and for direct conduction to the inner ear through the cartilage According to another specific feature, the attachment unit is the temple of eyeglasses. In such a case, the vibration of the cartilage conduction vibration unit can be conducted from the outer side of the ear cartilage through the natural operation of hooking on the eyeglasses. Accordingly, there is no need to clamp down on the bones of the face with the temples of the eyeglasses, as is done in the case of bone conduction. According to a more specific feature, the cartilage conduction vibration unit can be inserted into or removed from the temple of the eyeglasses. It is thereby made possible to conduct cartilage conduction from the outer side of the ear cartilage merely by having the cartilage conduction vibration unit worn on the temple of ordinary eyeglasses, even though the eyeglasses may not be specially designed so as to be provided with the cartilage conduction vibration unit.

According to a further specific feature, the incoming-talk unit includes a pair of fitting parts which can each be fitted to the pair of temples of the eyeglasses, and cartilage conduction vibration units are fitted to the temples of the eyeglasses by the fitting parts being fitted. According to a more specific feature, the pair of fitting parts are connected by a glass cord, thus obtaining the practical advantages of a harmonious design and loss prevention. According to a more specific feature, the fitting parts are elastic bodies, thus achieving a degree of freedom in the fitting.

According to a further specific feature, one of the aforesaid pair of fitting parts is a dummy. Given that the cartilage conduction vibration unit is fitted only to one ear, a fitting part need only be fitted to one temple, but that alone will be enough to change the thickness of the temple, giving rise to the concern that the eyeglasses will tilt. Therefore, the dummy fitting part is fitted to the other temple, whereby it is possible to maintain the balance of the eyeglasses when the cartilage conduction vibration units are fitted.

According to another specific feature, the cartilage conduction vibration unit is arranged on one of the pair of fitting parts, and a power source is arranged at the other. It is thereby possible to arrange the cartilage conduction vibration unit and the related constituent elements in a limited space while the left and right temples are also balanced. It is further possible to connect the pair of fitting parts with a glass cord having a dual purpose for creating an electric connection between the two, whereby a plurality of constituent elements can be divided to the left and right temples while a harmonious design and also a mutual electric connection can be maintained.

According to another further specific feature, cartilage conduction vibration units are arranged at both of the pair of fitting parts. It is thereby possible to listen to audio information stereophonically while achieving a balance between the left and right temples. According to another feature, the cartilage conduction vibration units can also be arranged directly on both of the pair of temples of the eyeglasses.

According to another specific feature, the incoming-talk unit is provided with: a detection unit for detecting when the ear cartilage are deformed due to the ear being covered; an outgoing-talk unit; a phase inverter for phase-inverting audio information inputted from the outgoing-talk unit; and a controller for outputting, from the cartilage conduction vibration unit, the audio information that has been phase-inverted by the phase inverter in accordance with the detection by the detection unit. It is thereby possible to attenuate the discomfort of one's own voice when the ear is covered in order to listen to louder audio information and the earplug bone conduction effect is produced, while also obstructing exterior noise.

According to another specific feature, the attachment unit is an ear-hooking unit. In such a case, even a person who does not require eyeglasses can listen to audio information in a natural state and a normal state without the external auditory meatus being blocked.

According to another feature, there is provided an incoming-talk unit for 3D viewing, comprising: a 3D viewing adjustment unit; a temple including a unit for adjusting contact with the temple of eyeglasses for adjusting vision when fitted over eyeglasses for adjusting vision; and an audio information output unit provided to the temple. It is thereby possible to appropriately listen to audio information both in a case where the incoming-talk unit for 3D viewing is fitted directly without eyeglasses, and also in a case where the same is fitted over eyeglasses for adjusting vision.

According to a specific feature, the audio information output unit is a cartilage conduction vibration unit. According to a further specific feature, the cartilage conduction vibration unit conducts cartilage conduction from the outer side of the ear cartilage. The aforesaid contact adjustment unit allows for the vibration of the cartilage conduction vibration unit to be effectively transmitted from the outer side of the ear cartilage in particular when the incoming-talk unit for 3D viewing is fitted over the eyeglasses for adjusting vision.

<Eighth Technical Feature>

An eighth technical feature disclosed in the present specification provides a mobile telephone comprising: a cartilage conduction vibration source for guiding an audio signal to the ear cartilage; and a low-frequency source for guiding, to the cartilage conduction vibration source, a low-frequency vibration signal of a lower signal than the audio signal. The vibration source can thereby be given a dual purpose for cartilage conduction and low-frequency vibration, and the cost of the vibration source and thereby be reduced.

According to a specific feature, a mobile telephone is provided with a touch detection unit for detecting touch by a finger, wherein the low-frequency source introduces, to the cartilage conduction vibration source, the low-frequency vibration signal in response to a detection of touch by the touch detection unit, and transmits the low-frequency vibration of the cartilage conduction vibration source to the finger touching. A suitable example of such a touch detection unit is a touch panel provided to a display screen.

According to another specific feature, the cartilage conduction vibration source serves a dual purpose as the touch detection unit. The cartilage conduction vibration source can thereby serve to guide audio signals to the ear cartilage, to output low frequencies, and to detect touch, and the cost of the vibration source can also thereby be reduced. This feature is suitable for a case where a contact-free motion sensor for detecting movement in the vicinity of the display screen is provided.

According to another specific feature, a delay lasting a predetermined period of time after the detection by the touch detection unit is allowed to pass, and the low-frequency vibration signal is introduced to the cartilage conduction vibration source. Feedback for a touch result can thereby be provided to the finger touching, without confusion.

According to another specific feature, a vibration insulation material for preventing the transmission of audio signals is interposed between the cartilage conduction vibration source and an outer wall part for outwardly conduction the vibration of the cartilage conduction vibration source, which is made to vibrate by the introduction of a low-frequency vibration signal having a low frequency. The leakage of audio signals to the outer wall part and elsewhere, the generation of unneeded air conduction, and other defects can thereby be prevented.

According to a further specific feature, the vibration insulation material prevents the transmission of vibration having a frequency at or above a predetermined frequency, and permits the transmission of vibration at or below the predetermined frequency. An audio signal thereby enables a low-frequency vibration to be relayed to the outer wall part from the cartilage conduction vibration source even while there is obstruction. According to another further specific feature, a low-frequency signal of the low-frequency source is configured so as to include the resonance frequency of the vibration insulation material. An audio signal can thereby cause the vibration insulation material to resonate for a low-frequency vibration even while there is obstruction, whereby the low-frequency vibration can be transmitted to the outer wall part from the cartilage conduction vibration source.

According to another specific feature, a switching unit for switching between introducing an audio signal and introducing a low-frequency signal of a low frequency is provided to the cartilage conduction vibration source. The cartilage conduction vibration source can thereby be appropriately applied to a plurality of objectives.

According to another specific feature, there is provided an audio signal output device for a mobile telephone characterized by comprising: eyeglass lenses; eyeglass temples; cartilage conduction vibration units for conducting cartilage conduction from the outer side of the ear cartilage, which are arranged at the eyeglass temples; a sound source unit for transmitting output to the cartilage conduction vibration units; and a unit for communicating with the mobile telephone. Diverse links with the mobile telephone are thereby made possible. According to a further specific feature, incoming-talk units are provided to the eyeglass temples; as an example of a more specific feature, the incoming-talk units are configured as bone conduction microphones. Such configurations are appropriately used for eyeglass temples naturally brought up against the face when the eyeglasses are worn, and permit two-way conversation.

According to another feature, there is provided a sound signal output device which includes: eyeglass lenses; eyeglass temples; cartilage conduction vibration units for conducting cartilage conduction from the outer side of the ear cartilage, which are arranged at the eyeglass temples; and a sound source unit for transmitting output to the cartilage conduction vibration units. A person wearing the eyeglasses can thereby enjoyably receive sound signals of the sound source unit in a natural state. According to a specific feature thereof, the eyeglass temples are a pair, and the cartilage conduction vibration units are arranged at each of both of the pair of eyeglass temples, and the output of the sound source unit is transmitted to each of the cartilage conduction vibration units. A pair of temples originally provided to eyeglasses can thereby be utilized and stereo sound signals can be enjoyably received without the ear being blocked.

According to another feature, there is provided a sound signal output device for a mobile telephone characterized by comprising: eyeglass lenses; eyeglass temples; cartilage conduction vibration units for conducting cartilage conduction from the outer side of the ear cartilage, which are arranged at the eyeglass temples; bone conduction microphones arranged at the eyeglass temples; and a unit for communicating with the mobile telephone. It is thereby possible to provide an incoming/outgoing-talk unit suitable for a mobile telephone for a person who wears eyeglasses.

<Ninth Technical Feature>
A ninth technical feature disclosed in the present specification provides a mobile telephone characterized by comprising: a cartilage conduction vibration source having a primary vibration direction, the cartilage conduction vibration source being adapted to guide an audio signal to the ear cartilage; a holding structure for avoiding the primary vibration direction and for holding the cartilage conduction vibration source; and an audio signal input unit for inputting an audio signal to the cartilage conduction vibration source. An audio signal can thereby be effectively guided to the ear cartilage, and useless vibration of the cartilage conduction vibration source can be prevented from being conducted to the mobile telephone.

According to a specific feature, the mobile telephone is provided with a vibration output structure for guiding, to the outer surface of the mobile telephone, vibration in the primary vibration direction of the cartilage conduction vibration source. An audio signal can thereby be effectively guided to the ear cartilage from the cartilage conduction vibration. More specifically, the vibration output structure is an opening part provided to the mobile telephone.

According to a further specific feature, there is a vibration conduction unit connected to the surface of the primary conduction vibration direction of the cartilage conduction vibration source and exposed from the opening part. An audio signal can thereby be effectively guided to the ear cartilage from the cartilage conduction vibration without the design of the outer surface of the mobile telephone being compromised.

According to another specific feature, an elastic body is provided between the vibration conduction unit and the opening part. Useless vibration of the cartilage conduction vibration source can thereby be prevented from being conducted to the mobile telephone without the design of the outer surface of the mobile telephone being compromised.

According to another specific feature, an output structure is provided to the upper corner parts of the mobile telephone. An audio signal can thereby be effectively guided from the cartilage conduction vibration to the tragus or other part of the ear cartilage due to the natural manner in which the mobile telephone is held.

According to another specific feature, the output structure is provided to the side surface parts of the mobile telephone. An audio signal can thereby be effectively guided from the cartilage conduction vibration to the tragus or other part of the ear cartilage even while contact with the cheek or the like can be prevented from fouling the display surface or other element of the mobile telephone.

According to a specific feature, the cartilage conduction vibration source is a piezoelectric bimorph element, where a hold in accordance with the structure and vibration properties of the piezoelectric bimorph element makes it possible to effectively guide an audio signal to the ear cartilage and to prevent useless vibration of the cartilage conduction vibration source from being conducted to the mobile telephone.

According to a more specific feature, the primary vibration direction is avoided and the middle part of the cartilage conduction vibration source is held. It is thereby possible to effectively guide an audio signal to the ear cartilage, and also to prevent useless vibration of the cartilage conduction vibration source from being conducted to the mobile telephone.

According to another feature, there is provided a mobile telephone characterized by comprising: a cartilage conduction vibration source having a primary vibration surface and an outer surface substantially orthogonal thereto, the cartilage conduction vibration source being adapted to guide an audio signal to the ear cartilage; a holding structure for holding the cartilage conduction vibration source at a ridge between the primary vibration surface and the outer surface; and an audio signal input unit for inputting an audio signal to the cartilage conduction vibration source. An audio signal can thereby be effectively guided to the ear cartilage, and also useless vibration of the cartilage conduction vibration source can be prevented from being conducted to the mobile telephone.

According to another feature, there is provided a mobile telephone characterized by comprising: a cartilage conduction vibration source for guiding an audio signal to the ear cartilage; a holding structure having a concave and convex surface for holding the cartilage conduction vibration source; and an audio signal input unit for inputting an audio signal to the cartilage conduction vibration source. An audio signal can thereby be effectively guided to the ear cartilage, and also useless vibration of the cartilage conduction vibration source can be prevented from being conducted to the mobile telephone.

<Tenth Technical Feature>
A tenth technical feature disclosed in the present specification provides a vibration element characterized in that an electrode is provided to the middle part of the longitudinal direction. The vibration element can thereby be electrically connected at the middle part of the longitudinal direction, and both ends of the vibration element can thereby be released from the burden of an electrical connection. According to a specific feature, the vibration element includes: a metal sheet; piezoelectric ceramic sheets provided to both sides of the metal sheet; and a resin for covering the periphery thereof, wherein the electrode includes a first electrode pulled out to the surface of the resin from the middle part of the longitudinal direction of the metal sheet, and a second electrode pulled out to the surface of the resin in the vicinity of the first electrode from each of the piezoelectric ceramic sheets.

According to another specific feature, the electrodes are pulled out on the surface of the vibration direction of the vibration element. According to another specific feature, the electrodes are pulled from the surface of the resin in the direction substantially orthogonal to the metal sheet and the piezoelectric ceramic sheets. According to yet another specific feature, the resin of the vibration element includes a primary vibration direction surface substantially parallel to the metal sheet and the piezoelectric ceramic sheets and also a non-vibration direction surface substantially orthogonal thereto, and the electrodes are pulled out from such a primarily vibration direction surface of the resin. According to another specific feature, the electrodes are pulled out to the surface of the resin upon being curved substantially 90° within the resin. These features are suitable for support the vibration element from the non-vibration direction.

According to another specific feature, there is provided a mobile telephone in which the above-described vibration element is supported on the middle part of the longitudinal direction. This makes it possible to achieve a mobile telephone capable of transmitting the vibration from both ends of the vibration element to the ear cartilage and the like by, for example, cartilage conduction. According to a more specific feature, the vibration element is sandwiched and supported at the middle part of the longitudinal direction from the direction substantially parallel to the metal sheet and piezoelectric ceramic sheets of the piezoelectric bimorph elements. It is thereby made possible to hold the vibration element in the state where less vibration is conducted to the mobile telephone.

According to a more specific feature of the mobile telephone described above, vibration conductors are provided to both ends of the vibration element. According to a further specific feature, the vibration conductors are provided to the vicinity of the corners of the mobile telephone. Vibration can thereby be readily conducted to the ear cartilage.

According to another specific feature of the mobile telephone described above, the vibration conductors are provided to the side surfaces of the mobile telephone. The front surface of the mobile telephone, to which a display surface or the like is provided, can thereby be prevented from becoming fouled due to contact with the cheek. According to a more specific feature, the vibration conductors assume a long shape along the side surfaces of the mobile telephone. It is thereby possible to obviate the need to strictly select the position to be held against the ear and to permit contact at many points.

According to another feature, there is provided a mobile telephone that is guarded at the corners of the outer wall of the body, the mobile telephone including vibration units provided in the vicinity of the corners. The corners of the outer wall of the mobile telephone are suitable for obtaining cartilage conduction by being held up against the ear cartilage, but are conversely also always susceptible to collision with an external unit. According to the configuration described above, cartilage conduction to, for example, the tragus or other part of the ear cartilage is made readily possible while there is also a guard against collision from an external unit.

According to another feature, there is provided a mobile telephone including a pair of vibration conductors having a long shape along the side surfaces of the mobile telephone, each of the vibration conductors being provided so as to be substantially orthogonal to both ends of the longitudinal direction of the vibration element. It is thereby possible to make use of the vibration of both ends of the vibration element and to use the long regions of the two side surfaces of the mobile telephone as vibration sources for cartilage conduction.

According to yet another feature, there is provided a mobile telephone having a pair of vibration elements having a long shape, each of which elements provided along the two side surfaces of the mobile telephone. It is thereby possible to use the long regions of the two side surfaces of the mobile telephone as vibration sources for cartilage conduction while also independently controlling the respective vibrations of both sides.

According to yet another feature, there is provided a mobile telephone including: a vibration element having a long shape provided along one side surface of the mobile telephone, and a holding unit provided to the side surface of the side opposite the side surface to which the vibration element is provided. It is thereby possible to clearly understand which side is the cartilage conduction vibration source.

There is provided a mobile telephone including: a vibration element provided to the vicinity of a top side of the mobile telephone; and an elastic vibration conductor for covering the vibration element and forming the top side of the mobile telephone. Cartilage conduction can thereby be obtained from contact with the ear irrespective of being the front surface, rear surface, or side surface in the vicinity of the top side of the mobile telephone.

<Eleventh Technical Feature>

An eleventh technical feature disclosed in the present specification provides a mobile telephone comprising a cartilage conduction vibration unit supported inside a chassis structure and is adapted to conduct cartilage conduction vibration to the surface of the chassis structure. It is thereby possible to hold up any place of the surface of the mobile telephone against the ear cartilage and listen to sound by cartilage conduction. There is also greater freedom in the manner in which the cartilage conduction vibration unit is held, and the holding structure is also simplified.

According to a specific feature, the surface of the chassis structure has a surface to made to vibrate, and the cartilage conduction vibration unit is held within the chassis structure such that the primary vibration direction thereof is in the direction substantially orthogonal to the surface made to vibrate. Vibration can thereby be effectively conducted to the surface made to vibrate intended for cartilage conduction. According to a more specific feature, the cartilage conduction vibration unit has a piezoelectric bimorph element including a metal sheet, the metal sheet being held in the direction substantially parallel to the surface made to vibrate. The main vibration direction of the cartilage conduction vibration unit can thereby be made to be the direction substantially orthogonal to the surface to be vibrated.

According to a further specific feature, the mobile telephone includes a display surface, and the cartilage conduction vibration unit is held such that the primary vibration direction thereof is substantially orthogonal to the display surface. The display surface on the mobile telephone or the rear surface thereof can thereby be made to vibrate effectively, and it is thereby possible to bring the mobile telephone up against the ear cartilage over a broad range. According to a further specific feature, the display surface has a touch panel operation surface, and the cartilage conduction vibration unit has a dual purpose as a vibration source for feedback for the sensation of touch panel operation.

According to another specific feature, the cartilage conduction vibration unit is held such that the primary vibration direction thereof is in the direction substantially orthogonal to a side surface of the mobile telephone. The side surface of the mobile telephone can thereby be made to vibrate effectively, and effective cartilage conduction can thereby be obtained even while the display surface is prevented from coming into contact with the cheek and becoming fouled.

According to another feature, there is included an impact detection surface, wherein the cartilage conduction vibration unit is held within the chassis structure such that the primary vibration direction thereof is in the direction substantially orthogonal to the impact detection surface. The cartilage conduction vibration unit can thereby be given the dual purpose of effectively detecting impact.

According to another feature, the cartilage conduction vibration unit has a dual purpose as a vibration source for providing notification of an incoming call. In such a case, because the vibration of the cartilage conduction vibration unit is conducted to all locations on the surface of the mobile telephone, effective notification of an incoming call can be provided.

According to another feature, the cartilage conduction vibration unit is held rigidly within the chassis structure. According to a further specific feature, the cartilage conduction vibration unit is held directly to the chassis structure. These features simplify the holding structure of the cartilage conduction vibration unit and are suitable for effectively transmitting vibration.

According to another feature, the mobile telephone includes a horizontal stationary state detection unit, the vibration of the cartilage conduction vibration unit being stopped whenever a horizontal stationary state has been detected. It is thereby possible to prevent the occurrence of uncomfortable vibration noise at times such as when the mobile telephone is placed on a desk during a telephone call.

According to further specific feature, the mobile telephone includes a touch panel operation surface, wherein the cartilage conduction vibration unit has a dual purpose as a vibration source for feedback for the sensation of a touch panel operation, and the vibration for feedback for the sensation of a touch panel operation in the cartilage conduction vibration unit is not stopped even when the horizontal stationary state is detected. According to another specific feature, the cartilage conduction vibration unit serves a dual purpose for an impact detection function, and the impact detection function in the cartilage conduction vibration unit is not stopped even when the horizontal stationary state is detected. These [features] are suitable for smooth GUI operation.

According to another further specific feature, the cartilage conduction vibration unit serves a dual purpose as a vibration source for providing notification of an incoming call, and the vibration for providing notification of an incoming call in the cartilage conduction vibration unit is not stopped even when the horizontal stationary state is detected. This feature is suitable for accurately providing notification of an incoming call.

<Twelfth Technical Feature>
A twelfth technical feature disclosed in the present specification provides a mobile telephone comprising: a chassis structure having a display surface; and a cartilage conduction vibration unit supported in the chassis structure so as to have a primary vibration surface inclined relative to the display surface. Vibration for cartilage conduction can thereby be conducted to the chassis structure from the direction of incline relative to the display surface.

According to a specific feature, the chassis structure includes an inclined surface parallel to the primary vibration surface. The inclined surface can thereby be brought into contact with the ear cartilage to obtain effective cartilage conduction even while fouling due to the display surface coming into contact with the cheek can be prevented, and a vibration component from the display surface or back surface of the mobile telephone can thereby also be obtained. According to a more specific feature, the chassis structure has a side surface orthogonal to the display surface, wherein an inclined plane is provided between the side surface and the surface parallel to the display surface. The inclined surface can thereby be provided with a design in which a box-type mobile telephone is beveled.

According to another specific feature, the chassis structure has a cylindrical surface containing the cartilage conduction vibration unit. It is thereby possible to obtain cartilage conduction by bringing the ear cartilage up against the cylindrical surface and a desired position on the display surface or back surface, and also possible thereby to bring the cylindrical surface into contact with the ear cartilage to effectively obtain cartilage conduction in the state where the display surface is not in contact with the face.

According to yet another specific feature, the chassis structure includes a side surface orthogonal to the display surface, and the vibration of the primary vibration surface in the cartilage conduction vibration unit is transmitted to a side surface and to the surface parallel to the display surface. It is thereby possible to obtain cartilage conduction in any case where either the side surface or the surface parallel to the display surface is brought into contact with the ear cartilage.

According to another specific feature, the chassis structure has an upper surface orthogonal to the display surface, and the vibration of the primary vibration surface in the cartilage conduction vibration unit is transmitted to the surface parallel to the display surface and to the upper surface. It is thereby possible to obtain cartilage conduction in any case where either the upper surface or the surface parallel to the display surface is brought into contact with the ear cartilage. In such a case, the vibration of the upper surface is suitable for contact in the state where the mobile telephone is pushed up against the ear cartilage while bringing the display surface into contact with the face is being avoided, and also for obtaining the earplug bone conduction effect by pushing stronger to block the external auditory meatus with the tragus. An example of the incline of the primary vibration surface in the cartilage conduction vibration unit is the range of about 30° to 60° relative to the display surface.

According to another specific feature, the vibration of both sides of a pair of opposing primary vibration surfaces in the cartilage conduction vibration unit is transmitted to the chassis structure. The vibration of the pair of primary vibration surfaces of the cartilage conduction vibration unit is thereby effectively utilized. According to further specific feature, the chassis structure has a side surface or upper surface orthogonal to the display surface, and the vibration of both sides of the primary vibration surfaces in the cartilage conduction vibration unit is respectively transmitted to the side surface or upper surface and to the surface parallel to the display surface. The vibration of the pair of primary vibration surfaces of the cartilage conduction vibration unit is thereby utilized as vibration sources having opposite directions. The positions to which the vibration of the pair of primary vibration surfaces is transmitted may be mutually opposing portions of the primary vibration surfaces, but the configuration may also be such that the vibration is respectively transmitted to the side surface or upper surface and to the surface parallel to the display surface from mutually crossing positions.

According to another feature, there is provided a mobile telephone comprising: a chassis structure, and a cartilage conduction vibration unit in which vibration is unrestrictedly permitted in a part of the primary vibration surface and in which another part of the primary vibration surface is supported within the chassis structure. It is thereby possible for the vibration of the cartilage conduction vibration unit to be effectively transmitted to the chassis structure while a loss in the freedom of vibration thereof is avoided.

According to a specific feature, the primary vibration surface at the middle part of the cartilage conduction vibration unit is supported in the chassis structure, and vibration is unrestrictedly permitted in the primary vibration surface at both end parts of the cartilage conduction vibration unit. The middle part at which support occurs may be the middle part of the cartilage conduction vibration unit, but when the behavior during the implementation of the cartilage conduction vibration unit lacks left-right symmetry, in order to compensate therefor, the configuration may also be such that the primary vibration surface is supported in the chassis structure at an off-center middle part.

According to another specific feature, a plurality of portions of the primary vibration surface of the cartilage conduction vibration unit is supported in the chassis structure. According to a more specific feature, the configuration is such that the primary vibration surfaces at both end parts of the cartilage conduction vibration unit are each supported in the chassis structure, and vibration is unrestrictedly permitted at the primary vibration surface in the middle part of the cartilage conduction vibration unit.

According to yet another feature, there is provided a mobile telephone comprising: a chassis structure; and a cartilage conduction vibration unit supported within the chassis structure by the interposition of a vibration conduction elastic body between the primary vibration surfaces. It is thereby possible for the vibration of the cartilage conduction vibration unit to be effectively transmitted to the chassis structure while a loss in the freedom of vibration thereof is avoided.

<Thirteenth Technical Feature>
A thirteenth technical feature disclosed in the present specification provides a mobile telephone configured such that a part of the cartilage conduction vibration unit is supported on the inside of the chassis in the vicinity of a corner part of the chassis and another part vibrates unrestrictedly, whereby the vibration of the cartilage conduction vibration unit is transmitted to the corner part of the chassis. The corner part can thereby effectively be made to vibrate while a structure in which the corner part would be susceptible to collision is avoided.

According to a specific feature, the cartilage conduction vibration unit is supported on the inside of the upper surface of the chassis at the vicinity of the corner part of the chassis. According to another specific feature, the cartilage conduction vibration unit is supported on the inside of a side surface of the chassis in the vicinity of the corner part of the chassis. According to yet another feature, the cartilage conduction vibration unit is supported on the inside of the front surface of the chassis in the vicinity of the corner part of the chassis. The features above can also be combined as appropriate, in terms of the manner in which the cartilage conduction vibration unit is supported.

According to another specific feature, the cartilage conduction vibration unit has an electrical terminal and is supported such that the vicinity of the electrical terminal vibrates unrestrictedly. The cartilage conduction vibration unit can thereby be supported at a position of the chassis closer to the inside of the corner part and the display surface at the corner part can thereby effectively be made to vibrate, without there being any hindrance to the presence of the electrical terminal.

According to another specific feature, the cartilage conduction vibration unit is supported such that the primary vibration direction thereof is perpendicular to the upper surface of the chassis. According to yet another feature, the cartilage conduction vibration unit is supported such that the primary vibration direction thereof is perpendicular to a side surface of the chassis. These features make it possible to adopt a configuration such that the vibration is more effective closer to the upper surface or closer to the side surface of the corner part of the chassis. According to yet another specific feature, the cartilage conduction vibration unit is supported such that the primary vibration thereof is perpendicular to the front surface of the chassis. It is thereby possible to adopt a configuration such that the vibration is more effective closer to the front surface of the corner part of the chassis. According to yet another feature, the cartilage conduction vibration unit is supported such that the primary vibration direction thereof is inclined relative to the front surface of the chassis. It is thereby possible allocate vibration components to the front surface and to the surface orthogonal thereto.

According to another feature, a circuit for the cartilage conduction vibration unit is supported on the inside of the chassis as a vibration unit integrated with the cartilage conduction vibration unit. It is thereby possible to configure the entirety of the cartilage conduction vibration unit and the circuit related thereto as a vibration unit.

According to a more specific feature, the cartilage conduction vibration unit has an electrical terminal, and the circuit for the cartilage conduction vibration unit is arranged in the vicinity of the electrical terminal. It is thereby possible to make effective use of the space in the vicinity of the electrical terminal to configure the vibration unit. According to a more specific feature, the portion of the vibration unit in the vicinity of the electrical terminal is supported. The portion to which the electrical terminal is not provided can thereby be made to unrestrictedly vibrate.

According to another feature, there is provided a mobile telephone configured such that the part of the cartilage conduction vibration unit to which the electrical terminal is not provided is supported on the inside of the chassis, and the other part to which the electrical terminal is provided is made to unrestrictedly vibrate, whereby the vibration of the cartilage conduction vibration unit is transmitted to the exterior of the chassis. The cartilage conduction vibration unit can thereby be supported at a position of the chassis closer to the inside of the corner part and the display surface at the corner part can thereby effectively be made to vibrate, without there being any hindrance to the presence of the electrical terminal.

According to another feature, there is provided a vibration unit characterized by the integration of a cartilage conduction vibration unit having an electrical unit with a circuit for the cartilage conduction vibration unit arranged in the vicinity of the electrical terminal. It is thereby possible to make effective use of the space in the vicinity of the electrical terminal to configure the vibration unit.

According to a specific feature, the circuit has an amplifier for the cartilage conduction vibration unit. The cartilage conduction vibration unit can thereby be effectively supported without the use of the space around the cartilage conduction vibration unit, and the cartilage conduction vibration unit can also thereby be made to vibration efficiently.

According to a specific feature, the circuit has an adjustment unit to electrically compensate for the variances of the cartilage conduction vibration unit. The cartilage conduction vibration unit can thereby be effectively supported without the use of the space around the cartilage conduction vibration unit, and performance can also thereby be maintained relative to the variances in the cartilage conduction vibration unit.

<Fourteenth Technical Feature>

A fourteenth technical feature disclosed in the present specification provides a mobile telephone in which a part of the cartilage conduction vibration unit is supported by the inside of an elastic body, and the outside of the elastic body is arranged at a corner part of the chassis. The freedom of the cartilage conduction vibration unit to vibrate can thereby be ensured, and the vibration thereof can thereby be efficiently guided to the corner part of the chassis for cartilage conduction by contact with the ear.

According to a specific feature, in the mobile telephone, the other part of the cartilage conduction vibration unit is supported by the inside of a second elastic body, and the outside of the second elastic body is arranged at another corner part of the chassis. The cartilage conduction vibration unit can thereby be more reliably supported while the freedom of the cartilage conduction vibration unit to vibrate can be ensured, and also the respective vibrations from both of the support units can thereby be efficiently guided to the corner parts of the chassis for cartilage conduction by contact with the ear.

According to a further specific feature, in the mobile telephone, the cartilage conduction vibration unit is shaped to have two end parts, the two end parts of the cartilage conduction vibration unit each being supported on the insides of the elastic body and second elastic body, and the outsides of the elastic body and the second elastic body are each arranged at opposite corner parts of the chassis. The two end parts of the cartilage conduction vibration unit can thereby be reliably supported and the freedom of both end parts to vibrate can be ensured to a certain degree by the support of the elastic bodies, and also the vibration of both ends can thereby be transmitted for cartilage conduction from either of the opposite corner parts of the chassis.

According to another technical feature, the cartilage conduction vibration unit has an electrical terminal, and one of either of the elastic body or the second elastic body includes an electrical terminal and supports the cartilage conduction vibration unit. It is thereby possible to reliably support the electrical terminal, including the connective wiring thereof, and the cartilage conduction vibration unit even while the freedom thereof to vibrate is ensured to a certain degree, and also thereby possible to also transmit vibration for cartilage conduction from the portion at which the electrical terminal is found.

According to another specific feature, the cartilage conduction vibration unit is eccentric between a corner part and another corner part. It is thereby possible to provide compensation for the imbalance of the cartilage conduction vibration unit, and also the layout of the various parts inside the mobile telephone can be designed with a greater degree of freedom.

According to another specific feature, the elastic body is formed with a material having an acoustic impedance approximating that of the ear cartilage. Effective cartilage conduction can thereby be obtained even while the freedom to vibrate is ensured.

According to another specific feature, in the mobile telephone, elastic bodies are also arranged at two other corner parts of the chassis where the cartilage conduction vibration unit is not arranged and are configured together with the elastic body at the corner part of the chassis where the cartilage conduction vibration unit is arranged so as to attenuate collision from the exterior unit to the four corners of the mobile telephone. The elastic bodies can thereby be given a dual purpose also as protectors for attenuating collision to the corner parts. This feature makes use of the elastic bodies at the corner parts for the dual objectives of appropriately making use of the corner parts of the mobile telephone to make contact with the ear for cartilage conduction and also protecting the corner parts of the mobile telephone, which are susceptible to collision. According to another specific feature, when the cartilage conduction vibration unit is supported such that the primary vibration direction thereof is orthogonal to the front surface of the chassis, the mobile telephone can be brought into contact with the ear for cartilage conduction without any change in the level of comfort experienced with a normal telephone call.

According to another feature, there is provided a mobile telephone in which a very slight stepped concavity is provided to the surface of the mobile telephone and the cartilage conduction vibration unit is arranged on the base surface of the concavity. It is thereby possible to protect the cartilage conduction vibration unit from a collision to the mobile telephone from an external unit, and also thereby possible to use the elastic deformation thereof to readily bring the cartilage conduction vibration unit into contact with the ear cartilage. According to a specific feature, the arrangement is such that the vibration surface of the cartilage conduction vibration unit is positioned on the base surface of the concavity, thus achieving efficient cartilage conduction. According to a more specific feature, a protective layer is provided to the vibration surface; wherever possible, the ear cartilage is brought into direct contact with the vibration surface, and damage to the vibration surface is prevented. According to another specific feature, the concavity is provided to a side surface of the mobile telephone, whereby the advantages of having the concavity can suitably be enjoyed.

According to another feature, there is provided a mobile telephone provided with a plurality of cartilage conduction vibration units having primary vibration surfaces which are not mutually parallel. Effective cartilage conduction is thereby possible in a plurality of directions. According to a specific feature, the primary vibration surface of one of the plurality of cartilage conduction vibration units is substantially parallel to a side surface of the mobile telephone, and the primary vibration surface of another one of the plurality of cartilage conduction vibration units is substantially parallel to the front surface of the mobile telephone. Cartilage conduction from the side surface, which is very advantageous, is thereby possible, as is cartilage conduction from the front surface, which is no less comfortable than when a mobile telephone is normally used.

According to another specific feature, an arrangement is employed in which the cartilage conduction vibration units are mutually parallel in the longitudinal direction. According to yet another specific feature, an arrangement is employed in which the cartilage conduction vibration units are not mutually parallel in the longitudinal direction.

<Fifteenth Technical Feature>

A fifteenth technical feature disclosed in the present specification provides a mobile telephone comprising: a plurality of elastic bodies arranged at each of a plurality of corner parts of the chassis; and cartilage conduction vibration units provided to each of the plurality of elastic bodies. There is thereby provided a mobile telephone in which the corner parts of the mobile telephone can be brought up against the ear cartilage for cartilage conduction and in which the cartilage conduction vibration units arranged at the corner parts can be protected from collision with an external unit.

According to a specific feature, the cartilage conduction vibration units are provided to the elastic bodies so as not to be exposed at the outer surfaces of the mobile telephone. According to a more specific feature, each of the cartilage conduction vibration units is embedded in the elastic bodies. According to yet another specific feature, each of the cartilage conduction vibration units is provided to the insides of the elastic bodies.

According to another specific feature, the plurality of cartilage conduction vibration units provided to each of the elastic bodies is given respectively different vibration directions. It is thereby possible to obtain favorable cartilage conduction whenever an elastic body is held to the ear cartilage from different directions. According to a more specific feature, the cartilage conduction vibration units can be controlled mutually independently.

According to another specific feature, the cartilage conduction vibration units provided to the elastic bodies are electromagnetic vibrators. An electromagnetic vibrator, similarly with respect to a piezoelectric bimorph element, is an example of an element suitable for providing a vibration source in the cartilage conduction vibration units.

According to another feature, there is provided a mobile telephone comprising elastic bodies arranged on the chassis and cartilage conduction vibration units provided to the elastic bodies, wherein the elastic bodies and the cartilage conduction vibration units are configured as replaceable unit parts. It is thereby also possible, among other possibilities, to facilitate replacing the elastic bodies and cartilage conduction vibration units, and to provide a product having different cartilage conduction vibration units while other parts are essentially the same.

According to another feature, there is provided a mobile telephone comprising: a plurality of cartilage conduction vibration units provided to the chassis and given different vibration directions; and a controller for independently controlling each of the plurality of cartilage conduction vibration units. It is thereby possible to obtain favorable cartilage conduction whenever an elastic body is held to the ear cartilage from different directions. According to a more specific feature, the plurality of provided cartilage conduction vibration units is controlled in accordance with the posture of the mobile telephone, and control in accordance with the direction in which an elastic body is held against the ear becomes possible.

According to another feature, there is provided a mobile telephone comprising: elastic bodies arranged on the chassis and including unrestrictedly vibrating parts where vibration is not controlled; and cartilage conduction vibration units provided to the unrestrictedly vibrating parts of the elastic bodies. The vibration of the cartilage conduction vibration units is thereby more favorably transmitted to the elastic bodies.

According to a specific feature, the unrestrictedly vibrating parts are elongated parts elongated to the inside of the chassis. It is thereby possible to appropriately hold the cartilage conduction vibration units within the mobile telephone even while vibration can be favorably transmitted.

According to a specific feature, the unrestrictedly vibrating parts face a window unit provided to the chassis. The vibration of the cartilage conduction vibration units can thereby be favorably transmitted via the window unit. According to a more specific feature, the unrestrictedly vibrating parts cover the window unit and have a rear surface facing the window unit, the cartilage conduction vibration units being provided to the rear surface. The vibration of the cartilage conduction vibration units provided to the inside of the mobile telephone can thereby be favorably transmitted to the elastic bodies via the window unit.

According to another feature, there is provided a mobile telephone comprising: elastic bodies arranged on a chassis; cartilage conduction vibration units provided to the elastic units; and balancers provided to the cartilage conduction vibration units. It is thereby possible to adjust the acoustic properties of the cartilage conduction vibration units transmitted to the elastic bodies.

<Sixteenth Technical Feature>

A sixteenth technical feature disclosed in the present specification provides a mobile telephone comprising: a cartilage conduction vibration unit; an air conduction generation unit; and selection means for making a selection between a state for generating, and a state for not generating, vibration from the air conduction generation unit. A variety of different uses are thereby made possible, and the ability to select the state for not generating vibration from the air conduction generation unit permits usage adapted to take the surroundings into consideration and/or adapted for privacy protection. The air conduction generation unit may also be configured so as to have a hollow box structure, according to need, in a case where there is a desire for vigorously generated air conduction.

According to a specific feature, the air conduction generation unit is configured such that the air conduction generation unit is made to vibrate by the transmission of the vibration of the cartilage conduction vibration unit, and the transmission of vibration from the cartilage conduction vibration unit is cut off whenever the selection means is used to select the state for not generating vibration from the air conduction generation unit. It is thereby made possible to select between a state for generating, and a state for not generating, vibration from the air conduction generation unit using the cartilage conduction vibration unit as a vibration source.

According to a more specific feature, the mobile telephone includes a vibration conductor for relaying the vibration of the cartilage conduction vibration unit to the air conduction vibration unit, and the relay of vibration to the air conduction generation unit is cut off whenever the selection means is used to select the state for not generating vibration from the air conduction generation unit. In the case where such a vibration conductor is employed, it becomes possible to select between a state for generating, and a state for not generating, vibration from the air conduction generation unit even though the cartilage conduction vibration unit and the air conduction generation unit are affixed together.

According to another specific embodiment, there is a sliding function by which the selection means can slide between a position for generating, and a position for not generating, the vibration from the air conduction generation unit. According to yet another specific feature, there is a rotation function by which the selection means can be rotated between a position for generating, and a position for not generating, the vibration from the air conduction generation unit. In the cases where a mobile function is employed, it is also possible to configure such that at least a part of at least one of either the cartilage conduction vibration unit or the air conduction generation unit can be moved by the selection means.

According to another specific feature, the air conduction generation unit includes a vibration source, and the selection means stops the generation of vibration from the vibration source of the air conduction generation unit in the state for not generating the vibration from the air conduction generation unit. It is thereby possible to select whether or not air conduction is to be generated even in a configuration lacking moveable parts.

According to another specific feature, there is an environmental noise detection unit, and the selection means automatically selects the state for not generating the vibration from the air conduction generation unit whenever the environmental noise detected by the environmental noise detection unit is at or below a predetermined loudness. It is thereby possible to automatically select a state adapted to take the surroundings into consideration and/or adapted for privacy protection in the state where the surroundings are silent.

According to another feature, there is provided a mobile telephone comprising: an audio generation unit; a pressure sensor for detecting pressure on the audio generation unit; and an automatic adjustment unit for automatically changing the state of audio generated from the audio generation unit on the basis of the pressure detected by the pressure sensor. It is thereby possible to automatically change the state of audio generated from the audio generation unit on the basis of the natural operation of pressing the audio generation unit up against the ear. According to a specific feature, the audio generation unit is an air conduction speaker. According to another specific feature, the automatic adjustment unit automatically adjusts the volume or acoustics of the audio generated from the audio generation unit.

According to another specific feature, the automatic adjustment unit changes the state of audio generated in one direction from an initial state and maintains the changed state in accordance with an increase in pressure from the pressure sensor, and returns the state of audio generated to the initial state in accordance with a predetermined reduction or greater reduction in pressure from the pressure sensor. It is thereby possible to change the state of audio generated on the basis of a natural operation, and also to avoid an unintentional change in the state of audio generated. According to another specific feature, the automatic adjustment unit automatically changes the state of audio generated from the audio generation unit when a change in pressure from the pressure sensor continues for a predetermined period of time or longer, and does not respond to a change in pressure that does not meet the predetermined period of time. It is thereby possible to avoid an unintentional change in the state of audio generated.

According to another feature, there is provided a mobile telephone characterized by comprising a right ear audio generation unit, and a left ear audio generation unit arranged at a different position than that of the right ear audio generation unit. It is thereby possible to achieve a natural posture for holding the mobile telephone up against the ear. According to a specific feature, the right ear audio generation unit and the left ear audio generation unit are each arranged at two corner parts at the upper part of the mobile telephone. According to another specific feature, a large-screen display unit is arranged on the same surface on which the right ear audio generation unit and the left ear audio generation unit are arranged. According to another specific feature, each of the right ear audio generation unit and the left ear audio generation unit air conduction speakers.

According to another feature, there is provided a mobile telephone in which a large-screen display unit is provided, and air conduction speakers are provided to the corner parts at the upper part of the surface to which the large-screen display unit is provided. It is thereby possible to achieve a natural posture for effectively holding the air conduction speakers against the ear even while interference between the large-screen display unit and the face is avoided.

<Seventeenth Technical Feature>

A seventeenth technical feature disclosed in the present specification provides a mobile telephone comprising: a pair of cartilage conduction vibration units; a sound source signal unit; and drive units for driving each of the pair of cartilage conduction vibration units in a mutually phase-inverted waveform on the basis of a sound source signal from the sound source signal unit. It is thereby possible to obtain cartilage conduction by contact with each of the pair of cartilage conduction vibration units, and also thereby possible to substantially eliminate air conduction that is based on the vibration of the pair of cartilage conduction vibration units.

According to a specific feature, the pair of cartilage conduction vibration units is provided to each of the pair of corner parts at the upper part of the mobile telephone, which are suitable for contact against the ear cartilage. According to a further specific feature, elastic body units are provided to the pair of corner parts, and the pair of cartilage conduction vibration units is supported on the elastic body units. It is thereby possible to protect the cartilage conduction vibration units from collision with an external unit.

According to a further specific feature, the outer surface of the elastic body units is beveled so as to have a smoothly convex shape, thus achieving suitable contact with the ear cartilage. According to another specific feature, the cartilage conduction vibration units include a piezoelectric bimorph element or an electromagnetic vibrator.

According to another specific feature, the drive units are capable of switching between a mode for driving each of the pair of cartilage conduction vibration units in mutually inverted waveforms on the basis of a sound source signal from the sound source signal unit, and a mode for driving each of the pair of cartilage conduction vibration units in mutually identical waveforms on the basis of a sound source signal from the sound source signal unit. It is thereby possible to switch between eliminating and increasing air conduction.

According to yet another specific feature, there is an environmental noise detection unit, and the drive units drive each of the pair of the cartilage conduction vibration units in mutually inverted waveforms on the basis of a sound source signal from the sound source signal unit whenever the environmental noise detected by the environmental noise detection unit is at or below a predetermined loudness. It is thereby possible to automatically eliminate air conduction when the environment is silent.

According to yet another specific feature, it is possible to adjust the balance for driving each of the pair of cartilage conduction vibration units in mutually inverted waveforms on the basis of a sound source signal from the sound source signal unit. It is thereby possible to effectively eliminate air conduction and also to regulate the state where air conduction is eliminated.

According to yet another feature, the drive units are capable of driving only one of the pair of cartilage conduction vibration units. It is thereby possible to avoid driving uselessly when there is no need to eliminate air conduction.

According to a more specific feature, the mobile telephone includes an environmental noise detection unit, and the drive units drive each of the pair of cartilage conduction vibration units in mutually inverted waveforms on the basis of a sound source signal from the sound source signal unit whenever the environmental noise detected by the environmental noise detection unit is at or below a predetermined loudness, and drive only one of the pair of cartilage conduction vibration units whenever the environmental noise detected by the environmental noise detection unit is at or above a predetermined loudness. It is thereby possible to cause only the cartilage conduction vibration unit that is in contact with the ear cartilage to vibrate, and in such a state to cause the other cartilage conduction vibration unit to vibrate in an inverted waveform and automatically eliminate air conduction when the environment becomes silent.

According to another feature, there is provided a mobile telephone in which the cartilage conduction vibration units are provided to the pair of corner parts at the upper part of the mobile telephone, and the outer surface of the corner parts is beveled so as to have a smoothly convex shape. It is thereby made possible to make contact with the ear cartilage without incurring substantial pain and also possible to comfortably listen by cartilage conduction with the corner parts appropriately fitted to the cartilage around the external auditory meatus.

According to another feature, there is provided a mobile telephone comprising: a pair of cartilage conduction vibration units; a sound source signal unit; drive units capable of driving each of the pair of cartilage conduction vibration units on the basis of a sound source signal from the sound source signal unit; a selection unit for selecting a cartilage conduction vibration unit to be driven by a drive unit; and a controller for controlling the waveform inversion of the sound source signal from the sound source signal unit. The pair of cartilage conduction vibration units can thereby be used to achieve a variety of different forms of cartilage conduction.

<Eighteenth Technical Feature>

An eighteenth technical feature disclosed in the present specification provides a mobile telephone comprising a surface of the outer wall and a vibration source arranged inward from the surface of the outer wall, wherein when the vibration of the vibration source is transmitted to the surface of the outer wall, and the surface of the outer wall is brought into contact with at least a part of the ear cartilage around the entrance part of the external auditory meatus without making contact with the auricular helix, the sound pressure inside the external auditory meatus at about 1 cm from the entrance part of the external auditory meatus has an increase of at least 10 dB over that in the non-contact state. A mobile telephone in which it is possible to listen to sound by cartilage conduction can thereby be provided.

According to another feature, there is provided a mobile telephone comprising an surface of the outer wall and a vibration source arranged inward from the surface of the outer wall, wherein when the vibration of the vibration source is transmitted to the surface of the outer wall, and the surface of the outer wall is brought into contact with at least a part of the ear cartilage around the entrance part of the external auditory meatus without making contact with the auricular helix, the sound pressure inside the external auditory meatus at about 1 cm from the entrance part of the external auditory meatus changes by at least 5 dB due to the change in contact pressure. A mobile telephone by which the volume can be changed by a change in contact pressure during cartilage conduction can thereby be provided.

According to another feature, there is provided a mobile telephone comprising an surface of the outer wall and a vibration source arranged inward from the surface of the outer wall, wherein when the vibration of the vibration source is transmitted to the surface of the outer wall, and the entrance part of the external auditory meatus is occluded by the surface of the outer wall being brought into contact with at least a part of the ear cartilage around the entrance part of the external auditory meatus without contact being made with the auricular helix, the sound pressure in the external auditory meatus at about 1 cm from the entrance part of the external auditory meatus has an increase of at least 20 dB compared to the non-contact state. A mobile telephone by which it is possible to listen to sound by the earplug bone conduction effect during cartilage conduction can thereby be provided.

According to the specific features above, the sound pressure that is increased or changed is at 1,000 Hz.

According to yet another feature, the increase or change in sound pressure is in a state where the output of the vibration source is not changed. The sound pressure is thereby increased or changed without the volume being altered.

According to another specific feature, the state where the surface of the outer wall is brought into contact with at least a part of the ear cartilage around the entrance part of the external auditory meatus without making contact with the auricular helix is a state where the surface of the outer wall is brought into contact with the outside of the tragus. According to a more specific feature, the state where the sound pressure in the external auditory meatus at about 1 cm from the entrance part of the external auditory meatus is increased by at least 10 dB when the surface of the outer wall is brought into contact with at least a part of the ear cartilage around the entrance part of the external auditory meatus without making contact with the auricular helix, compared to the non-contact state, is one where the contact pressure of the surface of the outer wall against the outside of the tragus is 250 g.

According to another specific feature, the vibration source is arranged such that the vibration thereof is transmitted to the surface of the corner parts of the outer wall, and the state where the surface of the outer wall is brought into contact with at least a part of the ear cartilage around the entrance part of the external auditory meatus without making contact with the auricular helix is a state where the surface of the corner parts of the outer wall is brought into contact with the outside of the tragus. It is thereby possible to achieve contact suitable for obtaining cartilage conduction in the mobile telephone.

According to a more specific feature, the corner parts of the outer wall are constituted of a different material from the other portions of the outer wall. According to another more specific feature, the vibration source is either held inside the outer wall at the corner parts of the outer wall or is held inside the corner parts of the outer wall.

According to another feature, there is provided a mobile telephone comprising a surface of an outer wall, a vibration source arranged inward from the surface of the outer wall, and volume adjustment means, the vibration of the vibration source being transmitted to the surface of the outer wall and sound being listened to by the contact of the surface of the outer wall with at least a part of the ear cartilage around the entrance part of the external auditory meatus without contact with the auricular helix, wherein: in a room where the noise level (the A-weighted sound pressure level) is 45 dB or less, [the mobile telephone] being brought into proximity with the entrance part of the external auditory meatus and the surface of the outer wall being arranged so as to not be in contact, the volume is minimized and pure sound at 1,000 HZ is generated from the vibration source, and also narrow-band noise (⅓ octave-band noise) at a marginal level where the pure sound at 1,000 Hz is masked and cannot be heard is generated from a loudspeaker at a position separated from the entrance part of the external auditory meatus by 1 m. When the narrow-band noise at 1,000 Hz is subsequently increased by 10 dB from the marginal level, bringing the surface of the outer wall into contact with at least a part of the ear cartilage around the entrance part of the external auditory meatus without making contact with the auricular helix makes it possible to listen to pure sound at 1,000 Hz without the need to adjust or change the volume adjusting means. A mobile telephone in which the volume can be changed by a change in contact pressure during cartilage conduction can thereby be provided.

According to another feature, there is provided a mobile telephone comprising a surface of an outer wall, a vibration source arranged inward from the surface of the outer wall, and volume adjustment means, the vibration of the vibration source being transmitted to the surface of the outer wall and sound being listened to by the contact of the surface of the outer wall with at least a part of the ear cartilage around the entrance part of the external auditory meatus without contact with the auricular helix, wherein: in a room where the noise level (the A-weighted sound pressure level) is 45 dB or less, [the mobile telephone] being brought into proximity with the entrance part of the external auditory meatus and the surface of the outer wall being arranged so as to not be in contact, the volume is minimized and pure sound at 1,000 HZ is generated from the vibration source, and also narrow-band noise (⅓ octave-band noise) at a marginal level where the pure sound at 1,000 Hz is masked and cannot be heard is generated from a loudspeaker at a position separated from the entrance part of the external auditory meatus by 1 m. When the narrow-band noise at 1,000 Hz is subsequently increased by 20 dB from the marginal level, bringing the surface of the outer wall into contact with at least a part of the ear cartilage around the entrance part of the external auditory meatus without making contact with the auricular helix to occlude the entrance part of the external auditory meatus makes it possible to listen to pure sound at 1,000 Hz without the need to adjust or change the volume adjusting means.

<Nineteenth Technical Feature>

A nineteenth technical feature disclosed in the present specification provides a sound output device in which the vibration of a vibration source arranged inward from the surface of an outer wall is transmitted to the surface of the outer wall, and sound is listened to by the contact of the surface of the outer wall with at least a part of the ear cartilage around the entrance part of the external auditory meatus, wherein the vibration source causes there to be generated, from the surface of the outer wall, air conduction of a frequency characteristic trending inversely with respect to the frequency characteristic during cartilage conduction. It is thereby possible for the frequency characteristic during cartilage conduction and the frequency characteristic of the vibration source to be complementary to each other and, as a result, for the frequency characteristic of the sound reaching the tympanic membrane to approach flatness.

According to a specific feature, the average air conduction generated by the vibration source from the surface of the outer wall from 500 Hz to 1 kHz is 5 dB less than the average air conduction generated by the vibration source from the surface of the outer wall from 1 kHz to 2.5 kHz.

According to another specific feature, [the sound output device] is provided with an equalizer for correcting the frequency characteristic in consideration of the frequency characteristic specific to cartilage conduction in regard to the vibration source is driven by a sound source signal of the sound source signal output unit. It is thereby made possible for frequency characteristic of the sound reaching the tympanic membrane to approach flatness in consideration of the frequency characteristic of the cartilage conduction.

According to a more specific feature, the equalizer corrects for the frequency characteristic, which is different from when the external auditory meatus is in an open state, when the vibration source is driven in the state where the external auditory meatus is occluded. It is thereby made possible for the frequency characteristic of the sound reaching the tympanic membrane to approach flatness in consideration of the frequency characteristic of cartilage conduction during the state where the earplug bone conduction effect occurs.

According to another specific feature, there is a low-pass filter for correcting the frequency characteristic in consideration of the frequency characteristic specific to cartilage conduction in terms of the manner in which the vibration source is driven by a sound source signal of the sound source signal output unit. According to a further specific feature, the low-pass filter trims frequencies at 2.5 kHz and higher when the sound output device is used in a mobile telephone. In yet another specific feature, the low-pass filter trims frequencies at 10 kHz and higher when the sound output device is used in an audio device. Concern can thereby be given to the surroundings during, for example, silence.

According to another feature, there is provided a sound output device which includes a sound source signal output unit for outputting a sound source signal, a surface of an outer wall, a vibration source arranged inward from the surface of the outer wall and driven by the sound source signal from the sound source signal output unit, and an air conduction generation unit drive by the sound source signal from the sound source signal output unit, wherein the air conduction generated by the transmission of the vibration of the vibration source to the surface of the outer wall has a different frequency characteristic from that of the air conduction generated form the air conduction generation unit, it being possible to listen to sound by direct air conduction generated from the air conduction generation unit or by air conduction through cartilage conduction when the surface of the outer wall is brought into contact with at least a part of the ear cartilage around the entrance part of the external auditory meatus. The uncomfortable change in acoustics depending on the manner in which sound is being listened to can thereby be attenuated.

According to another feature, there is provided a sound output device which includes a sound source signal output unit for outputting a sound source signal, a surface of an outer wall, a vibration source arranged inward from the surface of the outer wall and driven by the sound source signal from the sound source signal output unit, and an air conduction generation unit drive by the sound source signal from the sound source signal output unit, wherein the frequency characteristic of the drive signal when the vibration source is driven by the sound source signal is different from the frequency characteristic of the drive signal when the air conduction generation unit is driven by the sound source signal, it being possible to listen to sound by direct air conduction generated from the air conduction generation unit or by air conduction through cartilage conduction when the surface of the outer wall is brought into contact with at least a part of the ear cartilage around the entrance part of the external auditory meatus. The uncomfortable change in acoustics depending on the manner in which sound is being listened to can thereby be attenuated.

According to another feature, there is provided a sound output device which includes a vibration source arranged inward from the surface of an outer wall, a sound source signal output unit for outputting a sound source signal, and an equalizer for correcting the frequency characteristic in consideration of the frequency characteristic specific to cartilage conduction in regard to the vibration source being driven by the sound source signal of the sound source signal unit, wherein the vibration of the vibration source is transmitted to the surface of the outer wall, and the surface of the outer wall is brought into contact with at least a part of the ear cartilage around the entrance part of the external auditory meatus, whereby it is possible to listen to sound. It is thereby possible for consideration to be given to the frequency characteristic during cartilage conduction and, as a result, for the frequency characteristic of sound reaching the tympanic membrane to approach flatness. According to a specific feature, the equalizer corrects for the frequency characteristic, which is different from when the external auditory meatus is in an open state, in regard to driving of the vibration source in the state where the external auditory meatus is occluded. According to a more specific feature, [the sound output device] is provided with a detection unit for detecting whether or not the external auditory meatus is in an occluded state, and the equalizer automatically switches to the state where the frequency characteristic is corrected, on the basis of the detection by the detection unit. According to another more specific feature, [the sound output device] is provided with a low-pass filter for correcting the frequency characteristic in consideration of the frequency characteristic specific to cartilage conduction in regard to driving of the vibration source by the sound source signal of the sound source signal unit, and, when the equalizer corrects the frequency characteristic in the state where the external auditory meatus is occluded, the state is considered not to be silent, and the low-pass filter is made not to function.

According to another feature, there is provided a sound output device which includes a vibration source arranged inward from the surface of an outer wall, a sound source signal output unit for outputting a sound source signal, and a low-pass filter for correcting the frequency characteristic in consideration of the frequency characteristic specific to cartilage conduction in regard to driving of the vibration source by the sound source signal of the sound source signal output unit, wherein the vibration of the vibration source is transmitted to the surface of the outer wall, and the surface of the outer wall is brought into contact with at least a part of the ear cartilage around the entrance part of the external auditory meatus, whereby it is possible to listen to sound. Concern can thereby be given to the surroundings during, for example, silence. According to a specific feature, it is possible to switch between whether or not the low-pass filter is made to function. It is thereby possible to provide support for times of silence and to properly use an emphasis on acoustics. According to a more specific feature, [the sound output device] is provided with an environmental noise detection unit for detecting environmental noise, and there is an automatic switch for whether or not the low-pass filter is made to function, on the basis of the detection results from the environmental detection unit.

According to another feature, there is provided a sound output device which includes a vibration source arranged inward from the surface of an outer wall, and a sound source signal output unit for outputting a sound source signal, wherein the vibration of the vibration source is transmitted to the surface of the outer wall, and the surface of the outer wall is brought into contact with at least a part of the ear cartilage around the entrance part of the external auditory meatus, whereby it is possible to listen to sound; the sound output device being characterized in that the frequency characteristic is different when the external auditory meatus is in an occluded state and when the external auditory meatus is in an open state, in regard to driving of the vibration source by the sound source signal of the sound source signal output unit. It is thereby possible to reduce the discomfort arising from the presence or absence of the earplug bone conduction effect.

<Twentieth Technical Feature>

A twentieth technical feature disclosed in the present specification provides a mobile telephone comprising: a cartilage conduction vibration source; an outer surface having no localized projections; a cartilage contact unit on the outer surface, to which the vibration of the cartilage conduction vibration source is transmitted such that the amplitude or the acceleration of the vibration reaches a maximum; and a cartilage non-contact unit on the outer surface exhibiting an amplitude or acceleration of vibration less than that at the cartilage contact unit. The vibration energy of the cartilage conduction vibration source is thereby concentrated on the cartilage contact unit and the dispersion to the cartilage non-contact unit is thereby reduced. The usage of the mobile telephone will also not be hindered, because the cartilage contact unit is set to the outer surface having no localized projections.

According to another feature, there is provided a mobile telephone comprising: a cartilage conduction vibration source; an outer surface; a cartilage contact unit on the outer surface, which is set to a position removed from both the central up-down axis and central left-right axis of the outer surface and to which the vibration of the cartilage conduction vibration source is transmitted such that the amplitude or the acceleration of the vibration reaches a maximum; and a cartilage non-contact unit on the outer surface exhibiting an amplitude or acceleration of vibration less than that at the cartilage contact unit. Because the cartilage contact unit is set to a position removed from both the central up-down axis and the central left-right axis of the outer surface, the resulting arrangement is suitable for contact with the ear cartilage at the entrance part of the external auditory meatus.

According to a specific feature, the cartilage contact unit is set to a corner part of the upper part of the mobile telephone. The resulting configuration is thereby suitable for bringing the surface of the outer wall into contact with at least a part of the ear cartilage around the entrance part of the external auditory meatus without making contact with the auricular helix.

According to a more specific feature, cartilage contact units are set in each of the pair of corner parts at the upper part of the mobile telephone. It is thereby possible to concentrate the vibration energy of the cartilage conduction vibration source on the ear cartilage both when the mobile telephone is held up against the right ear and when the mobile telephone is held up against the left ear.

According to another specific feature, the amplitude or the acceleration of vibration in the cartilage non-contact unit is ¼ or less the acceleration of vibration in the cartilage contact unit. The vibration energy of the cartilage conduction vibration source can thereby be concentrated on the cartilage contact unit and the dispersion to the cartilage non-contact unit can thereby be reduced.

According to another specific feature, the amplitude or the acceleration of vibration in the cartilage non-contact unit reduces monotonically as the distance from the cartilage contact unit increases. The vibration energy of the cartilage conduction vibration source can thereby be concentrated on the cartilage contact unit and the dispersion to the cartilage non-contact unit can thereby be reduced.

According to another feature, there is provided a mobile telephone comprising: a cartilage conduction vibration source; a chassis; a cartilage contact unit for holding the cartilage conduction vibration source so as not to be in contact with the chassis; and an anti-vibration material interposed between the cartilage contact unit and the chassis of the mobile telephone. The vibration energy of the cartilage conduction vibration source can thereby be concentrated on the cartilage contact unit.

According to a more specific feature, the aforesaid cartilage contact unit is constituted of a hard material, and the aforesaid anti-vibration material is constituted of an elastic body. The vibration energy of the cartilage conduction vibration source can thereby be concentrated on the cartilage contact unit.

As another element for concentrating the vibration energy of the cartilage conduction vibration source onto the cartilage contact unit, it is also suitable: to avoid the primary vibration direction of the cartilage conduction vibration source and support the same on the chassis of the mobile telephone; to reduce the surface area of contact between the cartilage contact unit and the chassis of the mobile telephone supporting the same; to limit the position at which the cartilage conduction vibration source is held to the vicinity of the cartilage contact unit; to make the cartilage contact material of a different material from that of the chassis of the mobile telephone; and the like. In addition to the cases of the independent usage of such elements, it is also possible to employ an appropriate combination of a plurality of elements.

According to another feature, there is provided a mobile telephone comprising: a cartilage conduction vibration source; a T-coil; and a controller for preventing the cartilage conduction vibration source from vibrating whenever the T-coil is being used. The greater discomfort that occurs compared to listening to sound using the T-coil is thereby prevented, and the unnecessary consumption of power by cartilage conduction when the T-coil is operating is thereby prevented. In the description above, in a preferred configuration, to prevent accidental conflation where cartilage conduction is turned off in tandem when the T-coil is turned on by a mistaken operation, the T-coil will not turn on unless a special operation is intentionally done.

<Twenty-First Technical Feature>

A twenty-first technical feature disclosed in the present specification provides a mobile telephone comprising: a telephone function unit; a cartilage conduction vibration unit; an application processor for controlling the telephone function unit; a power management unit for supplying a plurality of different voltages to the telephone function unit; a drive circuit for driving the cartilage conduction vibration unit on the basis of the power supplied from the power management; and a controller for controlling the power management unit and the drive circuit on the basis of an instruction from the application processor. The cartilage conduction vibration unit can thereby be driven directly, and power voltage can be supplied to the cartilage conduction vibration unit integratedly with the supply of power voltage to the various constituent elements inside the mobile telephone, other integrated forms of control also being possible as well. According to a more specific feature, the power management unit, the drive circuit, and the controller are configured as a single-chip integrated circuit.

According to another specific feature, the drive circuit has a boosted-voltage circuit, and the integrated circuit has a connective terminal for external attachment of a condenser for the boosted-voltage circuit. The cartilage conduction vibration element (piezoelectric bimorph) can thereby be driven without the need to add a separate chip for the boosted-voltage circuit.

According to another specific feature, the mobile telephone is controlled by a controller and has a cartilage conduction acoustic processing for an audio signal for driving the cartilage conduction vibration unit. It is thereby possible to integrate the control of the power management with the control for acoustic processing. Accordingly, the mobile telephone can be endowed with a suitable cartilage conduction function merely by a normal audio signal being inputted to the integrated IC and the cartilage conduction vibration unit being connected to the integrated IC. According to a more specific feature, the power management unit, the drive circuit, the controller, and the cartilage conduction acoustic processing unit are configured as a single-chip integrated circuit.

According to another specific feature, the mobile telephone includes a speaker, a microphone, and an analog front-end unit by which the speaker and microphone are connected, the analog front-end unit being controlled by the controller. The output of audio signals can thereby be collectively switched and adjusted. Specifically, the transfer of digital control signals between the integrated IC and the application processor, the digital control signals relating to the functions of the overall mobile telephone inclusive of the functions of the cartilage conduction vibration unit, can be integrated with the transfer of analog audio signals between the integrated IC and the application processor. According to a more specific feature, the analog front-end unit switches between driving the cartilage conduction vibration unit and driving the speaker on the basis of the control by the controller. According to another more specific feature, the power management unit, the drive circuit, the controller, the cartilage conduction acoustic processing unit, and the analog front-end unit are configured as a single-chip integrated circuit.

According to another feature, there is provided a mobile telephone comprising: a telephone function unit; a cartilage conduction vibration unit; an application processor for controlling the telephone function unit; a power management unit for supplying a plurality of different voltages to the telephone function unit; a cartilage conduction acoustic processing unit for an audio signal for driving the cartilage conduction vibration unit; and a controller for controlling the power management unit and the cartilage conduction acoustic processing unit on the basis of an instruction from the application processor. The control for acoustic processing relating to cartilage conduction can thereby be integrated with the control for power management. According to a specific feature, the power management unit, the cartilage conduction acoustic processing unit, and the controller are configured as a single-chip integrated circuit.

According to another specific feature, the mobile telephone has a speaker, a microphone, and an analog front-end unit by which the speaker and microphone are connected, the analog front-end unit being controlled by the controller. The output of audio signals can thereby be collectively switched and adjusted. According to a more specific feature, the analog front-end unit switches between driving the cartilage conduction vibration unit and driving the speaker on the basis of the control by the controller. According to yet another more specific feature, the power management unit, the cartilage conduction acoustic processing unit, the controller, and the analog-front end unit are configured as a single-chip integrated circuit.

According to another feature, there is provided a single-chip integrated circuit which includes: a power management unit for supplying a plurality of different voltages for telephone functions; a connecting part by which a cartilage conduction vibration element, which is one of the constituent elements of the cartilage conduction vibration unit, is connected; a drive circuit for driving the cartilage conduction vibration unit on the basis of the power supplied from the power management; and a controller for controlling the power management unit and the drive circuit on the basis of digital data from an external unit. The cartilage conduction vibration unit can thereby be driven directly, and power voltage can be supplied to the cartilage conduction vibration unit integratedly with the supply of power voltage to the various constituent elements inside the mobile telephone, it being possible to also integrate the control thereof.

According to a specific feature, the drive circuit has a boosted-voltage circuit, and the integrated circuit has a connective terminal for external attachment of a condenser for the boosted-voltage circuit. The cartilage conduction vibration element (piezoelectric bimorph) can thereby be driven merely by the single-chip integrated circuit.

According to another specific feature, the single-chip integrated circuit is controlled by the controller and has a cartilage conduction acoustic processing unit for an audio signal for driving the cartilage conduction vibration unit. It is thereby possible to integrate the control of the power management with the control for acoustic processing. According to another specific feature, the single-chip integrated circuit includes a connecting part for the speaker, a connecting part for the microphone, and an analog front-end unit connected to each of the connecting parts, the analog front-end unit being controlled by the controller. According to a more specific feature, the analog front-end unit switches between driving the cartilage conduction vibration unit and driving the speaker on the basis of the control by the controller.

According to another feature, there is provided a single-chip integrated circuit which includes: a power management unit for supplying a plurality of different voltages for telephone functions; a connecting part by which a cartilage conduction vibration element, which is one of the constituent elements of the cartilage conduction vibration unit, is connected; an audio signal acoustic processing unit for an audio signal for driving the cartilage conduction vibration unit; and a controller for controlling the power management unit and the cartilage conduction acoustic processing unit on the basis of digital data from an external unit. According to a specific feature, the single-chip integrated circuit includes a connecting part for the speaker, a connecting part for the microphone, and an analog front-end unit connected to each of the connecting parts, the analog front-end unit being controlled by the controller. According to a more specific feature, the analog front-end unit switches between driving the cartilage conduction vibration unit and driving the speaker on the basis of the control by the controller.

<Twenty-Second Technical Feature>

A twenty-second technical feature disclosed in the present specification provides a mobile telephone comprising: a cartilage conduction vibration source provided inside a chassis; and an elastic body integrally affixed to and covered by the exterior of the chassis. The vibration of the chassis of the mobile telephone is thereby suppressed and sound leakage due to the generation of air conduction sound is thereby attenuated. According to a specific feature, the mobile telephone has a cartilage conduction unit for conducting the vibration of the cartilage conduction vibration source and for making contact with the ear cartilage, it being thus possible to listen to sound by cartilage conduction even while sound leakage to the surroundings due to the generation of air conduction sound is attenuated.

According to a more specific feature, the cartilage conduction unit is an elastic body. The elastic body has an acoustic impedance approximating that of ear cartilage, wherefore it is possible to listen to sound by cartilage conduction even when sound leakage to the surroundings due to the generation of air conduction sound is attenuated. According to a further specific feature, the cartilage conduction unit can be an elastic body integrally affixed to and covered by the exterior of the chassis. More specifically, the cartilage conduction unit can be connected with an elastic body integrally affixed to and covered by the exterior of the chassis.

According to another specific feature, the cartilage conduction unit is a rigid body, and the elastic body also covers the cartilage conduction unit. Sound leakage to the surroundings due to the generation of air conduction sound can thereby be attenuated even while favorable cartilage conduction is obtained. According to a more specific feature, the cartilage conduction unit is supported on the chassis via a vibration isolation material, and the transmission of vibrations to the chassis is attenuated. According to a further specific feature, the vibration isolation material is an elastic body of the same material as the elastic body integrally affixed to and covered by the exterior of the chassis.

According to another specific feature, the cartilage conduction vibration source is supported on the cartilage conduction unit in a state of non-contact with the chassis, and the direct transmission of vibration from the cartilage conduction vibration source to the chassis is avoided. In the case where priority is given to structural simplicity, it is also possible for the cartilage conduction vibration source to be supported on the chassis. The chassis will then have greater vibration, but such vibration can be attenuated by the elastic body integrally affixed to and covered by the exterior of the chassis.

According to another feature, there is provided a mobile telephone comprising: an elastic body integrally affixed to and covered by the exterior of the chassis, and a cartilage conduction vibration source supported by the elastic body in a state of non-contact with the chassis. It is thereby possible to attenuate sound leakage to the surroundings due to the generation of air conduction sound even while avoiding the direct transmission of vibration from the cartilage conduction vibration source to the chassis, and to listen to sound by cartilage conduction.

According to a specific feature, the cartilage conduction vibration source is supported on the inside of the elastic body, and the outside of the elastic body at the part supporting the cartilage conduction vibration source serves as a cartilage conduction unit for making contact with the ear cartilage. According to a further specific feature, the cartilage conduction vibration source is supported on the inside of the elastic body via a rigid support unit.

According to another specific feature, the mobile telephone has a support structure for supporting the internal configuration of the mobile telephone on the chassis from the inside such that the weight thereof vibrates integrally. The vibration from the interior and the exterior of the chassis of the mobile telephone can thereby be suppressed.

According to another feature, there is provided a mobile telephone comprising: a cartilage conduction vibration source provided to the interior of a chassis; and a support structure for supporting the internal configuration of the mobile telephone on the chassis from the inside such that the weight thereof vibrates integrally. The vibration of the chassis of the mobile telephone is thereby suppressed and sound leakage due to the generation of air conduction sound is thereby attenuated. Internal configurations contributing to the above include a battery.

According to a specific feature, the mobile telephone has a finely subdividing structure for finely subdividing surplus space of the interior of the chassis. The vibration of the chassis of the mobile telephone can thereby be suppressed and the air inside the chassis prevented from resonating, and the generation of air conduction sound can thereby be attenuated.

According to another feature, there is provided a mobile telephone comprising: a cartilage conduction vibration source provided to the interior of a chassis, and a finely subdividing structure for finely subdividing the surplus space of the interior of the chassis. The air inside the chassis can thereby be prevented from resonating, and the generation of air conduction sound can thereby be attenuated. An example of a finely subdividing structure is a barrier wall. Another example of a finely subdividing structure is a nonwoven cloth packed inside the chassis.

INDUSTRIAL APPLICATION

The present invention can be applied to a mobile telephone.

LIST OF REFERENCE SIGNS 24, 26 Cartilage conduction vibration unit
32,34 Tragus
19, 21, 22 Sensor
49 Gravitational acceleration detection unit
5, 17, 39 Gravitational acceleration detection unit
3 Folding structure
13 Audio output unit
38 Environment-noise microphone
36 Phase adjustment unit
39 Controller

What is claimed is:

1. An incoming/outgoing-talk unit for a mobile telephone, the incoming/outgoing-talk unit arranged for attaching to an ear having a base and an auricle that includes an inner side to collect incoming sound into an external auditory meatus and that includes an outer side opposite the inner side, the incoming/outgoing-talk unit comprising:
a pair of temples for a right ear and a left ear, respectively, each having an ear-hook unit,
a cartilage conduction vibration unit within at least one of the ear-hook units that makes direct contact with ear cartilage in a state where the hook unit is hooked to the ear so as to cause cartilage conduction from the cartilage conduction vibration unit to outer side of the cartilage of the base of the ear,
an outgoing-talk unit, and
a unit for performing short-range wireless communication with the mobile telephone,
wherein the cartilage conduction vibration unit causes cartilage conduction to the outer side of the cartilage of the base of the ear by means of direct contact of the cartilage conduction vibration unit to the outer side of the cartilage of the base of the ear without an audio source on the inner side of the auricle in a state where the ear-hook unit is hooked to the outer side of the base of the ear without crushing the auricle.

2. The incoming/outgoing-talk unit according to claim 1, comprising: a phase inversion unit for phase inversion of audio information inputted from the outgoing-talk unit; and a control unit for outputting, from the cartilage conduction vibration unit, audio information having been phase-inverted by the phase inversion unit.

3. The incoming/outgoing-talk unit according to claim 2, comprising an acoustics adjustment unit, the control unit outputting, from the cartilage conduction vibration unit, audio information having been acoustically adjusted by the acoustics adjustment unit and phase-inverted by the phase inversion unit.

4. The incoming/outgoing-talk unit according to claim 2, comprising a contact state detection unit for detecting a state of contact of the cartilage conduction vibration unit against the ear cartilage, the control unit determining in accordance with the state detected by the contact state detection unit whether or not to output, from the cartilage conduction vibration unit, the audio information having been phase-inverted by the phase inversion unit.

5. The incoming/outgoing-talk unit of claim 1 wherein the vibration generated by the cartilage conduction vibration unit is conducted into the ear cartilage through the direct contact thereto and air conduction sound is subsequently created within the external auditory meatus, the air conduction sound then proceeding through the inside of the external auditory meatus to reach the tympanic membrane.

6. An incoming-talk unit for attaching to an ear having a base and an auricle that includes an inner side to collect incoming sound into an external auditory meatus and that includes an outer side opposite the inner side, the incoming-talk unit comprising:
a pair of temples for a right ear and a left ear, respectively, each having an ear-hook unit, and
a cartilage conduction vibration unit within at least one of the ear-hook units for causing cartilage conduction to outer side of the cartilage of the base of the ear by means of direct contact of the cartilage conduction vibration unit to the outer side of the cartilage of the base of the ear without an audio source on the inner side of the auricle in a state where the ear-hook unit is hooked to the outer side of the base of the ear without crushing the auricle.

7. The incoming-talk unit according to claim 6, wherein the hook unit is part of an eyeglass temple.

8. The incoming-talk unit according to claim 7, wherein the cartilage conduction vibration unit is capable of being attached to and detached from the eyeglass temple.

9. The incoming-talk unit according to claim 7, wherein a respective cartilage conduction vibration unit is arranged on each of a pair of eyeglass temples.

10. The incoming-talk unit according to claim 7, wherein the incoming-talk unit is for three-dimensional viewing.

11. An incoming-talk unit capable of being superposed on eyesight-adjusting eyeglasses having a pair of temples, the incoming-talk unit comprising:
a pair of temples for a right ear and a left ear, respectively, each having a contact unit for fitting the pair of temples of the eyesight-adjusting eyeglasses when the incoming-talk unit is superposedly mounted on the eyesight-adjusting eyeglasses; and
a vibration source within at least one of the temples of the incoming-talk unit, respectively, to conduct vibration to the temples of the eyesight-adjusting eyeglasses which is in contact with ear cartilage
wherein the vibration source transmits vibration to an outer side of the cartilage of the base of the ear without an audio source on the inner side of the auricle in a state when the temples of the incoming-talk unit fit the pair of temples of the eyesight-adjusting eyeglasses and the pair of temples of the eyesight-adjusting eyeglasses are hooked to the outer side of the bases of the right and left ears without crushing the auricles, respectively.

12. The incoming-talk unit according to claim 11, wherein the contact unit has elasticity for a reliable contact with the temples of the eyesight-adjusting eyeglasses.

13. An incoming-talk unit for attaching to an ear having a base and an auricle that includes an inner side to collect incoming sound into an external auditory meatus and that includes an outer side opposite the inner side, the incoming-talk unit comprising:
a pair of temples for a right ear and a left ear, respectively, each temple for contacting to the outer side of the base of a respective one of the ears; and
a vibration source within at least one of the temples for transmitting vibration to at least one of the pair of temples to cause vibration conduction to outer side of the cartilage of the base of the ear by means of direct contact of the one of the temples to the outer side of the cartilage of the base of the ear without an audio source on the inner side of the auricle in a state when the pair of temples are hooked to the outer side of the bases of the right and left ears without crushing the auricles, respectively.

14. The incoming-talk unit according to claim 13, wherein the vibration source includes vibration sources for transmitting vibrations to the pair of temples, respectively.

15. The incoming-talk unit according to claim 13 further comprising an outgoing-talk unit.

16. The incoming-talk unit according to claim 13 further comprising a unit for performing short-range wireless communication with a mobile telephone.

17. The incoming-talk unit according to claim 13 further comprising a display unit for viewing image when the pair of temples are hooked to the right and left ears, respectively.

18. An incoming/outgoing-talk unit for a mobile telephone, the incoming/outgoing-talk unit arranged for attaching to an ear having a base and an auricle that includes an inner side to collect incoming sound into an external auditory meatus and that includes an outer side opposite the inner side, the incoming/outgoing-talk unit comprising:
  an attachment to an ear-hook unit of one of a pair of temples for a right ear and a left ear, respectively,
  a cartilage conduction vibration unit within the attachment that makes direct contact with ear cartilage in a state where the attachment is attached to the ear-hook unit and the ear-hook unit is hooked to the ear so as to cause cartilage conduction from the cartilage conduction vibration unit to outer side of the cartilage of the base of the ear,
  an outgoing-talk unit, and
  a unit for performing short-range wireless communication with the mobile telephone,
  wherein the cartilage conduction vibration unit causes cartilage conduction to the outer side of the cartilage of the base of the ear by means of direct contact of the cartilage conduction vibration unit to the outer side of the cartilage of the base of the ear without an audio source on the inner side of the auricle in a state where the attachment is attached to the ear-hook unit and the ear-hook unit is hooked to the outer side of the base of the ear without crushing the auricle.

19. The incoming/outgoing-talk unit according to claim 18, wherein the cartilage conduction vibration unit is an elastic body, the cartilage conduction vibration unit surrounding and holding a cartilage conduction vibration source.

20. The incoming/outgoing-talk unit according to claim 19, wherein the elastic body has an acoustic impedance approximating the acoustic impedance of ear cartilage.

21. The incoming/outgoing-talk unit according to claim 19, wherein the cartilage conduction vibration source comprises a piezoelectric bimorph element.

22. An incoming-talk unit for attaching to an ear having a base and an auricle that includes an inner side to collect incoming sound into an external auditory meatus and that includes an outer side opposite the inner side, the incoming-talk unit comprising:
  an attachment to an ear-hook unit of one of a pair of temples for a right ear and a left ear, respectively, and
  a cartilage conduction vibration unit within the attachment for causing cartilage conduction to outer side of the cartilage of the base of the ear by means of direct contact of the cartilage conduction vibration unit to the outer side of the cartilage of the base of the ear without an audio source on the inner side of the auricle in a state where the attachment is attached to the ear-hook unit and the ear-hook unit is hooked to the outer side of the base of the ear without crushing the auricle.

* * * * *